(12) United States Patent
Tsuboi et al.

(10) Patent No.: US 8,231,249 B2
(45) Date of Patent: Jul. 31, 2012

(54) LIGHTING SYSTEM

(75) Inventors: Miki Tsuboi, Kanagawa (JP); Yuichi Takai, Tokyo (JP); Mariko Obinata, Kanagawa (JP)

(73) Assignee: Sony Corporation, Tokyo (JP)

( * ) Notice: Subject to any disclaimer, the term of this patent is extended or adjusted under 35 U.S.C. 154(b) by 968 days.

(21) Appl. No.: 12/204,551

(22) Filed: Sep. 4, 2008

(65) Prior Publication Data

US 2009/0207622 A1 Aug. 20, 2009

(30) Foreign Application Priority Data

Sep. 5, 2007 (JP) ................................. 2007-230046

(51) Int. Cl.
 *F21V 5/00* (2006.01)
(52) U.S. Cl. ........ 362/317; 362/331; 362/334; 359/253; 359/228
(58) Field of Classification Search .................. 362/317, 362/341, 331; 396/175, 200, 665; 359/253, 359/228, 245
 See application file for complete search history.

(56) References Cited

U.S. PATENT DOCUMENTS 7,697,187 B2 * 4/2010 Kato et al. .................... 359/253
7,853,139 B2 * 12/2010 Tsuchiya ..................... 396/175

FOREIGN PATENT DOCUMENTS

| EP | 1 542 056 | 6/2005 |
|---|---|---|
| JP | 02-196228 | 8/1990 |
| JP | 2000-356708 | 12/2000 |
| JP | 2002-162507 | 6/2002 |
| JP | 2004-029756 | 1/2004 |
| WO | WO 03/071335 | 8/2003 |

OTHER PUBLICATIONS

Japanese Office Action issued on Jun. 23, 2009, for corresponding Japanese Patent Application JP 2007-230046.
European Search Report issued on Jan. 12, 2009, for corresponding European Patent Application No. 08015480.0.

* cited by examiner

*Primary Examiner* — Anabel Ton
(74) *Attorney, Agent, or Firm* — K&L Gates LLP

(57) ABSTRACT

A lighting system is provided that includes: an optical device including a cylindrical lens made up of a liquid lens, an emission unit including an axis line in the Z-axis direction, and a reflecting mirror configured to reflect light emitted from the emission unit. The cross-sectional shape of a light reflecting portion when cutting away the reflecting mirror at a virtual plane perpendicular to the Z axis is a part of a parabola. The axis line of the emission unit is positioned between the vertex of the parabola and a focal point. Thus, there is provided a lighting system in which an optical device, which is made up of a liquid lens employing an electrowetting phenomenon, having an arrangement and configuration whereby high optical power can be obtained.

15 Claims, 68 Drawing Sheets

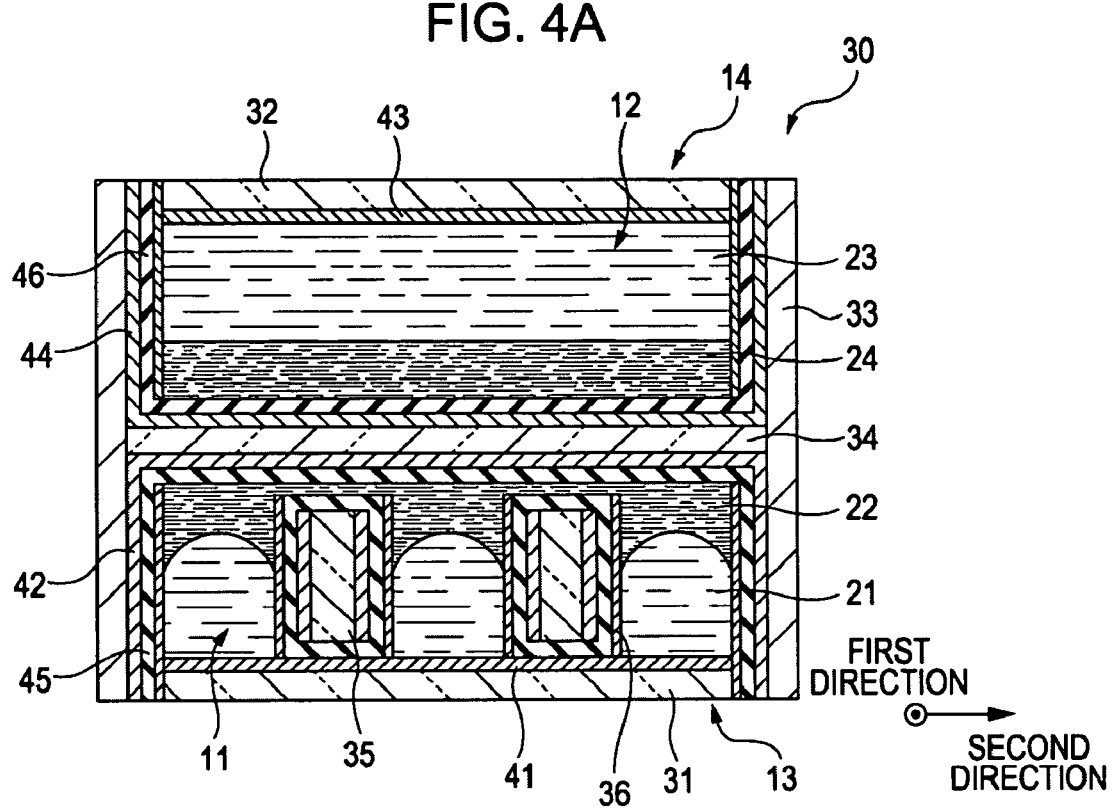
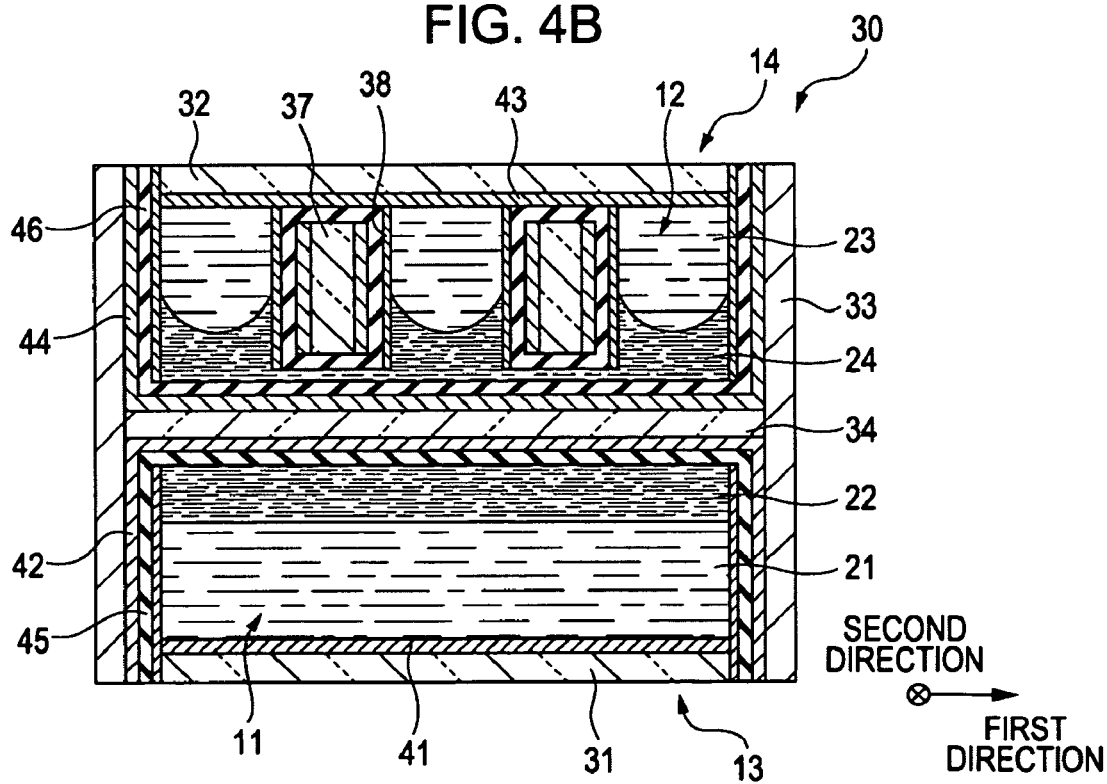

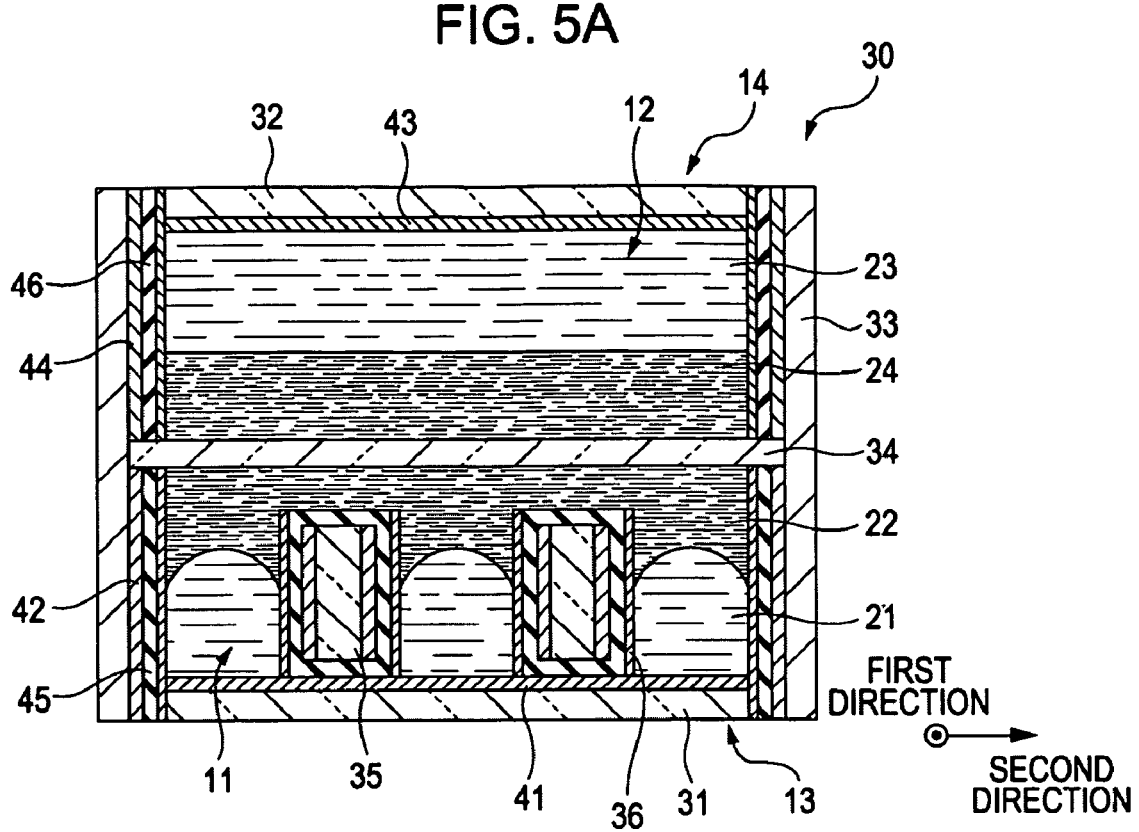
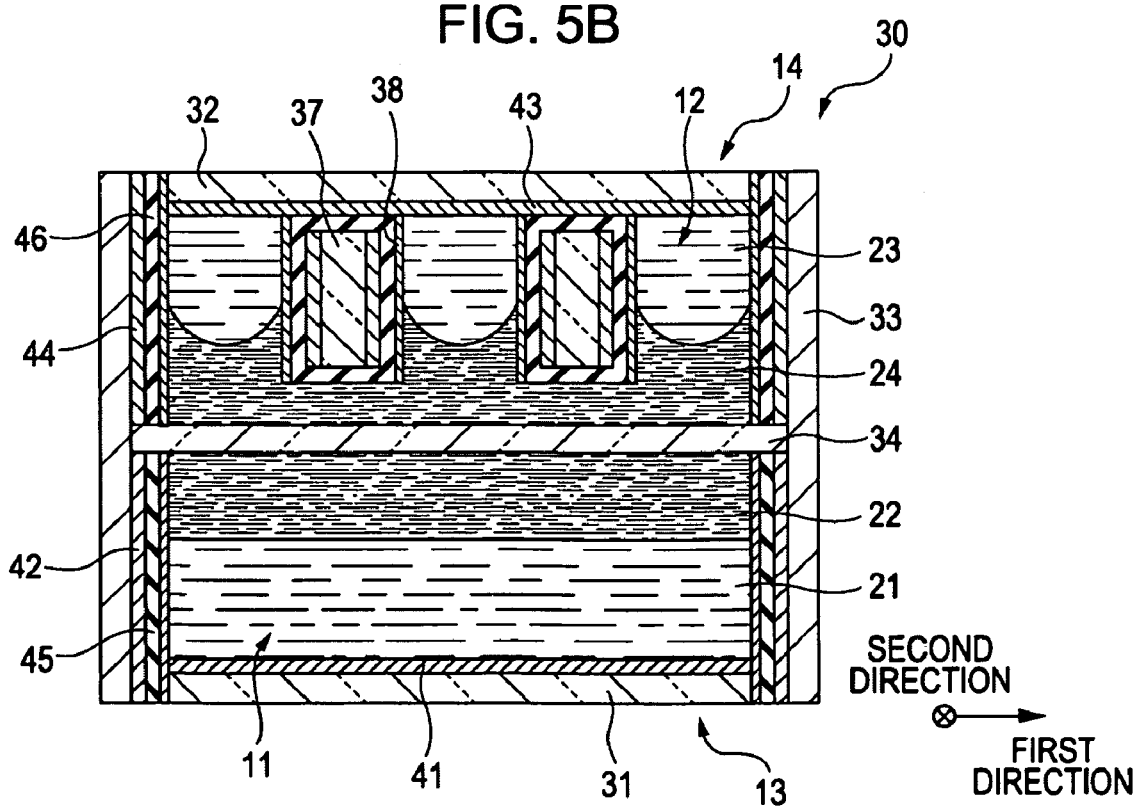

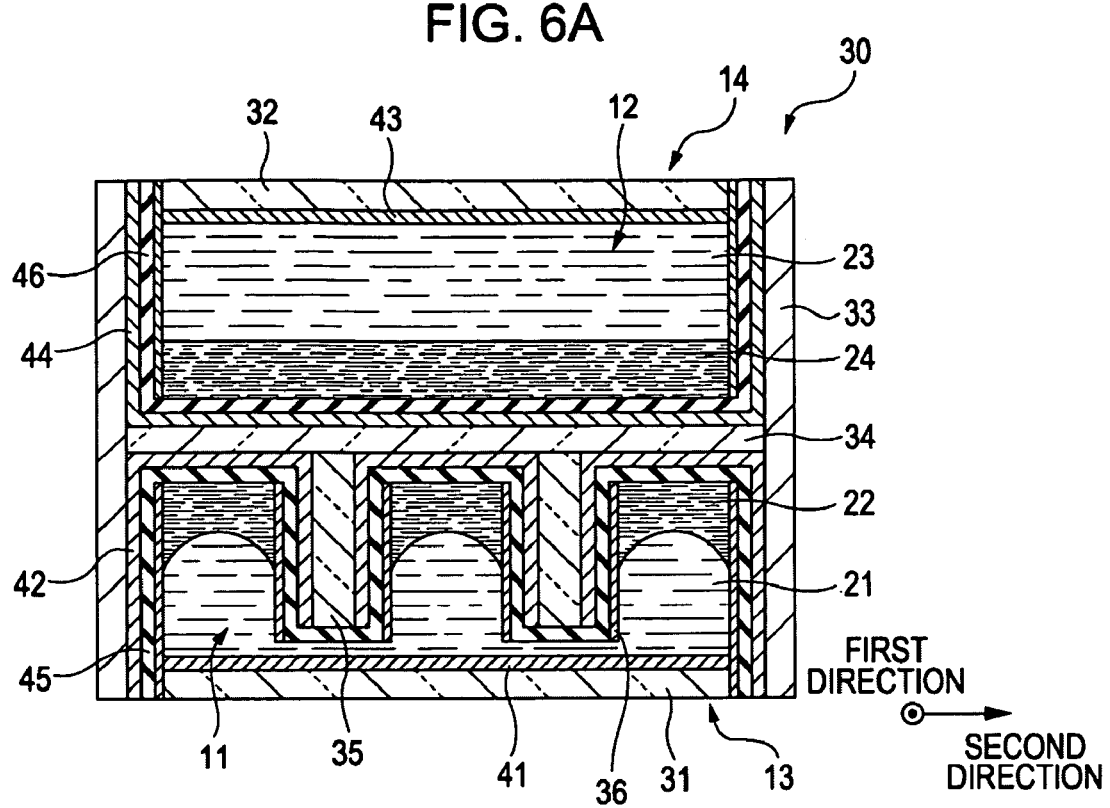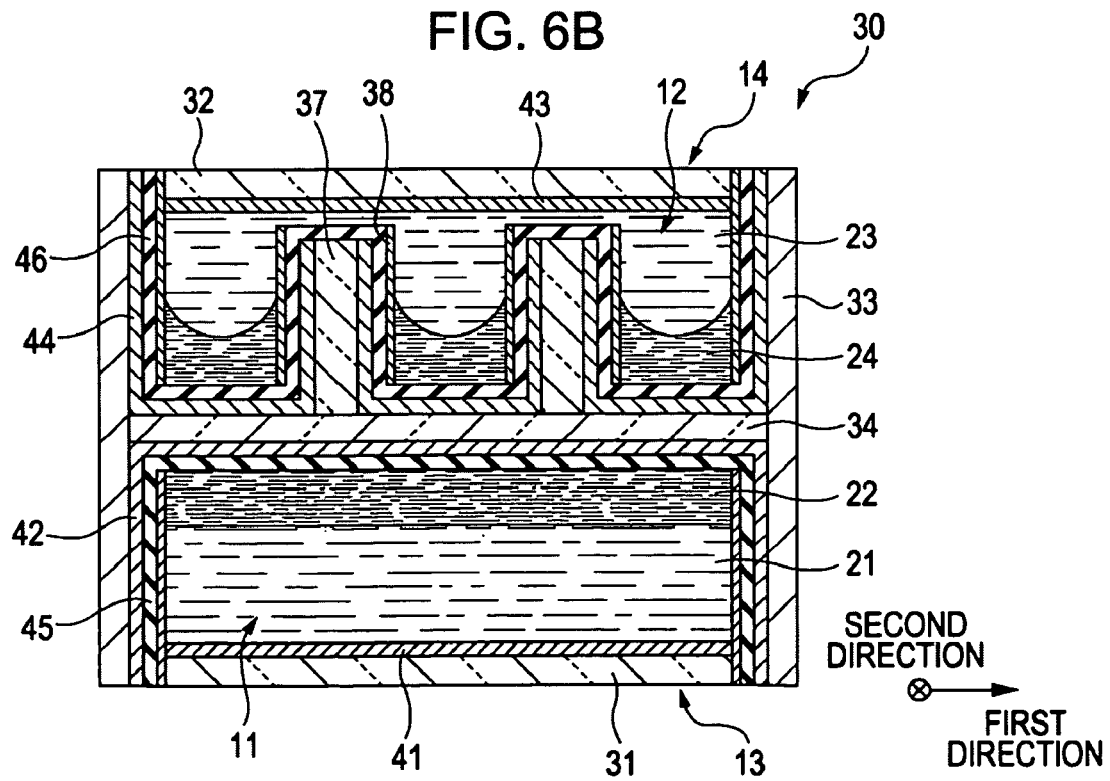

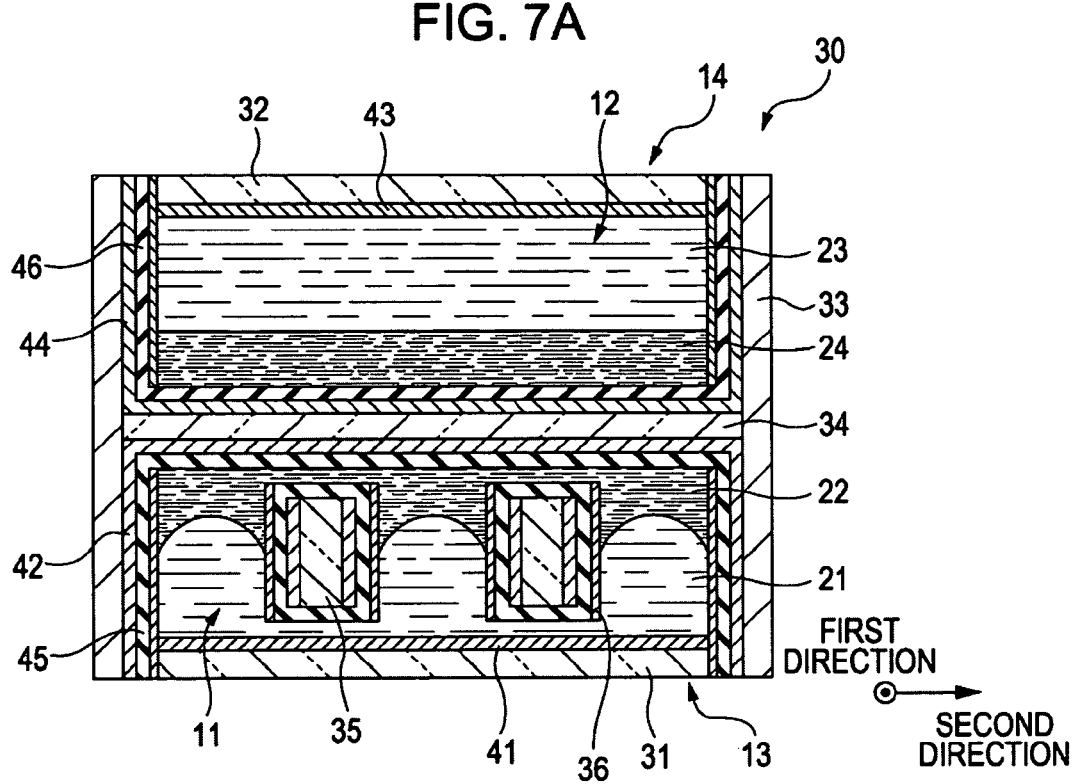
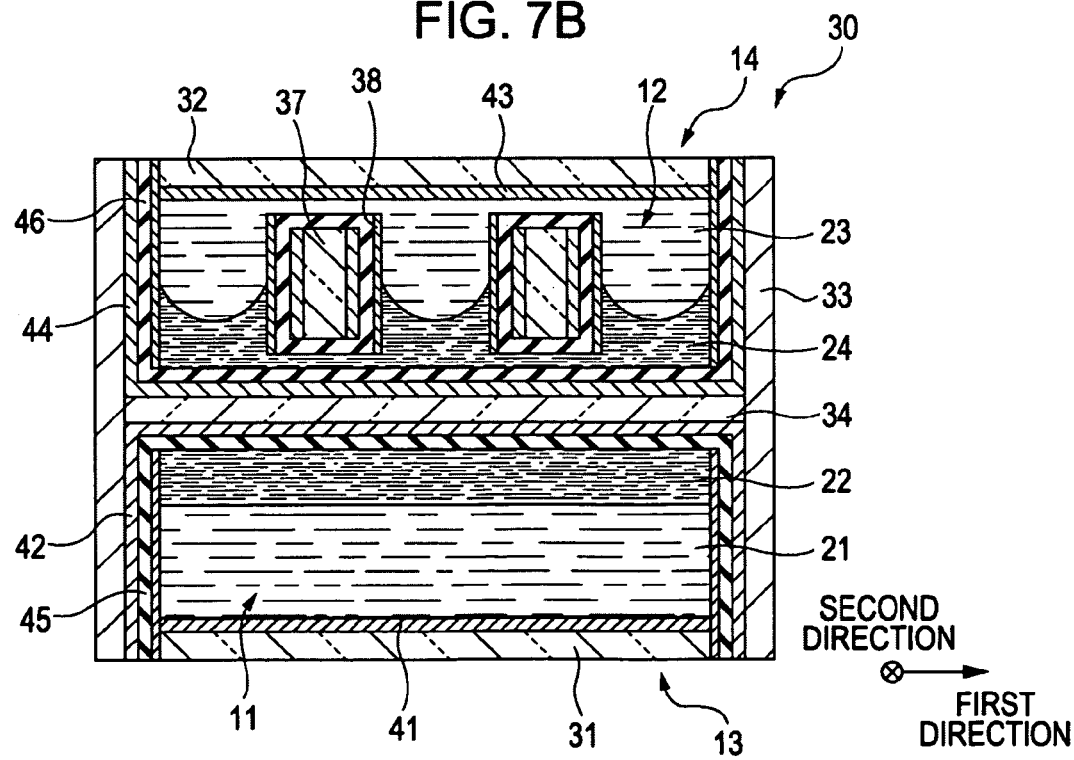

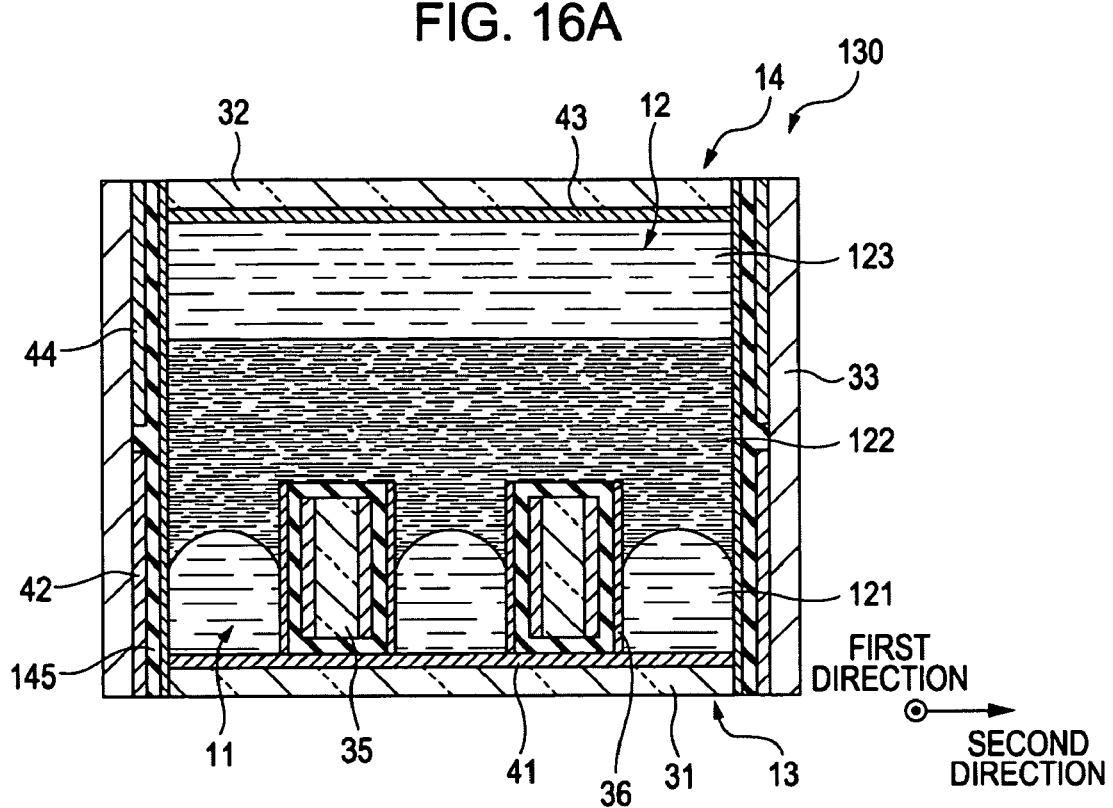
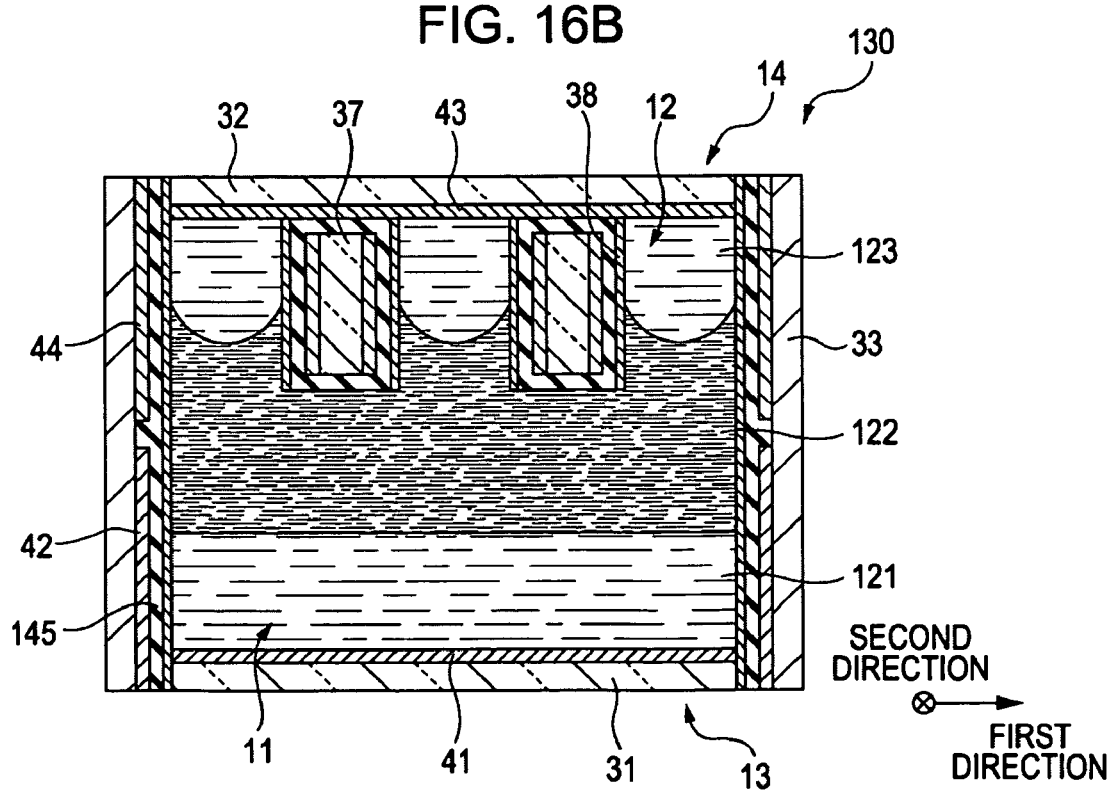

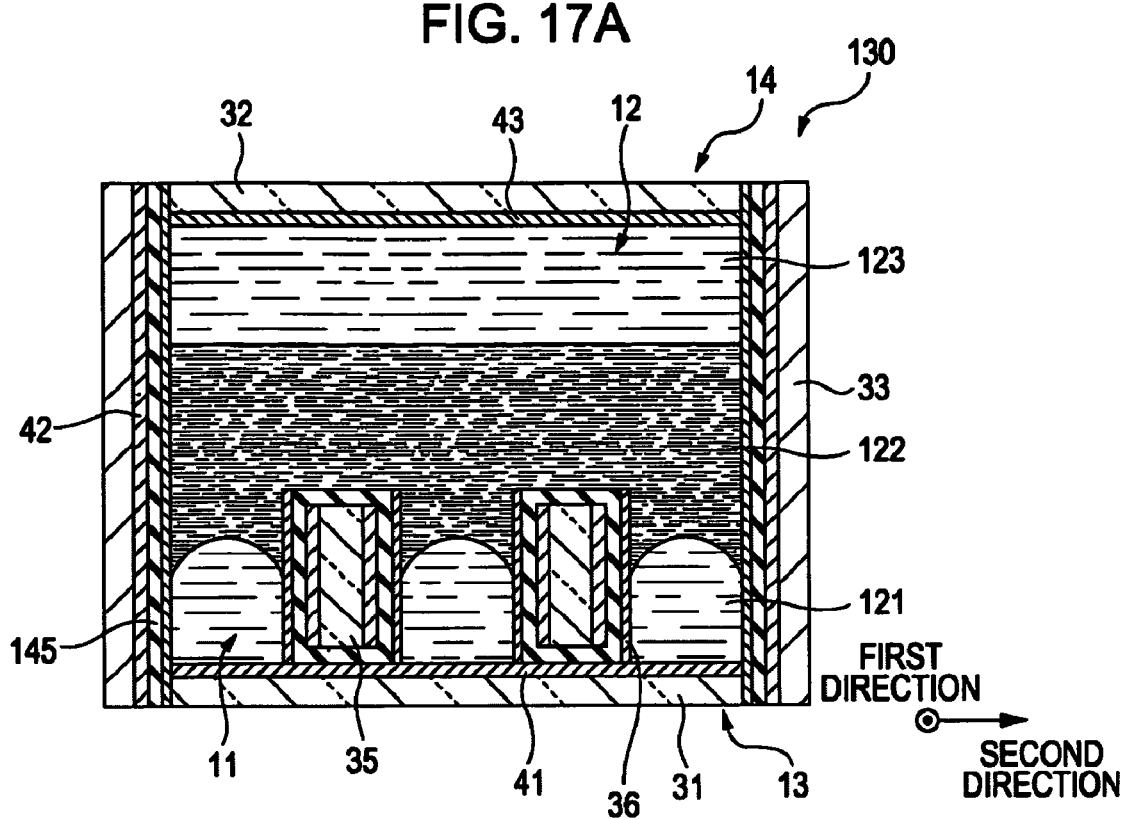
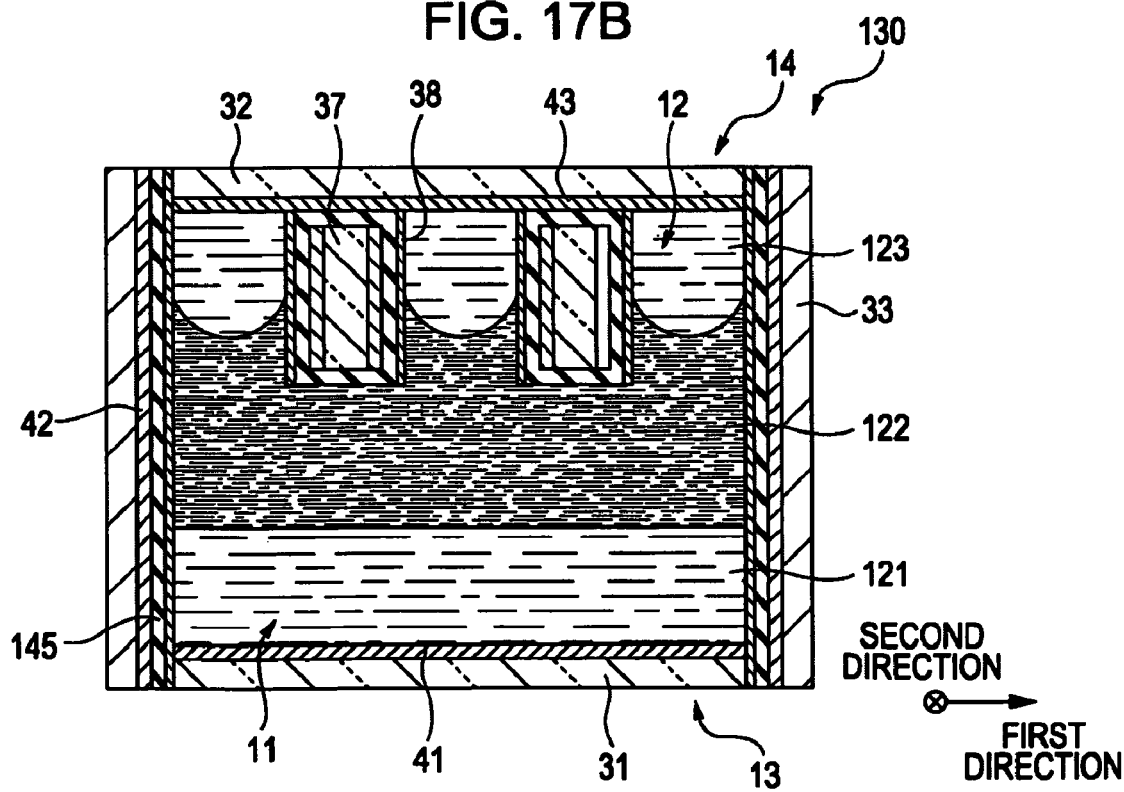

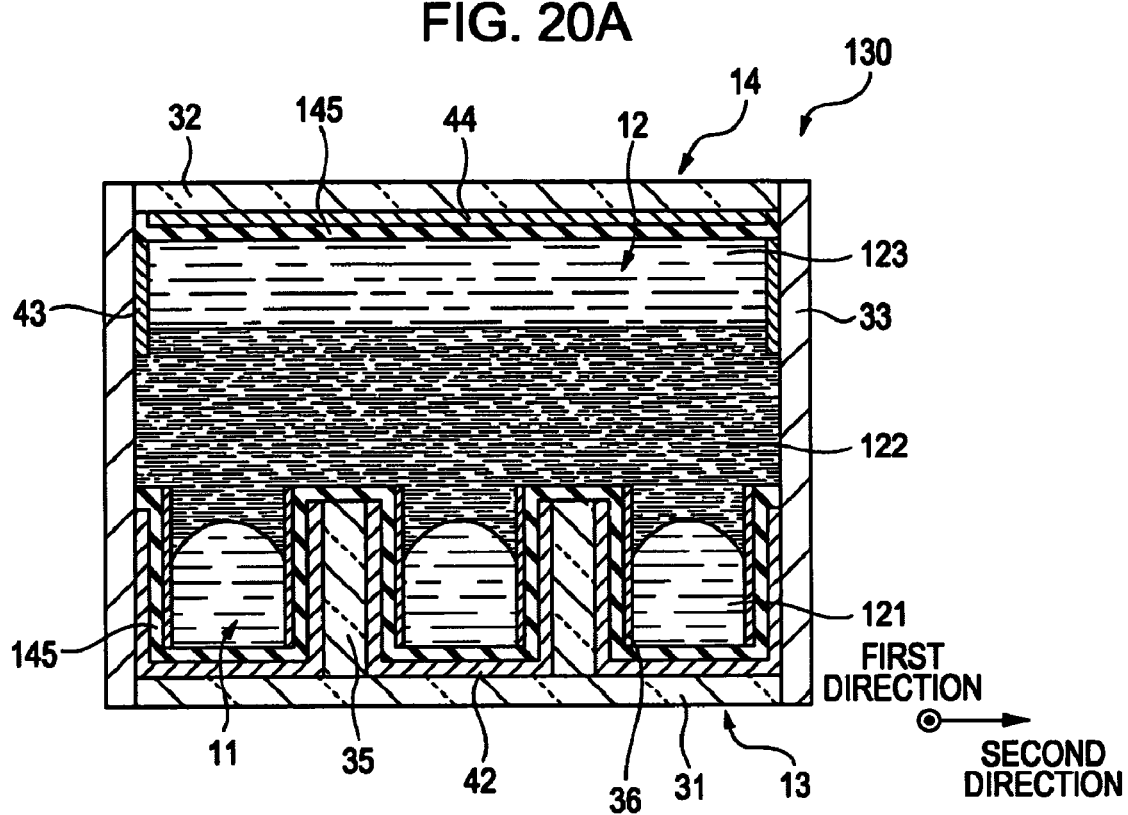
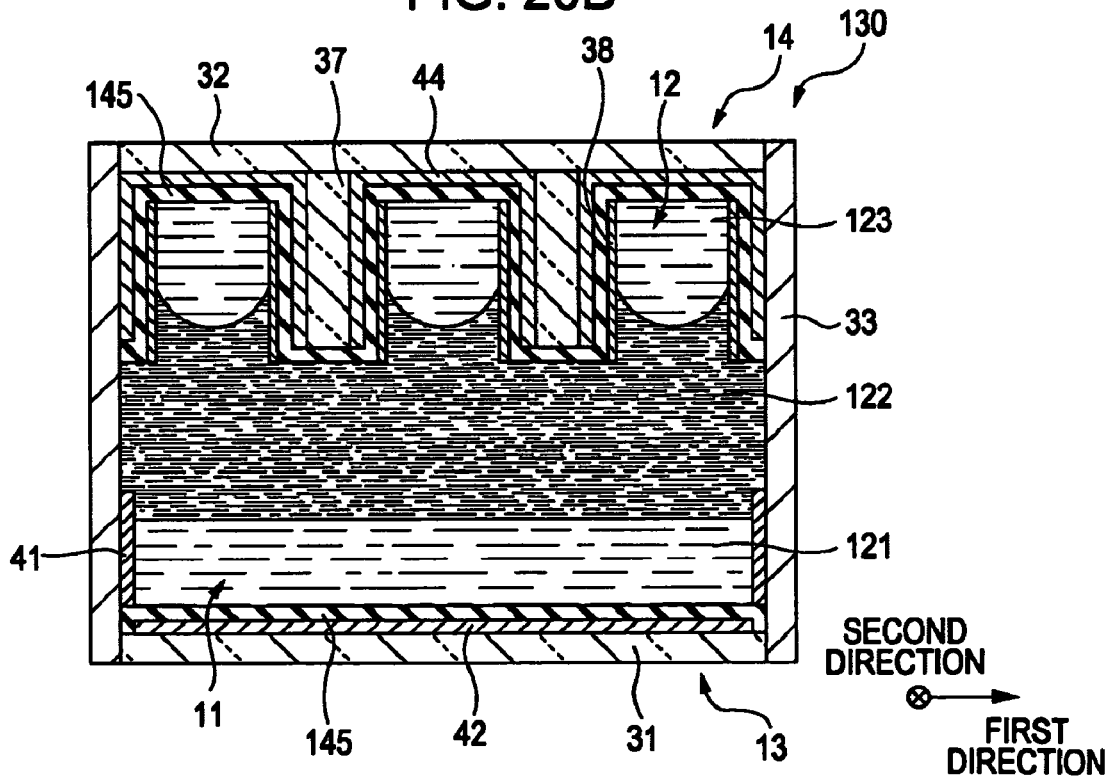

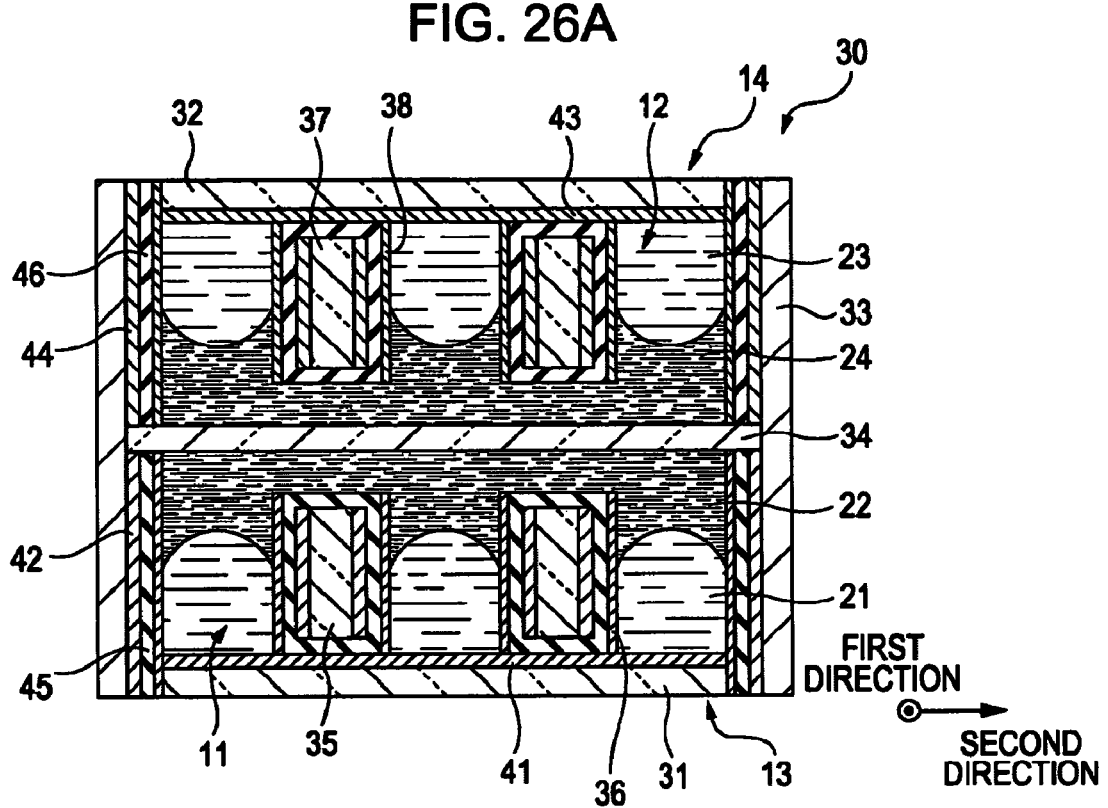
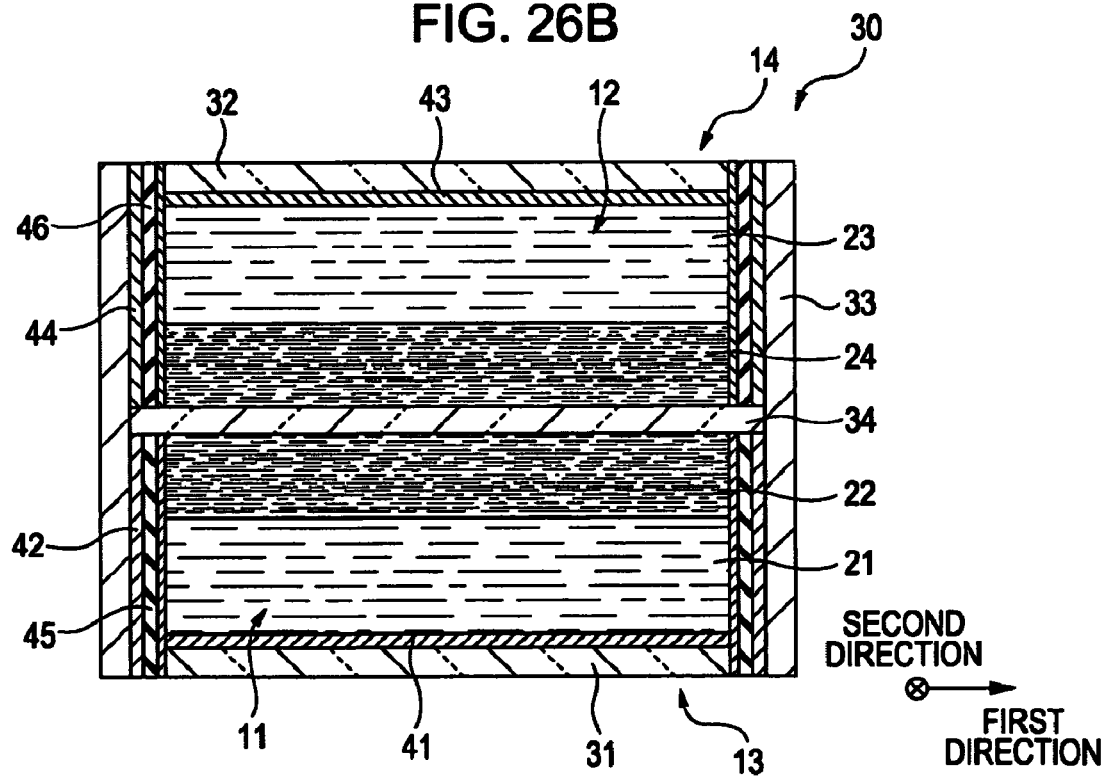

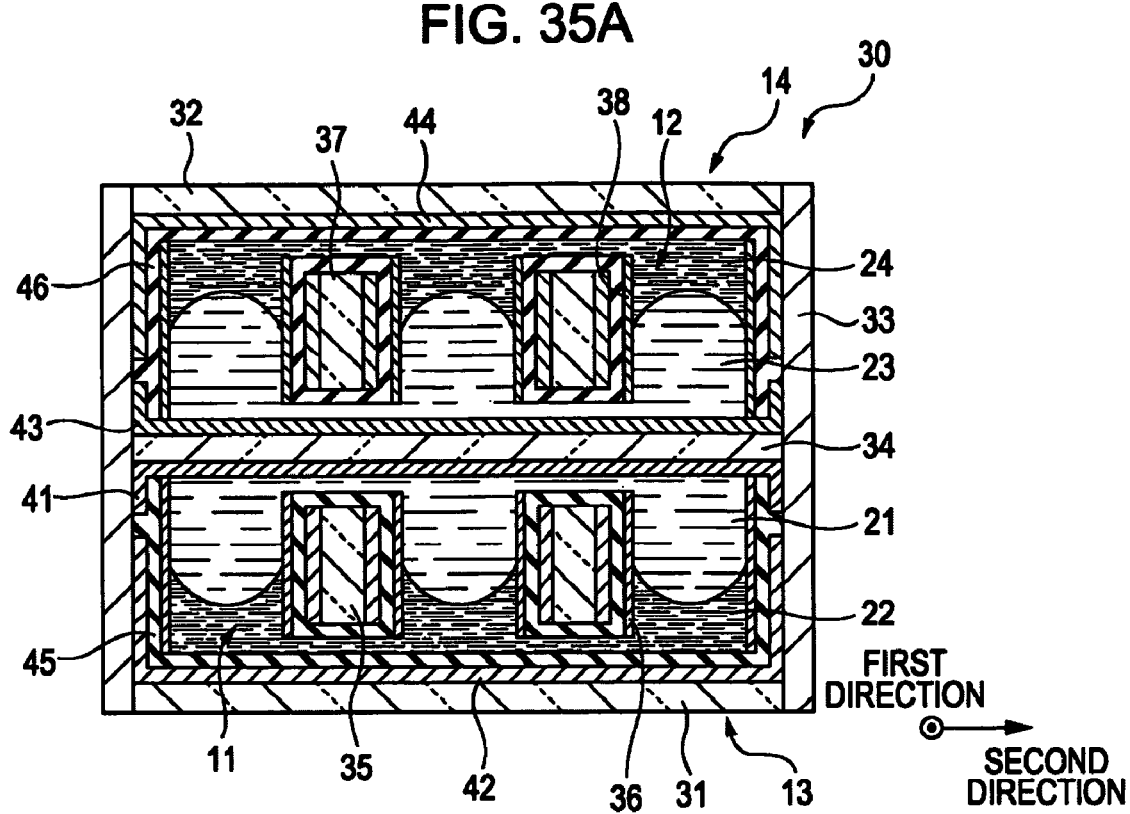
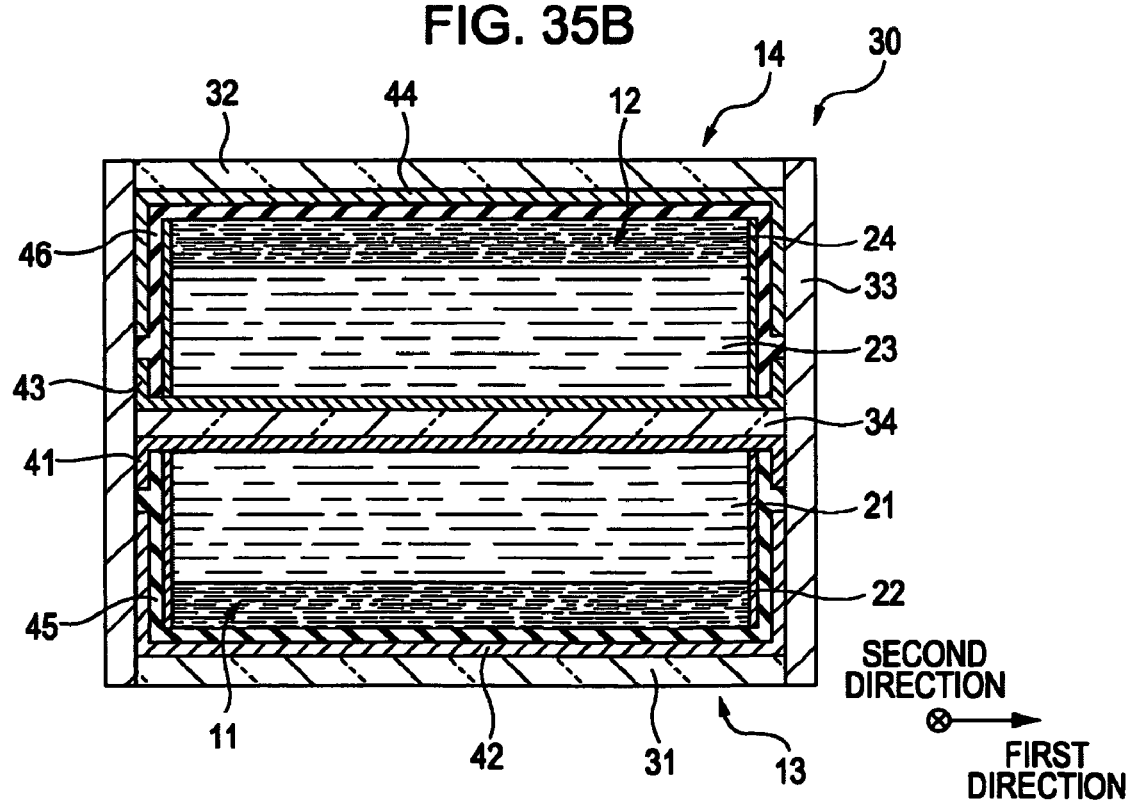

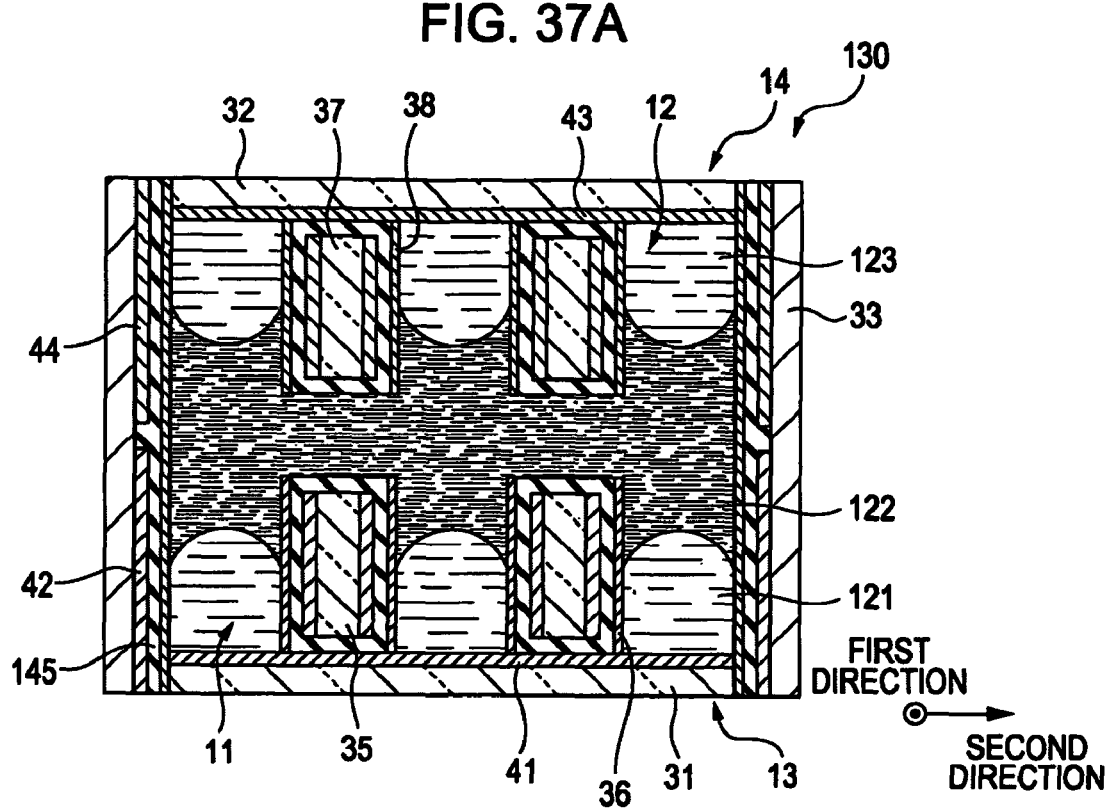
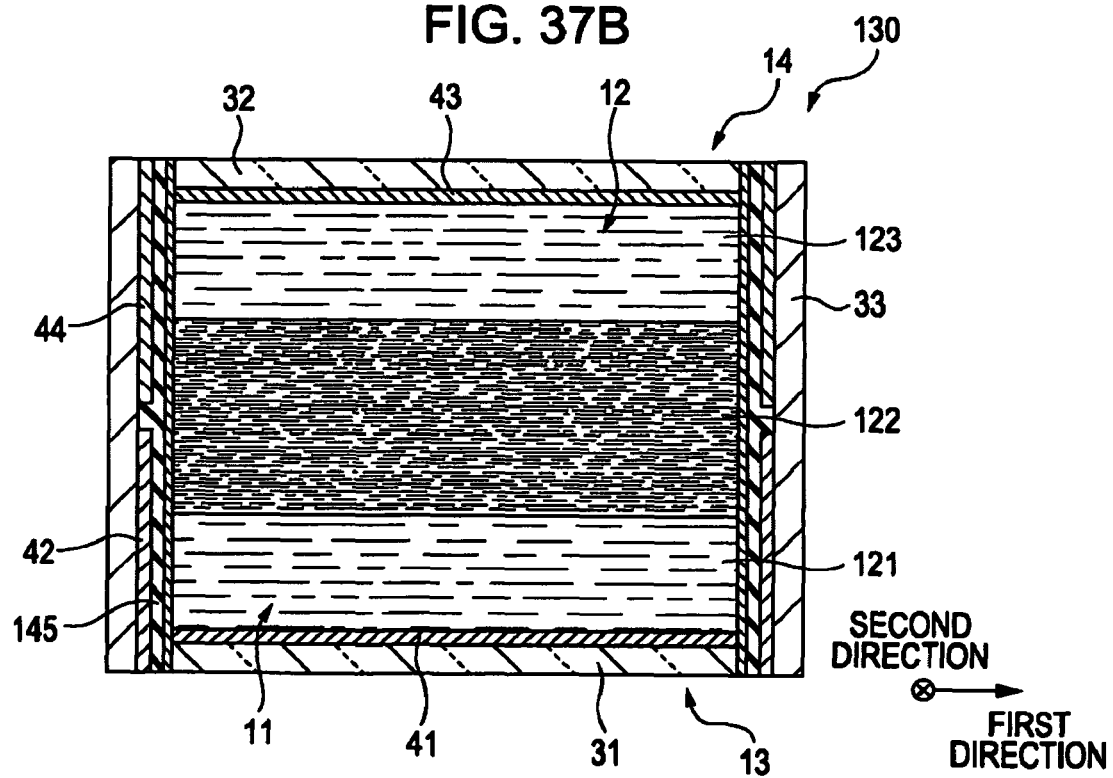

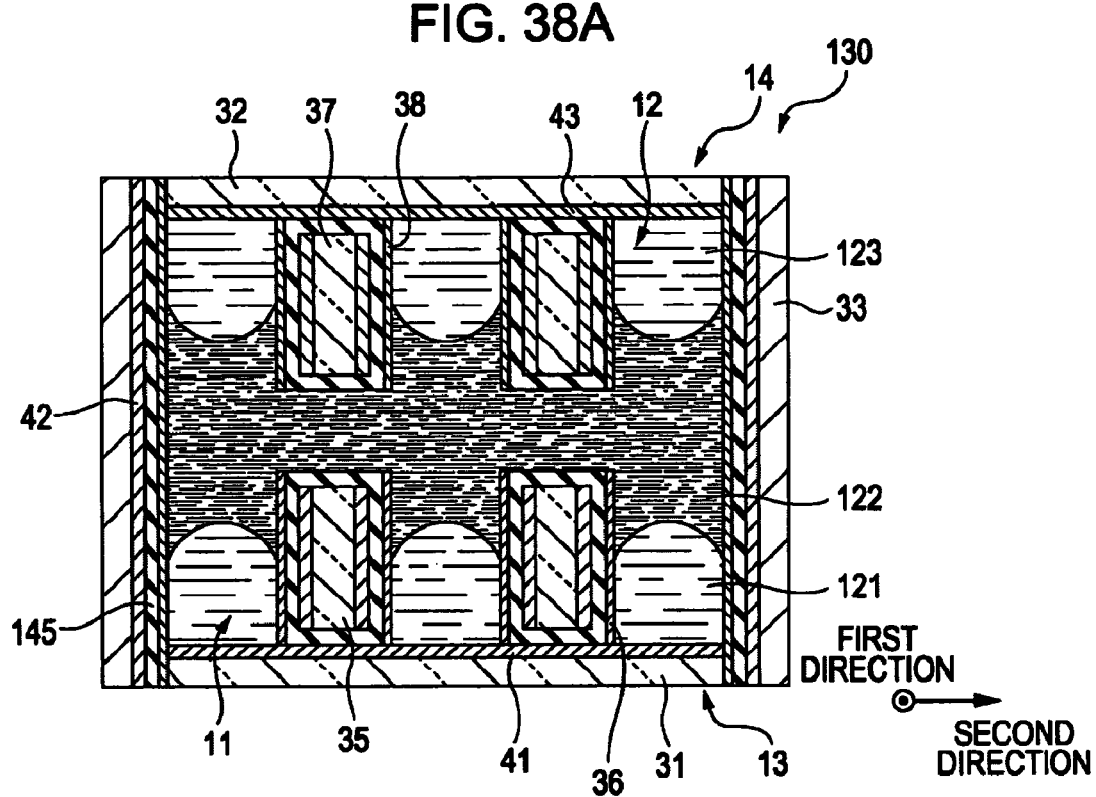
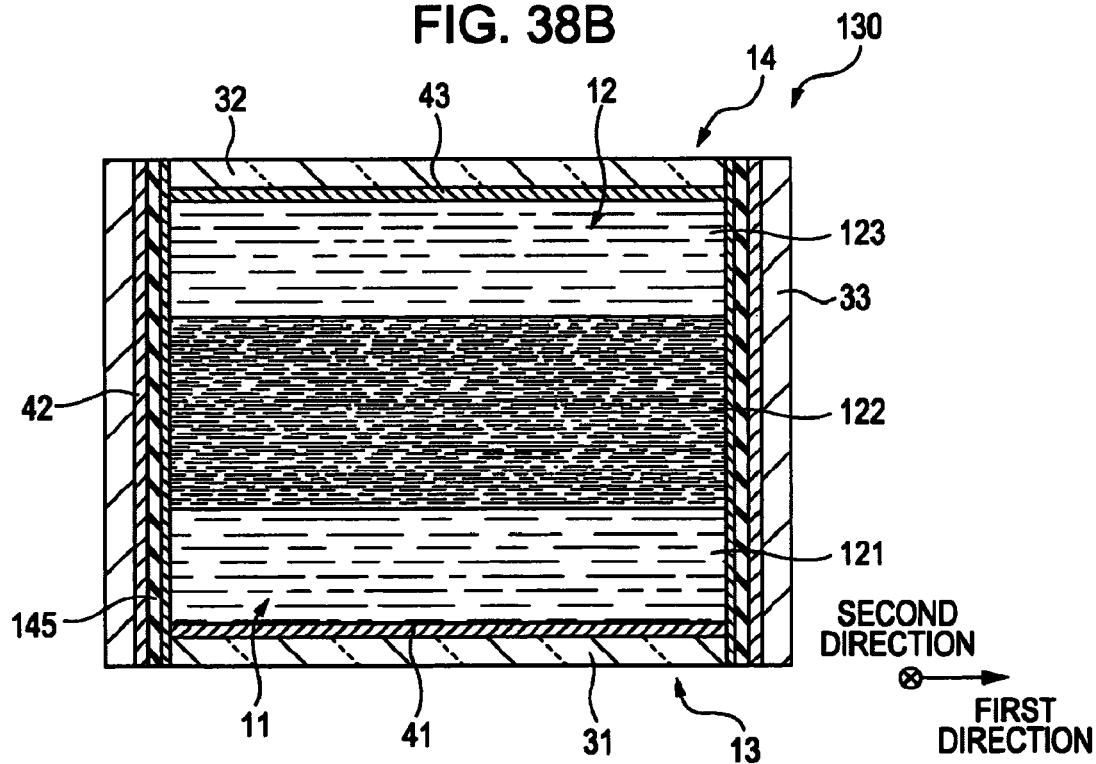

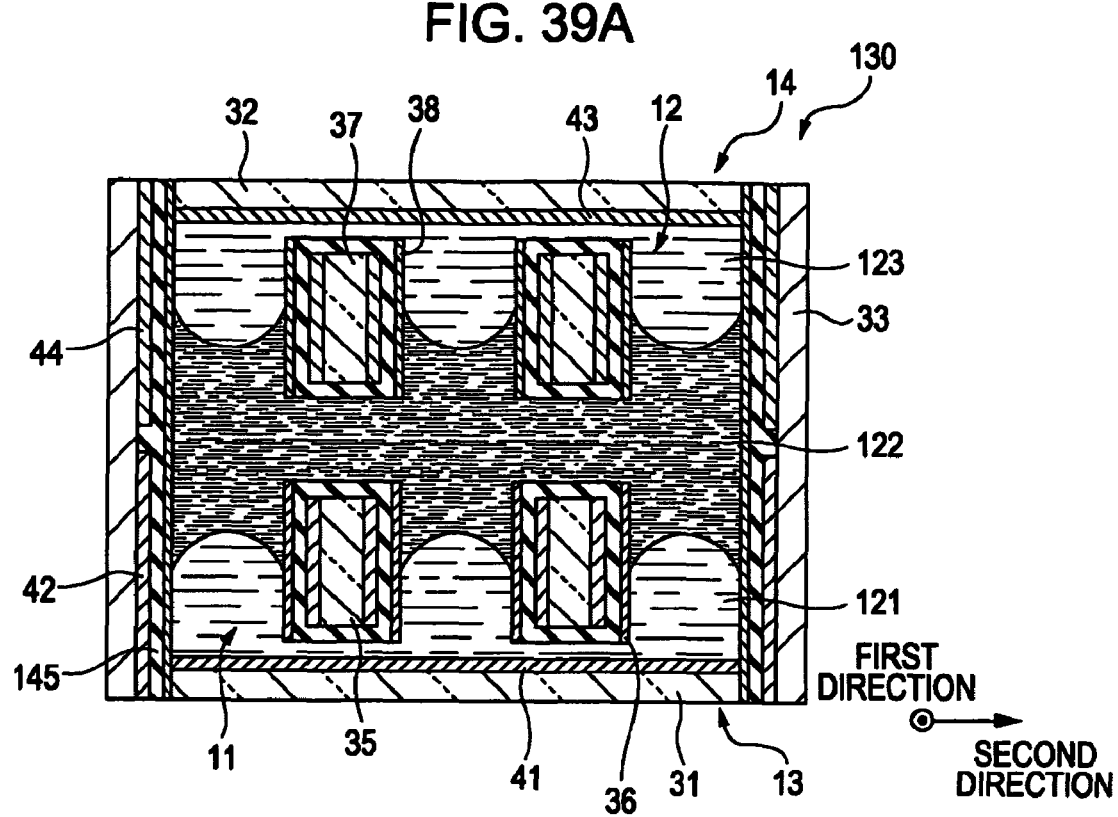
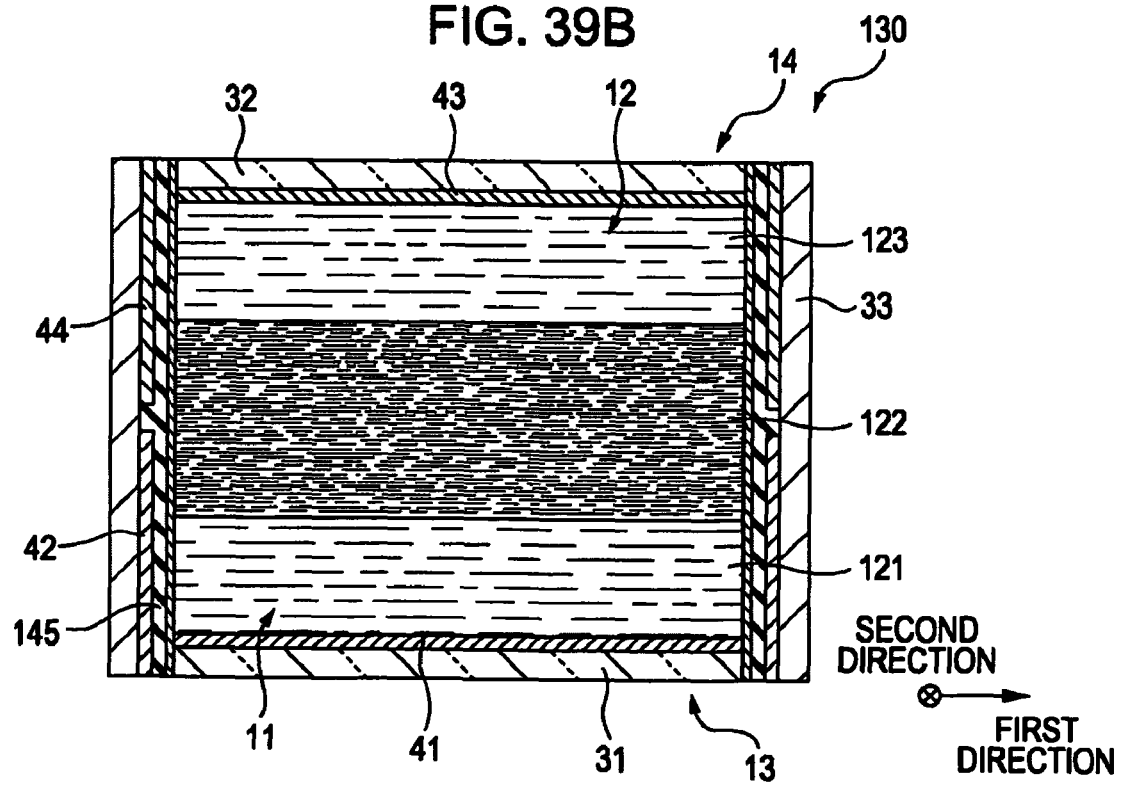

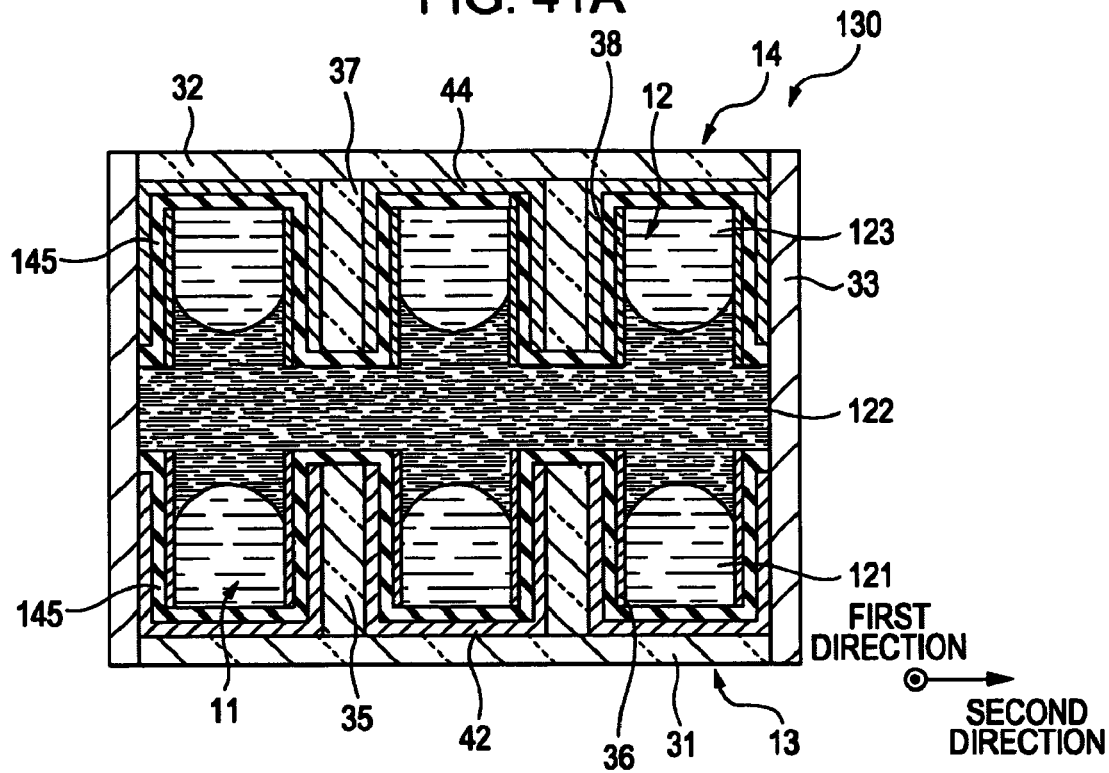
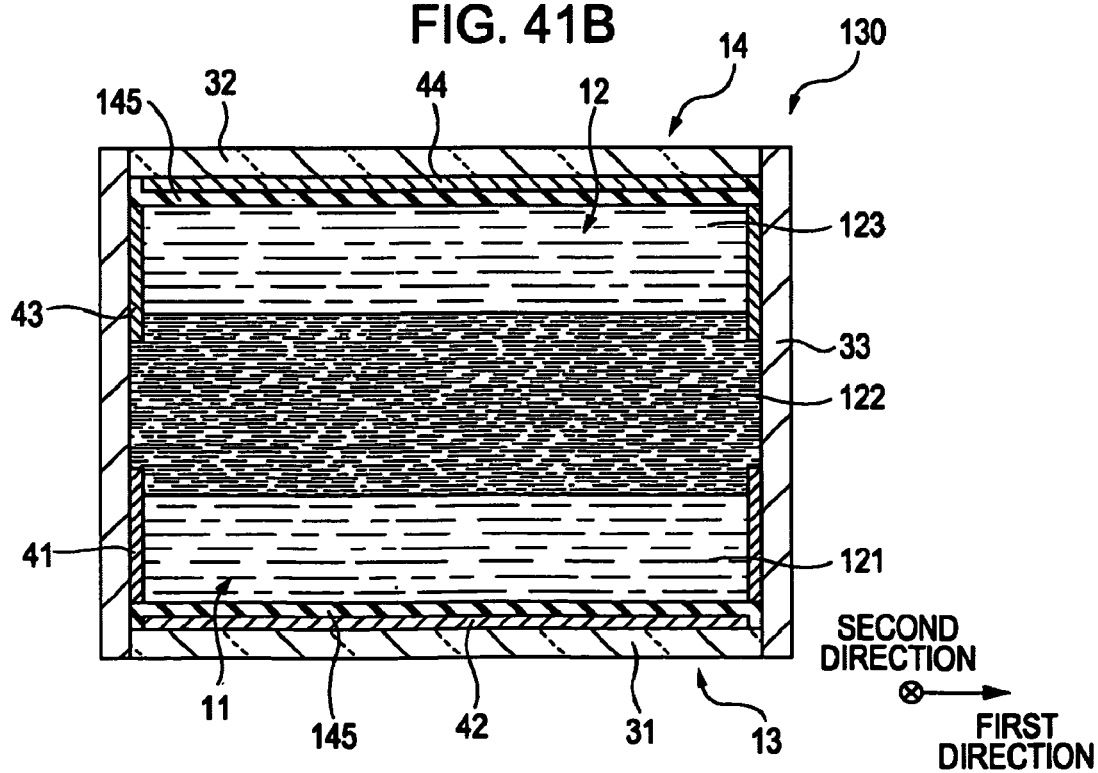

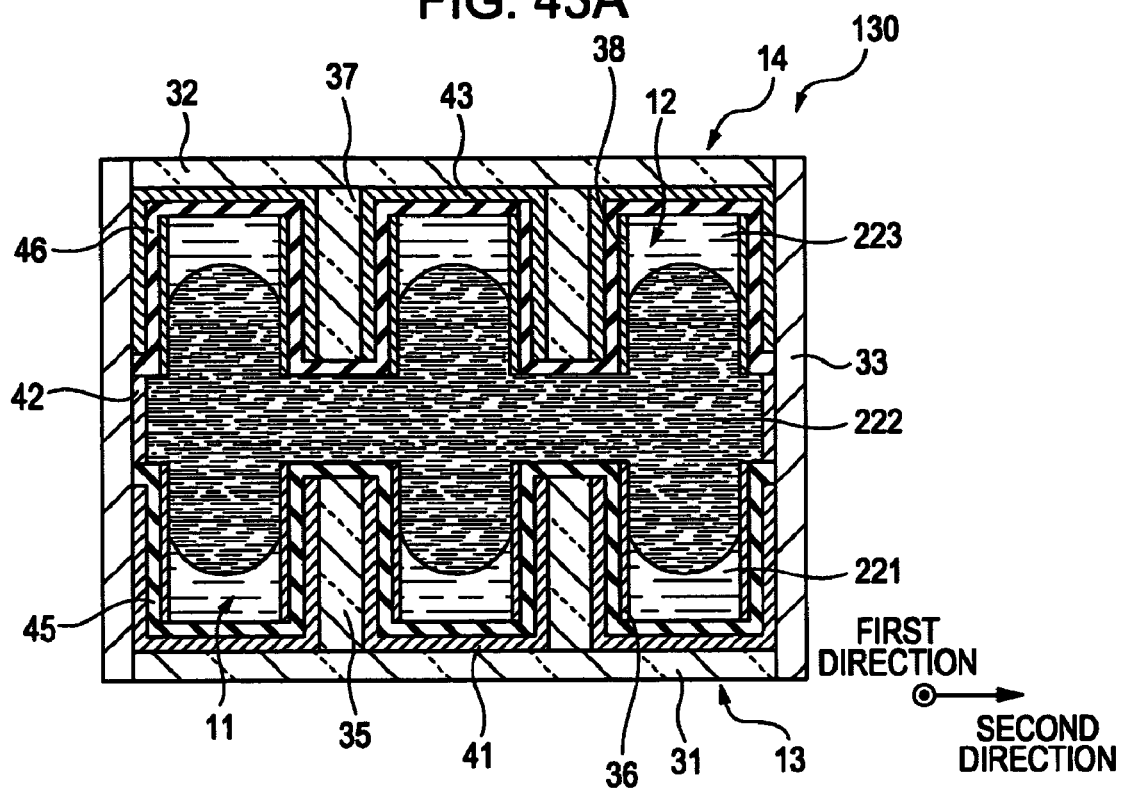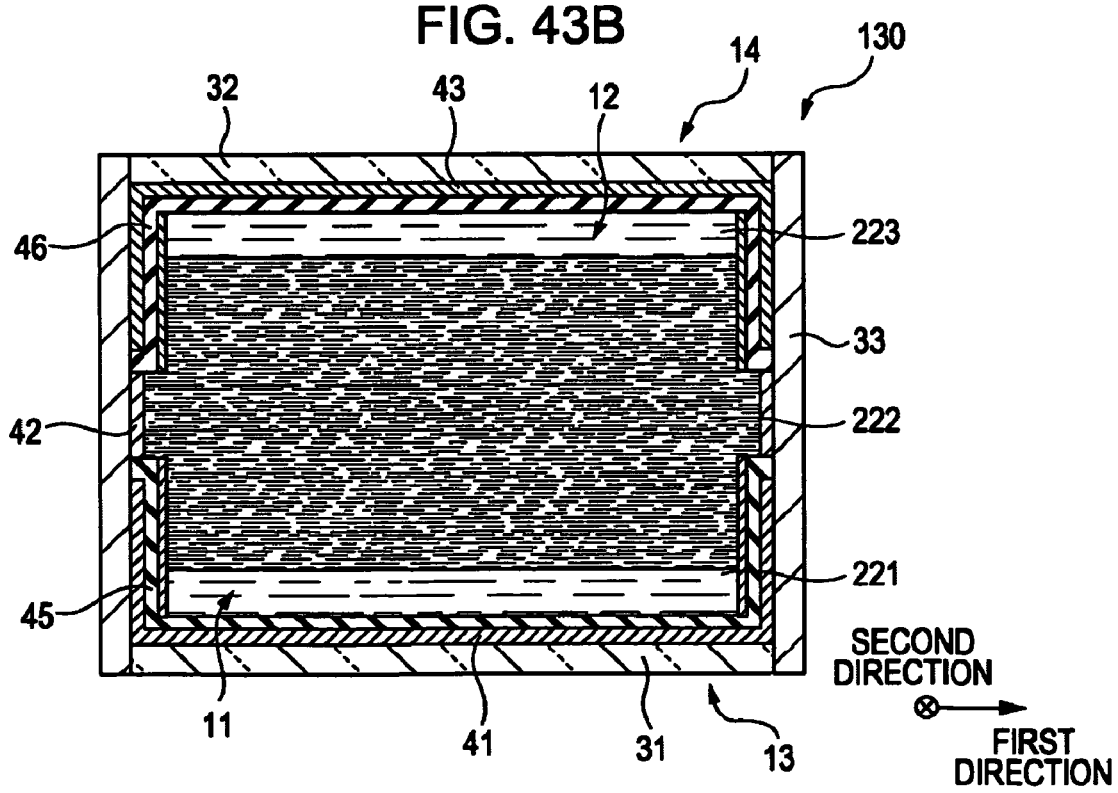

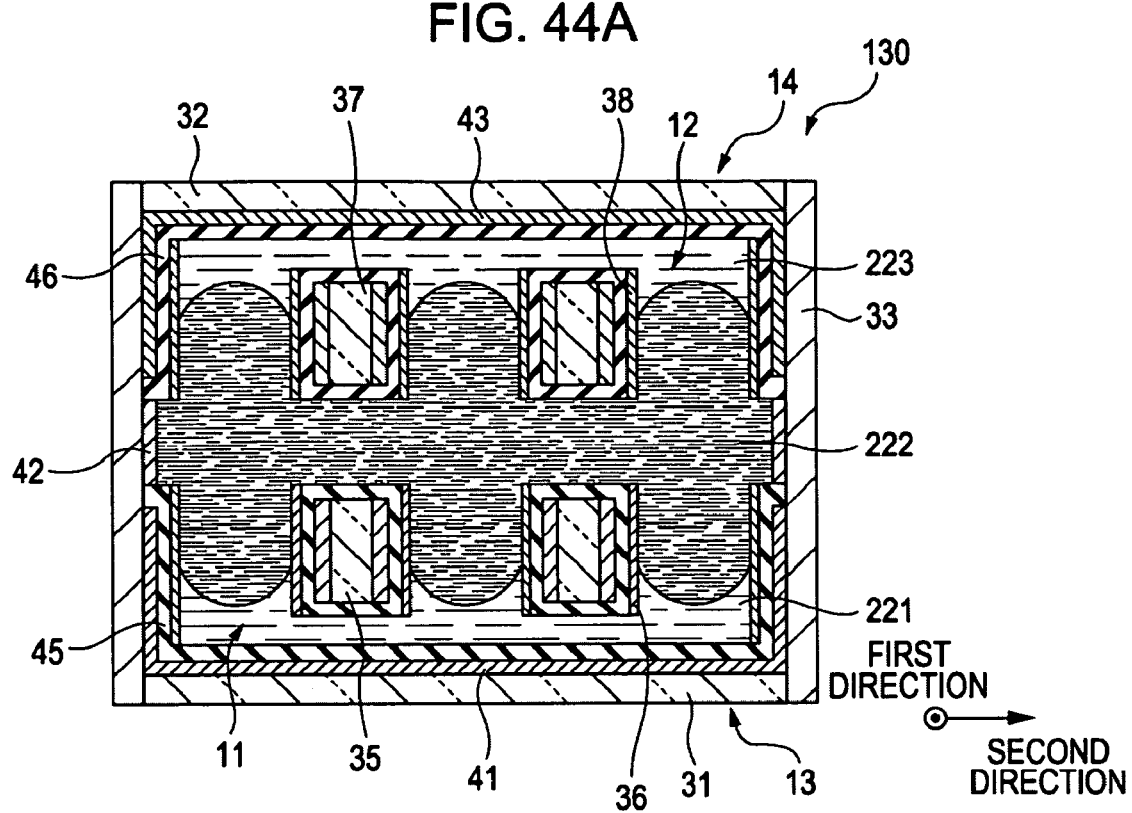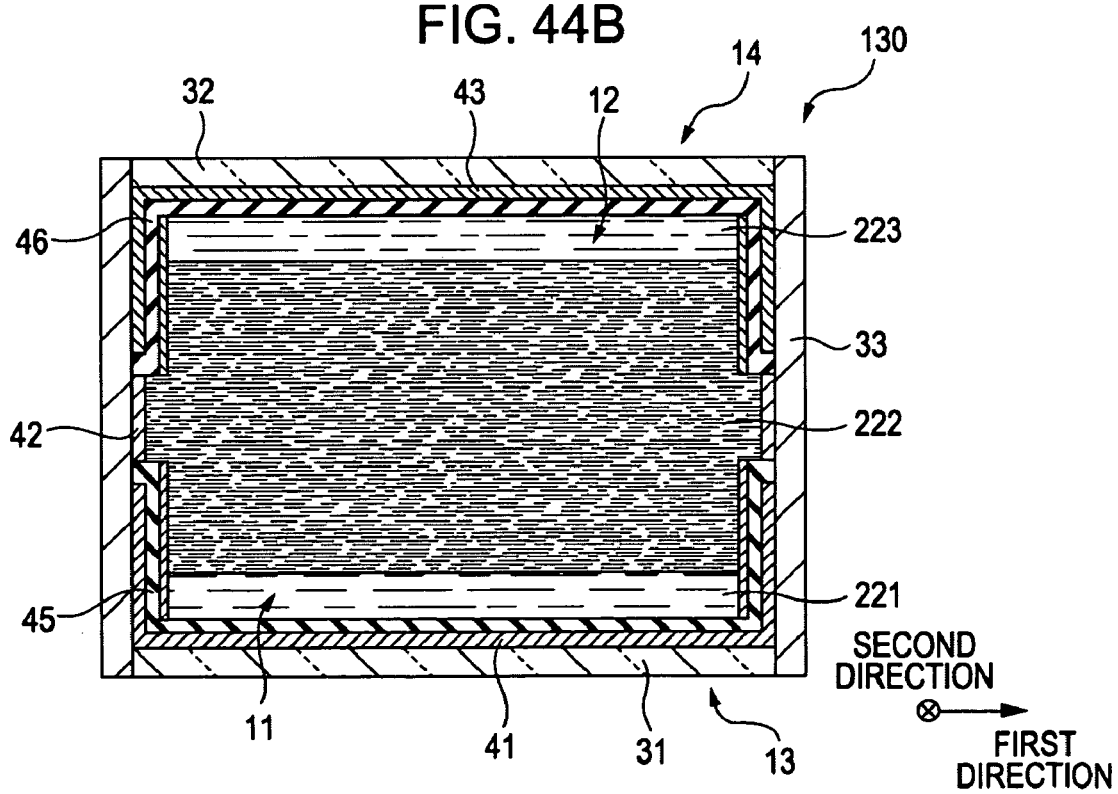

Y-AXIS DIRECTION
Z-AXIS DIRECTION

Z-AXIS DIRECTION
Y-AXIS DIRECTION

FIG. 46
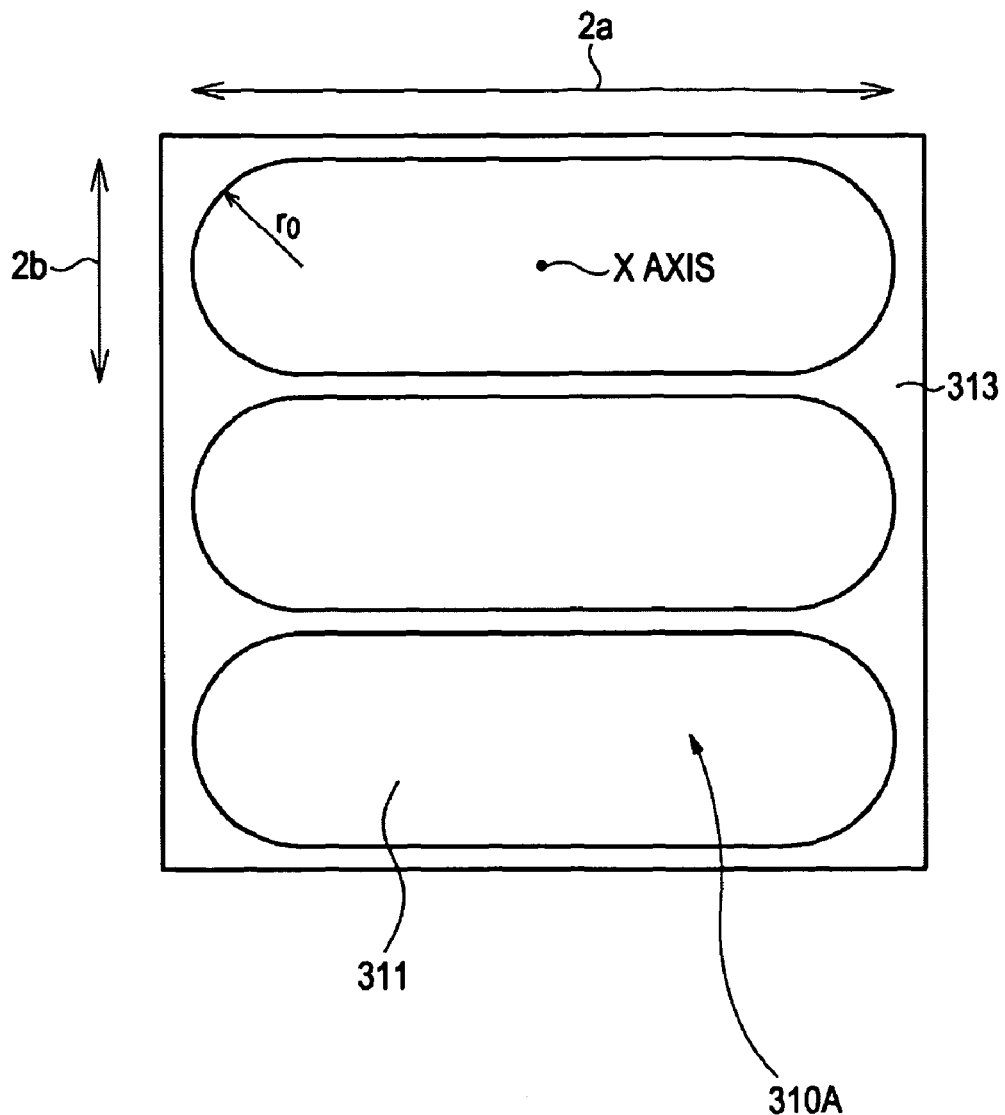
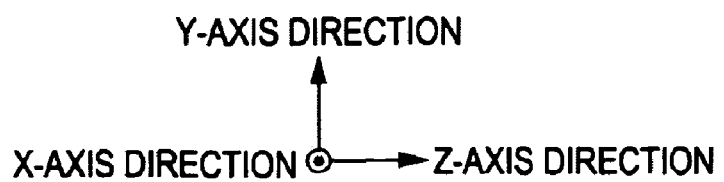

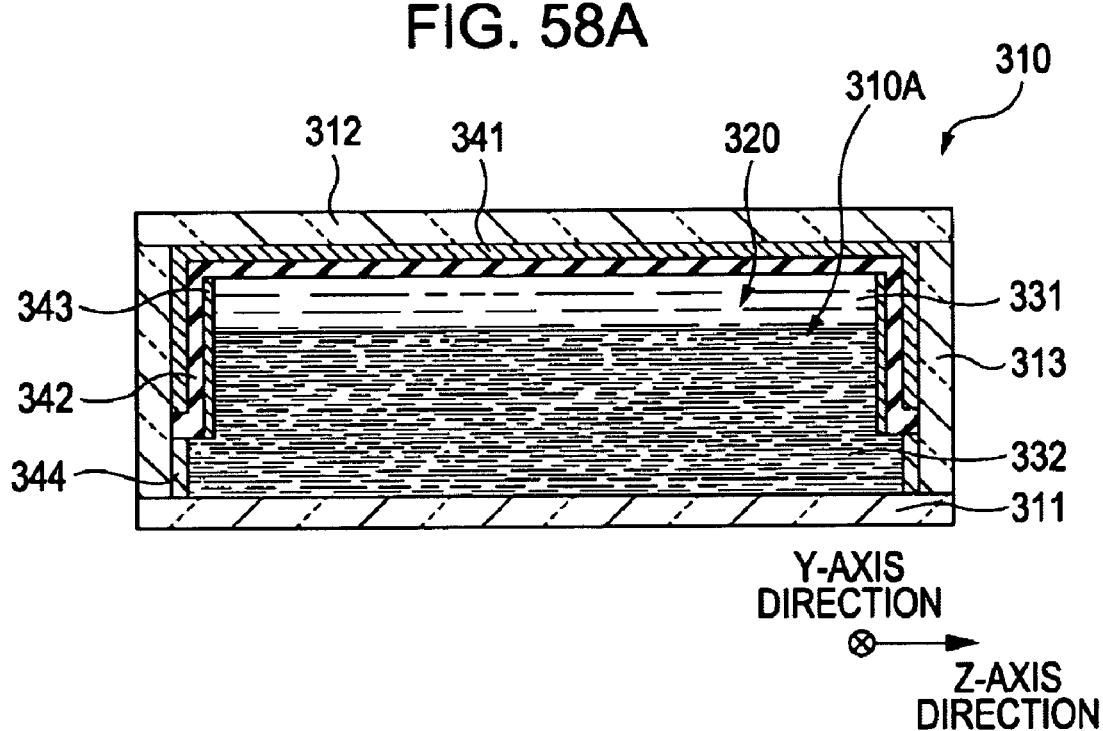
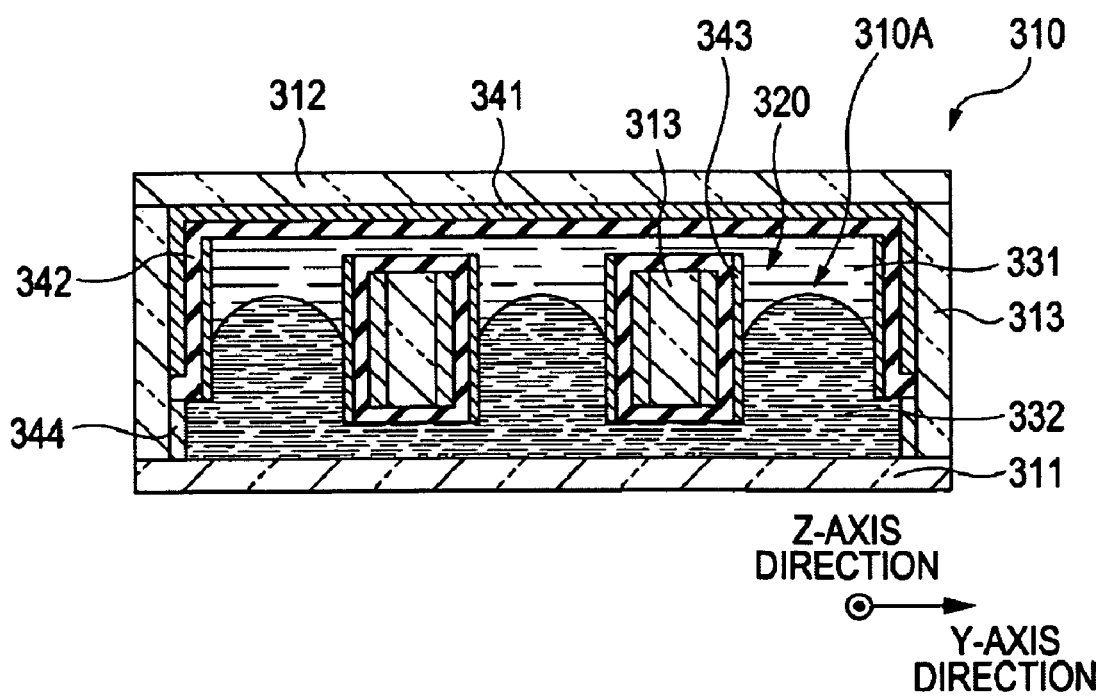

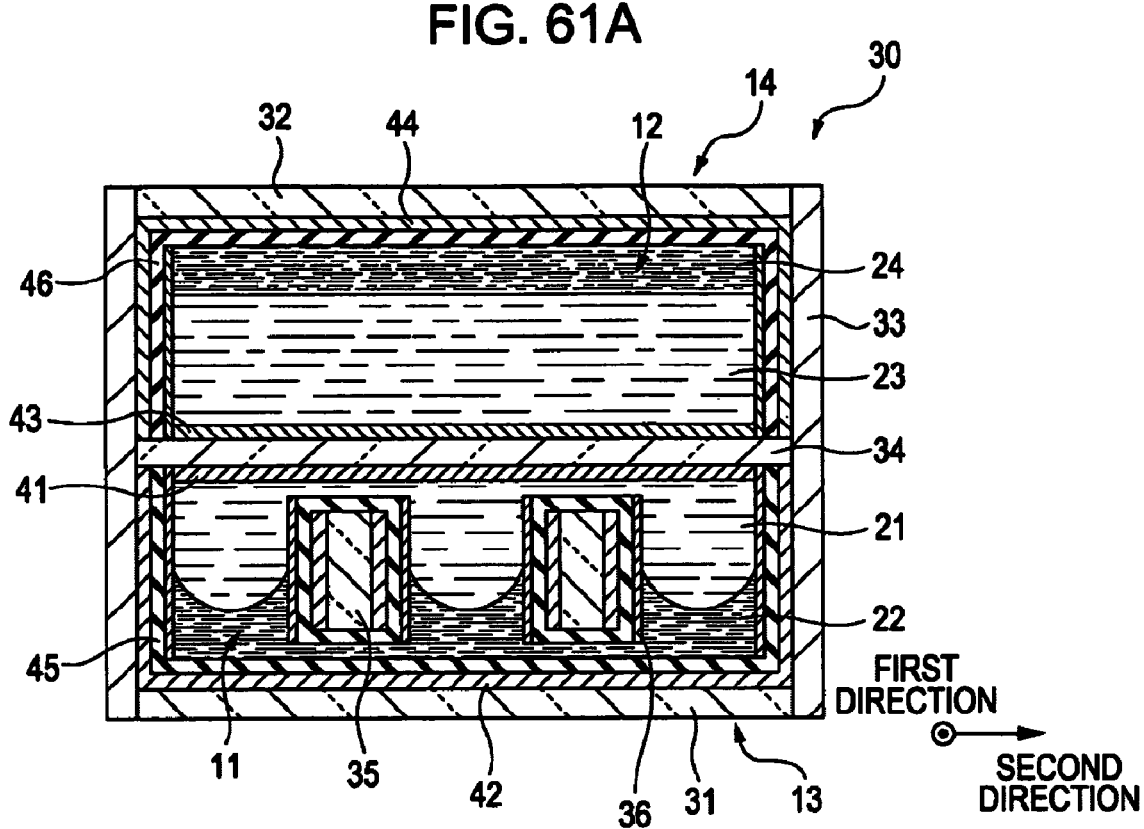
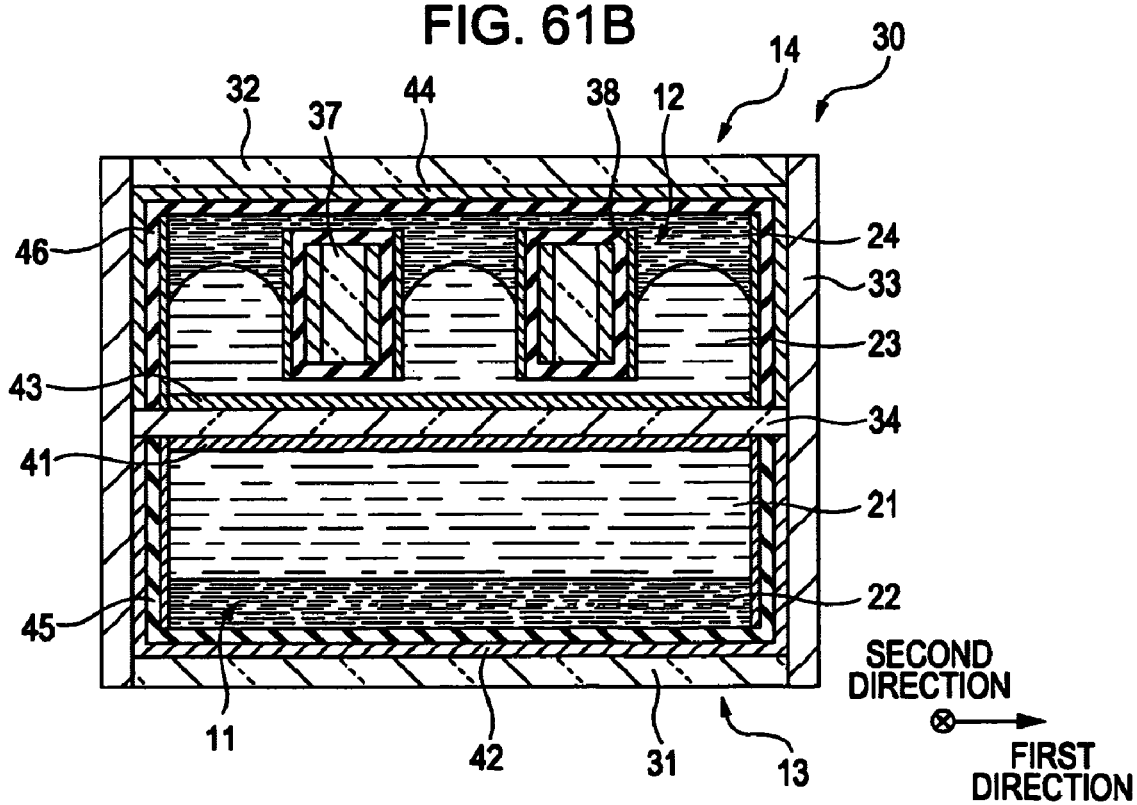

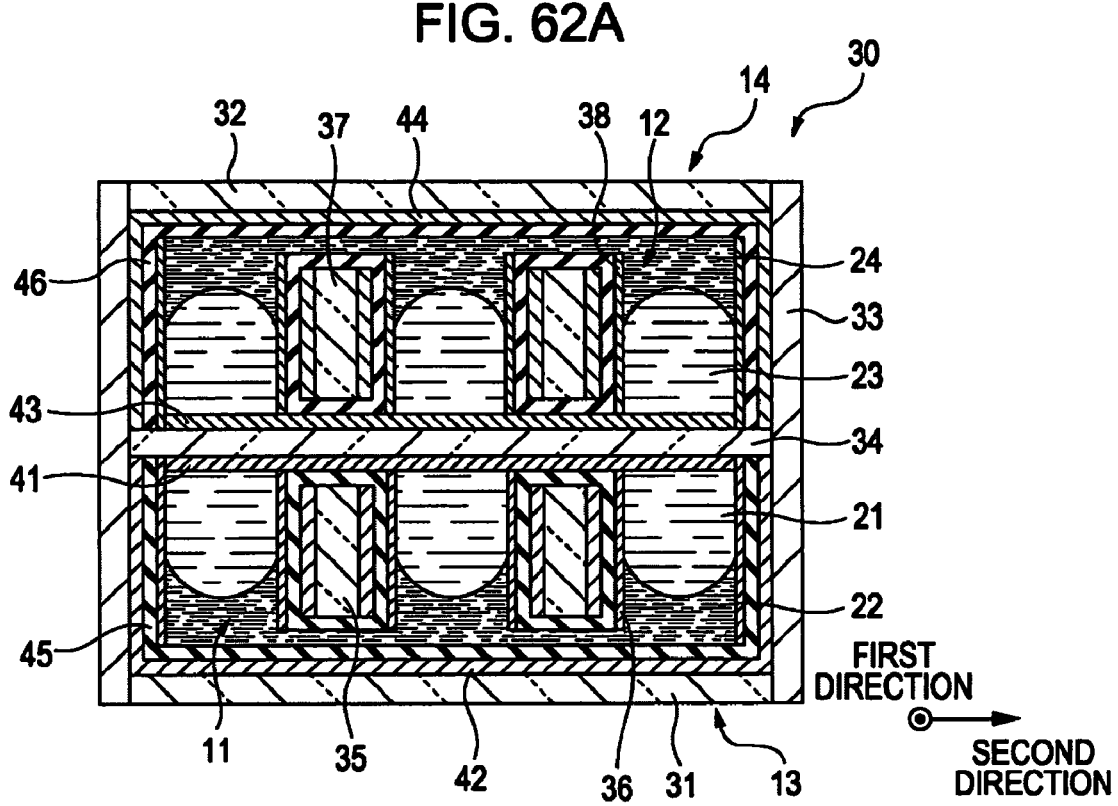
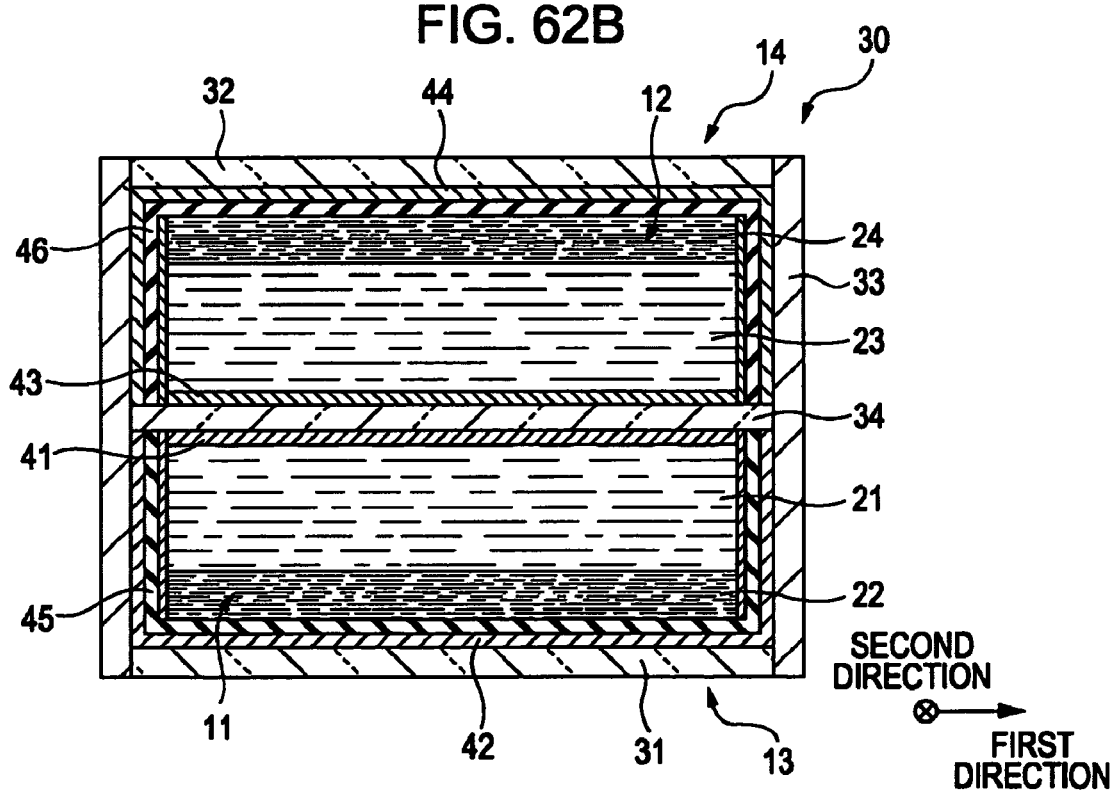

311  310A  313

311  310A  313

311  310A  313

311  310A  313

LIGHTING SYSTEM

CROSS REFERENCES TO RELATED APPLICATIONS

The present application claims priority to Japanese Patent Application JP 2007-230046 filed in the Japanese Patent Office on Sep. 5, 2007, the entire contents of which is incorporated herein by reference.

BACKGROUND

The present disclosure relates to a lighting system in which an optical device employing an electrowetting phenomenon is embedded.

In recent years, development of optical devices employing an electrowetting phenomenon (electrocapillarity) has been advanced. The term "electrowetting phenomenon" refers to a phenomenon wherein when applying voltage between liquid having electroconductivity and an electrode, energy at the solid-liquid interface between the electrode surface and the liquid change, and the shape of the liquid surface changes.

FIGS. 68A and 68B illustrate principle diagrams for describing electrocapillarity. As schematically illustrated in FIG. 68A, for example, let us say that an insulating film 402 is formed on the surface of an electrode 401, and an electroconductive droplet 403 made up of an electrolytic solution is disposed on this insulating film 402. The surface of the insulating film 402 is subjected to water-repellent processing, and as shown in FIG. 68A, in a state in which voltage is not applied thereto, interaction energy between the surface of the insulating film 402 and droplet 403 is low, and a contact angle $\theta_0$ is great. Here, the contact angle $\theta_0$ is an angle which includes the surface of the insulating film 402 and the tangent line of the droplet 403, and depends on physical properties such as the surface tension of the droplet 403, the surface energy of the insulating film 402, and so forth.

On the other hand, as schematically illustrated in FIG. 68B, upon voltage being applied between the electrode 401 and droplet 403, electrolytic ions on the droplet side are concentrated on the surface of the insulating film 402, thereby causing change in electrification quantity of a charge double layer, and also inducing change in the surface tension of the droplet 403. This phenomenon is an electrowetting phenomenon, wherein the contact angle $\theta_V$ of the droplet 403 is changed due to the magnitude of applied voltage. That is to say, in FIG. 68B, the contact angle $\theta_V$ is represented with the following Expression (A), i.e., the Lippman-Young expression as the function of applied voltage V.

$$\cos(\theta_V) = \cos(\theta_0) + (1/2)(\in_0 \cdot \in)/(\gamma_{LG} \cdot t) V2 \quad (A)$$

Here, the respective variables within the above-mentioned expression represent the following.

$\in_0$: dielectric constant of vacuum
$\in$: specific inductive capacity of insulating film
$\gamma_{LG}$: surface intension of electrolytic solution
t: film thickness of insulating film As described above, the surface shape (curvature) of the droplet 403 is changed depending on the magnitude of the voltage V to be applied between the electrode 401 and droplet 403. Accordingly, in the case of employing the droplet 403 as a lens element, an optical element of which the focal position (focal distance) can electrically be controlled can be realized.

Development of optical devices employing such an optical element has been advanced. For example, a lens array for strobe device has been proposed in Japanese Unexamined Patent Application Publication No. 2000-356708. With this lens array, insulating liquid droplets disposed on a water-repellent film of a substrate surface in an array manner and electroconductive liquid are encapsulated, thereby making up variable-focus lenses. Subsequently, each of the lenses is formed with an interface shape between insulating liquid and electroconductive liquid, the each lens shape is electrically controlled employing an electrowetting phenomenon, thereby changing focal distance. Also, a cylindrical lens made up of a liquid lens has been disclosed in Japanese Unexamined Patent Application Publication No. 2002-162507.

Note however, with the lens array disclosed in Japanese Unexamined Patent Application Publication No. 2000-356708, it is difficult to obtain great optical power. That is to say, even if the curvature of the lens is changed from a concave state to a flat state by turning on/off applied voltage, for example, the variable rate of the guide number of a strobe device is 1.48, and accordingly, a great variable rate is not readily obtained. Note that the details thereof will be described later.

To this end, it has been recognized that there is a demand to provide a lighting system in which an optical device, which is made up of a liquid lens employing an electrowetting phenomenon, having an arrangement and configuration whereby high optical power can be obtained.

SUMMARY

According to an embodiment, a lighting system includes: an optical device including a cylindrical lens made up of a liquid lens; an emission unit including an axis line in the Z-axis direction; and a reflecting mirror configured to reflect light emitted from the emission unit; with the cross-sectional shape of a light reflecting portion when cutting away the reflecting mirror at a virtual plane perpendicular to the Z axis being a part of a parabola; and with the axis line of the emission unit being positioned between the vertex of the parabola and a focal point.

That is to say, with this the lighting system, when assuming that the coordinates of a focal point of a parabola are (p, 0), and a directrix is x=−p (where p>0), the axis line of the emission unit is positioned at $(X_0, 0)$. Here, $0 < X_0 < p$ holds. Note that the equation of the parabola is represented with the following.

$$X = y^2/(4p)$$

Also, with this lighting system, it is desirable to set distance between the focal point of the parabola and the axis line of the emission means unit to 0.1 mm through 1 mm or 0.3 mm through 0.5 mm.

With this lighting system, we will say that even if the trajectory (value of x) of the cross-sectional shape of a light reflecting portion deviates within a range of ±10% from the trajectory of the parabola [x=y²/(4p)], the cross-sectional shape of the light reflecting portion is a parabola.

According to an embodiment, a lighting system includes: an optical device including a cylindrical lens made up of a liquid lens; an emission unit including an axis line in the Z-axis direction; and a reflecting mirror configured to reflect light emitted from the emission unit; with the cross-sectional shape of a light reflecting portion when cutting away the reflecting mirror at a virtual plane perpendicular to the Z axis being a part of an ellipse; and with the axis line of the emission unit being positioned between the intersection point with the long axis of the ellipse and a focal point adjacent to the intersection point.

That is to say, with the this lighting system, when assuming that the equation of the ellipse is $(x/a_0)^2+(y/b_0)^2=1$ (where $a_0>0$, $b_0>0$), the axis line of the emission unit is positioned at $(X_0, 0)$. Here, $-a_0<X_0<-(a_0^2-b_0^2)^{1/2}$ holds.

Also, with this lighting system, it is desirable to set distance between the focal point of the ellipse and the axis line of the emission unit to 0.1 mm through 1 mm or 0.3 mm through 0.5 mm.

Note that, with this lighting system, let us say that even if the trajectory (value of x) of the cross-sectional shape of a light reflecting portion deviates within a range of ±10% from the trajectory of the ellipse, the cross-sectional shape of the light reflecting portion is an ellipse.

A xenon tube, fluorescent light, lamp, semiconductor emission element such as emission diode, semiconductor laser, and so forth can be exemplified as the lighting system according to the above configurations including the above-mentioned desired arrangement. Also, a backlight unit employed for a strobe device and display device, fill light for AF of a camera, and so forth can be exemplified as specific application examples of the light system according the above configurations.

A reflecting mirror can be fabricated by forming a light reflecting portion (light reflecting layer) made up of aluminum, chromium, silver, or the like on the main unit made of metal or plastic based on, for example, a physical vapor deposition method (PVD method) such as the plating method, vacuum vapor deposition method, or sputtering method, and a chemical vapor deposition method (CVD method), or the like. Description will be made later in detail regarding the optical device.

With the lighting system according to the above configurations, the axis line of the emission unit is disposed between the vertex of the parabola and a focal point, or disposed between the intersection point with the long axis of the ellipse and a focal point adjacent to this intersection point, whereby increase in the guide number of the lighting system can be realized.

Additional features and advantages are described herein, and will be apparent from the following Detailed Description and the figures.

BRIEF DESCRIPTION OF THE FIGURES

FIGS. 4A and 4B are schematic cross-sectional views illustrating a cutaway of an optical device according to a fourth embodiment at a virtual vertical plane in a second direction (direction parallel to the Y axis), and a cutaway of the optical device according to the fourth embodiment at a virtual vertical plane in a first direction (direction parallel to the Z axis);

FIGS. 5A and 5B are schematic cross-sectional views illustrating a cutaway of a modification of the optical device according to the fourth embodiment at a virtual vertical plane in a second direction (direction parallel to the Y axis), and a cutaway of the modification of the optical device according to the fourth embodiment at a virtual vertical plane in a first direction (direction parallel to the Z axis);

FIGS. 6A and 6B are schematic cross-sectional views illustrating a cutaway of an optical device according to a fifth embodiment at a virtual vertical plane in a second direction (direction parallel to the Y axis), and a cutaway of the optical device according to the fifth embodiment at a virtual vertical plane in a first direction (direction parallel to the Z axis);

FIGS. 7A and 7B are schematic cross-sectional views illustrating a cutaway of an optical device according to a sixth embodiment at a virtual vertical plane in a second direction (direction parallel to the Y axis), and a cutaway of the optical device according to the sixth embodiment at a virtual vertical plane in a first direction (direction parallel to the Z axis);

FIGS. 16A and 16B are schematic cross-sectional views illustrating a cutaway of an optical device according to a tenth embodiment at a virtual vertical plane in a second direction (direction parallel to the Y axis), and a cutaway of the optical device according to the tenth embodiment at a virtual vertical plane in a first direction (direction parallel to the Z axis);

FIGS. 17A and 17B are schematic cross-sectional views illustrating a cutaway of a modification of the optical device according to the tenth embodiment at a virtual vertical plane in a second direction (direction parallel to the Y axis), and a cutaway of the modification of the optical device according to the tenth embodiment at a virtual vertical plane in a first direction (direction parallel to the Z axis);

FIGS. 20A and 20B are schematic cross-sectional views illustrating a cutaway of an optical device according to a twelfth embodiment at a virtual vertical plane in a second direction (direction parallel to the Y axis), and a cutaway of the optical device according to the twelfth embodiment at a virtual vertical plane in a first direction (direction parallel to the Z axis);

FIGS. 26A and 26B are schematic cross-sectional views illustrating a cutaway of a modification of the optical device according to the seventeenth embodiment at a virtual vertical plane in a second direction (direction parallel to the Y axis), and a cutaway of the modification of the optical device according to the seventeenth embodiment at a virtual vertical plane in a first direction (direction parallel to the Z axis);

FIGS. 35A and 35B are schematic cross-sectional views illustrating a cutaway of an optical device according to a twenty-second embodiment at a virtual vertical plane in a second direction (direction parallel to the Y axis), and a cutaway of the optical device according to the twenty-second embodiment at a virtual vertical plane in a first direction (direction parallel to the Z axis);

FIGS. 37A and 37B are schematic cross-sectional views illustrating a cutaway of an optical device according to a twenty-third embodiment at a virtual vertical plane in a second direction (direction parallel to the Y axis), and a cutaway of the optical device according to the twenty-third embodiment at a virtual vertical plane in a first direction (direction parallel to the Z axis);

FIGS. 38A and 38B are schematic cross-sectional views illustrating a cutaway of a modification of the optical device according to the twenty-third embodiment at a virtual vertical plane in a second direction (direction parallel to the Y axis), and a cutaway of the modification of the optical device according to the twenty-third embodiment at a virtual vertical plane in a first direction (direction parallel to the Z axis);

FIGS. 39A and 39B are schematic cross-sectional views illustrating a cutaway of an optical device according to a twenty-fourth embodiment at a virtual vertical plane in a second direction (direction parallel to the Y axis), and a cutaway of the optical device according to the twenty-fourth embodiment at a virtual vertical plane in a first direction (direction parallel to the Z axis);

FIGS. 41A and 41B are schematic cross-sectional views illustrating a cutaway of an optical device according to a twenty-fifth embodiment at a virtual vertical plane in a second direction (direction parallel to the Y axis), and a cutaway of the optical device according to the twenty-fifth embodiment at a virtual vertical plane in a first direction (direction parallel to the Z axis);

FIGS. 43A and 43B are schematic cross-sectional views illustrating a cutaway of an optical device according to a twenty-seventh embodiment at a virtual vertical plane in a second direction (direction parallel to the Y axis), and a cutaway of the optical device according to the twenty-seventh embodiment at a virtual vertical plane in a first direction (direction parallel to the Z axis);

FIGS. 44A and 44B are schematic cross-sectional views illustrating a cutaway of an optical device according to a twenty-eighth embodiment at a virtual vertical plane in a second direction (direction parallel to the Y axis), and a cutaway of the optical device according to the twenty-eighth embodiment at a virtual vertical plane in a first direction (direction parallel to the Z axis);

FIG. 46 is a diagram schematically illustrating an array state of cylindrical lens chambers of the optical device according to the twenty-ninth embodiment;

FIGS. 58A and 58B are schematic cross-sectional views illustrating a cutaway of another modification of the optical device according to the thirty-sixth embodiment at an X-Z plane, and a cutaway of the other modification of the optical device according to the thirty-sixth embodiment at an X-Y plane;

FIGS. 61A and 61B are schematic cross-sectional views illustrating a cutaway of another modification of the optical device according to the third embodiment at a virtual vertical plane in a second direction (direction parallel to the Y axis), and a cutaway of the other modification of the optical device according to the third embodiment at a virtual vertical plane in a first direction (direction parallel to the Z axis);

FIGS. 62A and 62B are schematic cross-sectional views illustrating a cutaway of a modification of the optical device according to the sixteenth embodiment at a virtual vertical plane in a second direction (direction parallel to the Y axis), and a cutaway of the modification of the optical device according to the sixteenth embodiment at a virtual vertical plane in a first direction (direction parallel to the Z axis);

DETAILED DESCRIPTION

The embodiments will be described below with reference to the drawings.

First Embodiment

Figure 1A:
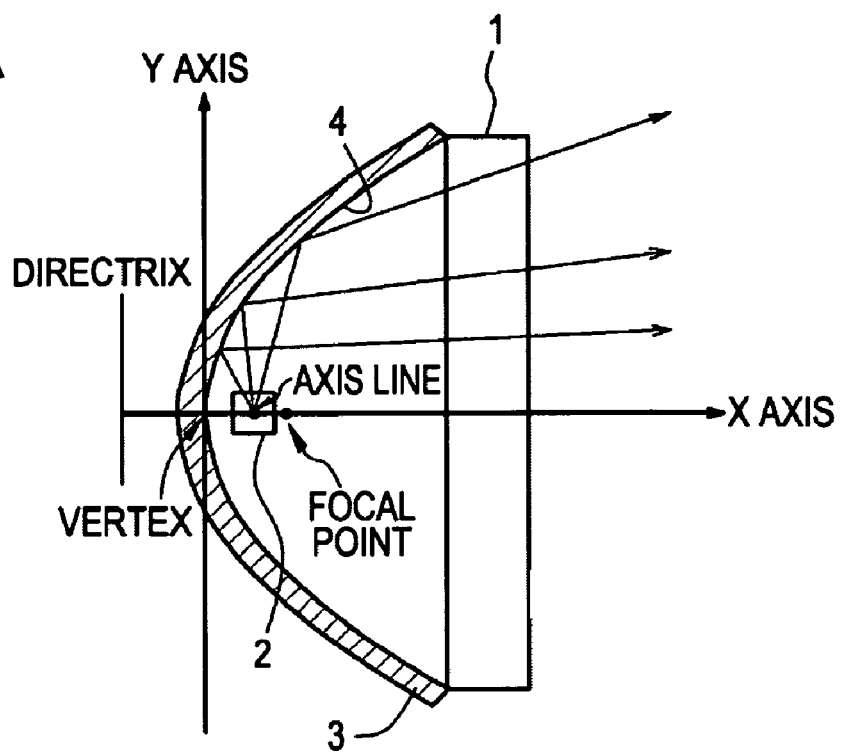
FIGS. 1A and 1B are conceptual diagrams of a lighting system according to a first embodiment.
Figure 1B:
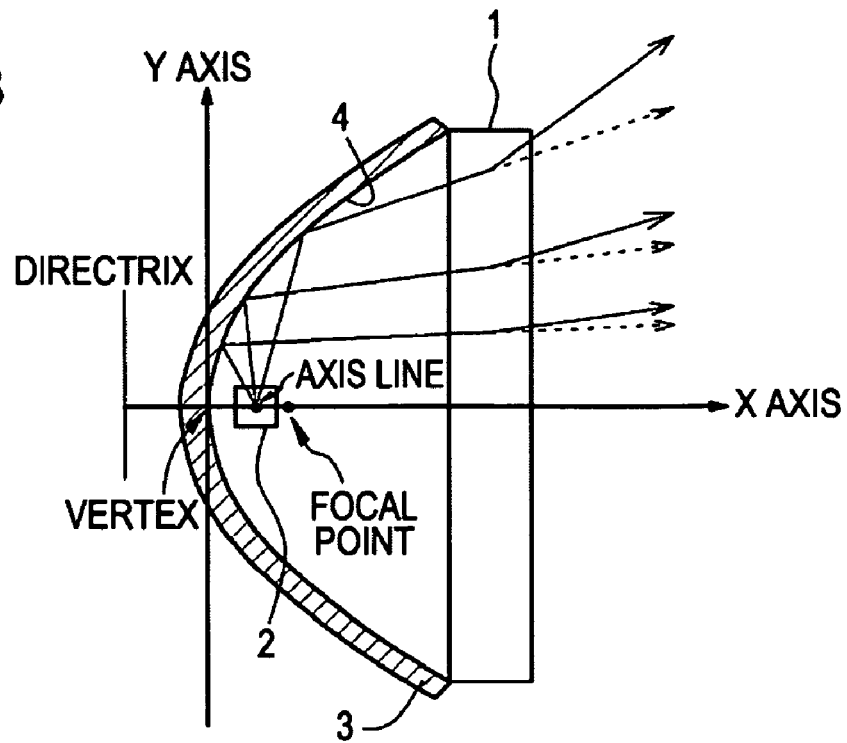

The first embodiment relates to a lighting system. Conceptual diagrams of the lighting system according to the first embodiment are illustrated in FIGS. 1A and 1B. The lighting system according to the first embodiment includes (A) An optical device 1 including a cylindrical lens made up of a liquid lens, (B) An emission unit 2 including an axis line in the Z-axis direction, and (C) A reflecting mirror 3 configured to reflect light emitted from the emission unit 2.

The lighting system according to the first embodiment is specifically a strobe device. FIG. 1A schematically illustrates the operation of the strobe device on the telephoto side, and FIG. 1B schematically illustrates the operation of the strobe device on the wide angle side. Note that description will be made later regarding the optical device 1. The emission unit 2 is, for example, made up of a rod-shaped xenon tube of which the diameter is 2.0 mm. Also, the reflecting mirror is fabricated by forming a light reflecting portion (light reflecting layer) 4 made of aluminum on the main unit of made of plastic based on the vacuum vapor deposition method, the emission unit 2 is fastened on to the reflecting mirror 3 by an unshown fixing unit, and accordingly, is configured so as not to be moved. The optical device 1 is fastened on to the front face portion of the reflecting mirror 3 by an unshown fixing unit. Note that a control circuit for performing control of the optical power of a cylindrical lens made up of a liquid lens of the optical device 1, and control of the operation of the emission unit 2 can be realized with a control circuit according to the related art, so detailed description thereof will be omitted. A later-described lighting system according to a second embodiment also has the same arrangement and configuration.

With the lighting system according to the first embodiment, the cross-sectional shape of the light reflecting portion 4 when cutting away the reflecting mirror 3 at a virtual plane perpendicular to the Z axis is a part of a parabola, and the axis line of the emission unit 2 is positioned between the vertex of the parabola and a focal point. Now, let us say that a straight line connecting the vertex of the parabola and the focal point is the X axis.

Specifically, when assuming that the coordinates of the focal point of the parabola are (p, 0), and a directrix is $x=-p$ (where p>0), the axis line of the emission unit is positioned at $(X_0, 0)$.

Here, p=0.506 (mm), and $X_C$=0.156 (mm).

Note that the equation of the parabola is represented with the following.

$$X=y^2/(4p)$$

The length in the X-axis direction of the light reflecting portion 4 (distance from the vertex to the optical device 1) is 4 mm. Also, distance $(p-X_0)$ between the focal point of the parabola and the axis line of the emission unit is 0.35 mm.

Figure 2A:
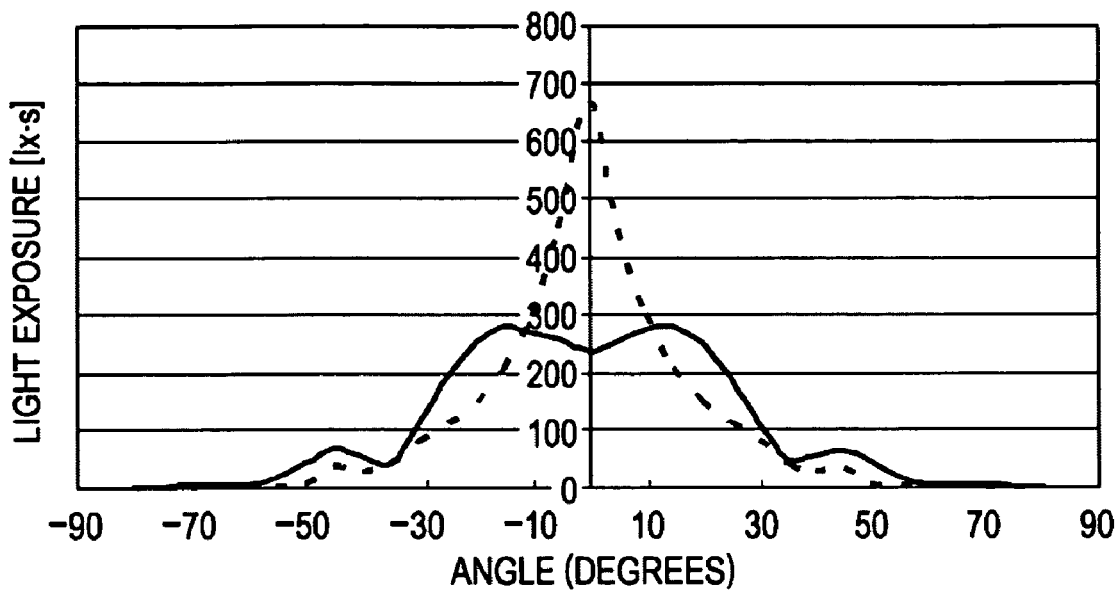
FIGS. 2A and 2B are graphs illustrating simulation results of a light quantity distribution when changing the focal distance of a cylindrical lens made up of a liquid lens with the lighting system according to the first embodiment and a light system serving as a comparative example.
Figure 2B:
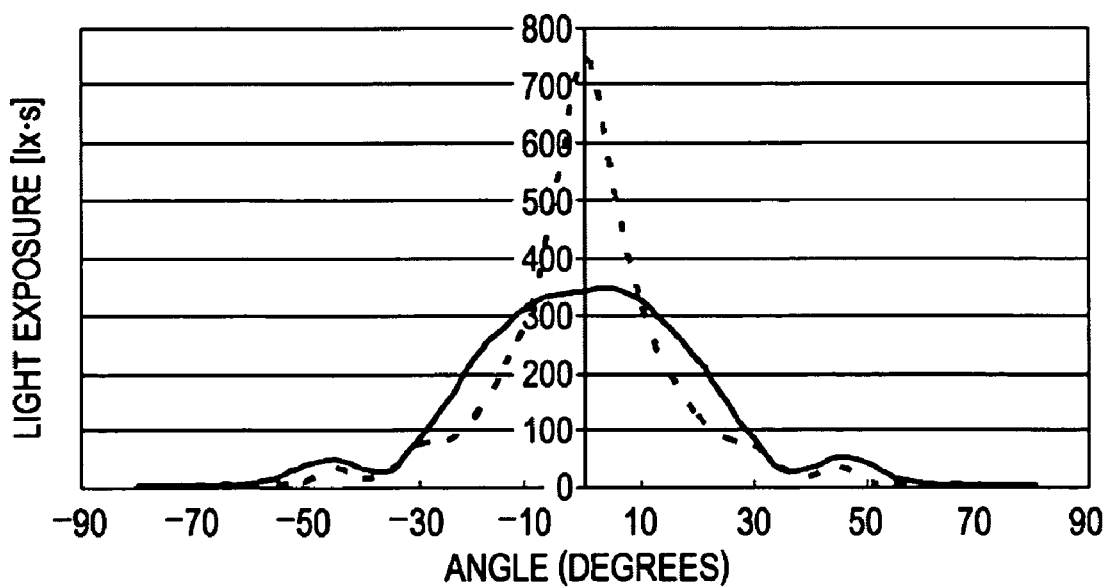

FIG. 2A illustrates a light quantity distribution in the Y-axis direction (vertical direction) when changing the focal distance of a cylindrical lens made up of a liquid lens with the lighting system according to the first embodiment. For the sake of comparison, FIG. 2B illustrates a light quantity distribution in the Y-axis direction (vertical direction) when matching the focal point of the parabola and the axis line of the emission unit, and changing the focal distance of a cylindrical lens made up of a liquid lens. Note that the simulation results shown in FIGS. 2A and 2B are results obtained when assuming that the optical device made up of one cylindrical lens is employed. While the first embodiment, according to FIG. 2A, the guide number of the strobe device increases from 11.0 to 18.5, i.e., becomes brighter by 1.85 times, with the comparative example shown in FIG. 2B, the guide number of the strobe device increases from 13.2 to 19.5, i.e., becomes brighter only by 1.48 times. Thus, the axis line of the emission unit 2 is disposed between the vertex of the parabola and the focal point, whereby increase in the guide number of the lighting system can be realized, and increase in the variable rate of the zoom strobe can be realized.

Second Embodiment

The second embodiment relates to a lighting system according to a second embodiment. Conceptual diagrams of the lighting system according to the second embodiment are the same as those shown in FIGS. 1A and 1B, and the arrangement and configuration of the lighting system according to the second embodiment can be regarded as the same as the arrangement and configuration of the lighting system according to the first embodiment, so detailed description will be omitted.

With the lighting system according to the second embodiment, the cross-sectional shape of the light reflecting portion 4 when cutting away the reflecting mirror 3 at a virtual plane perpendicular to the Z axis is a part of an ellipse, and the axis line of the emission unit 2 is positioned between the intersection point with the long axis of the ellipse and a focal point adjacent to the intersection point. Now, let us say that a straight line connecting the intersection with the axis line of the ellipse and the focal point is the X axis.

Specifically, when assuming that the equation of the ellipse is $(x/a_0)^2 + (y/b_0)^2 = 1$ (where $a_0 > 0$, $b_0 > 0$), the axis line of the emission unit is positioned at $(X_0, 0)$. Here, $-a_0 < X_0 < -(a_0^2 - b_0^2)^{1/2}$ holds.

With the lighting system according to the second embodiment as well, the variable rate of the guide number of the strobe device when changing the focal distance of the cylindrical lens made up of a liquid lens employing an electrowetting phenomenon can be increased as compared to that in the case of matching the focal point of the ellipse and the axis line of the emission unit, and increase in the variable rate of the zoom strobe can be realized.

The function of the light reflecting portion according to the first embodiment or second embodiment may be replaced with a function based on an aspheric function instead of employing a parabola or ellipse.

In general, various types of curved face can be represented with the following Expression (1). Note that, in Expression (1), "c" is the value of a curvature at a vertex where the curved face intersects with the z axis, and "e" is an eccentricity. Also, "$-e^2$" in Expression (1) is also referred to as a conic constant (K) or cone constant, and generally, Expression (1) in the case of K=0 represents a spherical face, Expression (1) in the case of K=−1 represents a paraboloid, Expression (1) in the case of K<−1 represents a hyperboloid, and Expression (1) in the case of −1<K<0 represents an ellipsoid. Further, a function wherein a zero-order coefficient "a" on the right side of Expression (1) is replaced with "$A \times r^4 + B \times r^6 + C \times r^8 + \ldots$" is referred to as an aspheric function. Accordingly, it is desirable to employ a shape when cutting away a curved face obtained with the aspheric function at an X-Y plane as the light reflecting portion according to the first embodiment or second embodiment.

$$z = \frac{cr^2}{1 + \sqrt{1 - c^2 r^2 (1 - e^2)}} + a \quad (1)$$

First, description will be made regarding an overview of the optical device suitable for employment at the lighting system according to the first or second embodiment, and next, description will be made regarding various types of optical devices based on embodiments. Now, with the following description as well, let us say that a straight line connecting the vertex of the parabola and the focal point is the X axis, or a straight line connecting the intersection point with the long axis of the ellipse and the focal point is the X axis.

An optical device having a 1-1'st configuration is an optical device including (A) a first cylindrical lens group where multiple first cylindrical lenses are apposed, each of which is made up of a liquid lens of which the axis line extends in a first direction (the direction parallel to the Z axis), (B) a second cylindrical lens group where multiple second cylindrical lenses are apposed, each of which is made up of a liquid lens of which the axis line extends in a second direction (the direction parallel to the Y axis), and light passing through the first cylindrical lens group is input, and a housing including (a) a first face transmissive to incident light, (b) a second face transmissive to incident light, facing the first face, (c) a side face linking the first face and the second face, and (d) a partition face transmissive to incident light;

with a first chamber being configured of the first face, the partition face, and a portion of the side face; with a second chamber being configured of the second face, the partition face, and the remaining portion of the side face; with a first partition plate being disposed within the first chamber, which extends in the first direction (the direction parallel to the Z axis), and partitions between the first cylindrical lenses; with a second partition plate being disposed within the second chamber, which extends in the second direction (the direction parallel to the Y axis), and partitions between the second cylindrical lenses; with the first chamber being occupied with first liquid and second liquid which make up a liquid lens serving as the first cylindrical lens; and with the second chamber being occupied with third liquid and fourth liquid which make up a liquid lens serving as the second cylindrical lens.

Note that, with the optical device having the 1-1'st configuration, in an alternative manner, the second cylindrical lens group may be configured wherein the multiple second cylindrical lenses are apposed, each of which is made up of a liquid lens of which the axis line extends in the first direction (the direction parallel to the Z axis), and in this case, the second partition plate, which extends in the first direction (the direction parallel to the Z axis), for partitioning between the second cylindrical lenses is disposed within the second chamber. Such an optical-device is referred to as an optical device having a 2-1'st configuration.

With the optical device having the 1-1'st configuration or 2-1'st configuration, it is desirable to employ an arrangement wherein the surface of the portion of the first partition plate where at least the interface between the first liquid and second liquid is disposed, and the surface of the portion of the second partition plate where at least the interface between the third liquid and fourth liquid is disposed are subjected to water-repellent processing. Also, it is desirable to employ an arrangement wherein the surface of the portion of the side face where at least the interface between the first liquid and second liquid is disposed, and the surface of the portion of the side face where at least the interface between the third liquid and fourth liquid is disposed are also subjected to water-repellent processing.

The optical device having the 1-1'st configuration or 2-1'st configuration, including the above-mentioned desired arrangement, may be configured wherein the first partition plate extends from the first face to the partition face, and the second partition plate extends from the second face to the partition face. Now, the optical device having such a configuration will be referred to as a 1-1-A'th configuration or 2-1-A'th configuration for the sake of convenience.

Alternatively, the optical device having the 1-1'st configuration or 2-1'st configuration, including the above-mentioned desired arrangement, may be configured wherein the first partition plate extends from the first face toward the partition face, the second partition plate extends from the second face toward the partition face, and there is a gap between the top face of the first partition plate and the top face of the second partition plate. Now, the optical device having such a configuration will be referred to as a 1-1-B'th configuration or 2-1-B'th configuration for the sake of convenience.

Note that the top face of the first partition plate means a face facing the second face, and the bottom face of the first partition plate means a face facing the first face. Also, the top face of the second partition plate means a face facing the first face, and the bottom face of the second partition plate means a face facing the second face. These are true for the following except for 1-1-C'th configuration or 2-1-C'th configuration which will be described next.

Alternatively, the optical device having the 1-1'st configuration or 2-1'st configuration, including the above-mentioned desired arrangement, may be configured wherein the first partition plate extends from the partition face toward the first face, there is a gap between the top face of the first partition plate and the first face, the second partition plate extends from the partition face toward the second face, and there is a gap between the top face of the second partition plate and the second face. Now, the optical device having such a configuration will be referred to as a 1-1-C'th configuration or 2-1-C'th configuration for the sake of convenience. With the optical device having the 1-1-C'th configuration or 2-1-C'th configuration, the top face of the first partition plate means a face facing the first face, and the top face of the second partition plate means a face facing the second face.

Alternatively, the optical device having the 1-1'st configuration or 2-1'st configuration, including the above-mentioned desired arrangement, may be configured wherein there is a gap between the bottom face of the first partition plate and the first face, there is a gap between the bottom face of the second partition plate and the second face, and there is a gap between the top face of the first partition plate and the top face of the second partition plate. Now, the optical device having such a configuration will be referred to as a 1-1-D'th configuration or 2-1-D'th configuration for the sake of convenience.

With the optical device having the 1-1'st configuration or 2-1'st configuration, including the above-mentioned various types of desired arrangement, it is desirable to employ an arrangement wherein the first liquid and second liquid are insoluble and unmixed, and the interface between the first liquid and second liquid makes up a lens face, and the third liquid and fourth liquid are insoluble and unmixed, and the interface between the third liquid and fourth liquid makes up a lens face.

Further, the optical device having the 1-1'st configuration or 2-1'st configuration, including the above-mentioned various types of desired arrangement, may be configured wherein the first liquid and third liquid have electroconductivity, the second liquid and fourth liquid have insulation properties, a first electrode adjacent to the first liquid, and a second electrode insulated from the first liquid are disposed within the first chamber, and a third electrode adjacent to the third liquid, and a fourth electrode insulated from the third liquid are disposed within the second chamber.

Subsequently, with such an electrode configuration, an arrangement may be made wherein the second electrode is adjacent to the interface between the first liquid and second liquid through a first insulating film, and the fourth electrode is adjacent to the interface between the third liquid and fourth liquid through a second insulating film.

Alternatively, with such an electrode configuration, an arrangement may be made wherein the first electrode is made up of a transparent electrode provided on the inner face of the first face, the third electrode is made up of a transparent electrode provided on the inner face of the second face, the second electrode is provided on the inner face of the side face making up the first chamber, and the fourth electrode is provided on the inner face of the side face making up the second chamber. Now, the optical device having such a configuration will be referred to as a 1-1-a'th configuration or 2-1-a'th configuration for the sake of convenience. Subsequently, with the optical device having the 1-1-a'th configuration or 2-1-a'th configuration, further, an arrangement may be made wherein the second electrode is provided so as to extend in the inner face of the partition plate making up the first chamber, and the fourth electrode is provided so as to extend in the inner face of the partition plate making up the second chamber. Alternatively, an arrangement may also be made wherein the first electrode is provided so as to extend in the inner face of the side face making up the first chamber, and the third electrode is provided so as to extend in the inner face of the side face making up the second chamber. Alternatively, an arrangement may be made wherein the first electrode is provided so as to extend in the inner face of the side face making up the first chamber, the third electrode is provided so as to extend in the inner face of the side face making up the second chamber, the second electrode is provided so as to extend in the inner face of the partition plate making up the first chamber, and the fourth electrode is provided so as to extend in the inner face of the partition plate making up the second chamber.

Alternatively, with such an electrode configuration, an arrangement may be made wherein the first electrode is provided on the inner face of the side face making up the first chamber, and the third electrode is provided on the inner face of the side face making up the second chamber, the second electrode is made up of a transparent electrode provided on the inner face of the first face, and the fourth electrode is made up of a transparent electrode provided on the inner face of the second face. Now, the optical device having such a configuration will be referred to as a 1-1-b'th configuration or 2-1-b'th configuration for the sake of convenience. Subsequently, with the optical device having the 1-1-b'th configuration or 2-1-b'th configuration, further, an arrangement may be made wherein the first electrode is provided so as to extend in the inner face of the partition plate making up the first chamber, and the third electrode is provided so as to extend in the inner face of the partition plate making up the second chamber. Alternatively, an arrangement may also be made wherein the second electrode is provided so as to extend in the inner face of the side face making up the first chamber, and the fourth electrode is provided so as to extend in the inner face of the side face making up the second chamber. Alternatively, an arrangement may be made wherein the first electrode is provided so as to extend in the inner face of the partition plate making up the first chamber, and the third electrode is provided so as to extend in the inner face of the partition plate making up the second chamber, the second electrode is provided so as to extend in the inner face of the side face making up the first chamber, and the fourth electrode is provided so as to extend in the inner face of the side face making up the second chamber.

An optical device having a 1-2'nd configuration is an optical device including (A) a first cylindrical lens group where multiple first cylindrical lenses are apposed, each of which is made up of a liquid lens of which the axis line extends in a first direction (the direction parallel to the Z axis);

(B) a second cylindrical lens group where multiple second cylindrical lenses are apposed, each of which is made up of a liquid lens of which the axis line extends in a second direction different from the first direction (the direction parallel to the Y axis), and light passing through the first cylindrical lens group is input; and a housing including (a) a first face transmissive to incident light, (b) a second face transmissive to incident light, facing the first face, and (c) a side face linking the first face and the second face; with a first chamber being configured of the first face, and a portion of the side face; with a second chamber being configured of the second face, and the remaining portion of the side face; with the first chamber and the second chamber being communicated; with a first partition plate being disposed within the first chamber, which extends in the first direction (the direction parallel to the Z axis), and partitions between the first cylindrical lenses; with a second partition plate being disposed within the second chamber, which extends in the second direction (the direction parallel to the Y axis), and partitions between the second cylindrical lenses; with the first chamber being occupied with first liquid and second liquid which make up a liquid lens serving as the first cylindrical lens; and with the second chamber being occupied with third liquid and second liquid which make up a liquid lens serving as the second cylindrical lens.

Note that, with the optical device having the 1-2'nd configuration, in an alternative manner, the second cylindrical lens group may be configured wherein the multiple second cylindrical lenses are apposed, each of which is made up of a liquid lens of which the axis line extends in the first direction (the direction parallel to the Z axis), and in this case, the second partition plate, which extends in the first direction (the direction parallel to the Z axis), for partitioning between the second cylindrical lenses is disposed within the second chamber. Such an optical device is referred to as an optical device having a 2-2'nd configuration.

With the optical device having the 1-2'nd configuration or 2-2'nd configuration, it is desirable to employ an arrangement wherein the surface of the portion of the first partition plate where at least the interface between the first liquid and second liquid is disposed, and the surface of the portion of the second partition plate where at least the interface between the third liquid and second liquid is disposed are subjected to water-repellent processing. Also, it is desirable to employ an arrangement wherein the surface of the portion of the side face where at least the interface between the first liquid and second liquid is disposed, and the surface of the portion of the side face where at least the interface between the third liquid and second liquid is disposed are also subjected to water-repellent processing.

The optical device having the 1-2'nd configuration or 2-2'nd configuration, including the above-mentioned desired arrangement, may be configured wherein the first partition plate extends from the first face toward the second face, the second partition plate extends from the second face toward the first face, and there is a gap between the top face of the first partition plate and the top face of the second partition plate.

Now, the optical device having such a configuration will be referred to as a 1-2-A'th configuration or 2-2-A'th configuration for the sake of convenience.

Alternatively, the optical device having the 1-2'nd configuration or 2-2'nd configuration, including the above-mentioned desired arrangement, may be configured wherein there is a gap between the bottom face of the first partition plate and the first face, there is a gap between the bottom face of the second partition plate and the second face, and there is a gap between the top face of the first partition plate and the top face of the second partition plate. Now, the optical device having such a configuration will be referred to as a 1-2-B'th configuration or 2-2-B'th configuration for the sake of convenience.

With the optical device having the 1-2'nd configuration or 2-2'nd configuration, including the above-mentioned various types of desired arrangement, it is desirable to employ an arrangement wherein the first liquid and second liquid are insoluble and unmixed, and the interface between the first liquid and second liquid makes up a lens face, and the third liquid and second liquid are insoluble and unmixed, and the interface between the third liquid and fourth liquid makes up a lens face.

Further, the optical device having the 1-2'nd configuration or 2-2'nd configuration, including the above-mentioned various types of desired arrangement, may be configured wherein the first liquid and third liquid have electroconductivity, the second liquid has insulation properties, a first electrode adjacent to the first liquid, and a second electrode insulated from the first liquid are disposed within the first chamber, and a third electrode adjacent to the third liquid, and a fourth electrode insulated from the third liquid are disposed within the second chamber.

Subsequently, with such an electrode configuration, an arrangement may be made wherein the second electrode is adjacent to the interface between the first liquid and second liquid through an insulating film, and the fourth electrode is adjacent to the interface between the third liquid and second liquid through an insulating film.

Alternatively, with such an electrode configuration, an arrangement may be made wherein the first electrode is made up of a transparent electrode provided on the inner face of the first face, the third electrode is made up of a transparent electrode provided on the inner face of the second face, the second electrode is provided on the inner face of the side face making up the first chamber, and the fourth electrode is provided on the inner face of the side face making up the second chamber. Now, the optical device having such a configuration will be referred to as a 1-2-a'th configuration or 2-2-a'th configuration for the sake of convenience. Here, the second electrode and fourth electrode may be configured of a common electrode.

Alternatively, with such an electrode configuration, an arrangement may be made wherein the first electrode is provided on the inner face of the side face making up the first chamber, and the third electrode is provided on the inner face of the side face making up the second chamber, the second electrode is made up of a transparent electrode provided on the inner face of the first face, and the fourth electrode is made up of a transparent electrode provided on the inner face of the second face. Now, the optical device having such a configuration will be referred to as a 1-2-b'th configuration or 2-2-b'th configuration for the sake of convenience. Here, the first electrode and third electrode may be configured of a common electrode.

Further, the optical device having the 1-2'nd configuration or 2-2'nd configuration, including the above-mentioned various types of desired arrangement, may be configured wherein the first liquid and third liquid have electroconductivity, the second liquid has insulation properties, a second electrode adjacent to the second liquid, and a first electrode insulated from the second liquid are disposed within the first chamber, and the second electrode adjacent to the second liquid, and a third electrode insulated from the second liquid are disposed within the second chamber.

Subsequently, with such an electrode configuration, an arrangement may be made wherein the first electrode is adjacent to the interface between the first liquid and second liquid through a first insulating film, and the third electrode is adjacent to the interface between the third liquid and second liquid through a second insulating film.

Alternatively, with such an electrode configuration, an arrangement may be made wherein the second electrode is provided on the inner face of the side face, the first electrode is made up of a transparent electrode provided on the inner face of the first face, and the third electrode is made up of a transparent electrode provided on the inner face of the second face. Now, the optical device having such a configuration will be referred to as a 1-2-c'th configuration or 2-2-c'th configuration for the sake of convenience.

An optical device having a 1-3'rd configuration is an optical device including:

(A) a first cylindrical lens group where multiple first cylindrical lenses are apposed, each of which is made up of a liquid lens of which the axis line extends in a first direction (the direction parallel to the Z axis);

(B) a second cylindrical lens group where multiple second cylindrical lenses are apposed, each of which is made up of a liquid lens of which the axis line extends in a second direction different from the first direction (the direction parallel to the Y axis), and light passing through the first cylindrical lens group is input.

With the optical device having the 2-3'rd configuration, multiple cylindrical lenses each made up of a liquid are apposed within the housing.

With the lighting system according to the present embodiment having the 1-1'st, 1-2'nd, or 1-3'rd configuration, if we say that the size in the first direction (the direction parallel to the Z axis) of an emission area of the emission unit is $L_{3-1}$, and the size in the second direction (the direction parallel to the Y axis) is $L_{e-2}$, the length in the first direction of an area to be lightened by the lighting system is $L_{i-1}$, the length in the second direction is $L_{i-2}$, a light distribution rate in the second direction of the first cylindrical lenses is $P_{1-2}$, a light distribution rate in the first direction of the second cylindrical lenses is $P_{2-1}$, and k is a constant, it is desirable to control the light distribution rate $P_{1-2}$ in the second direction of the first cylindrical lenses, and the light distribution rate $P_{2-1}$ in the first direction of the second cylindrical lenses so as to satisfy the following expression.

$$P_{2-1} = k \times P_{1-2} \text{ (where } k \times (L_{e-2}/L_{e-1}) = L_{i-2}/L_{i-1})$$

Here, the values of $L_{e-1}$ and $L_{e-2}$ are values automatically determined by the emission unit. On the other hand, it is desirable to determine the values of $L_{i-1}$ and $L_{i-2}$ as appropriate, for example, in a case wherein the lighting system is a strobe device, eventually, it is desirable to obtain an aspect ratio of the size of a film employed for a camera, or aspect ratio of the size of an imaging device provided in a camera, with $L_{i-2}/L_{i-1}$.

Accordingly, assuming that the size in the first direction (the direction parallel to the Z axis) of an emission area of the emission unit is $L_{e-1}$, and the size in the second direction (the direction parallel to the Y axis) is $L_{e-2}$, the length in the first direction of an area to be lightened by the lighting system is $L_{i-1}$, the length in the second direction is $L_{i-2}$, a light distribution rate in the second direction of the first cylindrical lenses is $P_{1-2}$, a light distribution rate in the first direction of the second cylindrical lenses is $P_{2-1}$, and k is a constant, a lighting method employing the lighting system according to the present embodiment including an optical device having the 1-1'st, 1-2'nd, or 1-3'rd configuration is a lighting method for controlling the light distribution rate $P_{1-2}$ in the second direction of the first cylindrical lenses, and the light distribution rate $P_{2-1}$ in the first direction of the second cylindrical lenses so as to satisfy the following expression.

$$P_{2-1} = k \times P_{1-2} \text{ (where } k \times (L_{e-2}/L_{e-1}) = L_{i-2}/L_{i-1})$$

An optical device having a 3rd configuration is an optical device where multiple cylindrical lenses each made up of a liquid lens are arrayed, including a housing including (a) a first supporting member transmissive to incident light, (b) a second supporting member transmissive to incident light, facing the first supporting member, and (c) Multiple partition walls disposed between the first supporting member and the second supporting member; with cylindrical lens chambers being configured of the first supporting member, the second supporting member, and the partition walls; with each of the cylindrical lens chambers being occupied with a layered structure of the first liquid and the second liquid making up a liquid crystal lens; and with the plane shape of each of the cylindrical lens chambers being a rectangle with four rounded corners.

With the optical device having the 3rd configuration, it is desirable to employ an arrangement wherein the interface between the first liquid and second liquid is positioned on the side face of the partition walls.

With the optical device having the 3rd configuration including the above-mentioned arrangement, an arrangement may be made wherein the first electrode adjacent to the insulating first liquid through an insulating film, and the second electrode adjacent to the electroconductive second liquid are disposed in each of the cylindrical lens chambers.

Subsequently, with such a desired arrangement, an arrangement may be made wherein the first electrode is disposed on the side face of the partition walls, and the second electrode is disposed on the second supporting member. Now, such an arrangement will be referred to as an optical device having a 3-1'st configuration. With the optical device having the 3-1'st configuration, an arrangement may be made wherein the first electrode extends onto the first supporting member from on the side face of the partition walls. Alternatively, with such a desired arrangement, an arrangement may be made wherein the first electrode is disposed on the side face of the partition walls, and the second electrode is disposed on the first supporting member. Now, such an arrangement will be referred to as an optical device having a 3-2'nd configuration. With the optical device having the 3-2'nd configuration, an arrangement may be made wherein the first electrode extends onto the second supporting member from on the side face of the partition walls.

With the optical device having the 3rd configuration including the above-mentioned various types of desired arrangements, it is desirable to subject the surface of an insulating film to water-repellent processing.

Also, with the optical device having the 3rd configuration, it is desirable that the first liquid and second liquid are insoluble and unmixed.

With the optical device having the 1-1'st, 1-2'nd, or 1-3'rd configuration, though not restricted to the following, if we say that the number of first cylindrical lenses making up the first cylindrical lens group is $N_1$, and the number of second cylindrical lenses making up the second cylindrical lens group is $N_2$, 2 through 10 may be employed as the value of $N_1$, and also 2 through 10 may be employed as the value of $N_2$. The value of $N_1$ and the value of $N_2$ may be the same, or may be different.

Also, with the optical device having the 2-1'st, 2-2'nd, or 2-3'rd configuration, though not restricted to the following, if we say that the number of first cylindrical lenses making up the first cylindrical lens group is $N_1$, and the number of second cylindrical lenses making up the second cylindrical lens group is $N_2$, 2 through 10 may be employed as the value of $N_1$, and also 2 through 10 may be employed as the value of $N_2$. The value of $N_1$ and the value of $N_2$ may be the same, or may be different. In the case of the value of $N_1$ and the value of $N_2$ being the same, the projection images of the axis lines of the multiple first cylindrical lenses making up the first cylindrical lens group, and the projection images of the axis lines of the multiple second cylindrical lenses making up the second cylindrical lens group may be overlapped, or may not be overlapped. Also, with the optical device having the 2-1'st, 2-2'nd, or 2-3'rd configuration, if we assume one light flux of light fluxes emitted from the emission unit, when the one light flux passes through the axis line of a certain first cylindrical lens, an arrangement may be made wherein the one light flux passes through the axis line of the second cylindrical lens corresponding to the certain first cylindrical lens, or an arrangement may be made wherein the one light flux does not pass through that.

With the optical device having the 3rd configuration, the plane shape of each of the cylindrical lens chambers is a rectangle with rounded four corners, but as this "rounded" shape, an arc protruding externally, a part of an ellipse, a part of a hyperbola, and a part of a parabola can be exemplified, and also a part of an arbitrary smooth curve protruding externally may be employed. Let us say that the normal line of the first supporting member which passes through the center of the cylindrical lens chamber is taken as the X axis, and the axis line of the cylindrical lens chamber which passes through the center of the cylindrical lens chamber is taken as the Z axis. Now, when voltage is applied to the first electrode and second electrode, and the cylindrical lens exhibits the maximum optical power, the optical power of the cylindrical lens on the X-Z plane (or plane parallel to the X-Z plane) is substantially zero, and the optical power of the cylindrical lens on the X-Y plane exhibits a limited value. Let us say that when voltage is applied to the first electrode and second electrode, and the cylindrical lens exhibits the maximum optical power, an angle (contact angle) made up of the interface between the first liquid and second liquid on the side face of the partition walls on the X-Y plane, and the side face of the partition walls is $(180-\theta)$ degrees, and the height of the interface on the side face of the partition walls is h. Note that in a case wherein the cylindrical lens exhibits the maximum optical power, and is in a protruding state facing the face of the second supporting member (the opposite face of the second supporting member) facing the first supporting member, let us say that the height h of the interface is height measured from the face of the first supporting member (the opposite face of the first supporting member) facing the second supporting member. On the other hand, in a case wherein the cylindrical lens exhibits the maximum optical power, and is in a protruding state facing the opposite face of the first supporting member, let us say that the height h of the interface is height measured from the opposite face of the second supporting member. Further, let us say that the length along the X-Z plane of the cylindrical lens chamber is $2a$, and the length along the X-Y plane is $2b$.

Now, if "r" is defined with the following Expression (2), the relation between the height h, length b, and r can be represented with Expression (3).

$$r=b/\cos(\theta) \tag{2}$$

$$r^2=b^2+h^2 \tag{3}$$

In a case wherein an arc is employed as the "rounded" shape, zero degree is enough for the contact angles at the four corners of the cylindrical lens chamber, so the maximum value of the radius $r_0$ of the rounded-shaped arc at the four corners of the cylindrical lens chamber is $(b^2+h^2)$, and the minimum value is b. Accordingly, it is desirable for $r_0$ to be within the following range.

$$b \leq r_0 \leq (b^2+h^2)^{1/2}$$

With the liquid lens, examples of liquid having electroconductivity (hereafter, sometimes referred to as electroconductive liquid) include, for example, water, electrolyte (electrolytic solution such as potassium chloride, sodium chloride, lithium chloride, sodium sulfate, etc.), triethylene glycol solution in which these electrolytes are dissolved, alcohols such as methyl alcohol with small molecular weight, ethyl alcohol, etc., polar liquid such as ambient temperature molten salt (ionic liquid), etc., and liquid compound of these. Note that alcohols such as methyl alcohol, ethyl alcohol, etc., can be used by adding electroconductivity thereto as a solution, or by dissolving salt to add electroconductivity thereto. Also, examples of solution having insulation properties (hereafter, sometimes referred to as insulating liquid) include a hydrocarbon material such as deccan, dodecane, hexadecane, undecane, etc., and non-polar solvents, such as silicone oil, fluorine material, etc. Note that electroconductive liquid and insulating liquid have a mutually different refractive index, and desirably are able to exist without mixing mutually. Also, it is desirable to match the density of electroconductive liquid and the density of insulating liquid as much as possible. It is desirable that electroconductive liquid and insulating liquid are transparent liquids as to incident light, but these liquids may be colored in some cases.

With the optical device having the 1-1'st, 1-2'nd, 1-3'rd, 2-1'st, 2-2'nd, or 2-3'rd configuration, a material making up the first face, second face, and partition face is preferably transmissive as to incident light. Now, the term "transmissive as to incident light" means that the optical transmittance of incident light is equal to or greater than 80%. Specific examples of a material making up the first face, second face, partition face, first supporting member, second supporting member, and partition walls include acrylic resin, polycarbonate resin (PC), ABS resin, a polymethyl methacrylate (PMMA), polyarylate resin (PAR), polyethylene terephthalate resin (PET), and glass. The same material may be employed as a material making up the partition plate and side face. Further, silicone rubber and cellophane may be employed as a material making up the partition face, and this may be a sheet shape or film shape. The material making up each member may be the same or may be different.

Electroconductive metallic oxide, such as ITO material, silver-added ITO, IZO material, and $SnO_2$ material, $In_2O_3$ material, $Sb_2O_5$ material, ZnO material, $In_2O_3$—ZnO material, Ga-added ZnO, $In_4Sn_3O_{12}$, InGaZnO, etc., transparent electrodes made up of metal, alloy, semiconductor material, etc., and electrodes made up of opaque metal or alloy may be employed as the electrodes, depending on the portion to be used, and desired properties. Specific examples include metal such aluminum (Al), tungsten (W), niobium (Nb), tantalum (Ta), molybdenum (Mo), chromium (Cr), copper (Cu), gold (Au), silver (Ag), titanium (Ti), nickel (Ni), cobalt (Co), zirconium (Zr), iron (Fe), platinum (Pt), zinc (Zn), etc., alloy including these metal (e.g., MoW) or compound (e.g., nitride such as TiN, etc., silicide such as $WSi_2$, $MoSi_2$, $TiSi_2$, $TaSi_2$, etc.), semiconductor such as silicon (Si), etc., and carbon thin film such as diamond, etc. Examples of a method for forming these electrodes include, for example, a combination of vapor depositing method such as electron beam evaporation method and hot filament vapor-depositing method, CVD method, or ion plating method and etching method, screen printing method, plating method (electroplating and electroless deposition method), liftoff method, laser ablation method, and sol-gel method.

The first insulating film, second insulating film, and insulating film are not restricted to a particular substance as long as a substance to be employed has insulation properties, and it is desirable to select a substance having relatively high specific inductive capacity. Also, in order to obtain relatively great capacitance, it is desirable to reduce the film thickness of the first insulating film, second insulating film, and insulating film, but it is preferable for the film thickness to be equal to or greater than film thickness whereby insulating strength can be ensured. Examples of a material making up the first insulating film, second insulating film, and insulating film include an SiOx material, SiO2 material such as SiN, SiON, oxidized fluoride silicon, polyimide resin, spin-on glass, low-melt glass, and glass paste, titanium oxide ($TiO_2$), tantalum oxide ($Ta_2O_5$), aluminum oxide ($Al_2O_3$), magnesium oxide (MgO), chromic oxide ($CrO_x$), zirconium oxide ($ZrO_2$), niobium oxide ($Nb_2O_5$), tin oxide ($SnO_2$), and vanadium oxide ($VO_x$). Examples of a method for forming the first insulating film, second insulating film, and insulating film include processes according to the related art, such as the CVD method, coating method, sputtering method, screen printing method, plating, electrodeposition method, and dipping method, and so forth.

Also, for example, the surface of the portion of the first partition plate where at least the interface between the first liquid and second liquid are positioned (specifically, the surface of the portion of the first partition plate positioned on the interface between the first liquid and second liquid, and the neighborhood of the interface thereof, and further, the surface of the portion of the side face where the interface between the first liquid and second liquid, and the neighborhood of the interface are positioned), and the surface of the portion of the second partition plate where at least the interface between the third liquid and fourth liquid are positioned (specifically, the surface of the portion of the second partition plate positioned on the interface between the third liquid and fourth liquid, and the neighborhood of the interface thereof, and further, the surface of the portion of the side face where the interface between the third liquid and fourth liquid, and the neighborhood of the interface are positioned), alternatively, the surface of the portion of the first partition plate where at least the interface between the first liquid and second liquid are positioned (specifically, the surface of the portion of the first partition plate positioned on the interface between the first liquid and second liquid, and the neighborhood of the interface thereof, and further, the surface of the portion of the side face where the interface between the first liquid and second liquid, and the neighborhood of the interface are positioned), and the surface of the portion of the second partition plate where at least the interface between the third liquid and second liquid are positioned (specifically, the surface of the portion of the second partition plate positioned on the interface between the third liquid and second liquid, and the neighborhood of the interface thereof, and further, the surface of the portion of the side face where the interface between the third liquid and second liquid, and the neighborhood of the interface are positioned) have been subjected to water-repellent processing. Examples of such water-repellent processing include a method for subjecting polyparaxylylene to film formation using the CVD method, and a method for subjecting a material such as PVDF (polyvinylidene fluoride) which is fluorine polymer, PTF (polytetrafluoroethylene), etc., to coating. Also, the surface of the partition plate may be subjected to coating with a layered structure of a combination between a high dielectric constant material and a water-repellent material.

It is desirable to set length $L_{CL-1}$ in the second direction (the direction parallel to the Y axis) of the first cylindrical lens, and length $L_{CL-2}$ in the first direction (the direction parallel to the Z axis) of the second cylindrical lens with the optical device having the 1-1'st, 1-2'nd, 1-3'rd, 2-1'st, 2-2'nd, or 2-3'rd configuration, or length $2b$ along the X-Y plane of the cylindrical lens with the optical device having the 3rd configuration to equal to or smaller than capillary tube length $\kappa^{-1}$. Now, the capillary tube length $\kappa^{-1}$ represents the maximum length wherein influence of gravity can be ignored as to interface tension, and specifically, if we say that the interface tension between electroconductive liquid and insulating liquid is $\Delta\gamma$, the density difference between the electroconductive liquid and insulating liquid is $\Delta\rho$, and gravitational acceleration is g, the capillary tube length $\kappa^{-1}$ can be represented with the following Expression (B).

$$\kappa^{-1}=(\Delta\gamma/(\Delta\rho \cdot g))^{1/2} \tag{B}$$

The capillary tube length $\kappa^{-1}$ differs depending on the types of the two media making up the interface. The interface tension, density difference, and capillary tube length in each case of a case wherein the two media are water and air, and a case wherein the two media are water and oil are shown in the following Table 1.

| | INTERFACE TENSION ($\Delta\gamma$) | DENSITY DIFFERENCE ($\Delta\rho$) | CAPILLARY TUBE LENGTH ($\kappa^{-1}$) |
|---|---|---|---|
| Water and Air | 72.88 (mN/m) | 0.99997 (g/cm$^3$) | 2.7 (mm) |
| Water and Oil | 29.5 (mN/m) | 0.0129 (g/cm$^3$) | 15.2 (mm) |

While the capillary tube length ($\kappa^{-1}$) is 2.7 mm in the case of water and air, the capillary tube length ($\kappa^{-1}$) is 15.2 mm in the case of water and oil. Accordingly, the density difference between the electroconductive liquid and insulating liquid ($\Delta\rho$) is reduced to 0.0129, whereby the length $L_{CL-1}$, $L_{CL-1}$, and 2b can be set to the maximum 15.2 mm.

With the optical device having the 1-1'st, 1-2'nd, or 1-3'rd configuration, the intensity distribution state of light can be changed by employing an electrowetting phenomenon, and moreover, the first cylindrical lens group and second cylindrical lens group of which the axes extend in a different direction are disposed in three dimensions, so an area where the first cylindrical lens and second cylindrical lens are overlapped serves as a lens, thereby preventing a problem wherein the aberrations at the four corner portions of the liquid lens element become great, as with the related art, from occurring. Also, the occupied area of the lens can be readily increased, and also great optical power can be obtained. Further, the cylindrical lens groups are disposed in an array manner, whereby a thin optical device can be realized. Also, the first cylindrical lens group and second cylindrical lens group of which the axes extend in a different direction are disposed in three dimensions, whereby the intensity distribution of light can be controlled in multiple directions independently.

Also, with the optical device having the 2-1'st, 2-2'nd, or 2-3'rd configuration, the intensity distribution state of light can be changed by employing an electrowetting phenomenon, and moreover, the first cylindrical lens group and second cylindrical lens group of which the axes extend in a different direction are disposed in three dimensions, so an area where the first cylindrical lens and second cylindrical lens are overlapped serves as a lens, whereby greater optical power than that in the related art can be obtained, and the change amount of optical power can be increased. Also, the cylindrical lens groups are disposed in an array manner, whereby a thin optical device can be realized.

Further, the optical device having the 3rd configuration is an optical device wherein the multiple cylindrical lenses each made up of a liquid lens are arrayed, so the occupied areas of the lenses can be readily increased, and great optical power can be obtained. Also, the plane shape of each cylindrical lens chamber is a rectangle with four rounded corners, whereby the aberrations at the four corners of the cylindrical lens can be reduced. Further, the multiple cylindrical lenses are disposed in an array manner, whereby a thin optical device can be realized.

Moreover, with the optical device having the 3rd configuration, providing a driving unit such as a motor or the like is not indispensable, whereby reduction in the number of components, reduction in size, reduction in thickness, and low cost of the optical device can be realized, and further, there is no component to which mechanical force is applied, thereby providing advantages such as longer operating life, high reliability, and occurrence of no sound at all, and with voltage control as well, almost no electric current flows, whereby low consumption power can be realized.

Third Embodiment

Figure 3A:
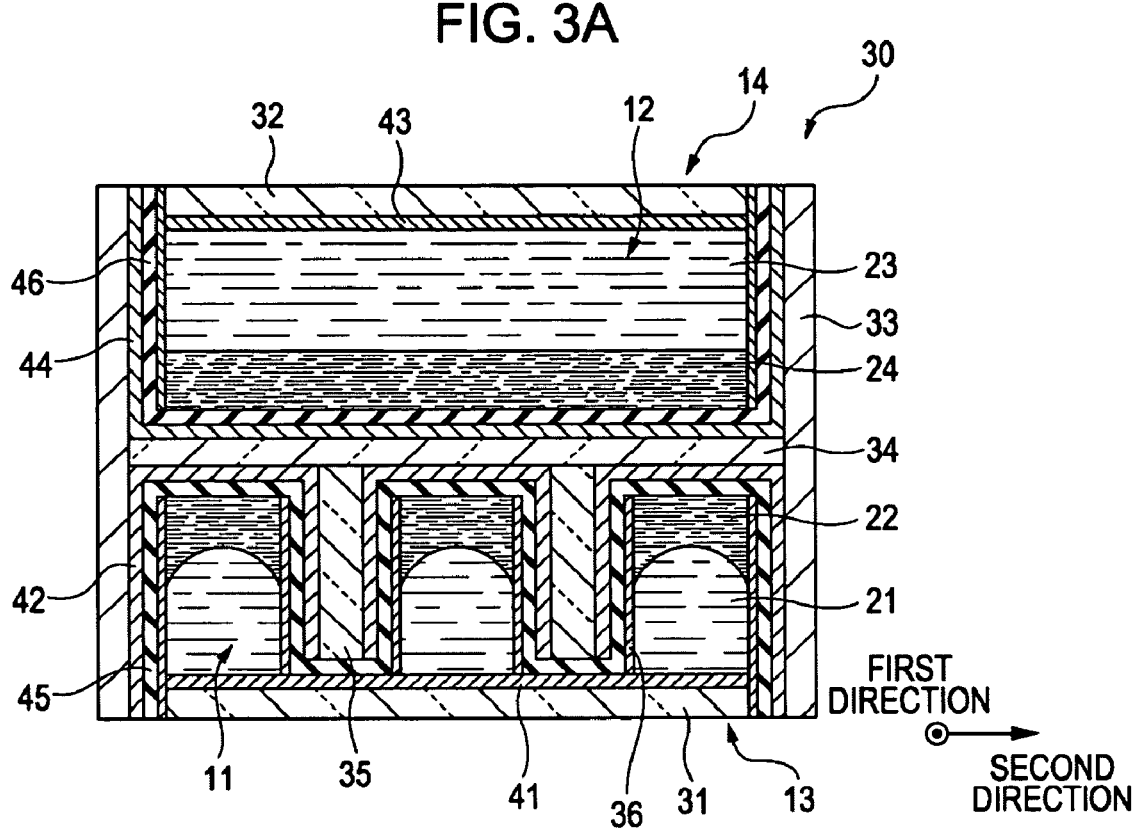
FIGS. 3A and 3B are schematic cross-sectional views illustrating a cutaway of an optical device according to a third embodiment at a virtual vertical plane in a second direction (direction parallel to the Y axis), and a cutaway of the optical device according to the third embodiment at a virtual vertical plane in a first direction (direction parallel to the Z axis)
Figure 3B:
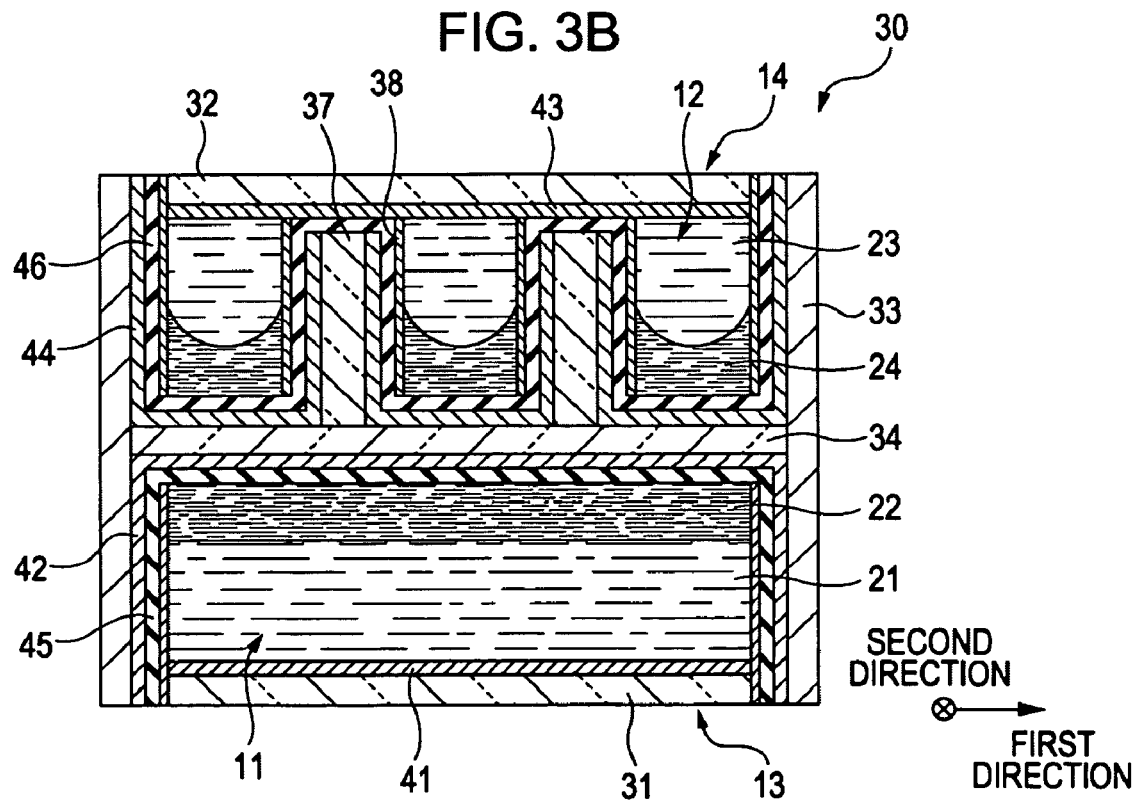

The third embodiment relates to the optical device having the 1-1'st or 1-3'rd configuration, and specifically relates to the optical device having the 1-1-A'th or 1-1-a'th configuration. FIG. 3A illustrates a schematic cross-sectional view of a cutaway of the optical device according to the third embodiment at a virtual vertical plane in a second direction (direction parallel to the Y axis), and FIG. 3B illustrates a schematic cross-sectional view of a cutaway of the optical device according to the third embodiment at a virtual vertical plane in a first direction (direction parallel to the Z axis).

An optical device according to the third embodiment is an optical device including (A) a first cylindrical lens group where multiple first cylindrical lenses 11 are apposed, each of which is made up of a liquid lens of which the axis line extends in a first direction (the direction parallel to the Z axis), (B) a second cylindrical lens group where multiple second cylindrical lenses 12 are apposed, each of which is made up of a liquid lens of which the axis line extends in a second direction different from the first direction (the direction parallel to the Y axis), and light passing through the first cylindrical lens group is input. Note that, specifically, the first direction is orthogonal to the second direction. This is true for later-described fourth through fifteenth embodiments. Also, the cylindrical lenses are also referred to as cylinder lenses, wherein one face has the shape of a part of the circumferential surface (cylinder side face) of a cylinder.

Subsequently, the optical device according to the third embodiment further includes a housing 30 having (a) a first face 31 transmissive to incident light,
(b) a second face 32 transmissive to incident light, facing the first face 31,
(c) a side face 33 linking the first face 31 and second face 32, and
(d) a partition face 34 transmissive to incident light.

This is true for later-described fourth through ninth embodiments, and sixteenth through twenty-second embodiments.

A first chamber 13 is configured of the first face 31, partition face 34, and a portion of the side face 33, a second chamber 14 is configured of the second face 32, partition face 34, and the remaining portion of the side face 33, a first partition plate 35 is disposed within the first chamber 13, which extends in the first direction (the direction parallel to the Z axis), and partitions between the first cylindrical lenses 11, a second partition plate 37 is disposed within the second chamber 14, which extends in the second direction (the direction parallel to the Y axis), and partitions between the second cylindrical lenses 12, the first chamber 13 is occupied with first liquid 21 and second liquid 22 which make up a liquid lens serving as the first cylindrical lens 11, and the second chamber 14 is occupied with third liquid 23 and fourth liquid 24 which make up a liquid lens serving as the second cylindrical lens 12. This configuration is true for later-described fourth through ninth embodiments. Also, this configuration is true for later-described sixteenth through twenty-second embodiments except that the second partition plate 37 is disposed within the second chamber 14, which extends in the first direction (the direction parallel to the Z axis), and partitions the second cylindrical lenses 12.

With the optical device according to the third embodiment, the surface of the portion of the first partition plate 35 where at least the interface between the first liquid 21 and second liquid 22 are positioned (specifically, the surface of the portion of the first partition plate 35 positioned on the interface between the first liquid 21 and second liquid 22, and the neighborhood of the interface thereof, and further, the surface of the portion of the side face 33 where the interface between the first liquid 21 and second liquid 22, and the neighborhood of the interface are positioned), and the surface of the portion of the second partition plate 37 where at least the interface between the third liquid 23 and fourth liquid 24 are positioned (specifically, the surface of the portion of the second partition plate 37 positioned on the interface between the third liquid 23 and fourth liquid 24, and the neighborhood of the interface thereof, and further, the surface of the portion of the side face 33 where the interface between the third liquid 23 and fourth liquid 24, and the neighborhood of the interface are positioned) have been subjected to water-repellent processing. More specifically, a water-repellent processing layer 36 is formed on the side face of the first partition plate 35 (further more specifically, on a first insulating film 45 formed on the side face of the first partition plate 35), and a water-repellent processing layer 38 is formed on the side face of the second partition plate 37 (further more specifically, on a second insulating film 46 formed on the side face of the second partition plate 37). Also, the water-repellent processing layer 36 is formed on the first insulating film 45 formed on the side face 33, and the water-repellent processing layer 38 is formed on the second insulating film 46 formed on the side face 33. This configuration is true for later-described fourth through ninth embodiments, and sixteenth through twenty-second embodiments. Note that a water-repellent processing layer may be formed on the entire area of the first insulating film 45 and second insulating film 46. This is true for later-described fourth through ninth embodiments, and sixteenth through twenty-second embodiments.

Also, with the optical device according to the third embodiment, the first partition plate 35 extends from the first face 31 to the partition face 34, and the second partition plate 37 extends from the second face 32 to the partition face 34.

Also, the optical device according to the third embodiment, the first liquid 21 and third liquid 23 have electroconductivity, and the second liquid 22 and fourth liquid 24 have insulation properties. This is true for later-described fourth through ninth embodiments, and sixteenth through twenty-second embodiments.

Further, a first electrode 41 adjacent to the first liquid 21, and a second electrode 42 insulated from the first liquid 21 are disposed within the first chamber 13. On the other hand, a third electrode 43 adjacent to the third liquid 23, and a fourth electrode 44 insulated from the third liquid 23 are disposed within the second chamber 14. Specifically, the second electrode 42 is adjacent to the interface between the first liquid 21 and second liquid 22 through the first insulating film 45, and the fourth electrode 44 is adjacent to the interface between the third liquid 23 and fourth liquid 24 through the second insulating film 46. Now, the first electrode 41 is made up of a transparent electrode provided on the inner face of the first face 31, and the third electrode 43 is made up of a transparent electrode provided on the inner face of the second face 32. Also, the second electrode 42 is provided on the inner face of the side face 33 making the first chamber 13 in a state covered with the first insulating film 45, and the fourth electrode 44 is provided on the inner face of the side face 33 making the second chamber 14 in a state covered with the second insulating film 46. Further, the second electrode 42 is also provided on the side face of the first partition plate 35 in a state covered with the first insulating film 45, and the fourth electrode 44 is also provided on the side face of the second partition plate 37 in a state covered with the second insulating film 46. Thus, the second electrode 42 is covered with the first insulating film 45, and the fourth electrode 44 is covered with the second insulating film 46. This is true for later-described fourth through ninth embodiments, and sixteenth through twenty-second embodiments. Note that, as shown in the drawing, the second electrode 42 may be provided extending on the inner face of the partition face 34 making the first chamber 13 in a state covered with the first insulating film 45, and the fourth electrode 44 may be provided extending on the inner face of the partition face 34 making the second chamber 14 in a state covered with the fourth insulating film 46.

The first liquid 21 and second liquid 22 are insoluble and unmixed, and separated at the interface, and this interface makes up a lens face. Also, the third liquid 23 and fourth liquid 24 are insoluble and unmixed, and separated at the interface, and this interface makes up a lens face. These are true for later-described fourth through ninth embodiments, and sixteenth through twenty-second embodiments.

With the optical device according to the third embodiment, specifically, the first face 31, second face 32, and partition face 34 are made of glass or a resin such as an acrylic resin or the like, and the side face 33, first partition plate 35, and second partition plate 37 are made of glass or a resin such as an acrylic resin or the like. Also, the first liquid 21 and third liquid 23 are made of lithium-chloride solution, the density thereof is 1.06 g/cm$^3$, and the refractive index thereof is 1.34. On the other hand, the second liquid 22 and fourth liquid 24 are made of silicone oil (TSF437, manufactured by Momentive Performance Materials Japan LLC (former name: GE TOSHIBA Silicone Co. Ltd.)), the density thereof is 1.02 g/cm$^3$, and the refractive index thereof is 1.49. Further, the water-repellent processing layers 36 and 38 are made up of polyparaxylylene or fluorine polymer. Also, the transparent electrodes (the first electrode 41 and third electrode 43 with the third embodiment and later-described sixteenth embodiment) are made of ITO, and in a case wherein transparency is not indispensable, the electrodes are made of a metal electrode such as gold, aluminum, copper, silver, or the like. Further, the first insulating film 45 and second insulating film 46 are made of metal oxides, such as polyparaxylylene, tantalum oxide, titanium oxide, or the like. The plane shape of the housing 30 (or later-described housing 130) is a square. The above-mentioned matters are true for later-described fourth through twenty-eighth embodiments as long as there is no notice otherwise in particular.

With the third embodiment, an arrangement has been made wherein the length $L_{CL-1}$ in the second direction (the direction parallel to the Y axis) of the first cylindrical lens is 30 mm, and the length $L_{CL-2}$ in the first direction (the direction parallel to the Z axis) of the second cylindrical lens is 30 mm. Also, an arrangement has been made wherein when assuming that the number of first cylindrical lenses 11 making up the first cylindrical lens group is $N_1$, and the number of second cylindrical lenses 12 making up the second cylindrical lens group is $N_2$, $N_1$ and $N_2$ are set to 10 ($N_1=N_2=10$). These arrangements are true for later-described fourth through fifteenth embodiments.

An arrangement and configuration are made wherein the first electrode 41, second electrode 42, third electrode 43, and fourth electrode 44 are connected to an external control circuit through an unshown connection unit, and desired voltage is applied thereto. Subsequently, upon voltage being applied between the first electrode 41 and second electrode 42, a lens face made up of the interface between the first liquid 21 and second liquid 22 is changed from the state protruding upward shown in FIG. 3A to a state protruding downward. On the other hand, upon voltage being applied between the third electrode 43 and fourth electrode 44, a lens face made up of the interface between the third liquid 23 and fourth liquid 24 is changed from the state protruding downward shown in FIG. 3B to a state protruding upward. The change states of the lens faces vary depending on voltage being applied to the electrodes (see Expression (A)). Thus, with the optical device according to the third embodiment, optical power at the first cylindrical lens group, and optical power at the second cylindrical lens group independently vary, whereby the focal distance of a lens formed by the first cylindrical lens group and second cylindrical lens group (specifically, lens made up of an area where the first cylindrical lens and second cylindrical lens are overlapped) can vary, and consequently, a strobe device of which the illuminating angle varies from the wide angle side to the telephoto side can be provided. This is true for later-described fourth through sixth embodiments.

Now, with the third embodiment, if we say that the size in the first direction (the direction parallel to the Z axis) of an emission area of the emission unit 2 is $L_{e-1}$, and the size in the second direction (the direction parallel to the Y axis) is $L_{e-2}$ the length in the first direction of an area to be lightened by the lighting system is $L_{i-1}$, the length in the second direction (the direction parallel to the Y axis) is $L_{i-2}$, a light distribution rate (optical magnifying power) in the second direction of the first cylindrical lenses is $P_{1-2}$, a light distribution rate (optical magnifying power) in the first direction of the second cylindrical lenses is $P_{2-1}$, and k is a constant, the light distribution rate $P_{1-2}$ in the second direction of the first cylindrical lenses, and the light distribution rate $P_{2-1}$ in the first direction of the second cylindrical lenses are controlled so as to satisfy the following expression.

$$P_{2-1}=k\times P_{1-2} \text{ (where } k\times(L_{e-2}/L_{e-1})=L_{i-2}/L_{i-1})$$

For example, in a case wherein a film to be employed for a camera is a so-called 135 film, or in a case wherein an image device (e.g., CCD element or CMOS image sensor) provided in a camera, it is desirable for the value of $L_{i-2}/L_{i-1}$ to be set to the aspect ratio of the film or imaging device, i.e., $L_{i-2}/L_{i-1}=1.5$ Also, in a case wherein a shooting format is, for example, so-called 6×6, 6×9, 6×7, and 6×4.5, the corresponding values to be set are $$L_{i-2}/L_{i-1}=6/6$$

$$L_{i-2}/L_{i-1}=9/6$$

$$L_{i-2}/L_{i-1}=7/6$$

$$L_{i-2}/L_{i-1}=6/4.5$$

Accordingly, an arrangement may be made wherein k is obtained from the size of a xenon tube to be used, and the value of $L_{i-2}/L_{i-1}$, and further, the light distribution rate (optical magnifying power) $P_{1-2}$ in the second direction of the first cylindrical lenses, and the light distribution rate (optical magnifying power) $P_{2-1}$ in the first direction of the second cylindrical lenses are determined from the value of the obtained k. Subsequently, optical power at the first cylindrical lens group and optical power at the first cylindrical lens group whereby the light distribution rate (optical magnifying power) $P_{1-2}$ and $P_{2-1}$ can be obtained are determined by performing various types of examinations, thereby storing the voltage to be applied to the electrodes of the optical device in the strobe device.

The above-mentioned control of the light distribution rates can be applied to control of a lighting system to which the optical device according to any of later-described fourth through fifteenth embodiments is embedded.

The second electrode 42 and fourth electrode 44 may be made common in some cases. In other words, the second electrode 42 and fourth electrode 44 may be configured of a common electrode. Specifically, the second electrode 42 may be formed integral with the fourth electrode 44. This is true for later-described fourth through sixth, and sixteenth through nineteenth embodiments. Also, the first electrode 41 may be provided extending on the inner face of the side face 33 from the inner face of the first face 31 making up the first chamber 13, and the third electrode 43 may be provided extending on the inner face of the side face 33 from the inner face of the second face 32 making up the second chamber 14. This is true for later-described fourth through sixth, and sixteenth through nineteenth embodiments.

Fourth Embodiment

The fourth embodiment is a modification of the third embodiment, and specifically, relates to the optical device having the 1-1-B'th or 1-1-a'th configuration. FIG. 4A illustrates a schematic cross-sectional view of a cutaway of the optical device according to the fourth embodiment at a virtual vertical plane in a second direction (direction parallel to the Y axis), and FIG. 4B illustrates a schematic cross-sectional view of a cutaway of the optical device according to the fourth embodiment at a virtual vertical plane in a first direction (direction parallel to the Z axis).

With the optical device according to the third embodiment, the first partition plate 35 extends from the first face 31 to the partition face 34, and the second partition plate 37 extends from the second face 32 to the partition face 34.

On the other hand, with the optical device according to the fourth embodiment, the first partition plate 35 extends from the first face 31 toward the partition face 34, and the second partition plate 37 extends from the second face 32 toward the partition face 34, and there is a gap between the top face of the first partition plate 35 and the top face of the second partition plate 37. The arrangement and configuration of the optical device according to the fourth embodiment can be regarded as the same as those of the optical device according to the third embodiment except for the above-mentioned point, so the detailed description thereof will be omitted.

Note that, with the examples shown in FIGS. 4A and 4B, the second electrode 42 is provided on the inner face of the partition face 34, the inner face of the side face 33, and the side face of the first partition plate 35, which make up the first chamber 13, and the fourth electrode 44 is provided on the inner face of the partition face 34, the inner face of the side face 33, and the side face of the second partition plate 37, which make up the second chamber 14, but the optical device according to the fourth embodiment is not restricted to such an arrangement and configuration. As shown in FIG. 5A of a schematic cross-sectional view of a cutaway of a modification of the optical device according to the fourth embodiment at a virtual vertical plane in a second direction (direction parallel to the Y axis), and as shown in FIG. 5B of a schematic cross-sectional view of a cutaway of the modification of the optical device according to the fourth embodiment at a virtual vertical plane in a first direction (direction parallel to the Z axis), an arrangement may be made wherein the second electrode 42 is provided only on the inner face of the side face 33 and the side face of the first partition plate 35, which makes up the first chamber 13, and the fourth electrode 44 is provided only on the inner face of the side face 33 and the side face of the second partition plate 37, which makes up the second chamber 14. Such an arrangement is employed, whereby the electrodes disposed on the optical path can be reduced, and also improvement in optical transmittance can be realized. Note that the portion of the second electrode 42 provided on the inner face of the side face 33 is formed integral with the portion of the second electrode 42 provided on the side face of the first partition plate 35 at an unshown area, and the portion of the fourth electrode 44 provided on the inner face of the side face 33 is formed integral with the portion of the fourth electrode 44 provided on the side face of the second partition plate 37 at an unshown area. In a case wherein the first partition plate and second partition plate have the same configuration, this is true for later-described eighth and tenth embodiments.

Fifth Embodiment

The fifth embodiment is a modification of the third embodiment, and specifically, relates to the optical device having the 1-1-C'th or 1-1-a'th configuration. FIG. 6A illustrates a schematic cross-sectional view of a cutaway of the optical device according to the fifth embodiment at a virtual vertical plane in a second direction (direction parallel to the Y axis), and FIG. 6B illustrates a schematic cross-sectional view of a cutaway of the optical device according to the fifth embodiment at a virtual vertical plane in a first direction (direction parallel to the Z axis).

With the optical device according to the fifth embodiment, the first partition plate 35 extends from the partition face 34 toward the first face 31, and there is a gap between the top face of the first partition plate 35 and the first face 31, and on the other hand, the second partition plate 37 extends from the partition face 34 toward the second face 32, and there is a gap between the top face of the second partition plate 37 and the second face 32. The arrangement and configuration of the optical device according to the fifth embodiment can be regarded as the same as those of the optical device according to the third embodiment except for the above-mentioned point, so the detailed description thereof will be omitted.

Sixth Embodiment

The sixth embodiment is a modification of the third embodiment, and specifically, relates to the optical device having the 1-1-D'th or 1-1-a'th configuration. FIG. 7A illustrates a schematic cross-sectional view of a cutaway of the optical device according to the sixth embodiment at a virtual vertical plane in a second direction (direction parallel to the Y axis), and FIG. 7B illustrates a schematic cross-sectional view of a cutaway of the optical device according to the sixth embodiment at a virtual vertical plane in a first direction (direction parallel to the Z axis).

With the optical device according to the sixth embodiment, there is a gap between the bottom face of the first partition plate 35 and the first face 31, and there is a gap between the bottom face of the second partition plate 37 and the second face 32, and there is a gap between the top face of the first partition plate 35 and the top face of the second partition plate 37. The arrangement and configuration of the optical device according to the sixth embodiment can be regarded as the same as those of the optical device according to the third embodiment except for the above-mentioned point, so the detailed description thereof will be omitted.

Figure 8A:
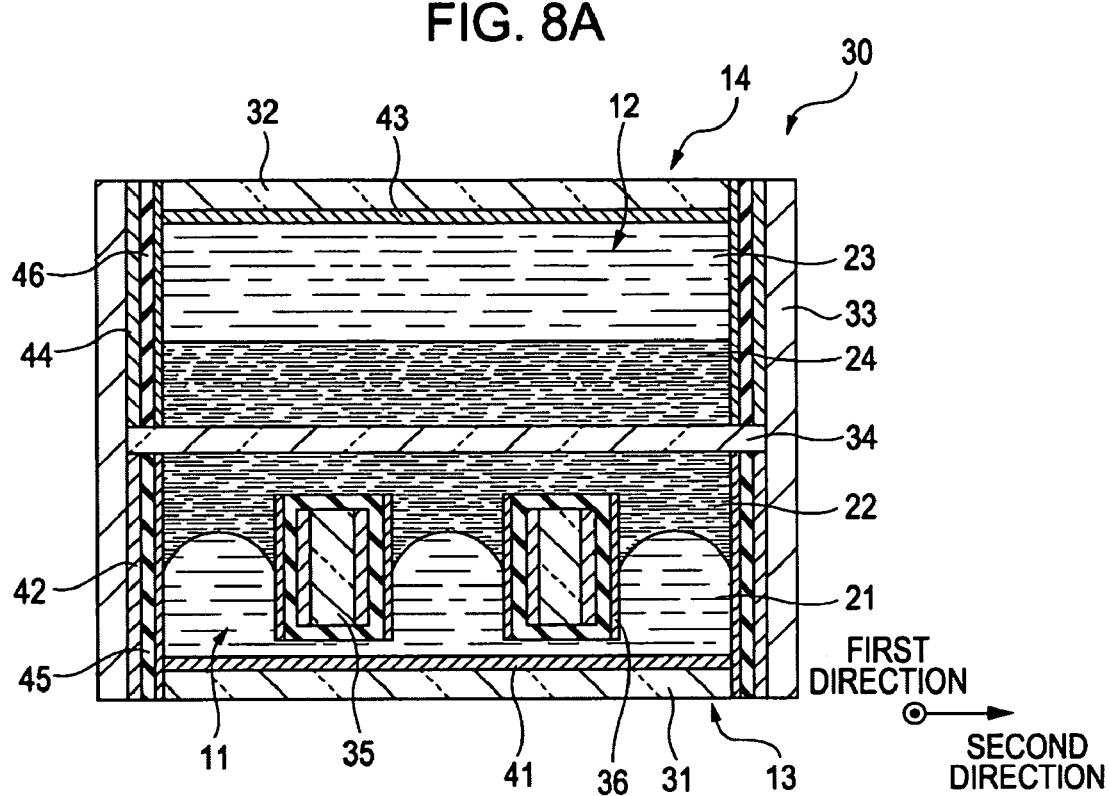
FIGS. 8A and 8B are schematic cross-sectional views illustrating a cutaway of a modification of the optical device according to the sixth embodiment at a virtual vertical plane in a second direction (direction parallel to the Y axis), and a cutaway of the modification of the optical device according to the sixth embodiment at a virtual vertical plane in a first direction (direction parallel to the Z axis)
Figure 8B:
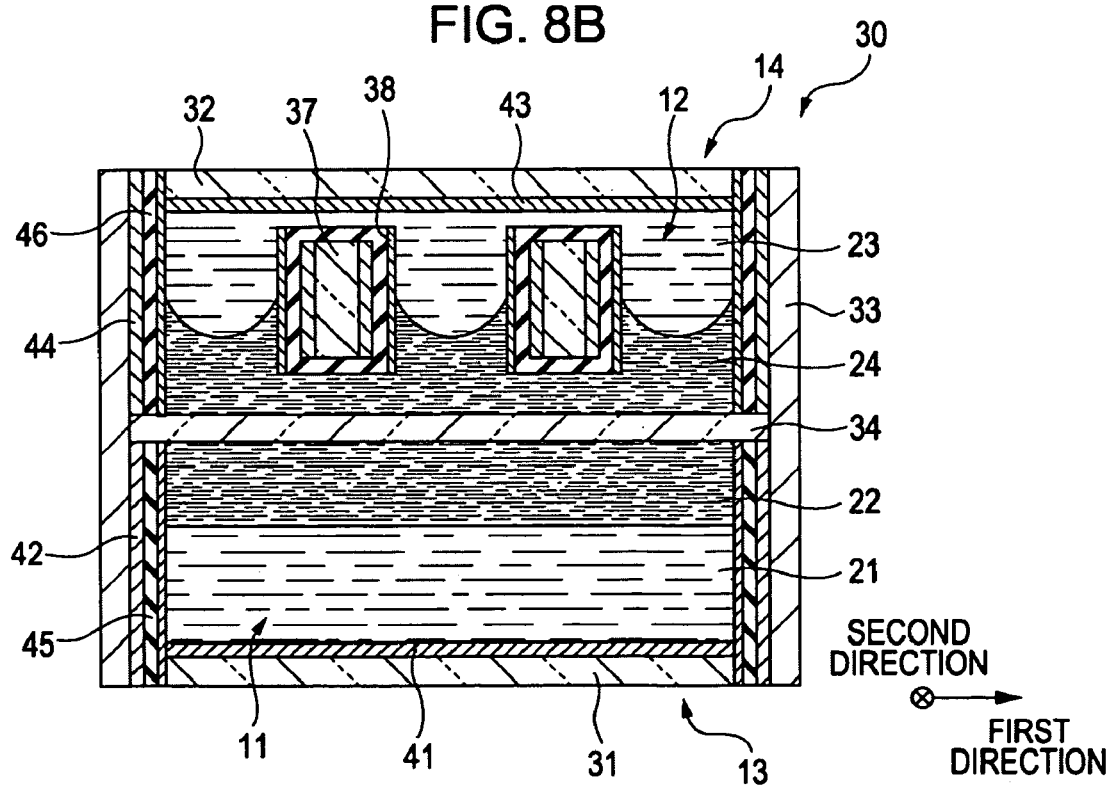

Note that, with the examples shown in FIGS. 7A and 7B, the second electrode 42 is provided on the inner face of the partition face 34, the inner face of the side face 33, and the side face of the first partition plate 35, which make up the first chamber 13, and the fourth electrode 44 is provided on the inner face of the partition face 34, the inner face of the side face 33, and the side face of the second partition plate 37, which make up the second chamber 14, but the optical device according to the sixth embodiment is not restricted to such an arrangement and configuration. As shown in FIG. 8A of a schematic cross-sectional view of a cutaway of a modification of the optical device according to the sixth embodiment at a virtual vertical plane in a second direction (direction parallel to the Y axis), and as shown in FIG. 8B of a schematic cross-sectional view of a cutaway of the modification of the optical device according to the sixth embodiment at a virtual vertical plane in a first direction (direction parallel to the Z axis), an arrangement may be made wherein the second electrode 42 is provided only on the inner face of the side face 33 and the side face of the first partition plate 35, which makes up the first chamber 13, and the fourth electrode 44 is provided only on the inner face of the side face 33 and the side face of the second partition plate 37, which makes up the second chamber 14. Such an arrangement is employed, whereby the electrodes disposed on the optical path can be reduced, and also improvement in optical transmittance can be realized. Note that the portion of the second electrode 42 provided on the inner face of the side face 33 is formed integral with the portion of the second electrode 42 provided on the side face of the first partition plate 35 at an unshown area, and the portion of the fourth electrode 44 provided on the inner face of the side face 33 is formed integral with the portion of the fourth electrode 44 provided on the side face of the second partition plate 37 at an unshown area. In a case wherein the first partition plate and second partition plate have the same configuration, this is true for later-described ninth, eleventh, and thirteenth embodiments.

Seventh Embodiment

Figure 9A:
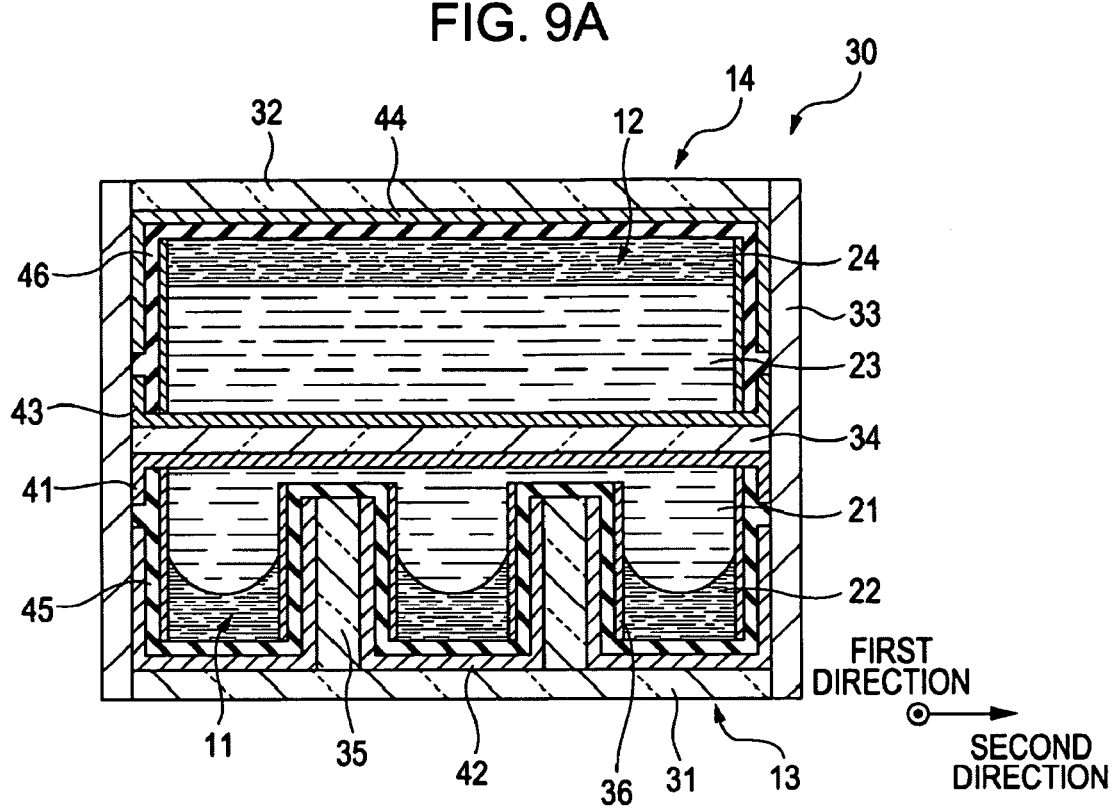
FIGS. 9A and 9B are schematic cross-sectional views illustrating a cutaway of an optical device according to a seventh embodiment at a virtual vertical plane in a second direction (direction parallel to the Y axis), and a cutaway of the optical device according to the seventh embodiment at a virtual vertical plane in a first direction (direction parallel to the Z axis)

The seventh embodiment is a modification of the fourth embodiment, and specifically, relates to the optical device having the 1-1-B'th or 1-1-b'th configuration. A point wherein the seventh embodiment or later-described eighth and ninth embodiments differ from the third embodiment, and fifth and sixth embodiments is that the layout of the first liquid 21 and third liquid 23, and the layout of the second liquid 22 and fourth liquid 24 are inverted vertically. FIG. 9A illustrates a schematic cross-sectional view of a cutaway of the optical device according to the seventh embodiment at a virtual vertical plane in a second direction (direction parallel to the Y axis), and FIG. 9B illustrates a schematic cross-sectional view of a cutaway of the optical device according to the seventh embodiment at a virtual vertical plane in a first direction (direction parallel to the Z axis).

With the optical device according to the seventh embodiment, the first electrode 41 is provided on the inner face of the side face 33 making up the first chamber 13, and the third electrode 43 is provided on the inner face of the side face 33 making up the second chamber 14. On the other hand, the second electrode 42 is made up of a transparent electrode provided on the inner face of the first face 31, the inner face of the side face 33, and the side face of the first partition plate 35 in a state covered with the first insulating film 45, and the fourth electrode 44 is made up of a transparent electrode provided on the inner face of the second face 32, the inner face of the side face 33, and the side face of the second partition plate 37 in a state covered with the second insulating film 46. Note that the first electrode 41 is provided extending on the inner face of the partition face 34 making up the first chamber 13, and the third electrode 43 is provided extending on the inner face of the partition face 34 making up the second chamber 14.

The arrangement and configuration of the optical device according to the seventh embodiment can be regarded as the same as those of the optical device according to the fourth embodiment except for the above-mentioned point, so the detailed description thereof will be omitted. Note that with the optical device according to the seventh embodiment, similar to the optical device according to the fourth embodiment, the first partition plate 35 extends from the first face 31 toward the partition face 34, the second partition plate 37 extends from the second face 32 toward the partition face 34, and there is a gap between the top face of the first partition plate 35 and the top face of the second partition plate 37.

Figure 9B:
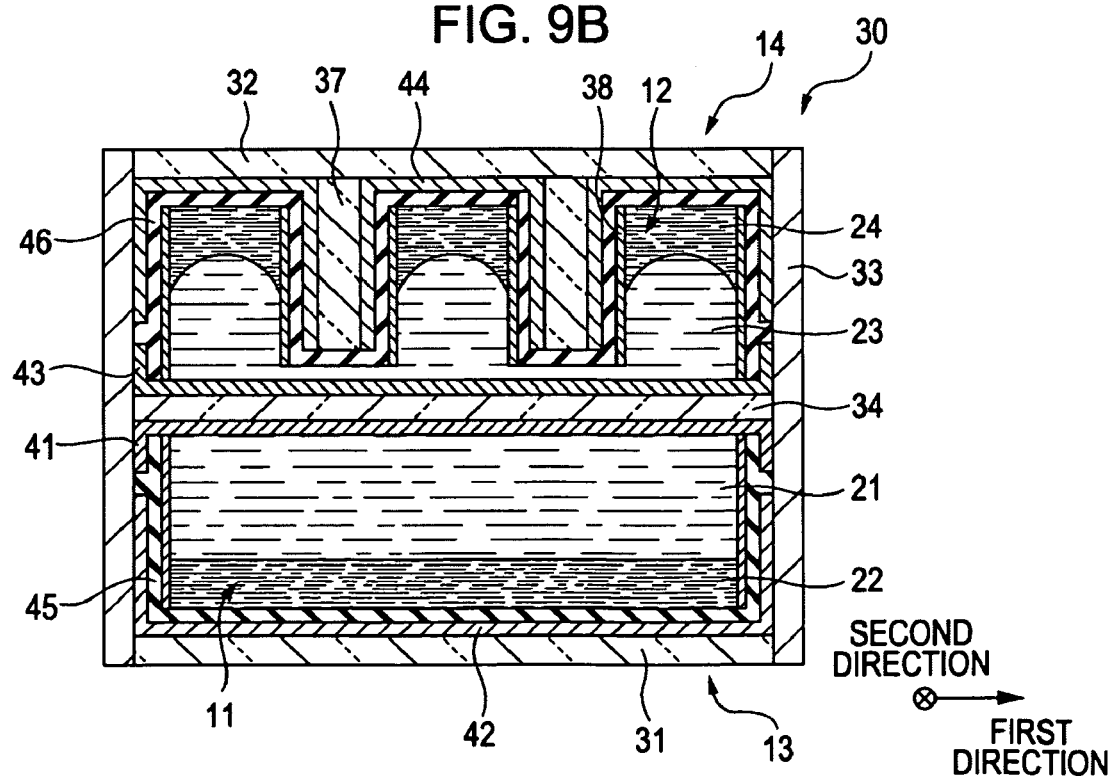
Figure 10A:
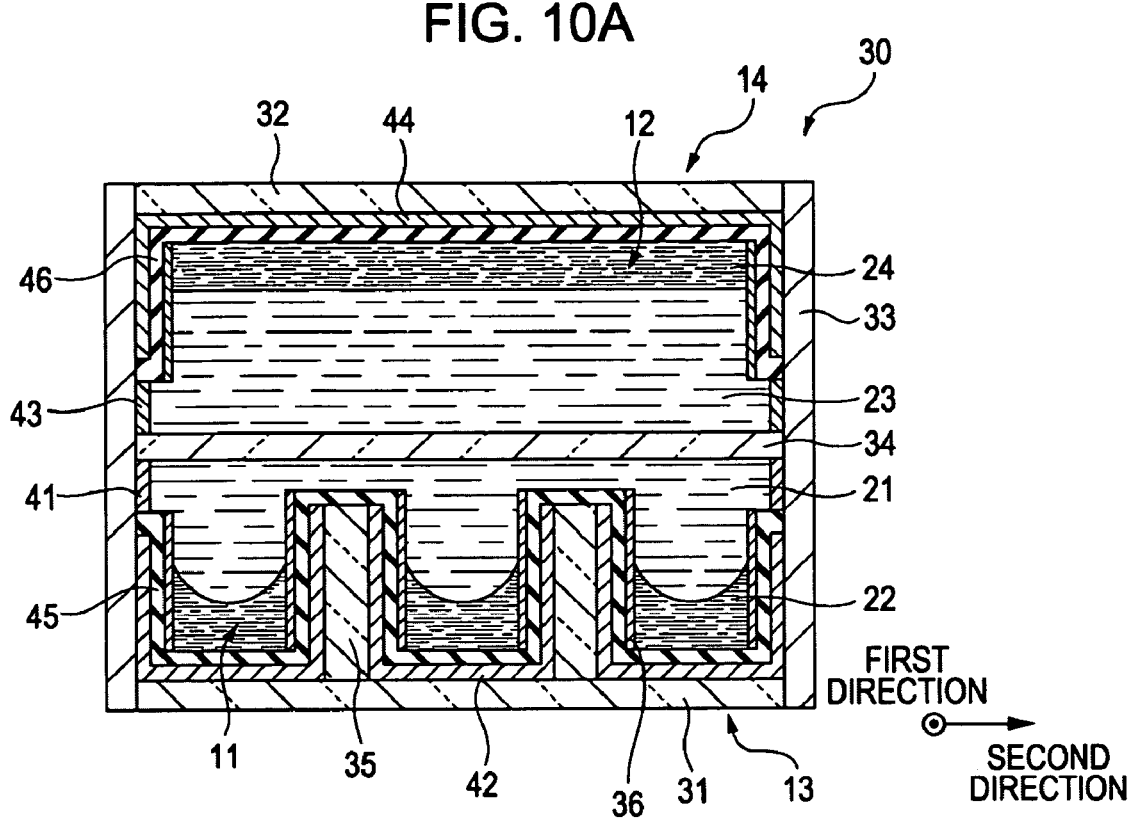
FIGS. 10A and 10B are schematic cross-sectional views illustrating a cutaway of a modification of the optical device according to the seventh embodiment at a virtual vertical plane in a second direction (direction parallel to the Y axis), and a cutaway of the modification of the optical device according to the seventh embodiment at a virtual vertical plane in a first direction (direction parallel to the Z axis)
Figure 10B:
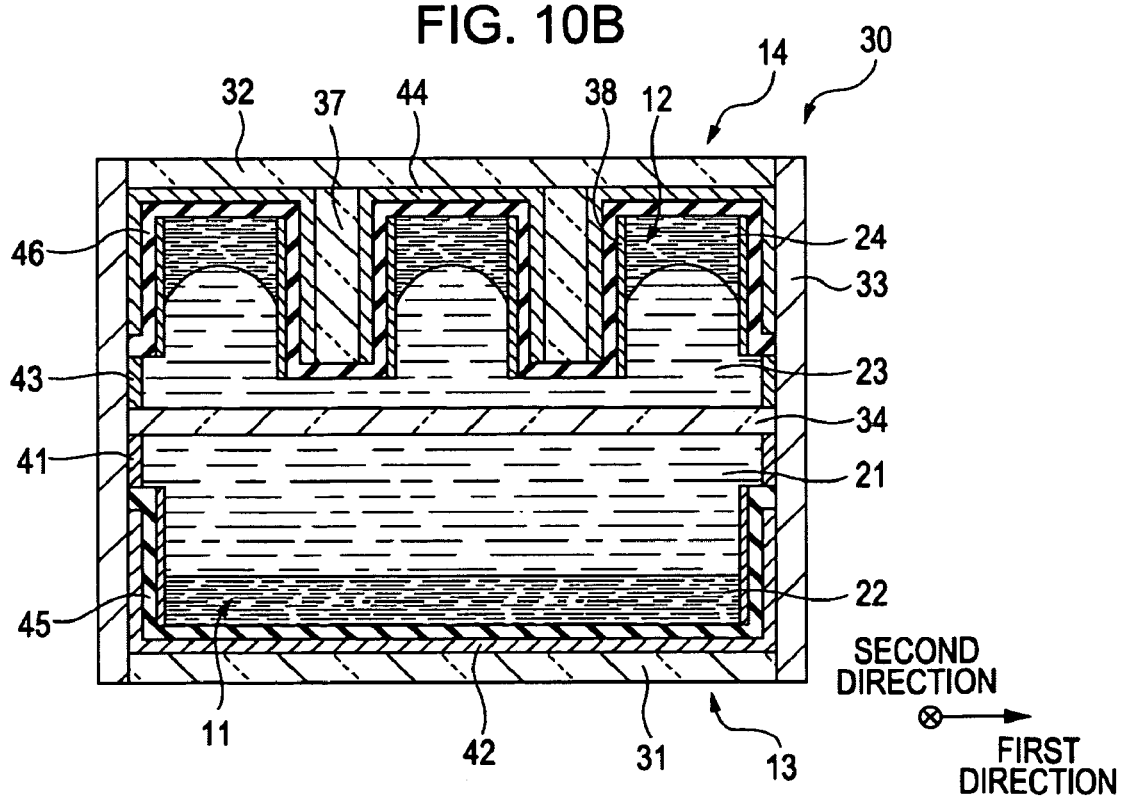

With the examples shown in FIGS. 9A and 9B, the first electrode 41 is provided extending on the inner face of the partition face 34 making up the first chamber 13, and the third electrode 43 is provided extending on the inner face of the partition face 34 making up the second chamber 14, but the optical device according to the seventh embodiment is not restricted to such an arrangement and configuration. As shown in FIG. 10A of a schematic cross-sectional view of a cutaway of a modification of the optical device according to the seventh embodiment at a virtual vertical plane in a second direction (direction parallel to the Y axis), and as shown in FIG. 10B of a schematic cross-sectional view of a cutaway of the modification of the optical device according to the seventh embodiment at a virtual vertical plane in a first direction (direction parallel to the Z axis), an arrangement may be made wherein the first electrode 41 is provided only on the inner face of the side face 33 making up the first chamber 13, and the third electrode 43 is provided only on the inner face of the side face 33 making up the second chamber 14. Such an arrangement is employed, whereby the electrodes disposed on the optical path can be reduced, and also improvement in optical transmittance can be realized.

With the optical device according to the seventh embodiment or the modification thereof described above, the first electrode 41 and third electrode 43 may be made common in some cases. In other words, the first electrode 41 and third electrode 43 may be configured of a common electrode. Specifically, the first electrode 41 may be formed integral with the third electrode 43. This is true for later-described eighth and ninth embodiments.

Figure 11A:
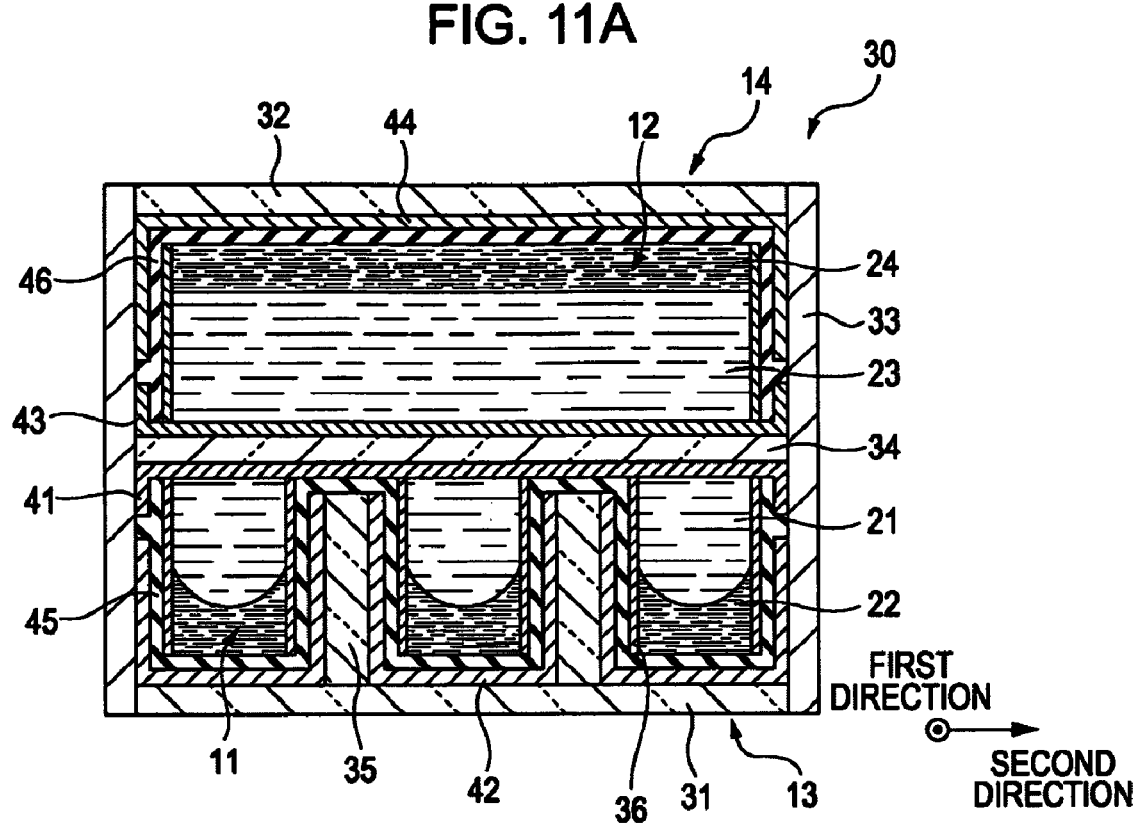
FIGS. 11A and 11B are schematic cross-sectional views illustrating a cutaway of another modification of the optical device according to the seventh embodiment at a virtual vertical plane in a second direction (direction parallel to the Y axis), and a cutaway of the other modification of the optical device according to the seventh embodiment at a virtual vertical plane in a first direction (direction parallel to the Z axis)
Figure 11B:
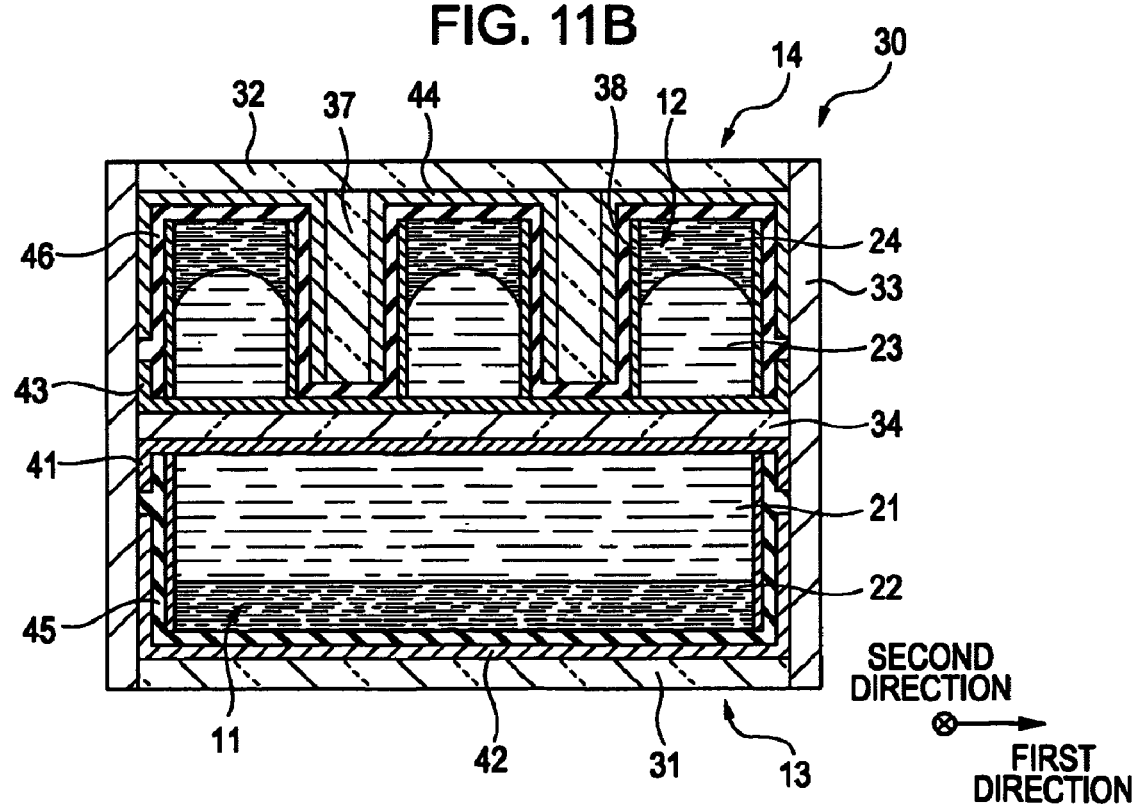

Also, FIG. 11A illustrates a schematic cross-sectional view of a cutaway of a modification of the optical device according to the seventh embodiment at a virtual vertical plane in a second direction (direction parallel to the Y axis), and FIG. 11B illustrates a schematic cross-sectional view of a cutaway of the modification of the optical device according to the seventh embodiment at a virtual vertical plane in a first direction (direction parallel to the Z axis). This modification is a modification of the third embodiment, and specifically, relates to the optical device having the 1-1-A'th or 1-1-b'th configuration. That is to say, with this modification, the first partition plate 35 extends from the first face 31 to the partition face 34, and the second partition plate 37 extends from the second face 32 to the partition face 34. Subsequently, an arrangement may be made wherein the first electrode 41 extends on the inner face of the partition face 34 making up the first chamber 13, the third electrode 43 extends on the inner face of the partition face 34 making up the second chamber 14, the second electrode 42 extends on the inner face of the side face 33 making up the first chamber 13, and the fourth electrode 44 extends on the inner face of the side face 33 making up the second chamber 14. In such a case, the second electrode 42 and fourth electrode 44 may be made common as appropriate. In other words, the second electrode 42 and fourth electrode 44 may be configured of a common electrode. Specifically, the second electrode 42 may be formed integral with the fourth electrode 44. Also, though not shown in the drawing, an arrangement may be made wherein the first electrode 41 is provided only on the inner face of the side face 33 making up the first chamber 13, and the third electrode 43 is provided only on the inner face of the side face 33 making up the second chamber 14.

With the seventh embodiment as well, an arrangement and configuration are made wherein the first electrode 41, second electrode 42, third electrode 43, and fourth electrode 44 are connected to an external control circuit through an unshown connection unit, and desired voltage is applied thereto. Subsequently, upon voltage being applied between the first electrode 41 and second electrode 42, a lens face made up of the interface between the first liquid 21 and second liquid 22 is changed from the state protruding downward shown in FIGS. 9A, 10A, and 11A to a state protruding upward. On the other hand, upon voltage being applied between the third electrode 43 and fourth electrode 44, a lens face made up of the interface between the third liquid 23 and fourth liquid 24 is changed from the state protruding upward shown in FIGS. 9B, 10B, and 11B to a state protruding downward. The change states of the lens faces vary depending on voltage being applied to the electrodes (see Expression (A)). Thus, with the optical device according to the seventh embodiment, optical power at the first cylindrical lens group, and optical power at the second cylindrical lens group independently vary, whereby the focal distance of a lens formed by the first cylindrical lens group and second cylindrical lens group (specifically, lens made up of an area where the first cylindrical lens and second cylindrical lens are overlapped) can vary, and consequently, a strobe device of which the illuminating angle varies from the wide angle side to the telephoto side can be provided. This is true for later-described eighth and ninth embodiments.

Eighth Embodiment

Figure 12A:
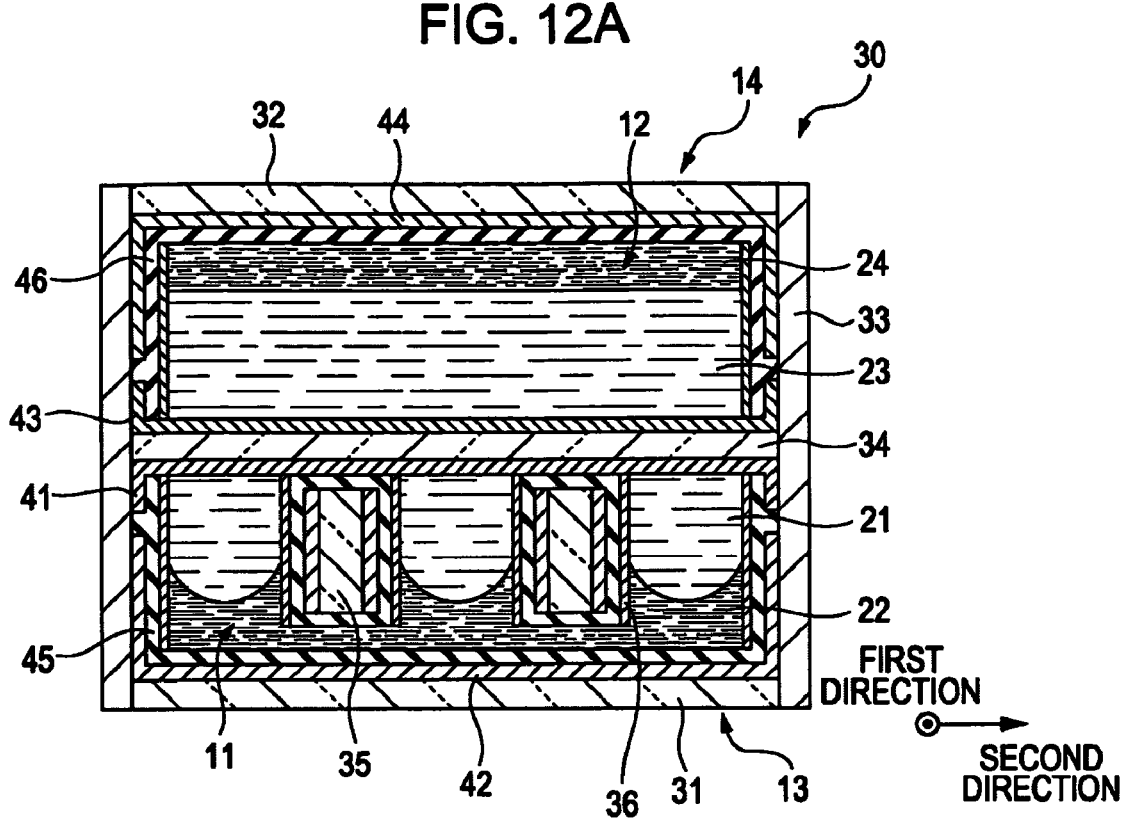
FIGS. 12A and 12B are schematic cross-sectional views illustrating a cutaway of an optical device according to an eighth embodiment at a virtual vertical plane in a second direction (direction parallel to the Y axis), and a cutaway of the optical device according to the eighth embodiment at a virtual vertical plane in a first direction (direction parallel to the Z axis)
Figure 12B:
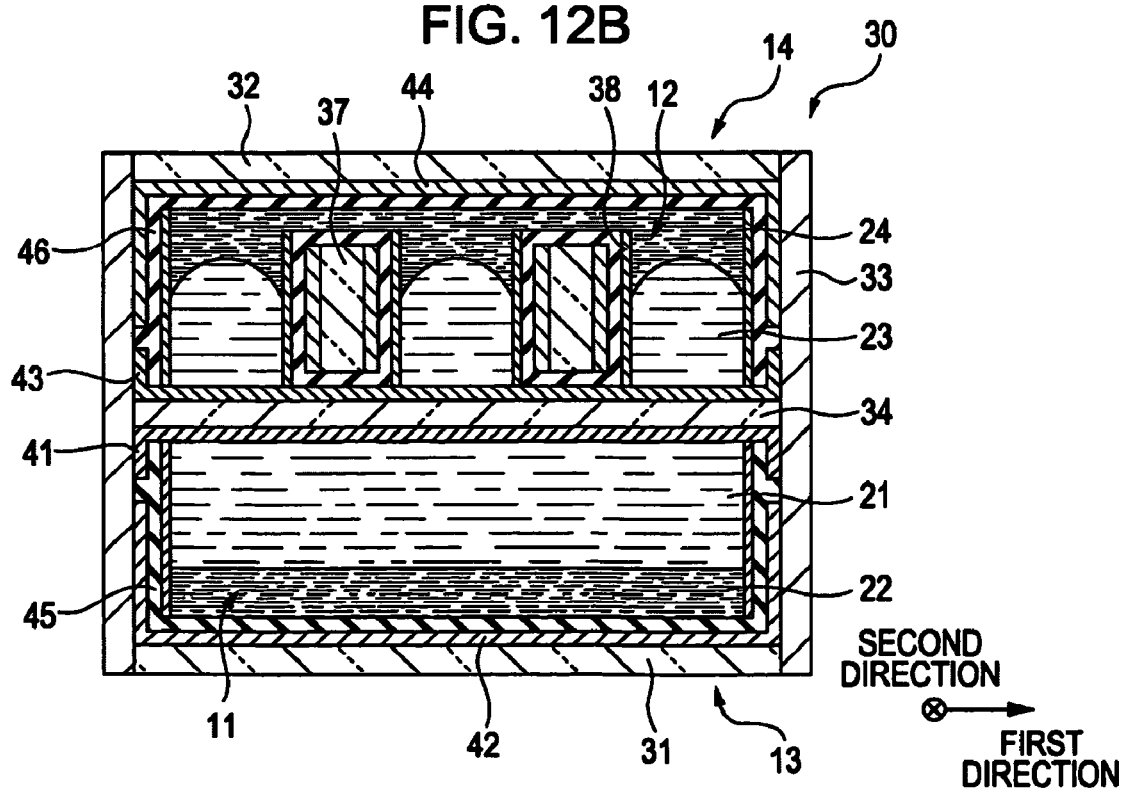

The eighth embodiment is also a modification of the third embodiment, and specifically, relates to the optical device having the 1-1-C'th or 1-1-b'th configuration. FIG. 12A illustrates a schematic cross-sectional view of a cutaway of the optical device according to the eighth embodiment at a virtual vertical plane in a second direction (direction parallel to the Y axis), and FIG. 12B illustrates a schematic cross-sectional view of a cutaway of the optical device according to the eighth embodiment at a virtual vertical plane in a first direction (direction parallel to the Z axis).

With the optical device according to the eighth embodiment, similar to the fifth embodiment, the first partition plate 35 extends from the partition face 34 toward the first face 31, and there is a gap between the top face of the first partition plate 35 and the first face 31, and on the other hand, the second partition plate 37 extends from the partition face 34 toward the second face 32, and there is a gap between the top face of the second partition plate 37 and the second face 32. The arrangement and configuration of the optical device according to the eighth embodiment can be regarded as the same as those of the optical device according to the seventh embodiment except for the above-mentioned point, so the detailed description thereof will be omitted.

Figure 13A:
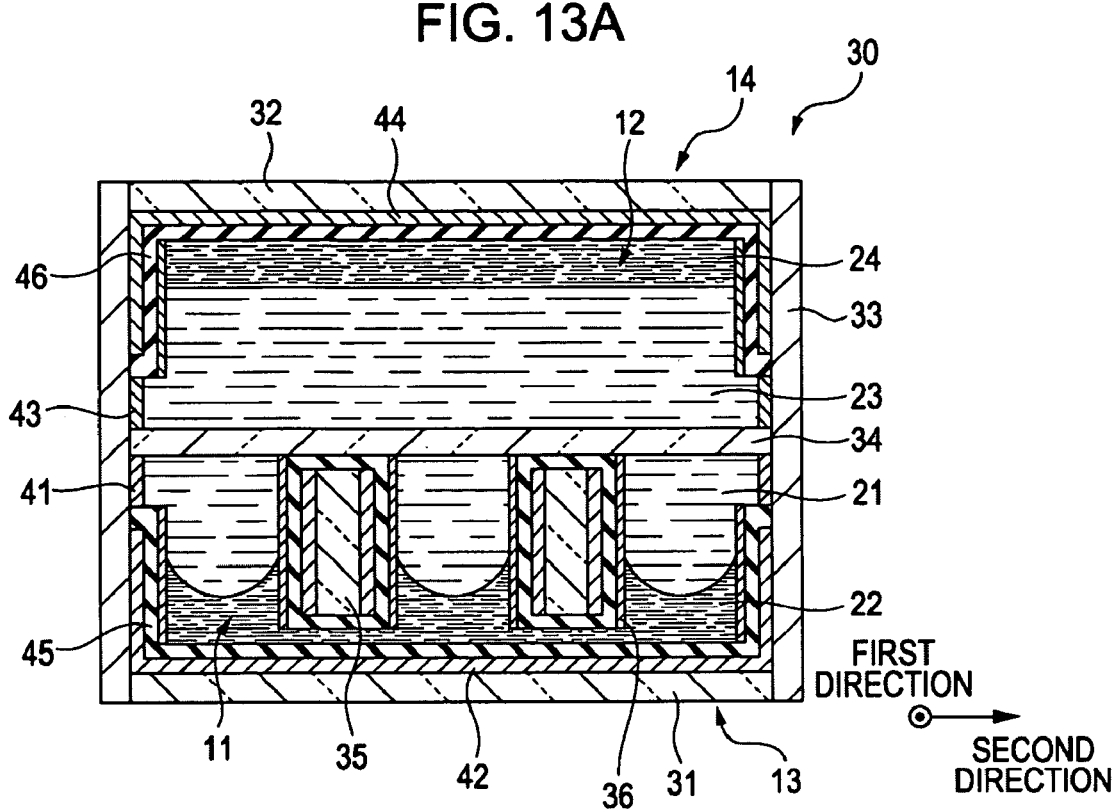
FIGS. 13A and 13B are schematic cross-sectional views illustrating a cutaway of a modification of the optical device according to the eighth embodiment at a virtual vertical plane in a second direction (direction parallel to the Y axis), and a cutaway of the modification of the optical device according to the eighth embodiment at a virtual vertical plane in a first direction (direction parallel to the Z axis)
Figure 13B:
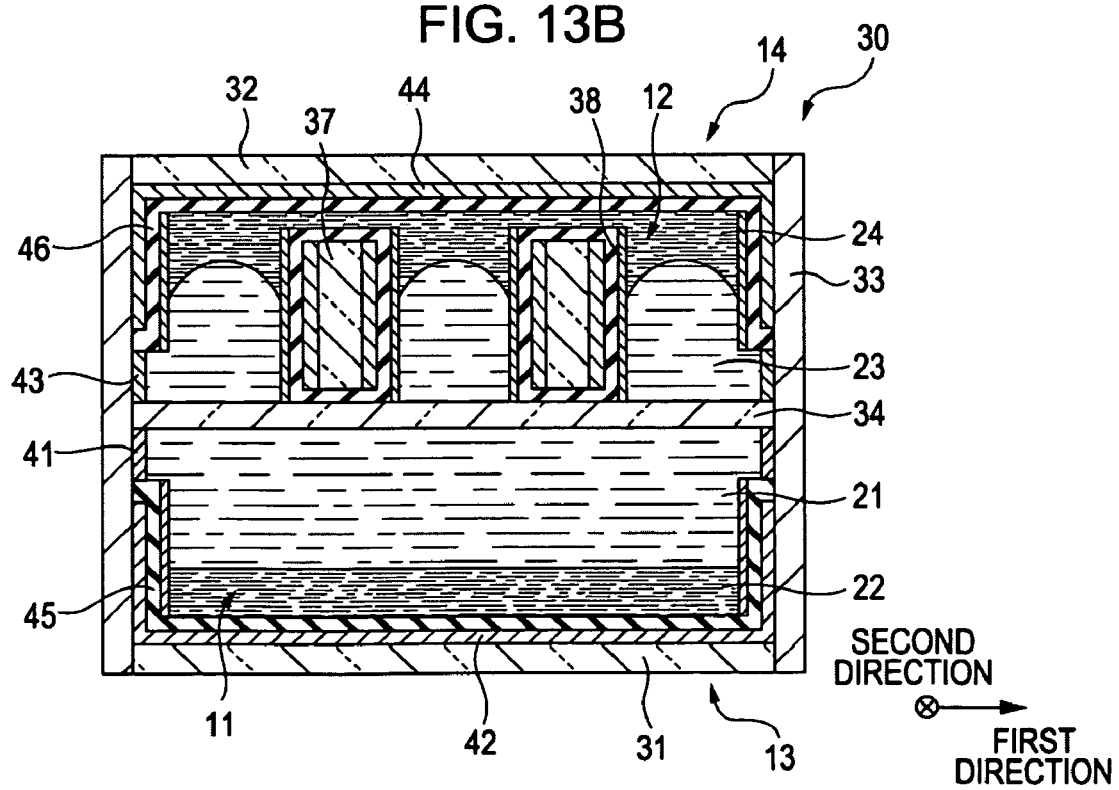

As shown in FIG. 13A of a schematic cross-sectional view of a cutaway of a modification of the optical device according to the eighth embodiment at a virtual vertical plane in a second direction (direction parallel to the Y axis), and as shown in FIG. 13B of a schematic cross-sectional view of a cutaway of the modification of the optical device according to the eighth embodiment at a virtual vertical plane in a first direction (direction parallel to the Z axis), in the same way described with the modification of the seventh embodiment, an arrangement may be made wherein the first electrode 41 is provided only on the inner face of the side face 33 making up the first chamber 13, and the third electrode 43 is provided only on the inner face of the side face 33 making up the second chamber 14. Such an arrangement is employed, whereby the electrodes disposed on the optical path can be reduced, and also improvement in optical transmittance can be realized.

With the optical device according to the eighth embodiment or a modification thereof described above, the first electrode 41 and third electrode 43 may be made common, and the second electrode 42 and fourth electrode 44 may be made common, as appropriate. In other words, the first electrode 41 and third electrode 43 may be configured of a common electrode, and the second electrode 42 and fourth electrode 44 may be configured of a common electrode.

Ninth Embodiment

Figure 14A:
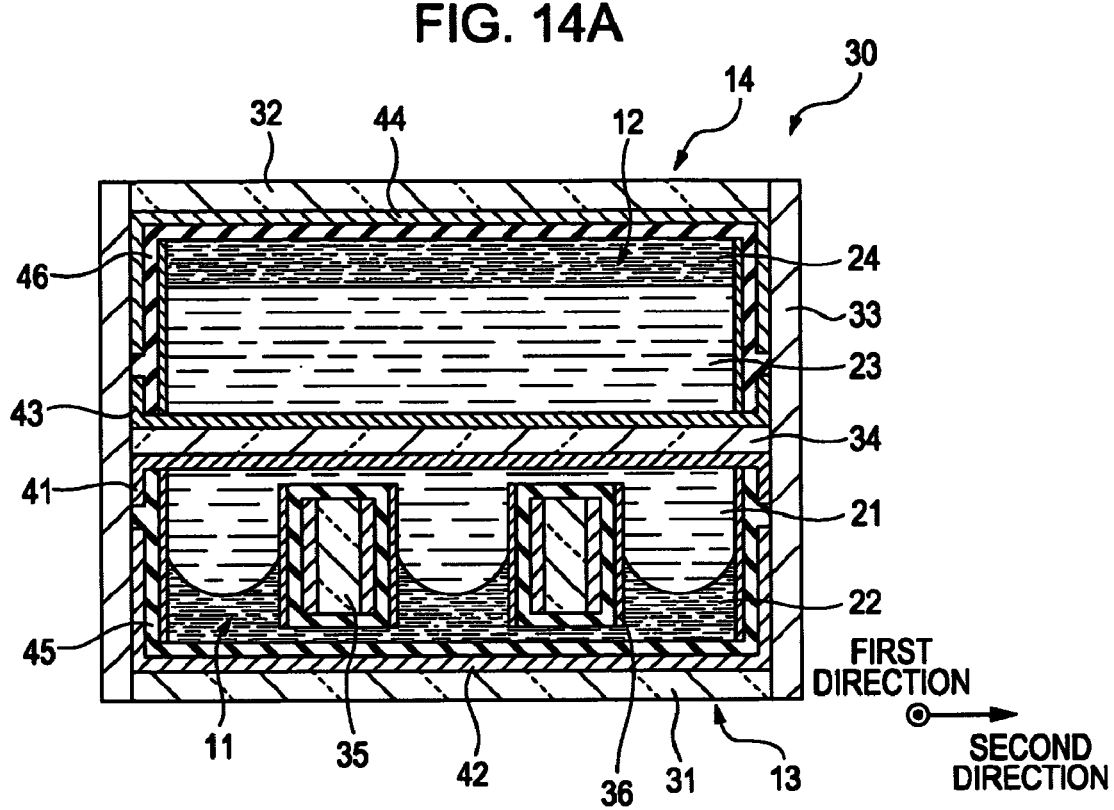
FIGS. 14A and 14B are schematic cross-sectional views illustrating a cutaway of an optical device according to a ninth embodiment at a virtual vertical plane in a second direction (direction parallel to the Y axis), and a cutaway of the optical device according to the ninth embodiment at a virtual vertical plane in a first direction (direction parallel to the Z axis)

The ninth embodiment is also a modification of the third embodiment, and specifically, relates to the optical device having the 1-1-D'th or 1-1-b'th configuration, and relates to a combination of the sixth and seventh embodiments. FIG. 14A illustrates a schematic cross-sectional view of a cutaway of the optical device according to the ninth embodiment at a virtual vertical plane in a second direction (direction parallel to the Y axis), and FIG. 14B illustrates a schematic cross-sectional view of a cutaway of the optical device according to the ninth embodiment at a virtual vertical plane in a first direction (direction parallel to the Z axis).

With the optical device according to the ninth embodiment, there is a gap between the bottom face of the first partition plate 35 and the first face 31, and there is a gap between the bottom face of the second partition plate 37 and the second face 32, and there is a gap between the top face of the first partition plate 35 and the top face of the second partition plate 37. The arrangement and configuration of the optical device according to the ninth embodiment can be regarded as the same as those of the optical device according to the seventh embodiment except for the above-mentioned point, so the detailed description thereof will be omitted.

Figure 14B:
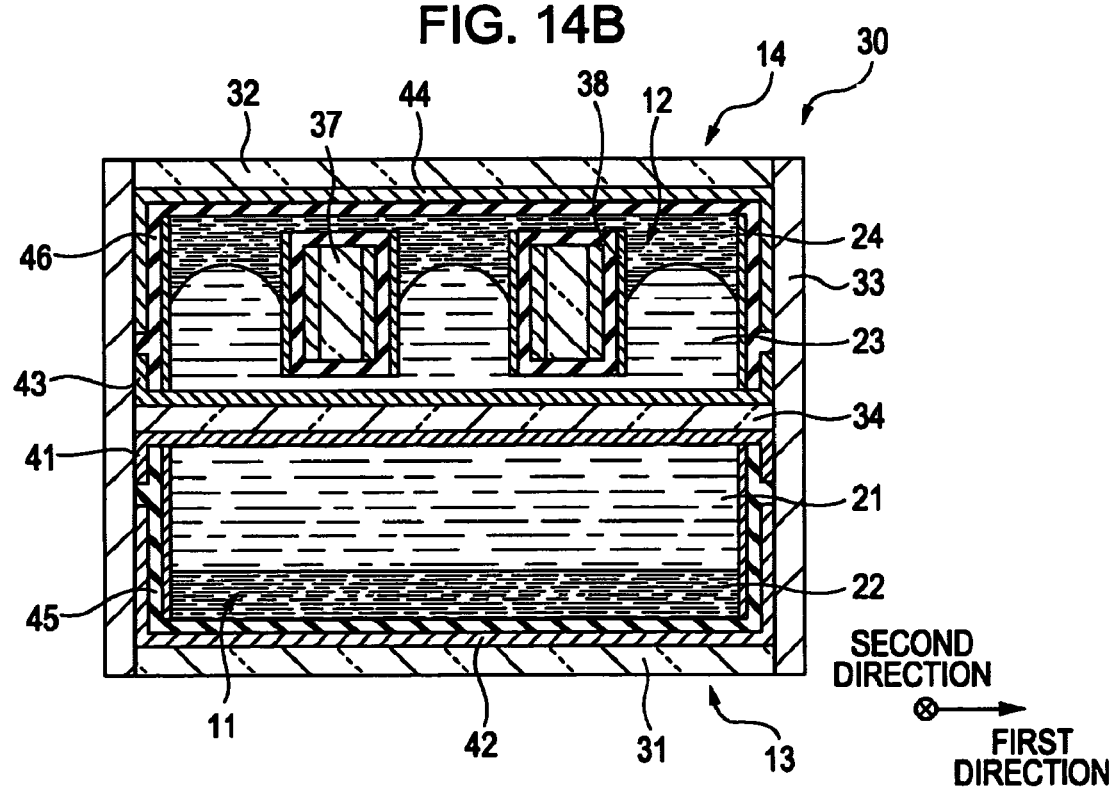
Figure 15A:
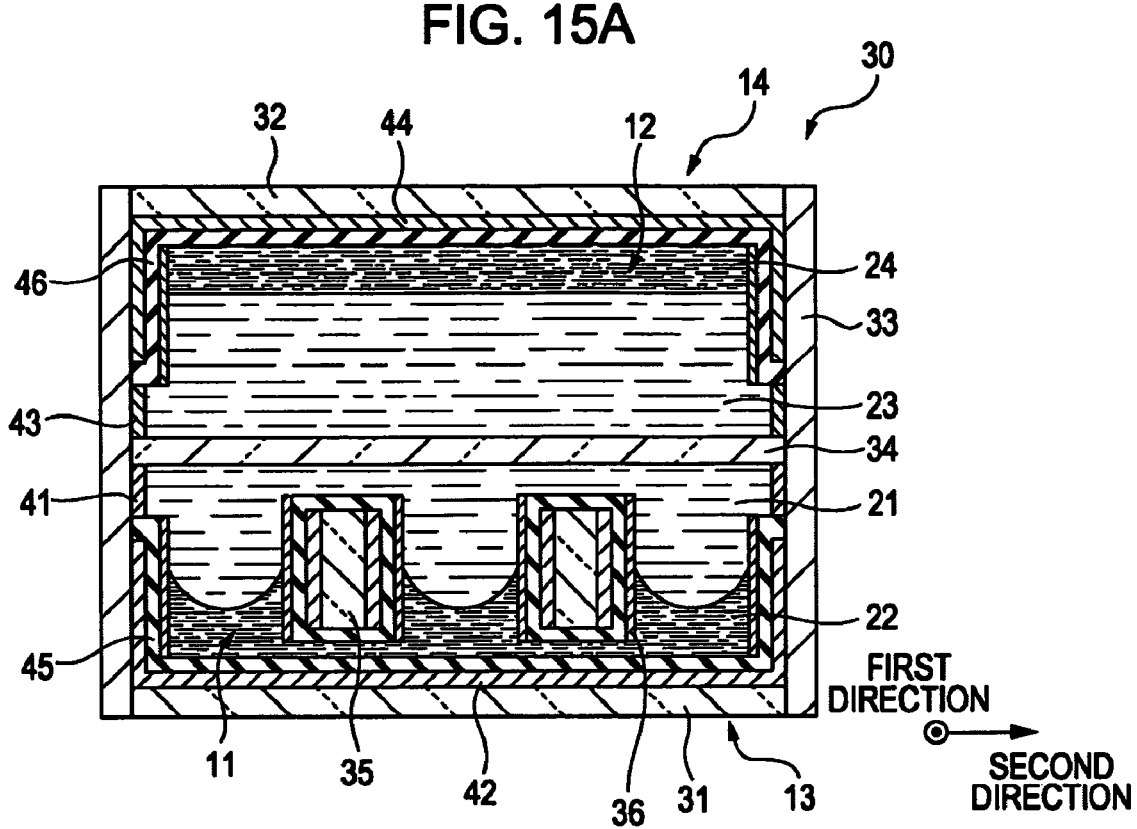
FIGS. 15A and 15B are schematic cross-sectional views illustrating a cutaway of a modification of the optical device according to the ninth embodiment at a virtual vertical plane in a second direction (direction parallel to the Y axis), and a cutaway of the modification of the optical device according to the ninth embodiment at a virtual vertical plane in a first direction (direction parallel to the Z axis)
Figure 15B:
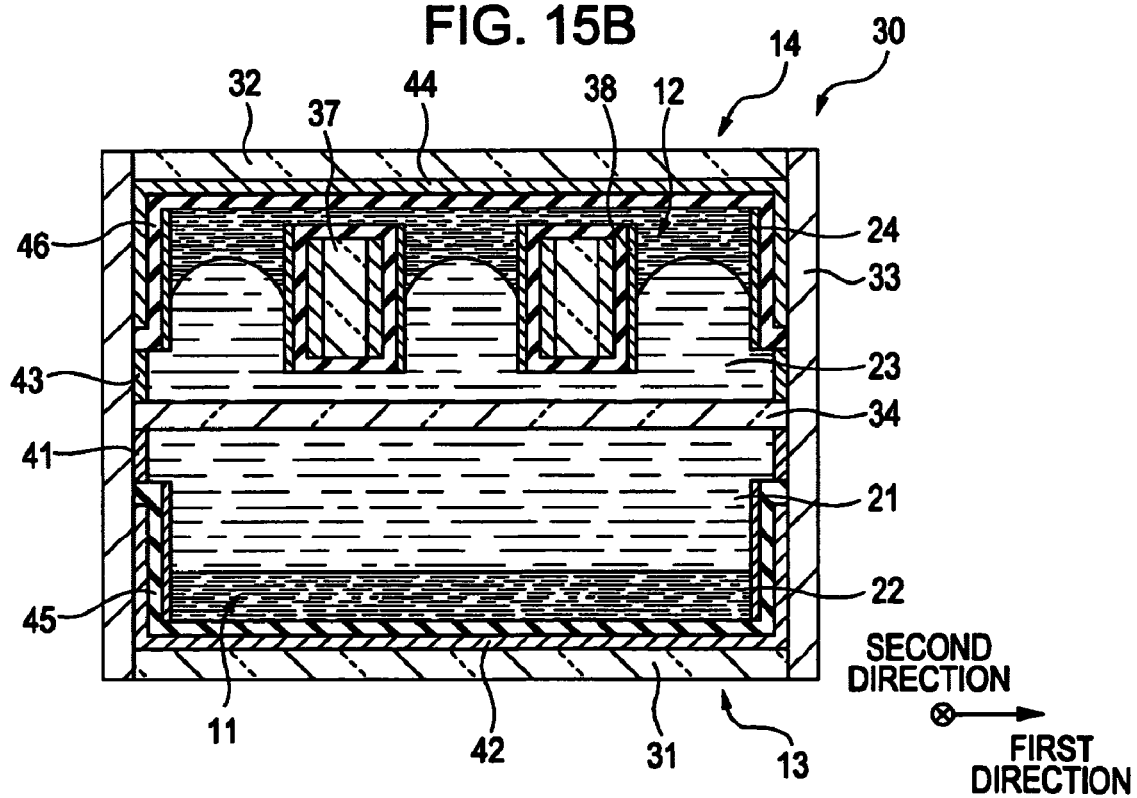

Note that, with the examples shown in FIGS. 14A and 14B, the first electrode 41 is provided on the inner face of the partition face 34 making up the first chamber 13, and the third electrode 43 is provided on the inner face of the partition face 34 making up the second chamber 14, but the optical device according to the ninth embodiment is not restricted to such an arrangement and configuration. As shown in FIG. 15A of a schematic cross-sectional view of a cutaway of a modification of the optical device according to the ninth embodiment at a virtual vertical plane in a second direction (direction parallel to the Y axis), and as shown in FIG. 15B of a schematic cross-sectional view of a cutaway of the modification of the optical device according to the ninth embodiment at a virtual vertical plane in a first direction (direction parallel to the Z axis), an arrangement may be made wherein the first electrode 41 is provided only on the inner face of the side face 33 making up the first chamber 13, and the third electrode 43 is provided only on the inner face of the side face 33 making up the second chamber 14. Such an arrangement is employed, whereby the electrodes disposed on the optical path can be reduced, and also improvement in optical transmittance can be realized.

With the optical device according to the ninth embodiment or the modification thereof described above, the first electrode 41 and third electrode 43 may be made common, and the second electrode 42 and fourth electrode 44 may be made common, as appropriate. In other words, the first electrode 41 and third electrode 43 may be configured of a common electrode, and the second electrode 42 and fourth electrode 44 may be configured of a common electrode.

Tenth Embodiment

The tenth embodiment relates to the optical device having the 1-2'nd or 1-3'rd configuration, and specifically relates to the optical device having the 1-2-A'th or 1-2-a'th configuration. FIG. 16A illustrates a schematic cross-sectional view of a cutaway of the optical device according to the tenth embodiment at a virtual vertical plane in a second direction (direction parallel to the Y axis), and FIG. 16B illustrates a schematic cross-sectional view of a cutaway of the optical device according to the tenth embodiment at a virtual vertical plane in a first direction (direction parallel to the Z axis).

An optical device according to the tenth embodiment is an optical device including (A) a first cylindrical lens group where multiple first cylindrical lenses 11 are apposed, each of which is made up of a liquid lens of which the axis line extends in a first direction (the direction parallel to the Z axis);

(B) a second cylindrical lens group where multiple second cylindrical lenses 12 are apposed, each of which is made up of a liquid lens of which the axis line extends in a second direction different from the first direction (the direction parallel to the Y axis), and light passing through the first cylindrical lens group is input.

Subsequently, the optical device according to the tenth embodiment further includes a housing 130 having (a) a first face 31 transmissive to incident light, (b) a second face 32 transmissive to incident light, facing the first face 31, and (c) a side face 33 linking the first face 31 and second face 32.

This is true for later-described eleventh through fifteenth embodiments, and twenty-third through twenty-eighth embodiments.

A first chamber 13 is configured of the first face 31, and a portion of the side face 33, a second chamber 14 is configured of the second face 32, and the remaining portion of the side face 33, the first chamber 13 and second chamber 14 are communicated, a first partition plate 35 is disposed within the first chamber 13, which extends in the first direction (the direction parallel to the Z axis), and partitions between the first cylindrical lenses 11, a second partition plate 37 is disposed within the second chamber 14, which extends in the second direction (the direction parallel to the Y axis), and partitions between the second cylindrical lenses 12, the first chamber 13 is occupied with first liquid 121 and second liquid 122 which make up a liquid lens serving as the first cylindrical lens 11, and the second chamber 14 is occupied with third liquid 123 and second liquid 122 which make up a liquid lens serving as the second cylindrical lens 12. This configuration is true for later-described eleventh through thirteenth embodiments. Also, this configuration is true for later-described twenty-third through twenty-eighth embodiments except that the second partition plate 37 is disposed within the second chamber 14, which extends in the first direction (the direction parallel to the Z axis), and partitions the second cylindrical lenses 12.

With the optical device according to the tenth embodiment as well, the surface of the portion of the first partition plate 35 where at least the interface between the first liquid 121 and second liquid 122 are positioned (specifically, the surface of the portion of the first partition plate 35 positioned on the interface between the first liquid 121 and second liquid 122, and the neighborhood of the interface thereof, and further, the surface of the portion of the side face 33 where the interface between the first liquid 121 and second liquid 122, and the neighborhood of the interface are positioned), and the surface of the portion of the second partition plate 37 where at least the interface between the third liquid 123 and second liquid 122 are positioned (specifically, the surface of the portion of the second partition plate 37 positioned on the interface between the third liquid 123 and second liquid 122, and the neighborhood of the interface thereof, and further, the surface of the portion of the side face 33 where the interface between the third liquid 123 and second liquid 122, and the neighborhood of the interface are positioned) have been subjected to water-repellent processing. More specifically, a water-repellent processing layer 36 is formed on the side face of the first partition plate 35 (further more specifically, on an insulating film 145 formed on the side face of the first partition plate 35), and a water-repellent processing layer 38 is formed on the side face of the second partition plate 37 (further more specifically, on the insulating film 145 formed on the side face of the second partition plate 37). Also, the water-repellent processing layer 36 is formed on the insulating film 145 formed on the side face 33. This configuration is true for later-described eleventh through fifteenth embodiments, and twenty-third through twenty-eighth embodiments. Note that a water-repellent processing layer may be formed on the entire area of the insulating film 145. This is true for later-described eleventh through fifteenth embodiments, and twenty-third through twenty-eighth embodiments.

Also, with the optical device according to the tenth embodiment, the first partition plate 35 extends from the first face 31 to the second face 32, and the second partition plate 37 extends from the second face 32 to the first face 31, and there is a gap between the top of the first partition plate 35 and the top of the second partition plate 37.

Also, with the optical device according to the tenth embodiment, the first liquid 121 and third liquid 123 have electroconductivity, and the second liquid 122 has insulation properties. This is true for later-described eleventh through thirteenth embodiments, and twenty-third through twenty-sixth embodiments.

Subsequently, a first electrode 41 adjacent to the first liquid 121, and a second electrode 42 insulated from the first liquid 121 are disposed within the first chamber 13, and a third electrode 43 adjacent to the third liquid 123, and a fourth electrode 44 insulated from the third liquid 123 are disposed within the second chamber 14. Specifically, the second electrode 42 is adjacent to the interface between the first liquid 121 and second liquid 122 through the insulating film 145, and the fourth electrode 44 is adjacent to the interface between the third liquid 123 and second liquid 122 through the insulating film 145. Now, the first electrode 41 is made up of a transparent electrode provided on the inner face of the first face 31, and the third electrode 43 is made up of a transparent electrode provided on the inner face of the second face 32. Also, the second electrode 42 is provided on the inner face of the side face 33 and the side face of the first partition plate 35, which make the first chamber 13, in a state covered with the insulating film 145, and the fourth electrode 44 is provided on the inner face of the side face 33 and the side face of the second partition plate 37, which make the second chamber 14, in a state covered with the insulating film 145.

the first liquid 121 and second liquid 122 are insoluble and unmixed, and separated at the interface, and this interface makes up a lens face. Also, the third liquid 123 and second liquid 122 are insoluble and unmixed, and separated at the interface, and this interface makes up a lens face. These are true for later-described eleventh through fifteenth embodiments, and twenty-third through twenty-eighth embodiments.

An arrangement and configuration are made wherein the first electrode 41, second electrode 42, third electrode 43, and fourth electrode 44 are connected to an external control circuit through an unshown connection unit, and desired voltage is applied thereto. Subsequently, upon voltage being applied between the first electrode 41 and second electrode 42, a lens face made up of the interface between the first liquid 121 and second liquid 122 is changed from the state protruding upward shown in FIG. 16A to a state protruding downward. On the other hand, upon voltage being applied between the third electrode 43 and fourth electrode 44, a lens face made up of the interface between the third liquid 123 and second liquid 122 is changed from the state protruding downward shown in FIG. 16B to a state protruding upward. The change states of the lens faces vary depending on voltage being applied to the electrodes (see Expression (A)). Thus, with the optical device according to the tenth embodiment, optical power at the first cylindrical lens group, and optical power at the second cylindrical lens group independently vary, whereby the focal distance of a lens formed by the first cylindrical lens group and second cylindrical lens group (specifically, lens made up of an area where the first cylindrical lens and second cylindrical lens are overlapped) can vary, and consequently, a strobe device of which the illuminating angle varies from the wide angle side to the telephoto side can be provided. This is true for later-described eleventh embodiment. The components disposed on the optical path can be reduced, and also improvement in optical transmittance can be realized. This is true for later-described eleventh through fifteenth embodiments.

Note that the second electrode and fourth electrode may be made common. In other words, the second electrode and fourth electrode may be configured of a common electrode. Specifically, the second electrode may be formed integral with the fourth electrode. FIG. 17A illustrates a schematic cross-sectional view of a cutaway of such an optical device according to the tenth embodiment at a virtual vertical plane in a second direction (direction parallel to the Y axis), and FIG. 17B illustrates a schematic cross-sectional view of a cutaway of the optical device according to the tenth embodiment at a virtual vertical plane in a first direction (direction parallel to the Z axis). In FIGS. 17A and 17B, an electrode obtained by making the second electrode and fourth electrode common is shown with the second electrode 42.

Eleventh Embodiment

Figure 18A:
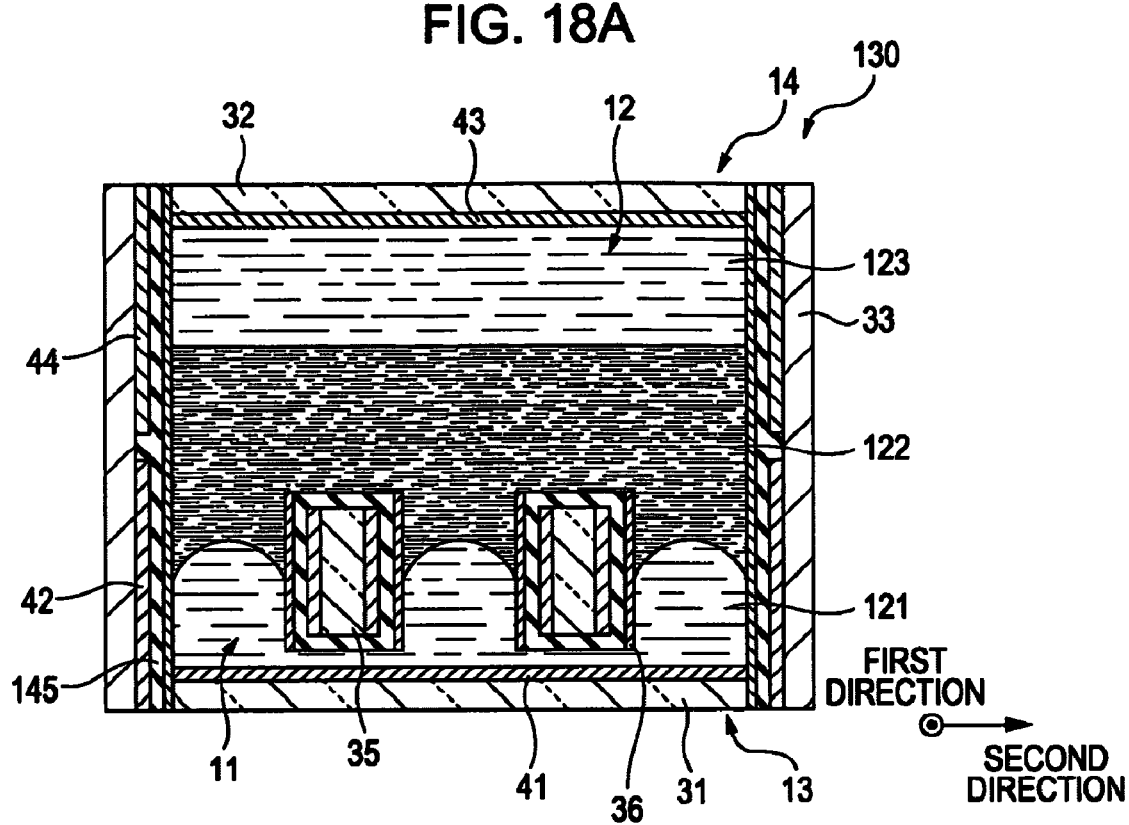
FIGS. 18A and 18B are schematic cross-sectional views illustrating a cutaway of an optical device according to an eleventh embodiment at a virtual vertical plane in a second direction (direction parallel to the Y axis), and a cutaway of the optical device according to the eleventh embodiment at a virtual vertical plane in a first direction (direction parallel to the Z axis)
Figure 18B:
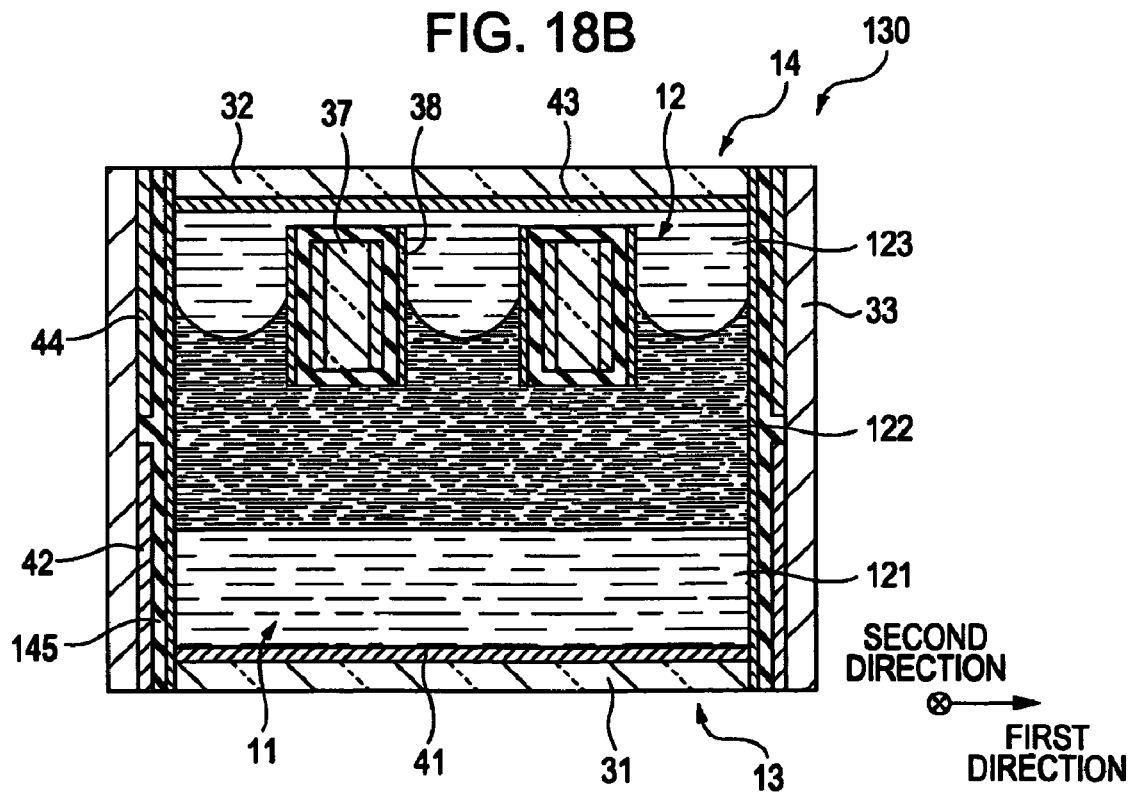

The eleventh embodiment is a modification of the tenth embodiment, and specifically, relates to the optical device having the 1-2-B'th or 1-2-a'th configuration. FIG. 18A illustrates a schematic cross-sectional view of a cutaway of the optical device according to the eleventh embodiment at a virtual vertical plane in a second direction (direction parallel to the Y axis), and FIG. 18B illustrates a schematic cross-sectional view of a cutaway of the optical device according to the eleventh embodiment at a virtual vertical plane in a first direction (direction parallel to the Z axis).

With the optical device according to the eleventh embodiment, there is a gap between the bottom face of the first partition plate 35 and the first face 31, and there is a gap between the bottom face of the second partition plate 37 and the second face 32, and there is a gap between the top face of the first partition plate 35 and the top face of the second partition plate 37. The arrangement and configuration of the optical device according to the eleventh embodiment can be regarded as the same as those of the optical device according to the tenth embodiment except for the above-mentioned point, so the detailed description thereof will be omitted.

Figure 19A:
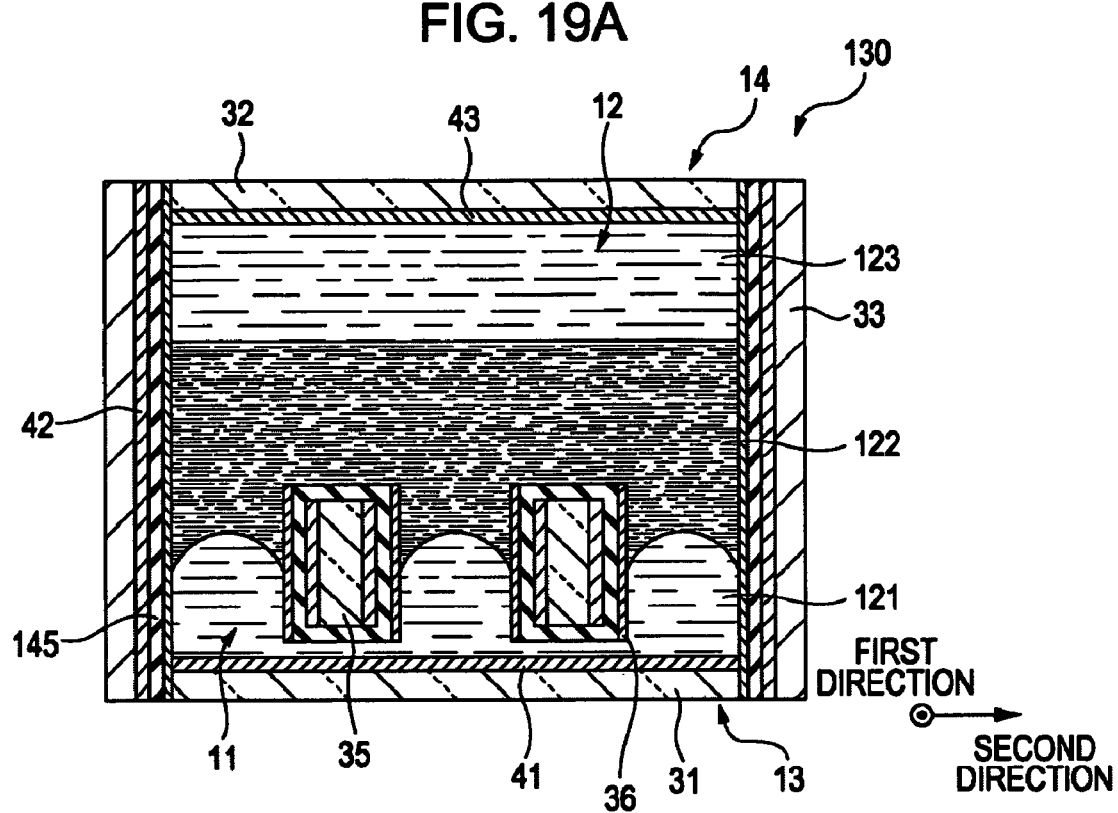
FIGS. 19A and 19B are schematic cross-sectional views illustrating a cutaway of a modification of the optical device according to the eleventh embodiment at a virtual vertical plane in a second direction (direction parallel to the Y axis), and a cutaway of the modification of the optical device according to the eleventh embodiment at a virtual vertical plane in a first direction (direction parallel to the Z axis)
Figure 19B:
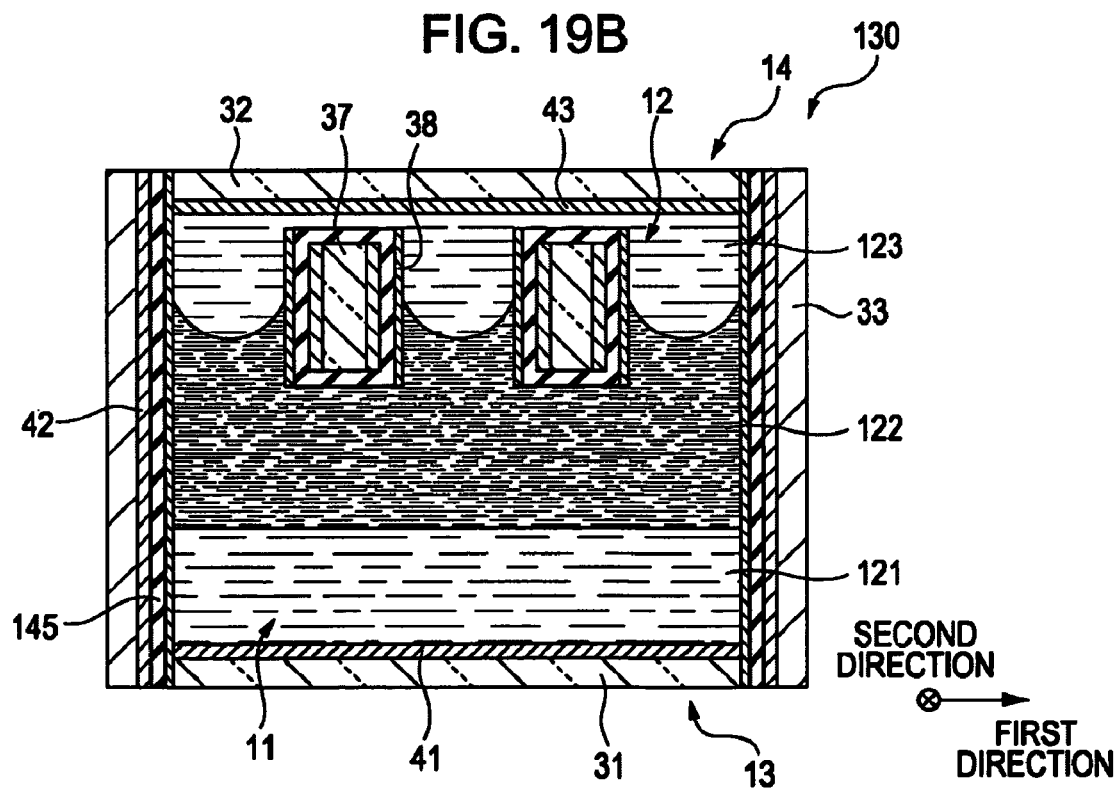

Note that the second electrode and fourth electrode may be made common. In other words, the second electrode and fourth electrode may be configured of a common electrode. Specifically, the second electrode may be formed integral with the fourth electrode. FIG. 19A illustrates a schematic cross-sectional view of a cutaway of such an optical device according to the eleventh embodiment at a virtual vertical plane in a second direction (direction parallel to the Y axis), and FIG. 19B illustrates a schematic cross-sectional view of a cutaway of the optical device according to the eleventh embodiment at a virtual vertical plane in a first direction (direction parallel to the Z axis). In FIGS. 19A and 19B, an electrode obtained by making the second electrode and fourth electrode common is shown with the second electrode 42.

Twelfth Embodiment

The twelfth embodiment is also a modification of the tenth embodiment, and specifically, relates to the optical device having the 1-2-A'th or 1-2-b'th configuration. FIG. 20A illustrates a schematic cross-sectional view of a cutaway of the optical device according to the twelfth embodiment at a virtual vertical plane in a second direction (direction parallel to the Y axis), and FIG. 20B illustrates a schematic cross-sectional view of a cutaway of the optical device according to the twelfth embodiment at a virtual vertical plane in a first direction (direction parallel to the Z axis).

With the optical device according to the twelfth embodiment, the first electrode 41 is provided on the inner face of the side face 33 making up the first chamber 13, and the third electrode 43 is provided on the inner face of the side face 33 making up the second chamber 14, the second electrode 42 is made up of a transparent electrode provided on the inner face of the first face 31, the side face of the first partition plate 35, and the side face 33 in a state covered with the insulating film 145, and the fourth electrode 44 is made up of a transparent electrode provided on the inner face of the second face 32, the side face of the second partition plate 37, and the side face 33 in a state covered with the insulating film 145. The arrangement and configuration of the optical device according to the twelfth embodiment can be regarded as the same as those of the optical device according to the tenth embodiment except for the above-mentioned point, so the detailed description thereof will be omitted.

Thirteenth Embodiment

Figure 21A:
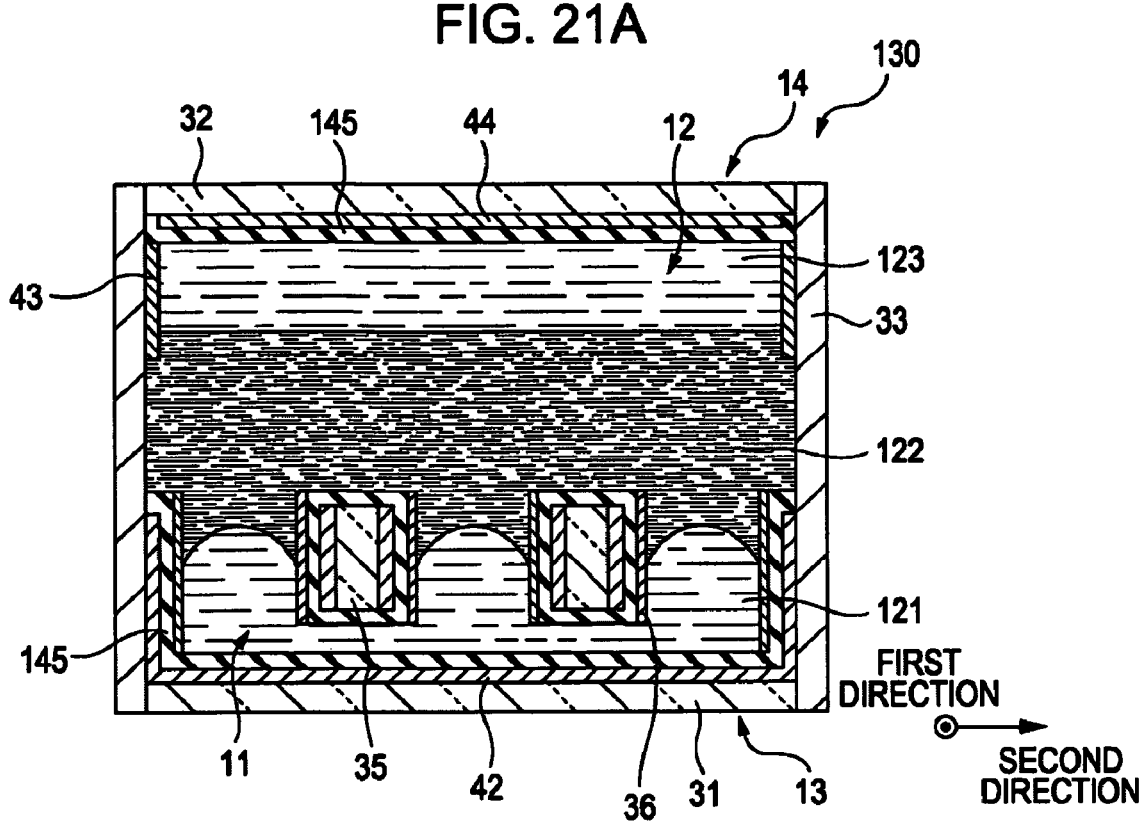
FIGS. 21A and 21B are schematic cross-sectional views illustrating a cutaway of an optical device according to a thirteenth embodiment at a virtual vertical plane in a second direction (direction parallel to the Y axis), and a cutaway of the optical device according to the thirteenth embodiment at a virtual vertical plane in a first direction (direction parallel to the Z axis)
Figure 21B:
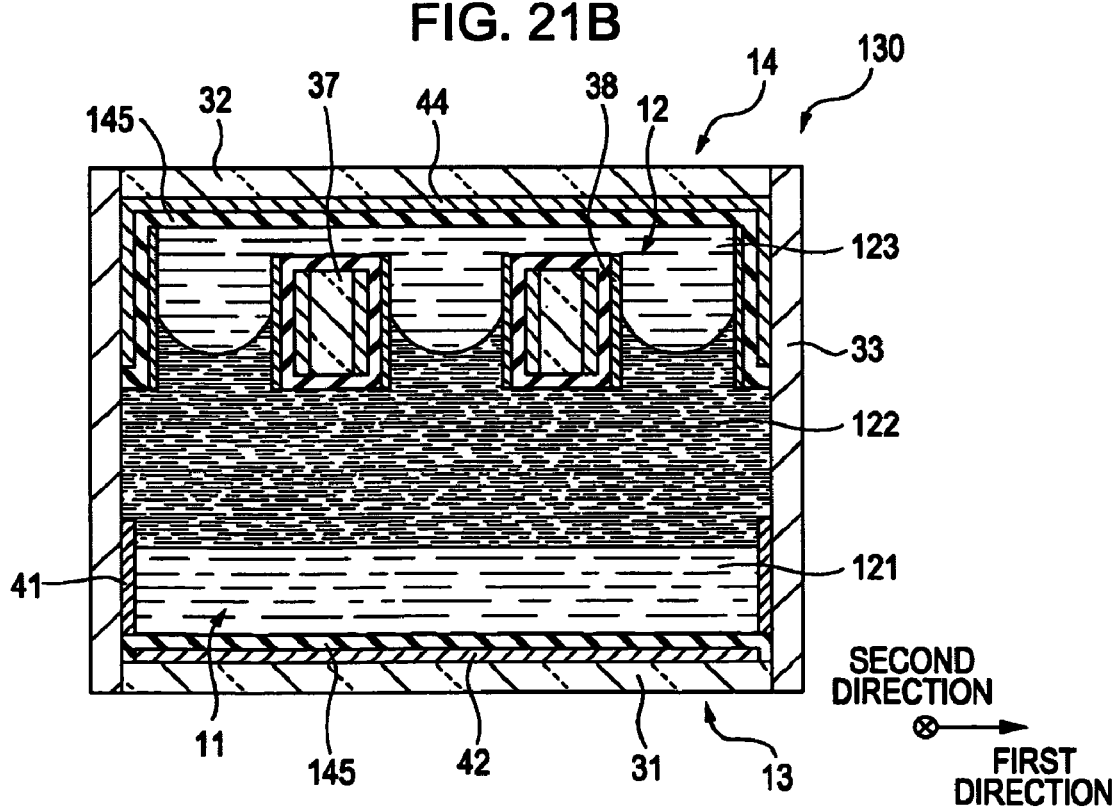

The thirteenth embodiment is a modification of the eleventh embodiment, and specifically, relates to the optical device having the 1-2-B'th or 1-2-b'th configuration. FIG. 21A illustrates a schematic cross-sectional view of a cutaway of the optical device according to the thirteenth embodiment at a virtual vertical plane in a second direction (direction parallel to the Y axis), and FIG. 21B illustrates a schematic cross-sectional view of a cutaway of the optical device according to the thirteenth embodiment at a virtual vertical plane in a first direction (direction parallel to the Z axis).

With the optical device according to the thirteenth embodiment, the first electrode 41 is provided on the inner face of the side face 33 making up the first chamber 13, and the third electrode 43 is provided on the inner face of the side face 33 making up the second chamber 14, the second electrode 42 is made up of a transparent electrode provided on the inner face of the first face 31, the side face of the first partition plate 35, and the side face 33 in a state covered with the insulating film 145, and the fourth electrode 44 is made up of a transparent electrode provided on the inner face of the second face 32, the side face of the second partition plate 37, and the side face 33 in a state covered with the insulating film 145. The arrangement and configuration of the optical device according to the thirteenth embodiment can be regarded as the same as those of the optical device according to the eleventh embodiment except for the above-mentioned point, so the detailed description thereof will be omitted.

Fourteenth Embodiment

Figure 22A:
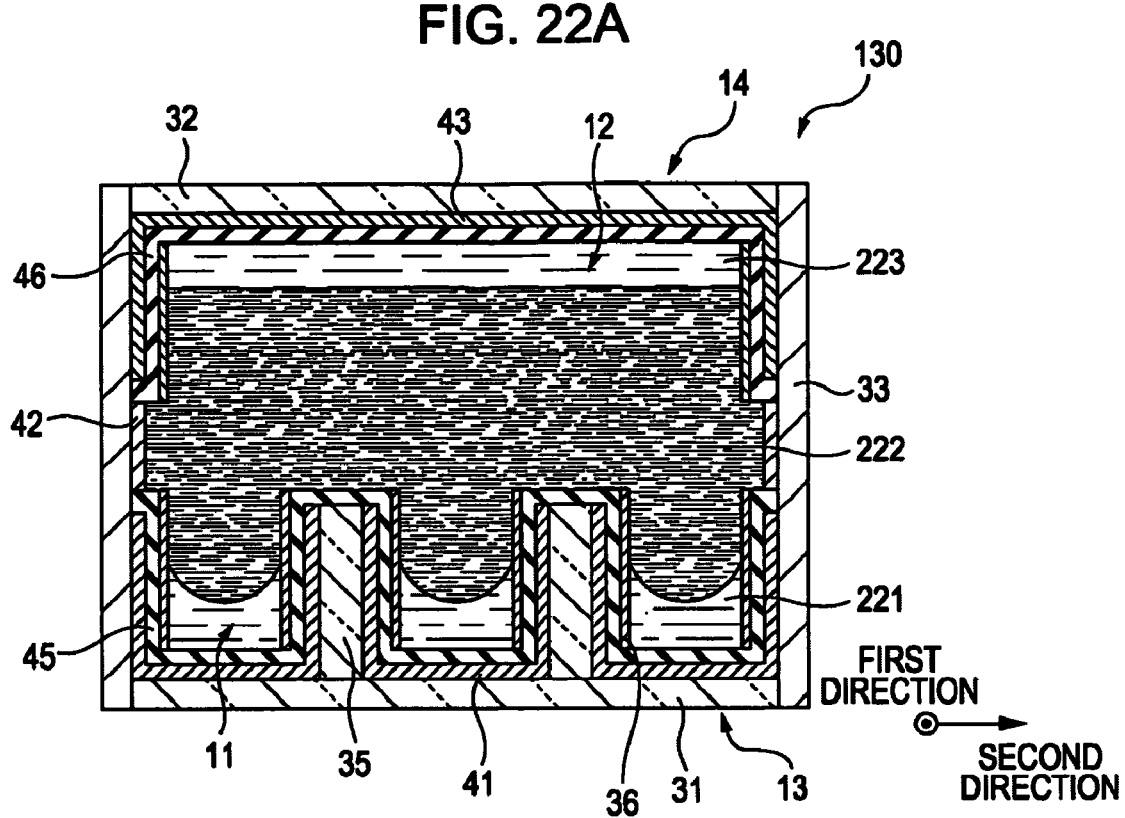
FIGS. 22A and 22B are schematic cross-sectional views illustrating a cutaway of an optical device according to a fourteenth embodiment at a virtual vertical plane in a second direction (direction parallel to the Y axis), and a cutaway of the optical device according to the fourteenth embodiment at a virtual vertical plane in a first direction (direction parallel to the Z axis)
Figure 22B:
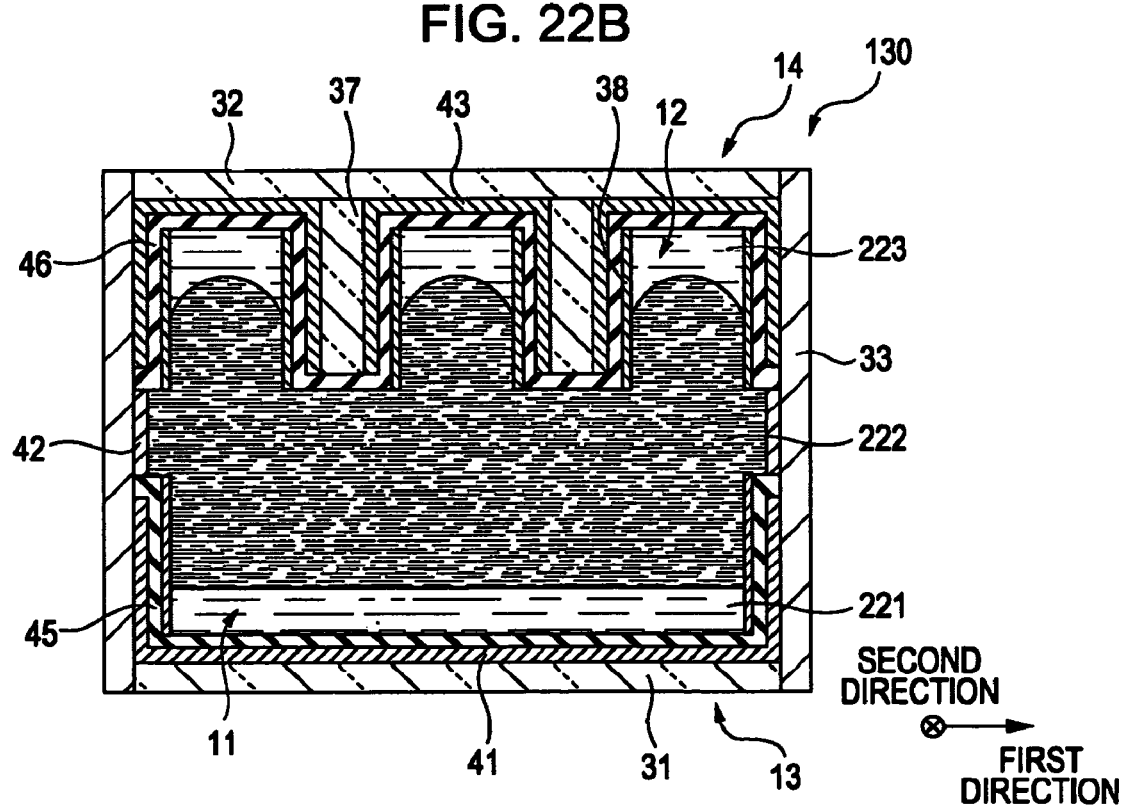

The fourteenth embodiment is also a modification of the tenth embodiment, and specifically, relates to the optical device having the 1-2-A'th or 1-2-c'th configuration. A point wherein the fourteenth embodiment or later-described fifteenth embodiment differs from the eleventh embodiment or twelfth embodiment is that the composition and layout of the first liquid, second liquid, and third liquid differ. FIG. 22A illustrates a schematic cross-sectional view of a cutaway of the optical device according to the fourteenth embodiment at a virtual vertical plane in a second direction (direction parallel to the Y axis), and FIG. 22B illustrates a schematic cross-sectional view of a cutaway of the optical device according to the fourteenth embodiment at a virtual vertical plane in a first direction (direction parallel to the Z axis).

Also, with the fourteenth embodiment or later-described twenty-seventh embodiment, first liquid 221 and third liquid 223 have insulation properties, and second liquid 222 has electroconductivity. Subsequently, a second electrode 42 adjacent to the second liquid 222, and a first electrode 41 insulated from the second liquid 222 are disposed within the first chamber 13, and a second electrode 42 adjacent to the second liquid 222, and a third electrode 43 insulated from the second liquid 222 are disposed within the second chamber 14. Specifically, the first electrode 41 is adjacent to the interface between the first liquid 221 and second liquid 222 through a first insulating film 45, and the third electrode 43 is adjacent to the interface between the third liquid 223 and second liquid 222 through a second insulating film 46. Now, the second electrode 42 is provided on the inner face of the side face 33, the first electrode 41 is made up of a transparent electrode provided on the inner face of the first face 31, the side face of the first partition plate 35, and the side face 33 in a state covered with the first insulating film 45, and the third electrode 43 is made up of a transparent electrode provided on the inner face of the second face 32, the side face of the second partition plate 37, and the side face 33 in a state covered with the second insulating film 46.

With the optical device according to the fourteenth embodiment, the first partition plate 35 extends from the first face 31 toward the second face 32, and the second partition plate 37 extends from the second face 32 toward the first face 31, and there is a gap between the top face of the first partition plate 35 and the top face of the second partition plate 37.

With the fourteenth embodiment as well, an arrangement and configuration are made wherein the first electrode 41, second electrode 42, third electrode 43, and fourth electrode 44 are connected to an external control circuit through an unshown connection unit, and desired voltage is applied thereto. Subsequently, upon voltage being applied between the second electrode 42 and first electrode 41, a lens face made up of the interface between the second liquid 222 and first liquid 221 is changed from the state protruding downward shown in FIG. 22A to a state protruding upward. On the other hand, upon voltage being applied between the second electrode 42 and third electrode 43, a lens face made up of the interface between the second liquid 222 and third liquid 223 is changed from the state protruding upward shown in FIG. 22B to a state protruding downward. The change states of the lens faces vary depending on voltage being applied to the electrodes (see Expression (A)). Thus, with the optical device according to the fourteenth embodiment, optical power at the first cylindrical lens group, and optical power at the second cylindrical lens group independently vary, whereby the focal distance of a lens formed by the first cylindrical lens group and second cylindrical lens group (specifically, lens made up of an area where the first cylindrical lens and second cylindrical lens are overlapped) can vary, and consequently, a strobe device of which the illuminating angle varies from the wide angle side to the telephoto side can be provided. This is true for later-described fifteenth embodiment.

Fifteenth Embodiment

Figure 23A:
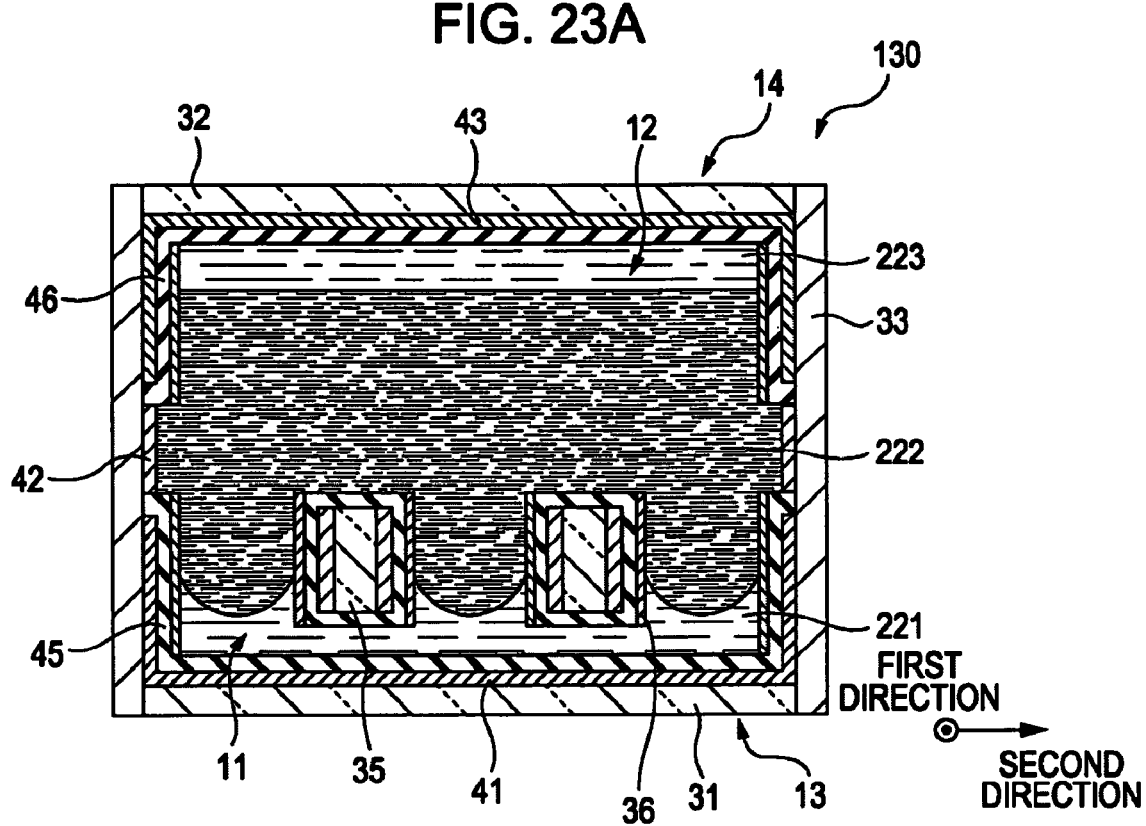
FIGS. 23A and 23B are schematic cross-sectional views illustrating a cutaway of an optical device according to a fifteenth embodiment at a virtual vertical plane in a second direction (direction parallel to the Y axis), and a cutaway of the optical device according to the fifteenth embodiment at a virtual vertical plane in a first direction (direction parallel to the Z axis)
Figure 23B:
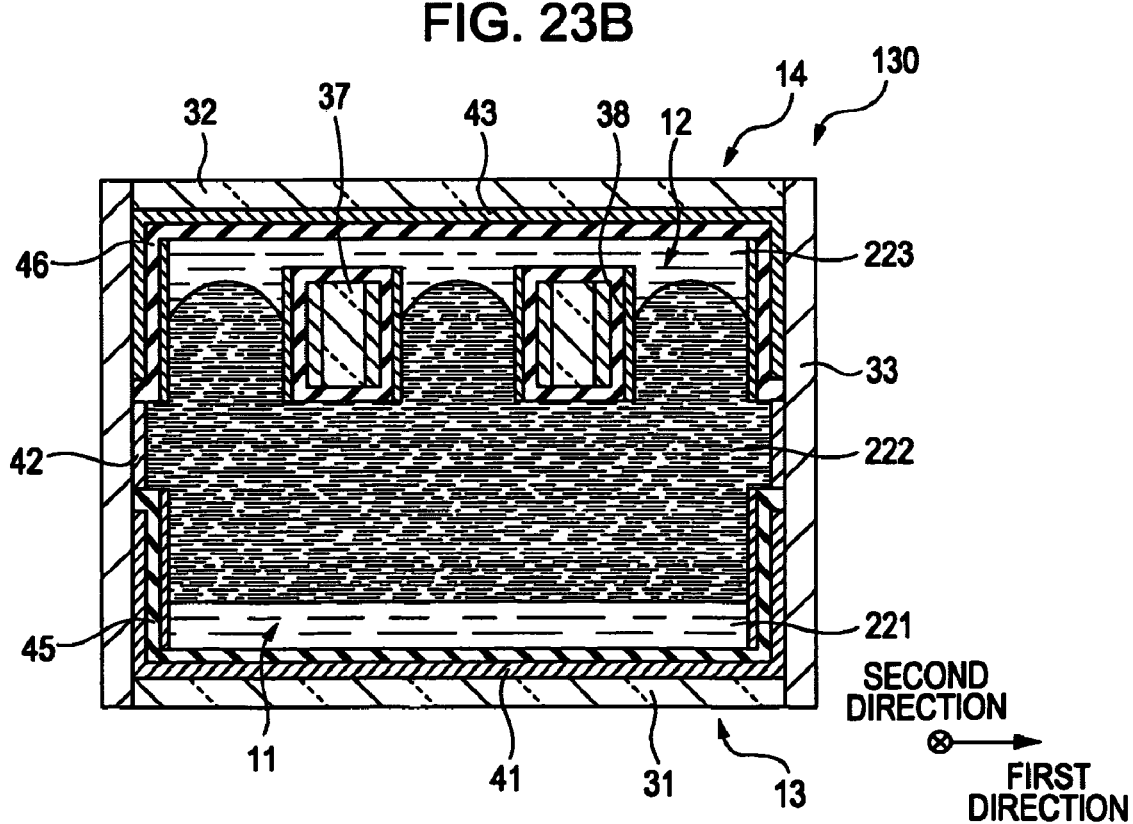

The fifteenth embodiment is a modification of the fourteenth embodiment, and specifically, relates to the optical device having the 1-2-B'th or 1-2-c'th configuration. FIG. 23A illustrates a schematic cross-sectional view of a cutaway of the optical device according to the fifteenth embodiment at a virtual vertical plane in a second direction (direction parallel to the Y axis), and FIG. 23B illustrates a schematic cross-sectional view of a cutaway of the optical device according to the fifteenth embodiment at a virtual vertical plane in a first direction (direction parallel to the Z axis).

With the optical device according to the fifteenth embodiment, there is a gap between the bottom face of the first partition plate 35 and the first face 31, and there is a gap between the bottom face of the second partition plate 37 and the second face 32, and there is a gap between the top face of the first partition plate 35 and the top face of the second partition plate 37. The arrangement and configuration of the optical device according to the fifteenth embodiment can be regarded as the same as those of the optical device according to the fourteenth embodiment except for the above-mentioned point, so the detailed description thereof will be omitted. The portion of the first electrode 41 provided on the inner face of the first face 31, and the portion of the first electrode 41 provided on the side face of the first partition plate 35 are united with an unshown area, and the portion of the third electrode 43 provided on the inner face of the second face 32, and the portion of the third electrode 43 provided on the side face of the second partition plate 37 are united with an unshown area.

Sixteenth Embodiment

Figure 24A:
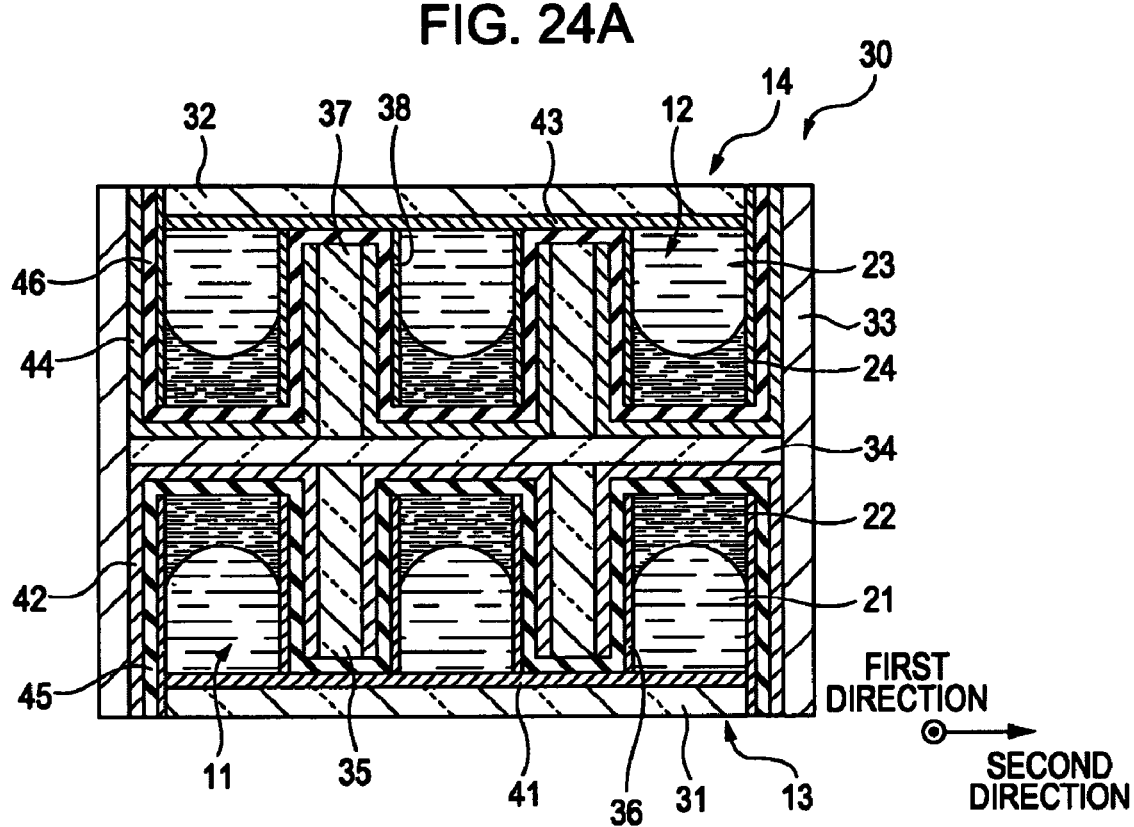
FIGS. 24A and 24B are schematic cross-sectional views illustrating a cutaway of an optical device according to a sixteenth embodiment at a virtual vertical plane in a second direction (direction parallel to the Y axis), and a cutaway of the optical device according to the sixteenth embodiment at a virtual vertical plane in a first direction (direction parallel to the Z axis)
Figure 24B:
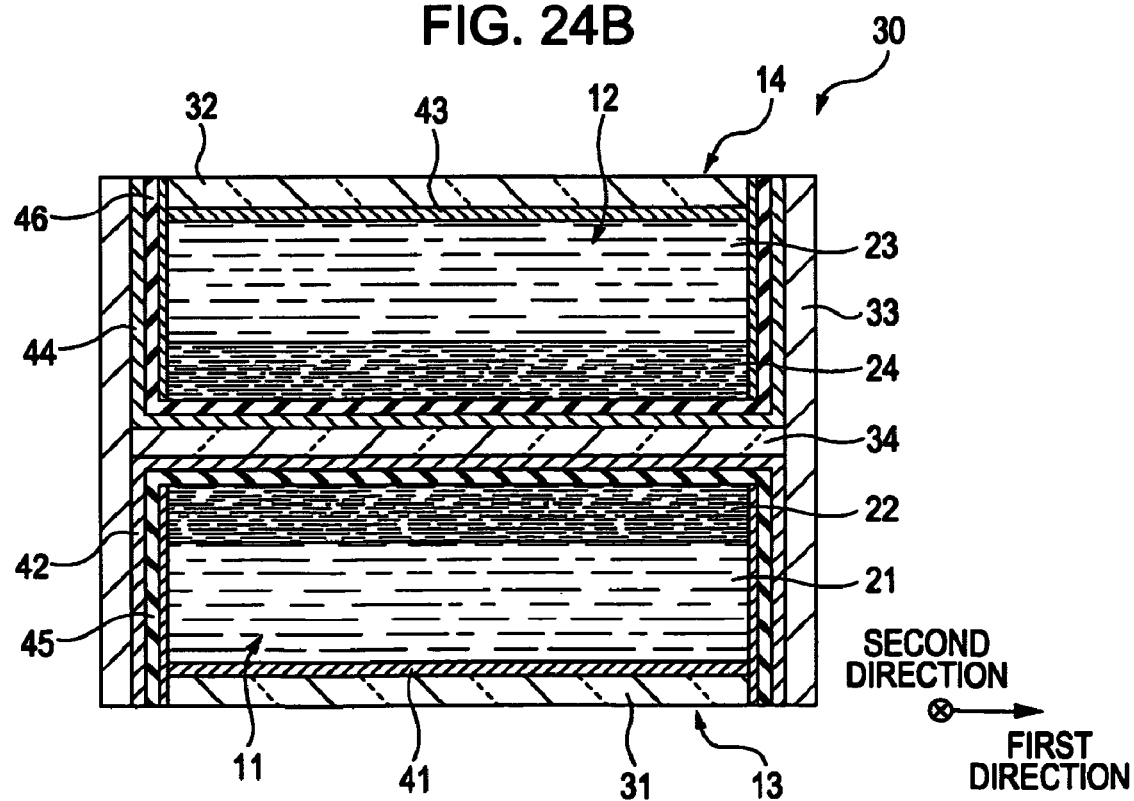

The sixteenth embodiment relates to the optical device having the 2-1'st or 2-3'rd configuration, and specifically, relates to the optical device having the 2-1-A'th or 2-1-a'th configuration. FIG. 24A illustrates a schematic cross-sectional view of a cutaway of the optical device according to the sixteenth embodiment at a virtual vertical plane in a second direction (direction parallel to the Y axis), and FIG. 24B illustrates a schematic cross-sectional view of a cutaway of the optical device according to the sixteenth embodiment at a virtual vertical plane in a first direction (direction parallel to the Z axis).

An optical device according to the sixteenth embodiment is an optical device including (A) a first cylindrical lens group where multiple first cylindrical lenses 11 are apposed, each of which is made up of a liquid lens of which the axis line extends in a first direction (the direction parallel to the Z axis);

(B) a second cylindrical lens group where multiple second cylindrical lenses 12 are apposed, each of which is made up of a liquid lens of which the axis line extends in the first direction (the direction parallel to the Z axis), and light passing through the first cylindrical lens group is input.

Now, description will be made regarding the optical device according to the sixteenth embodiment along the optical device having the 2-3'rd configuration. The optical device according to the sixteenth embodiment is configured by the multiple cylindrical lenses 11 and 12 each made up of a liquid lens being apposed within the housing 30.

With the optical device according to the sixteenth embodiment, the first partition plate 35 extends from the first face 31 to the partition face 34, and the second partition plate 37 extends from the second face 32 to the partition face 34.

With the sixteenth embodiment, an arrangement has been made wherein the length $L_{CL-1}$ in the second direction (the direction parallel to the Y axis) of the first cylindrical lens is 30 mm, and the length $L_{CL-2}$ in the second direction (the direction parallel to the Y axis) of the second cylindrical lens is 30 mm. Also, an arrangement has been made wherein when assuming that the number of first cylindrical lenses II making up the first cylindrical lens group is $N_1$, and the number of second cylindrical lenses 12 making up the second cylindrical lens group is $N_2$, $N_1$ and $N_2$ are set to 10 ($N_1=N_2=10$). These arrangements are true for later-described seventeenth through twenty-eighth embodiments.

An arrangement and configuration are made wherein the first electrode 41, second electrode 42, third electrode 43, and fourth electrode 44 are connected to an external control circuit through an unshown connection unit, and desired voltage is applied thereto. Subsequently, upon voltage being applied between the first electrode 41 and second electrode 42, a lens face made up of the interface between the first liquid 21 and second liquid 22 is changed from the state protruding upward shown in FIG. 24A to a state protruding downward. On the other hand, upon voltage being applied between the third electrode 43 and fourth electrode 44, a lens face made up of the interface between the third liquid 23 and fourth liquid 24 is changed from the state protruding downward shown in FIG. 24A to a state protruding upward. The change states of the lens faces vary depending on voltage being applied to the electrodes (see Expression (A)). Thus, with the optical device according to the sixteenth embodiment, optical power at the first cylindrical lens group, and optical power at the second cylindrical lens group independently vary, whereby the focal distance of a lens formed by the first cylindrical lens group and second cylindrical lens group (specifically, lens made up of an area where the first cylindrical lens and second cylindrical lens are overlapped) can vary, and consequently, a strobe device of which the illuminating angle varies from the wide angle side to the telephoto side can be provided. This is true for later-described seventeenth through nineteenth embodiments.

Seventeenth Embodiment

Figure 25A:
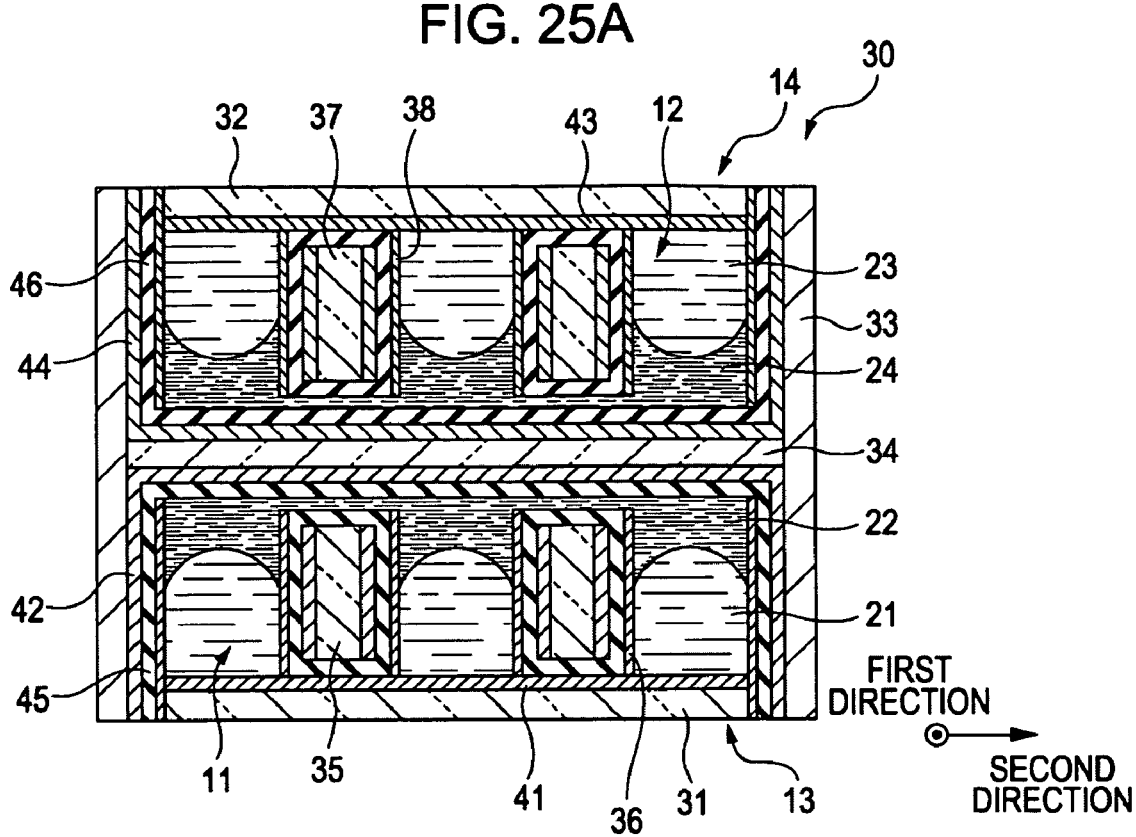
FIGS. 25A and 25B are schematic cross-sectional views illustrating a cutaway of an optical device according to a seventeenth embodiment at a virtual vertical plane in a second direction (direction parallel to the Y axis), and a cutaway of the optical device according to the seventeenth embodiment at a virtual vertical plane in a first direction (direction parallel to the Z axis)

The seventeenth embodiment is a modification of the sixteenth embodiment, and specifically, relates to the optical device having the 2-1-B'th or 2-1-a'th configuration. FIG. 25A illustrates a schematic cross-sectional view of a cutaway of the optical device according to the seventeenth embodiment at a virtual vertical plane in a second direction (direction parallel to the Y axis), and FIG. 25B illustrates a schematic cross-sectional view of a cutaway of the optical device according to the seventeenth embodiment at a virtual vertical plane in a first direction (direction parallel to the Z axis).

With the optical device according to the seventeenth embodiment, similar to the optical device according to the fourth embodiment, the first partition plate 35 extends from the first face 31 toward the partition face 34, and the second partition plate 37 extends from the second face 32 toward the partition face 34, and there is a gap between the top face of the first partition plate 35 and the top face of the second partition plate 37. The arrangement and configuration of the optical device according to the seventeenth embodiment can be regarded as the same as those of the optical device according to the sixteenth embodiment except for the above-mentioned point, so the detailed description thereof will be omitted.

Figure 25B:
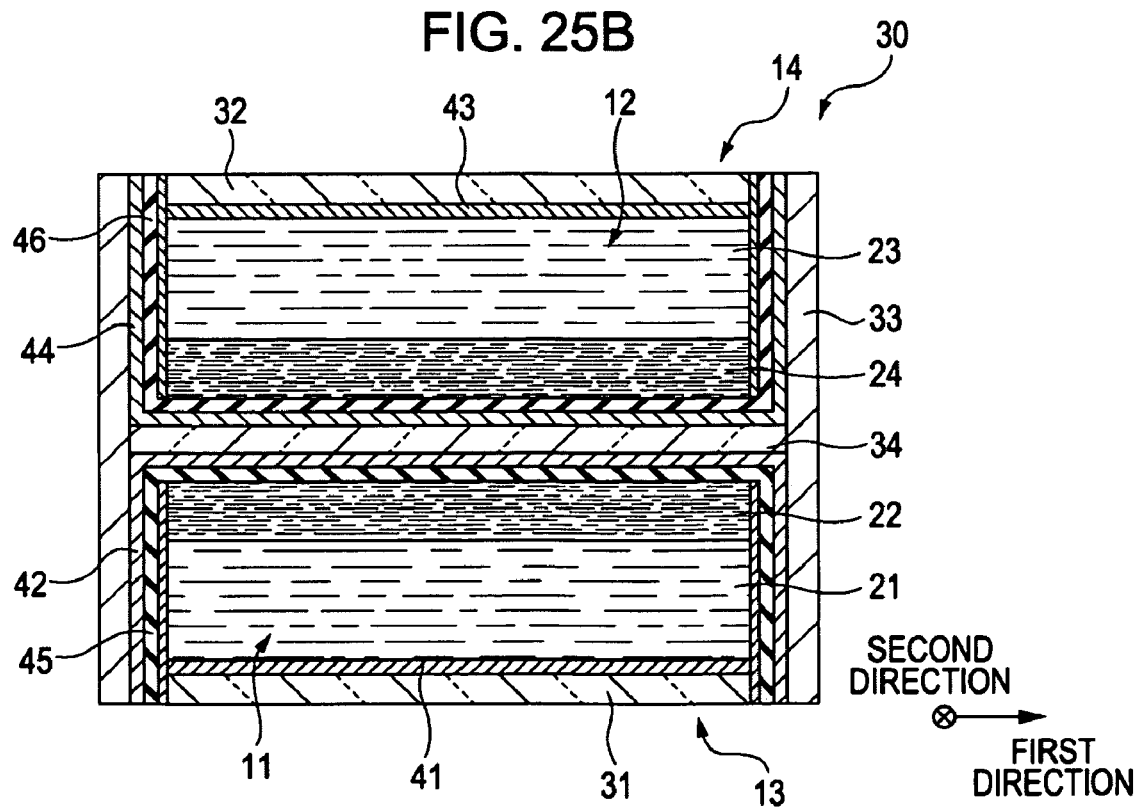

Note that, with the examples shown in FIGS. 25A and 25B, the second electrode 42 is provided on the inner face of the partition face 34, the inner face of the side face 33, and the side face of the first partition plate 35, which make up the first chamber 13, and the fourth electrode 44 is provided on the inner face of the partition face 34, the inner face of the side face 33, and the side face of the second partition plate 37, which make up the second chamber 14, but the optical device according to the seventeenth embodiment is not restricted to such an arrangement and configuration. As shown in FIG.

26A of a schematic cross-sectional view of a cutaway of a modification of the optical device according to the seventeenth embodiment at a virtual vertical plane in a second direction (direction parallel to the Y axis), and as shown in FIG. 26B of a schematic cross-sectional view of a cutaway of the modification of the optical device according to the seventeenth embodiment at a virtual vertical plane in a first direction (direction parallel to the Z axis), an arrangement may be made wherein the second electrode 42 is provided only on the inner face of the side face 33 and the side face of the first partition plate 35, which makes up the first chamber 13, and the fourth electrode 44 is provided only on the inner face of the side face 33 and the side face of the second partition plate 37, which makes up the second chamber 14. Such an arrangement is employed, whereby the electrodes disposed on the optical path can be reduced, and also improvement in optical transmittance can be realized. Note that the portion of the second electrode 42 provided on the inner face of the side face 33 is formed integral with the portion of the second electrode 42 provided on the side face of the first partition plate 35 at an unshown area, and the portion of the fourth electrode 44 provided on the inner face of the side face 33 is formed integral with the portion of the fourth electrode 44 provided on the side face of the second partition plate 37 at an unshown area. In a case wherein the first partition plate and second partition plate have the same configuration, this is true for later-described twenty-first and twenty-third embodiments.

Eighteenth Embodiment

Figure 27A:
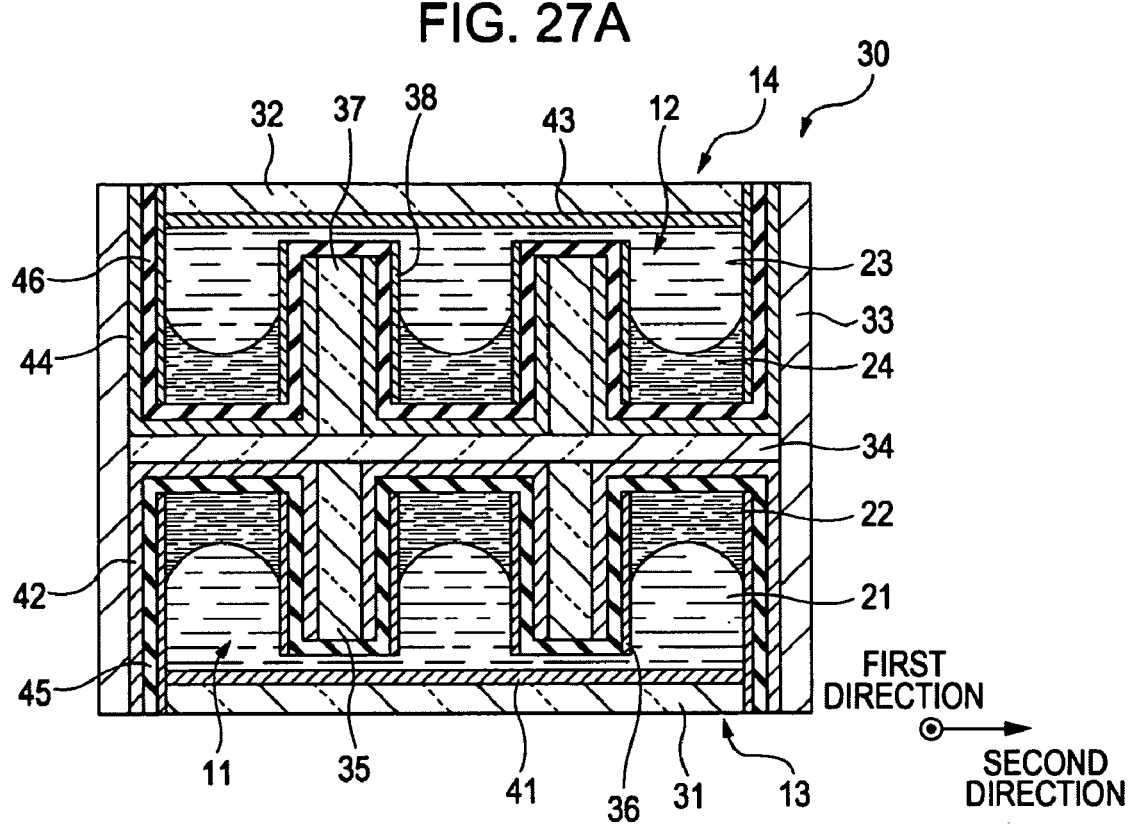
FIGS. 27A and 27B are schematic cross-sectional views illustrating a cutaway of an optical device according to a eighteenth embodiment at a virtual vertical plane in a second direction (direction parallel to the Y axis), and a cutaway of the optical device according to the eighteenth embodiment at a virtual vertical plane in a first direction (direction parallel to the Z axis)
Figure 27B:
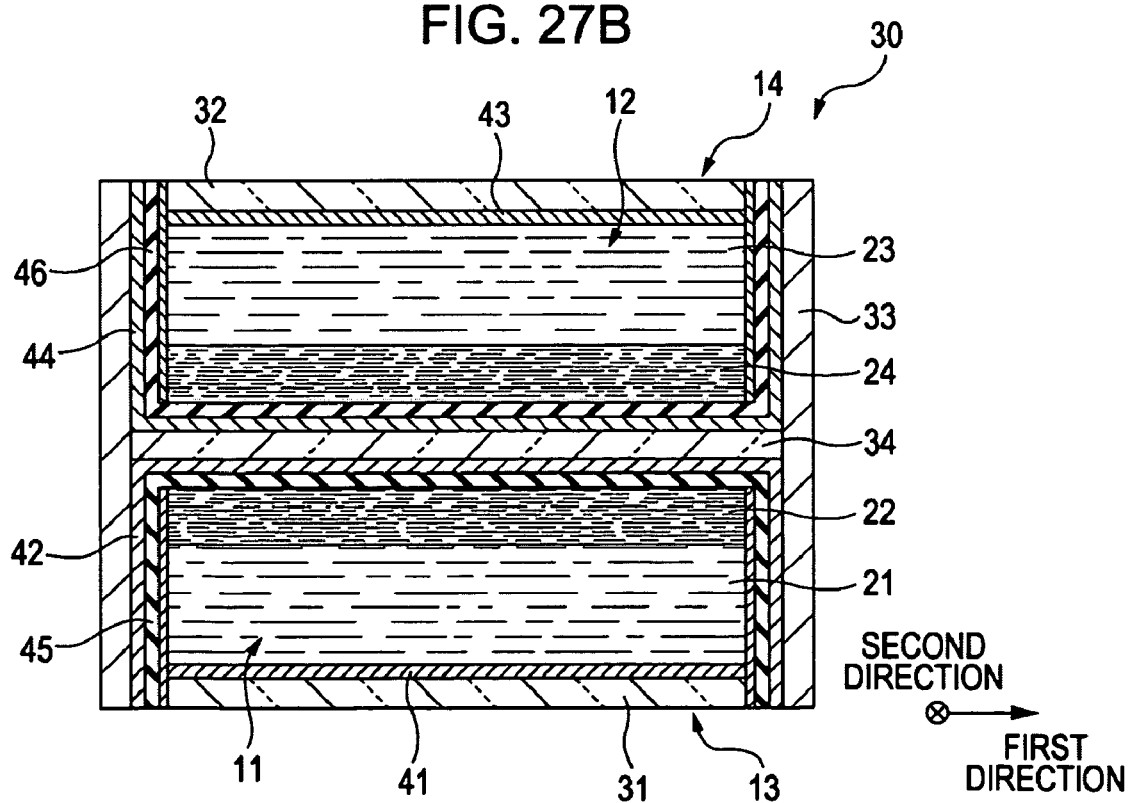

The eighteenth embodiment is also a modification of the sixteenth embodiment, and specifically, relates to the optical device having the 2-1-C'th or 2-1-a'th configuration. FIG. 27A illustrates a schematic cross-sectional view of a cutaway of the optical device according to the eighteenth embodiment at a virtual vertical plane in a second direction (direction parallel to the Y axis), and FIG. 27B illustrates a schematic cross-sectional view of a cutaway of the optical device according to the eighteenth embodiment at a virtual vertical plane in a first direction (direction parallel to the Z axis).

With the optical device according to the eighteenth embodiment, similar to the optical device according to the fifth embodiment, the first partition plate 35 extends from the partition face 34 toward the first face 31, and there is a gap between the top face of the first partition plate 35 and the first face 31. On the other hand, the second partition plate 37 extends from the partition face 34 toward the second face 32, and there is a gap between the top face of the second partition plate 37 and the second face 32. The arrangement and configuration of the optical device according to the eighteenth embodiment can be regarded as the same as those of the optical device according to the sixteenth embodiment except for the above-mentioned point, so the detailed description thereof will be omitted.

Nineteenth Embodiment

Figure 28A:
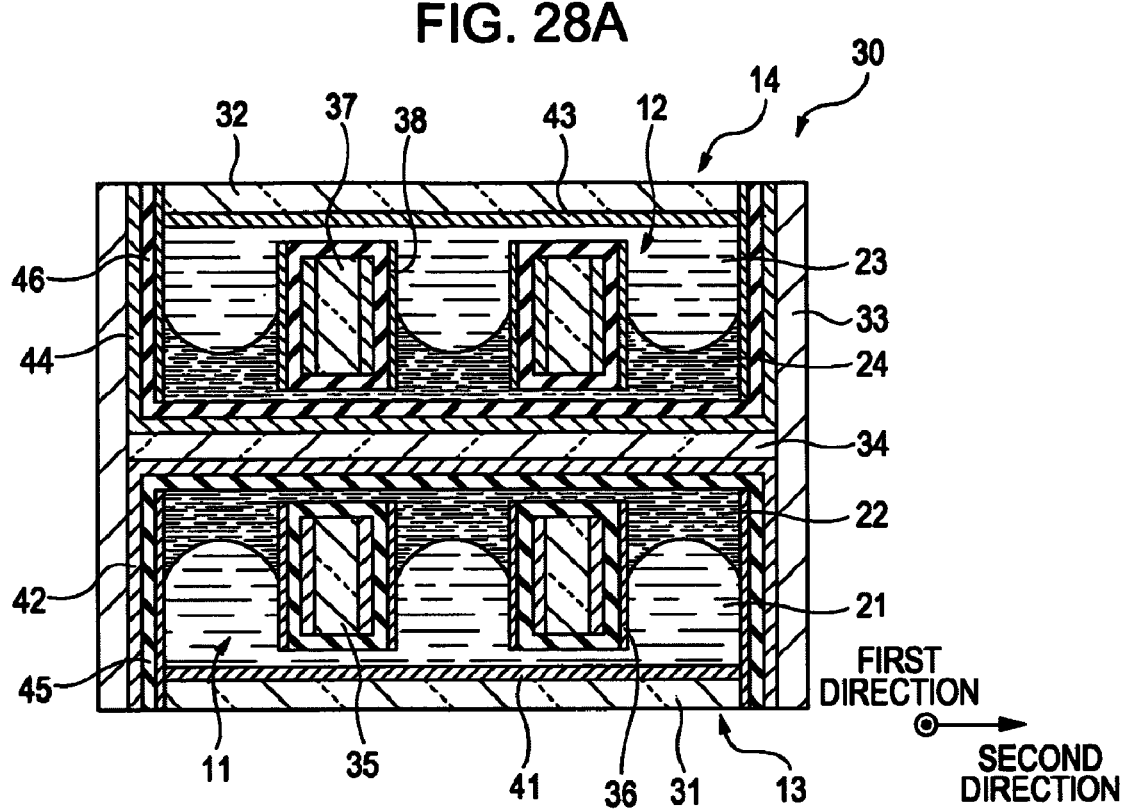
FIGS. 28A and 28B are schematic cross-sectional views illustrating a cutaway of an optical device according to a nineteenth embodiment at a virtual vertical plane in a second direction (direction parallel to the Y axis), and a cutaway of the optical device according to the nineteenth embodiment at a virtual vertical plane in a first direction (direction parallel to the Z axis)

The nineteenth embodiment is also a modification of the sixteenth embodiment, and specifically, relates to the optical device having the 2-1-D'th or 2-1-a'th configuration. FIG. 28A illustrates a schematic cross-sectional view of a cutaway of the optical device according to the nineteenth embodiment at a virtual vertical plane in a second direction (direction parallel to the Y axis), and FIG. 28B illustrates a schematic cross-sectional view of a cutaway of the optical device according to the nineteenth embodiment at a virtual vertical plane in a first direction (direction parallel to the Z axis).

With the optical device according to the nineteenth embodiment, there is a gap between the bottom face of the first partition plate 35 and the first face 31, and there is a gap between the bottom face of the second partition plate 37 and the second face 32, and there is a gap between the top face of the first partition plate 35 and the top face of the second partition plate 37. The arrangement and configuration of the optical device according to the nineteenth embodiment can be regarded as the same as those of the optical device according to the sixteenth embodiment except for the above-mentioned point, so the detailed description thereof will be omitted.

Figure 28B:
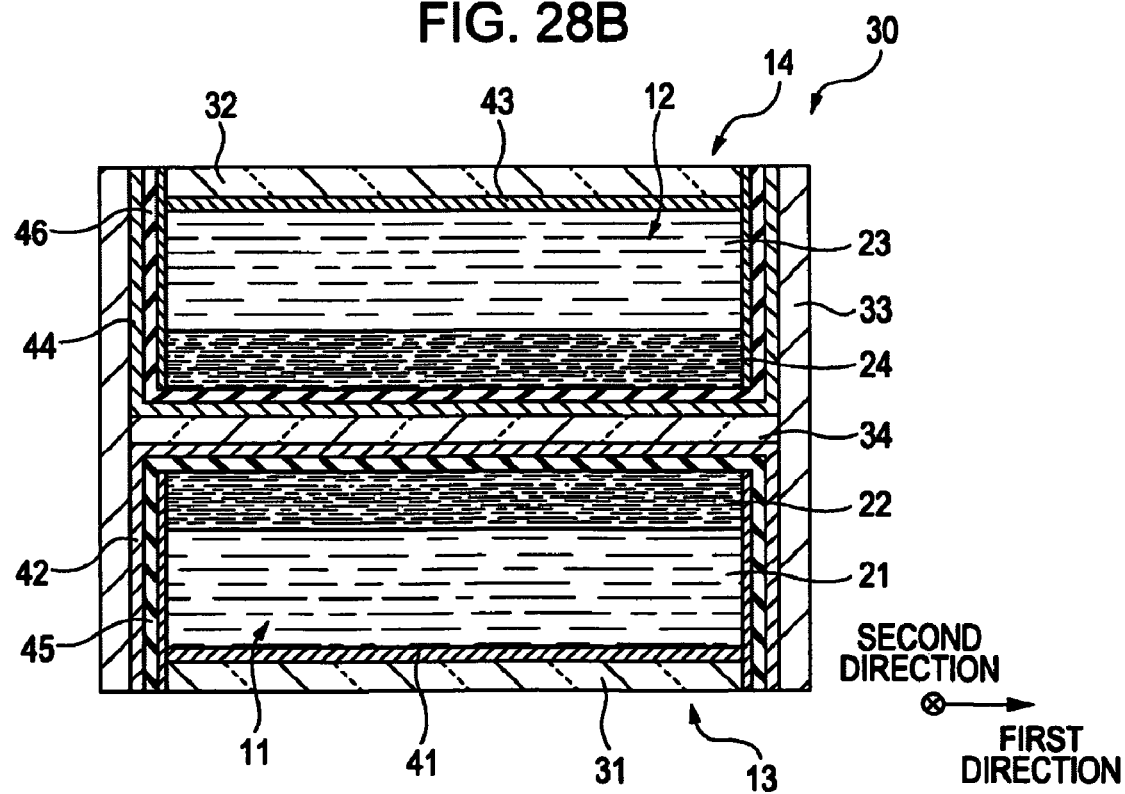
Figure 29A:
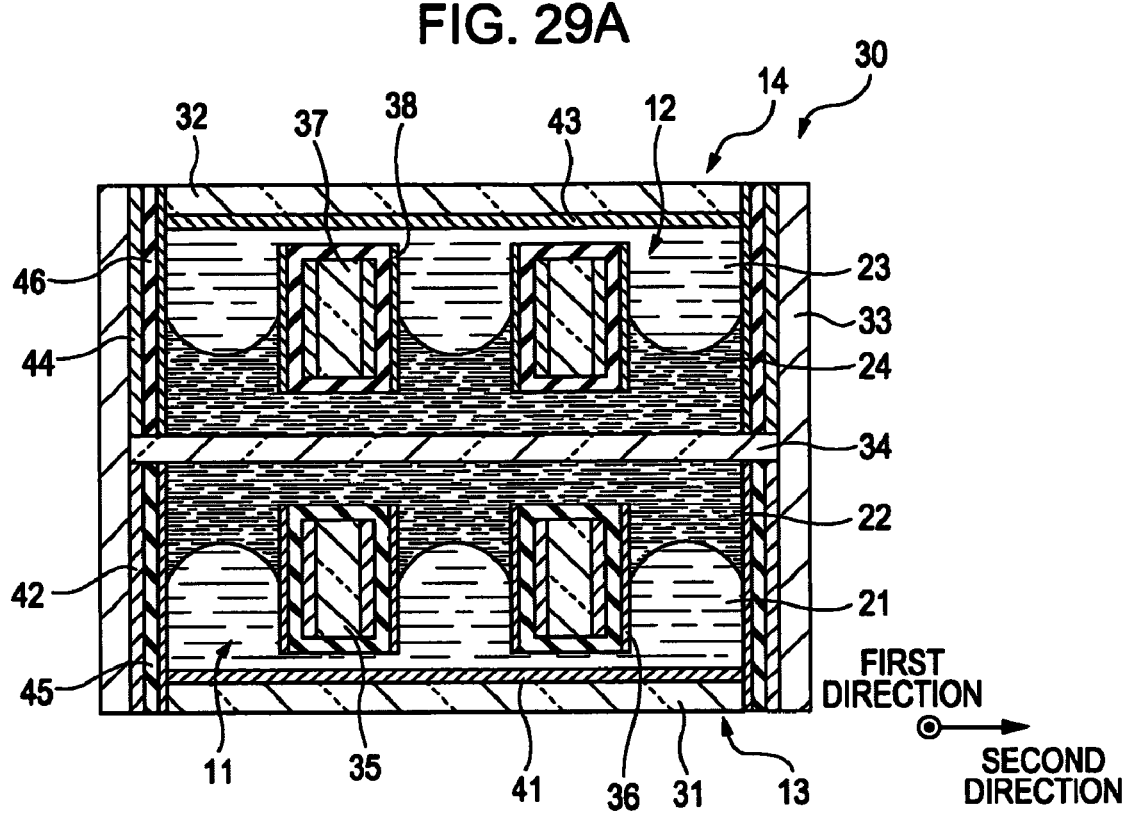
FIGS. 29A and 29B are schematic cross-sectional views illustrating a cutaway of a modification of the optical device according to the nineteenth embodiment at a virtual vertical plane in a second direction (direction parallel to the Y axis), and a cutaway of the modification of the optical device according to the nineteenth embodiment at a virtual vertical plane in a first direction (direction parallel to the Z axis)
Figure 29B:
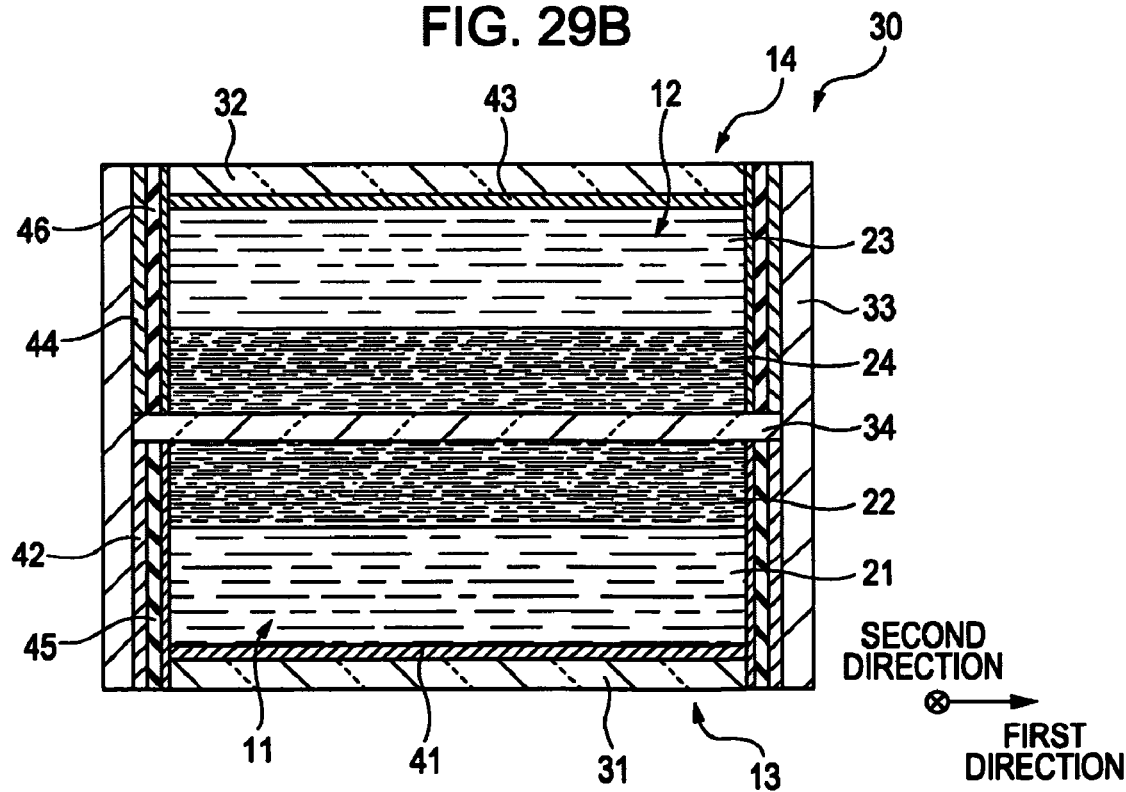

Note that, with the examples shown in FIGS. 28A and 28B, the second electrode 42 is provided on the inner face of the partition face 34, the inner face of the side face 33, and the side face of the first partition plate 35, which make up the first chamber 13, and the fourth electrode 44 is provided on the inner face of the partition face 34, the inner face of the side face 33, and the side face of the second partition plate 37, which make up the second chamber 14, but the optical device according to the nineteenth embodiment is not restricted to such an arrangement and configuration. As shown in FIG. 29A of a schematic cross-sectional view of a cutaway of a modification of the optical device according to the nineteenth embodiment at a virtual vertical plane in a second direction (direction parallel to the Y axis), and as shown in FIG. 29B of a schematic cross-sectional view of a cutaway of the modification of the optical device according to the nineteenth embodiment at a virtual vertical plane in a first direction (direction parallel to the Z axis), an arrangement may be made wherein the second electrode 42 is provided only on the inner face of the side face 33 and the side face of the first partition plate 35, which makes up the first chamber 13, and the fourth electrode 44 is provided only on the inner face of the side face 33 and the side face of the second partition plate 37, which makes up the second chamber 14. Such an arrangement is employed, whereby the electrodes disposed on the optical path can be reduced, and also improvement in optical transmittance can be realized. Note that the portion of the second electrode 42 provided on the inner face of the side face 33 is formed integral with the portion of the second electrode 42 provided on the side face of the first partition plate 35 at an unshown area, and the portion of the fourth electrode 44 provided on the inner face of the side face 33 is formed integral with the portion of the fourth electrode 44 provided on the side face of the second partition plate 37 at an unshown area. In a case wherein the first partition plate and second partition plate have the same configuration, this is true for later-described twenty-second, twenty-fourth, and twenty-sixth embodiments.

Twentieth Embodiment

Figure 30A:
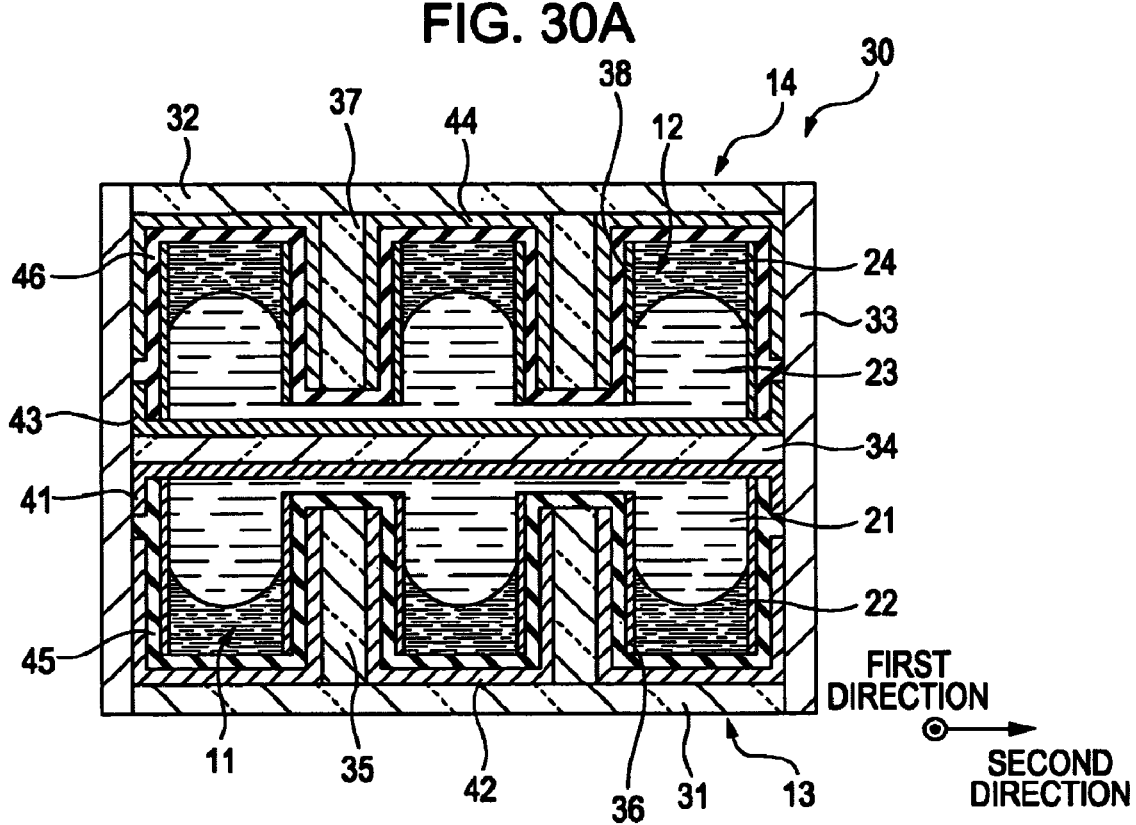
FIGS. 30A and 30B are schematic cross-sectional views illustrating a cutaway of an optical device according to a twentieth embodiment at a virtual vertical plane in a second direction (direction parallel to the Y axis), and a cutaway of the optical device according to the twentieth embodiment at a virtual vertical plane in a first direction (direction parallel to the Z axis)

The twentieth embodiment is a modification of the seventeenth embodiment, and specifically, relates to the optical device having the 2-1-B'th or 2-1-b'th configuration. A point wherein the twentieth embodiment or later-described twenty-first and twenty-second embodiments differs from the sixteenth embodiment or eighteenth and nineteenth embodiments is that the layout of the first liquid 21 and second liquid 22 is inverted vertically from the layout of the second liquid 22 and fourth liquid 24. FIG. 30A illustrates a schematic cross-sectional view of a cutaway of the optical device according to the twentieth embodiment at a virtual vertical plane in a second direction (direction parallel to the Y axis), and FIG. 30B illustrates a schematic cross-sectional view of a cutaway of the optical device according to the twentieth embodiment at a virtual vertical plane in a first direction (direction parallel to the Z axis).

With the optical device according to the thirteenth embodiment, similar to the optical device according to the seventh embodiment, the first electrode 41 is provided on the inner face of the side face 33 making up the first chamber 13, and the third electrode 43 is provided on the inner face of the side face 33 making up the second chamber 14, and on the other hand, the second electrode 42 is made up of a transparent electrode provided on the inner face of the first face 31, the inner face of the side face 33, and the side face of the first partition plate 35 in a state covered with the first insulating film 45, and the fourth electrode 44 is made up of a transparent electrode provided on the inner face of the second face 32, the inner face of the side face 33, and the side face of the second partition plate 37 in a state covered with the second insulating film 46. Note that the first electrode 41 extends on the inner face of the partition face 34 making up the first chamber 13, and the third electrode 43 extends on the inner face of the partition face 34 making up the second chamber 14.

The arrangement and configuration of the optical device according to the twentieth embodiment can be regarded as the same as those of the optical device according to the seventeenth embodiment except for the above-mentioned point, so the detailed description thereof will be omitted. Note that, with the optical device according to the twentieth embodiment, the first partition plate 35 extends from the first face 31 toward the partition face 34, and the second partition plate 37 extends from the second face 32 toward the partition face 34, and there is a gap between the top face of the first partition plate 35 and the top face of the second partition plate 37.

Figure 30B:
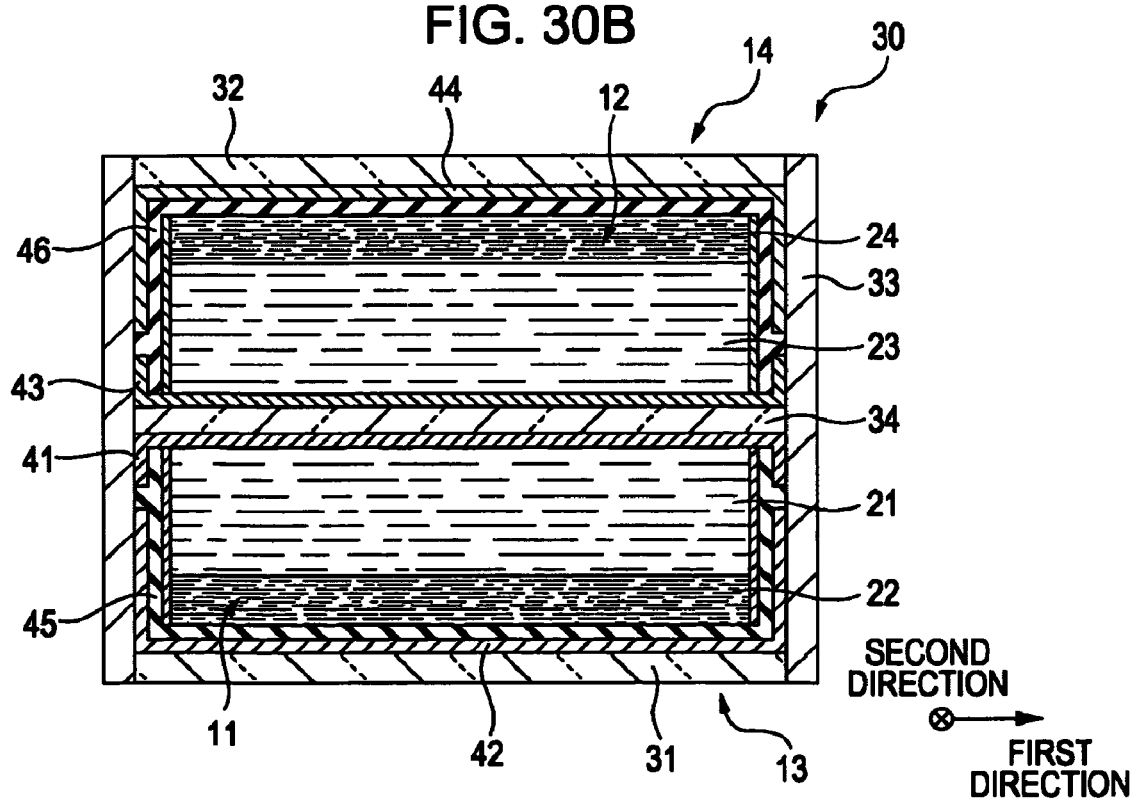
Figure 31A:
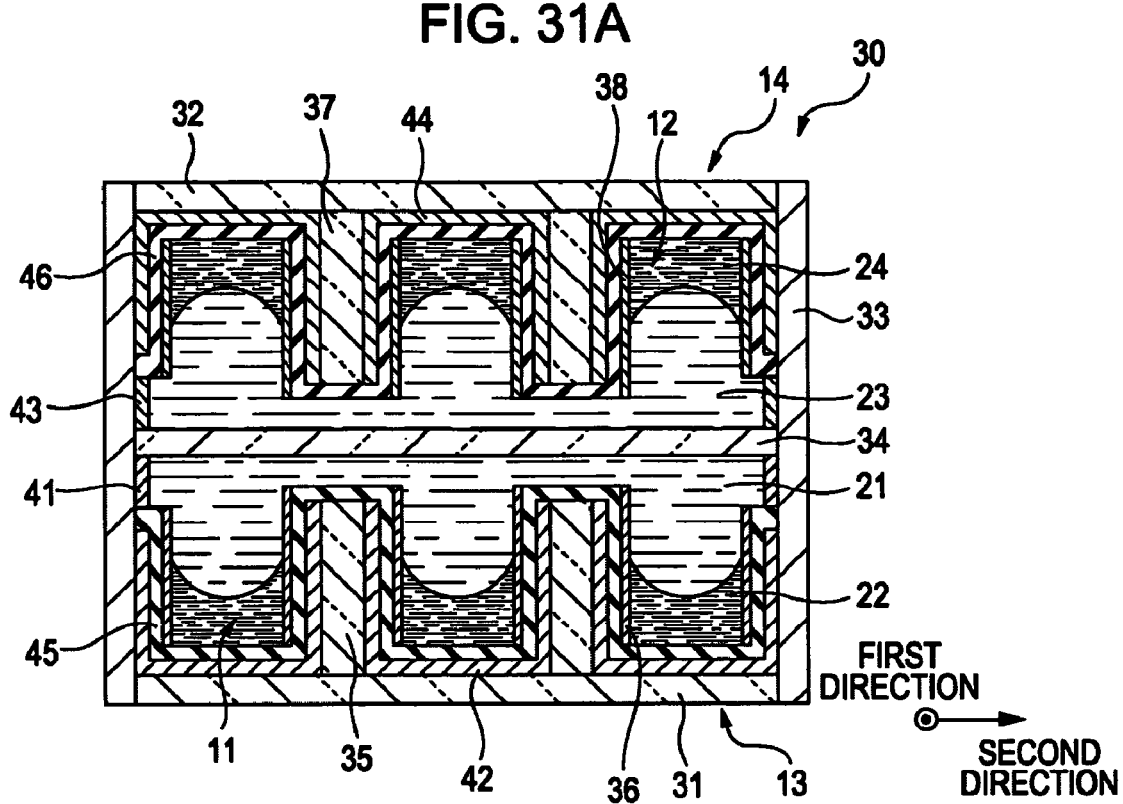
FIGS. 31A and 31B are schematic cross-sectional views illustrating a cutaway of a modification of the optical device according to the twentieth embodiment at a virtual vertical plane in a second direction (direction parallel to the Y axis), and a cutaway of the modification of the optical device according to the twentieth embodiment at a virtual vertical plane in a first direction (direction parallel to the Z axis)
Figure 31B:
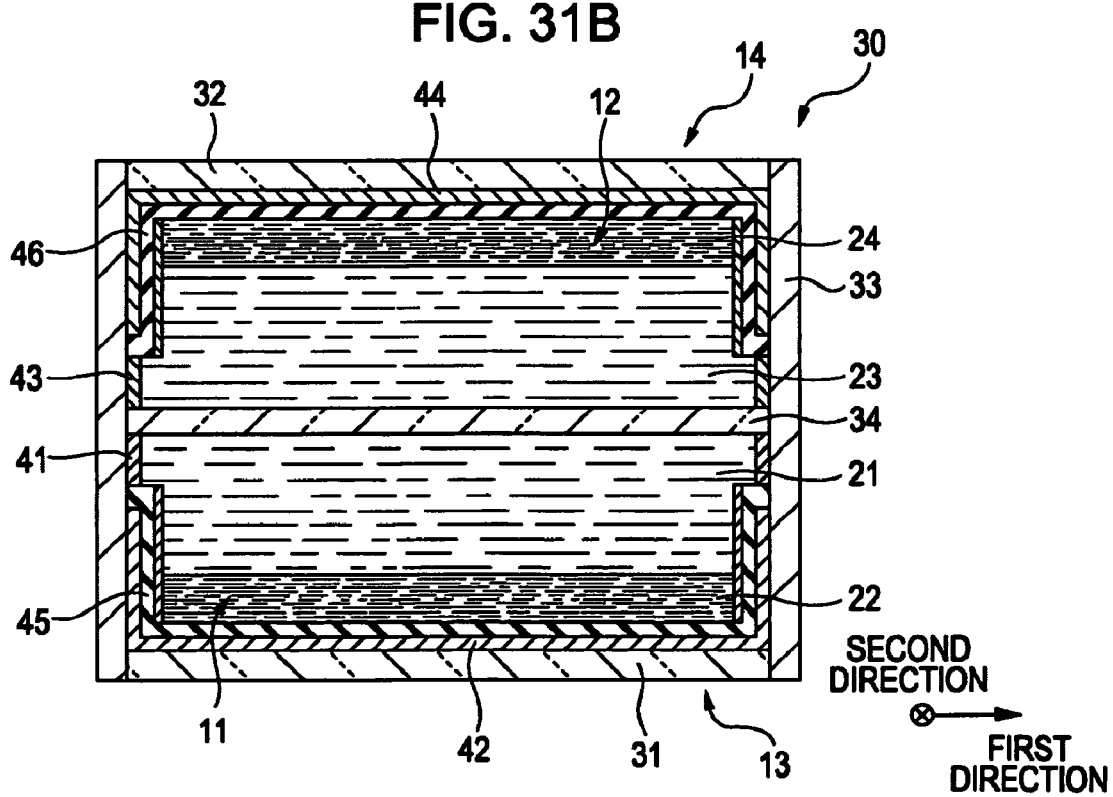

Note that, with the examples shown in FIGS. 30A and 30B, the first electrode 41 is provided on the inner face of the partition face 34 making up the first chamber 13, and the third electrode 43 is provided on the inner face of the partition face 34 making up the second chamber 14, but the optical device according to the twentieth embodiment is not restricted to such an arrangement and configuration. As shown in FIG. 31A of a schematic cross-sectional view of a cutaway of a modification of the optical device according to the twentieth embodiment at a virtual vertical plane in a second direction (direction parallel to the Y axis), and as shown in FIG. 31B of a schematic cross-sectional view of a cutaway of the modification of the optical device according to the twentieth embodiment at a virtual vertical plane in a first direction (direction parallel to the Z axis), an arrangement may be made wherein the first electrode 41 is provided only on the inner face of the side face 33 making up the first chamber 13, and the third electrode 43 is provided only on the inner face of the side face 33 making up the second chamber 14. Such an arrangement is employed, whereby the electrodes disposed on the optical path can be reduced, and also improvement in optical transmittance can be realized.

With the optical device according to the twentieth embodiment or a modification thereof described above, the first electrode 41 and third electrode 43 may be made common in some cases. In other words, the first electrode 41 and third electrode 43 may be configured of a common electrode. Specifically, the first electrode 41 may be formed integral with the third electrode 43. This is true for later-described twenty-first through twenty-second embodiments.

Figure 32A:
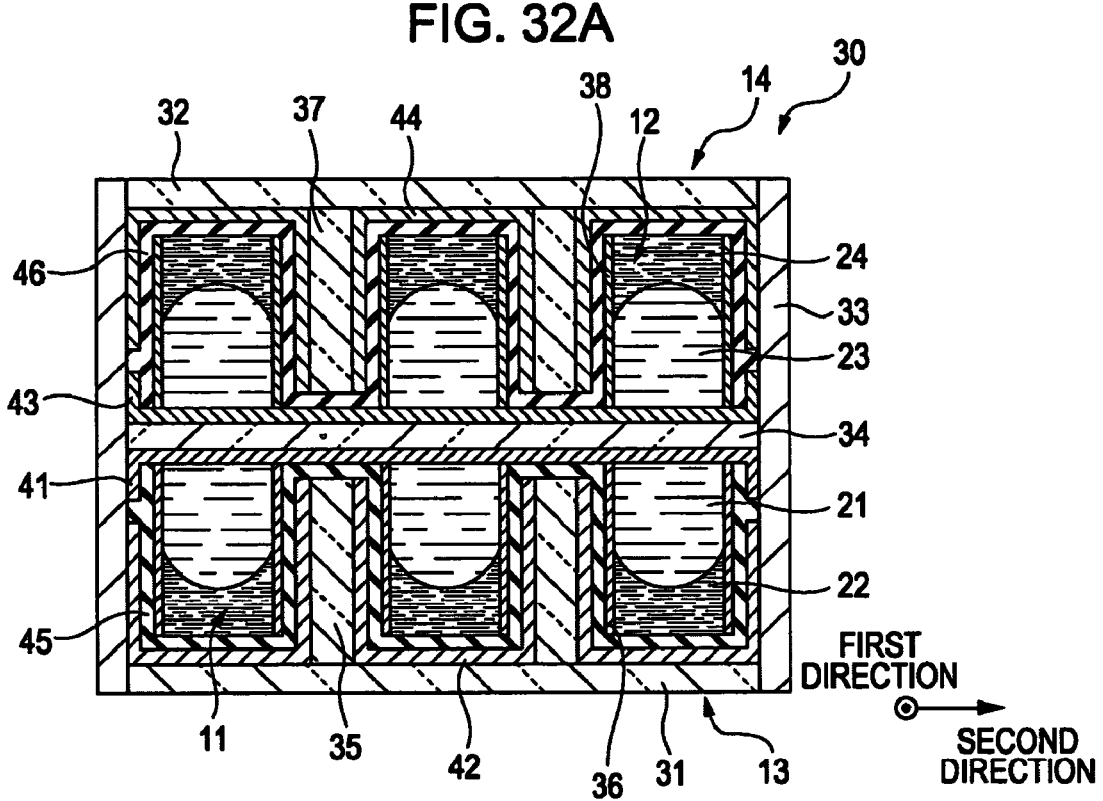
FIGS. 32A and 32B are schematic cross-sectional views illustrating a cutaway of another modification of the optical device according to the twentieth embodiment at a virtual vertical plane in a second direction (direction parallel to the Y axis), and a cutaway of the other modification of the optical device according to the twentieth embodiment at a virtual vertical plane in a first direction (direction parallel to the Z axis)
Figure 32B:
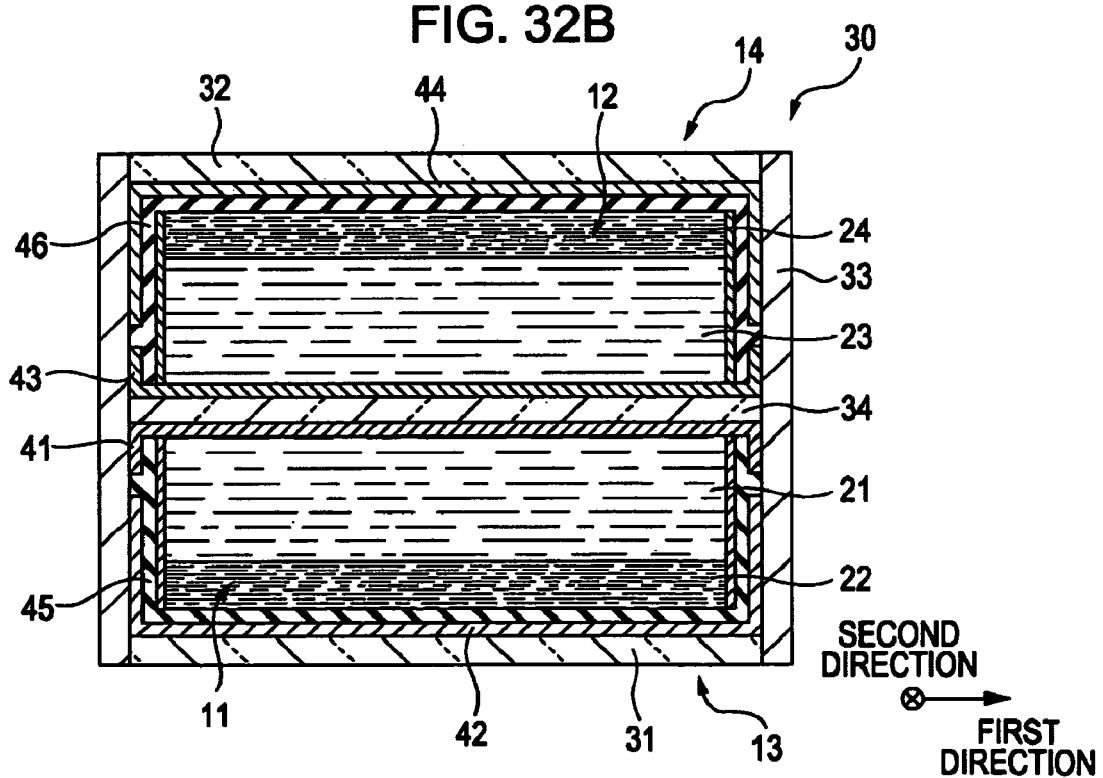

Also, FIG. 32A illustrates a schematic cross-sectional view of a cutaway of another modification of the optical device according to the twentieth embodiment at a virtual vertical plane in a second direction (direction parallel to the Y axis), and FIG. 32B illustrates a schematic cross-sectional view of a cutaway of the other modification of the optical device according to the twentieth embodiment at a virtual vertical plane in a first direction (direction parallel to the Z axis). This modification is a modification of the sixteenth embodiment, and specifically, relates to the optical device having the 2-1-A'th or 2-1-b'th configuration. That is to say, with this modification, the first partition plate 35 extends from the first face 31 to the partition face 34, and the second partition plate 37 extends from the second face 32 to the partition face 34. Subsequently, an arrangement may be made wherein the first electrode 41 extends on the inner face of the partition face 34 making up the first chamber 13, the third electrode 43 extends on the inner face of the partition face 34 making up the second chamber 14, the second electrode 42 extends on the inner face of the side face 33 making up the first chamber 13, and the fourth electrode 44 extends on the inner face of the side face 33 making up the second chamber 14. In such a case, the second electrode 42 and fourth electrode 44 may be made common as appropriate. In other words, the second electrode 42 and fourth electrode 44 may be configured of a common electrode. Specifically, the second electrode 42 may be formed integral with the fourth electrode 44. Also, though not shown in the drawing, an arrangement may be made wherein the first electrode 41 is provided only on the inner face of the side face 33 making up the first chamber 13, and the third electrode 43 is provided only on the inner face of the side face 33 making up the second chamber 14.

With the twentieth embodiment as well, an arrangement and configuration are made wherein the first electrode 41, second electrode 42, third electrode 43, and fourth electrode 44 are connected to an external control circuit through an unshown connection unit, and desired voltage is applied thereto. Subsequently, upon voltage being applied between the first electrode 41 and second electrode 42, a lens face made up of the interface between the first liquid 21 and second liquid 22 is changed from the state protruding downward shown in FIGS. 30A, 31A, and 32A to a state protruding upward. On the other hand, upon voltage being applied between the third electrode 43 and fourth electrode 44, a lens face made up of the interface between the third liquid 23 and fourth liquid 24 is changed from the state protruding upward shown in FIGS. 30A, 31A, and 32A to a state protruding downward. The change states of the lens faces vary depending on voltage being applied to the electrodes (see Expression (A)). Thus, with the optical device according to the twentieth embodiment, optical power at the first cylindrical lens group, and optical power at the second cylindrical lens group independently vary, whereby the focal distance of a lens formed by the first cylindrical lens group and second cylindrical lens group (specifically, lens made up of an area where the first cylindrical lens and second cylindrical lens are overlapped) can vary, and consequently, a strobe device of which the illuminating angle varies from the wide angle side to the telephoto side can be provided. This is true for later-described twenty-first and twenty-second embodiments.

Twenty-First Embodiment

Figure 33A:
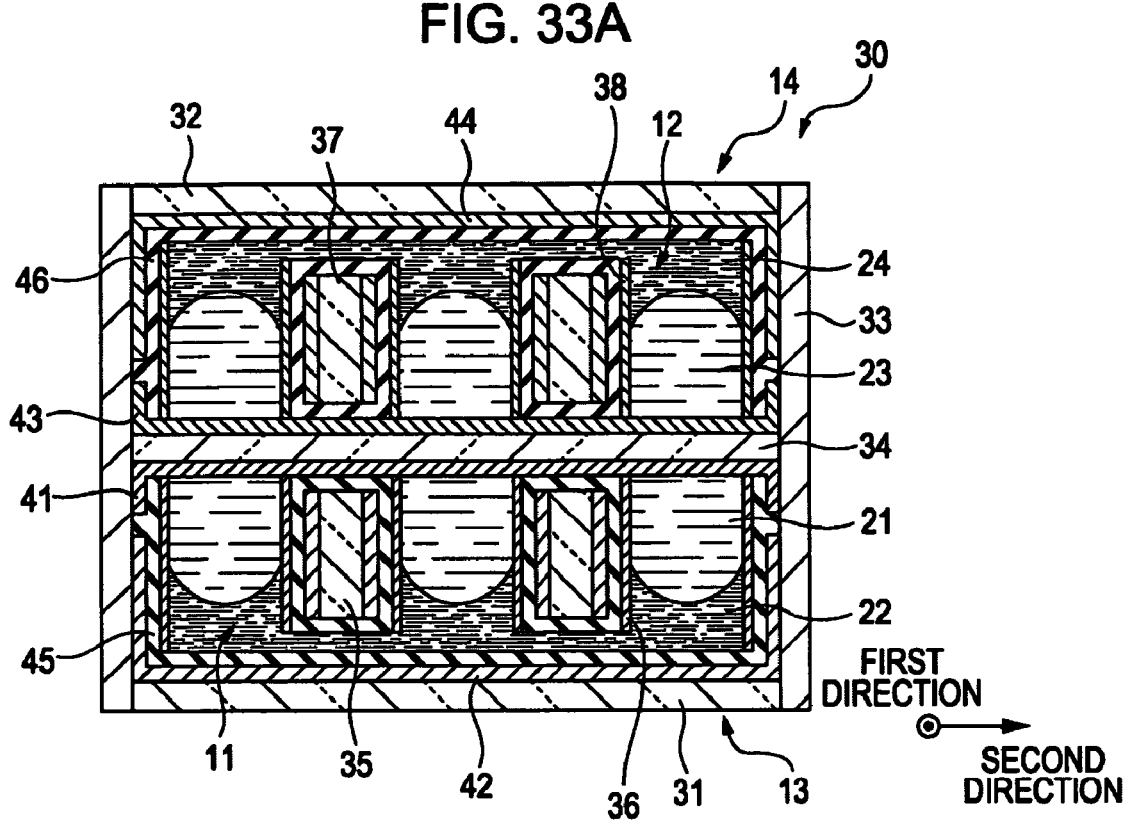
FIGS. 33A and 33B are schematic cross-sectional views illustrating a cutaway of an optical device according to a twenty-first embodiment at a virtual vertical plane in a second direction (direction parallel to the Y axis), and a cutaway of the optical device according to the twenty-first embodiment at a virtual vertical plane in a first direction (direction parallel to the Z axis)
Figure 33B:
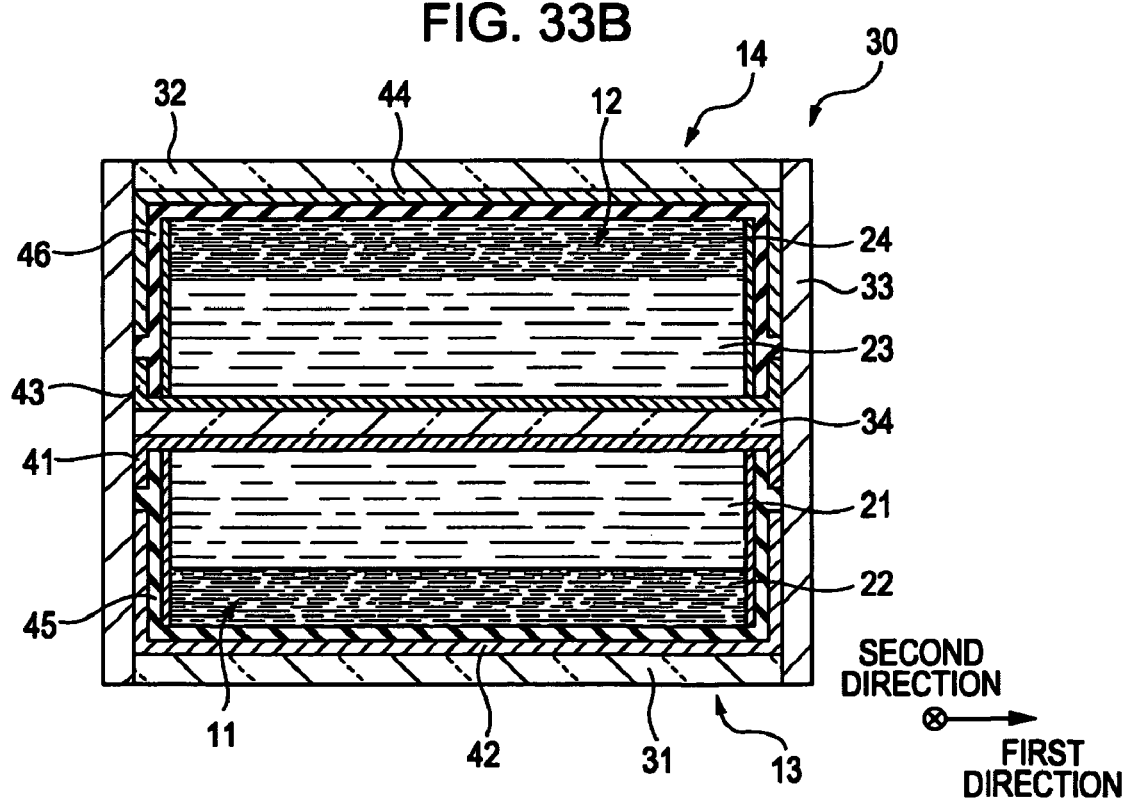

The twenty-first embodiment is also a modification of the sixteenth embodiment, and specifically, relates to the optical device having the 2-1-C'th or 2-1-b'th configuration, and relates to a combination of the twentieth embodiment and eighteenth embodiment. FIG. 33A illustrates a schematic cross-sectional view of a cutaway of the optical device according to the twenty-first embodiment at a virtual vertical plane in a second direction (direction parallel to the Y axis), and FIG. 33B illustrates a schematic cross-sectional view of a cutaway of the optical device according to the twenty-first embodiment at a virtual vertical plane in a first direction (direction parallel to the Z axis).

With the optical device according to the twenty-first embodiment, similar to the eighteenth embodiment, the first partition plate 35 extends from the partition face 34 toward the first face 31, and there is a gap between the top face of the first partition plate 35 and the first face 31, and on the other hand, the second partition plate 37 extends from the partition face 34 toward the second face 32, and there is a gap between the top face of the second partition plate 37 and the second face 32. The arrangement and configuration of the optical device according to the twenty-first embodiment can be regarded as the same as those of the optical device according to the twentieth embodiment except for the above-mentioned point, so the detailed description thereof will be omitted.

Figure 34A:
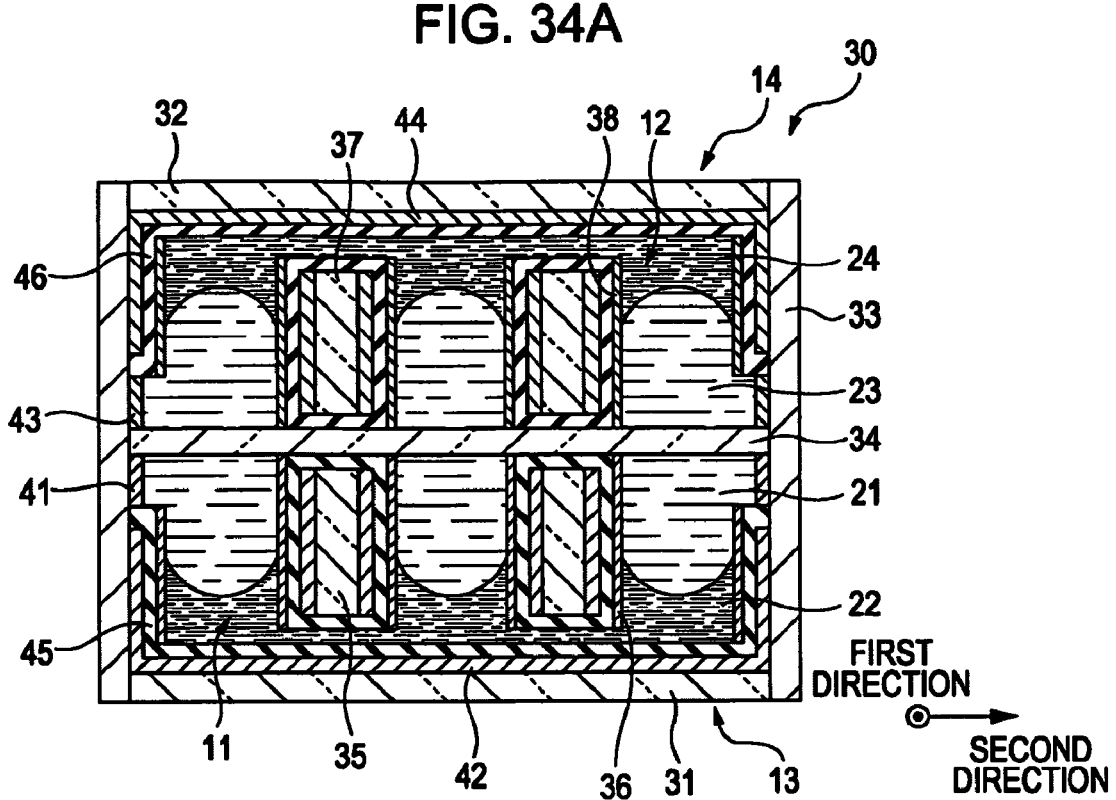
FIGS. 34A and 34B are schematic cross-sectional views illustrating a cutaway of a modification of the optical device according to the twenty-first embodiment at a virtual vertical plane in a second direction (direction parallel to the Y axis), and a cutaway of the modification of the optical device according to the twenty-first embodiment at a virtual vertical plane in a first direction (direction parallel to the Z axis)
Figure 34B:
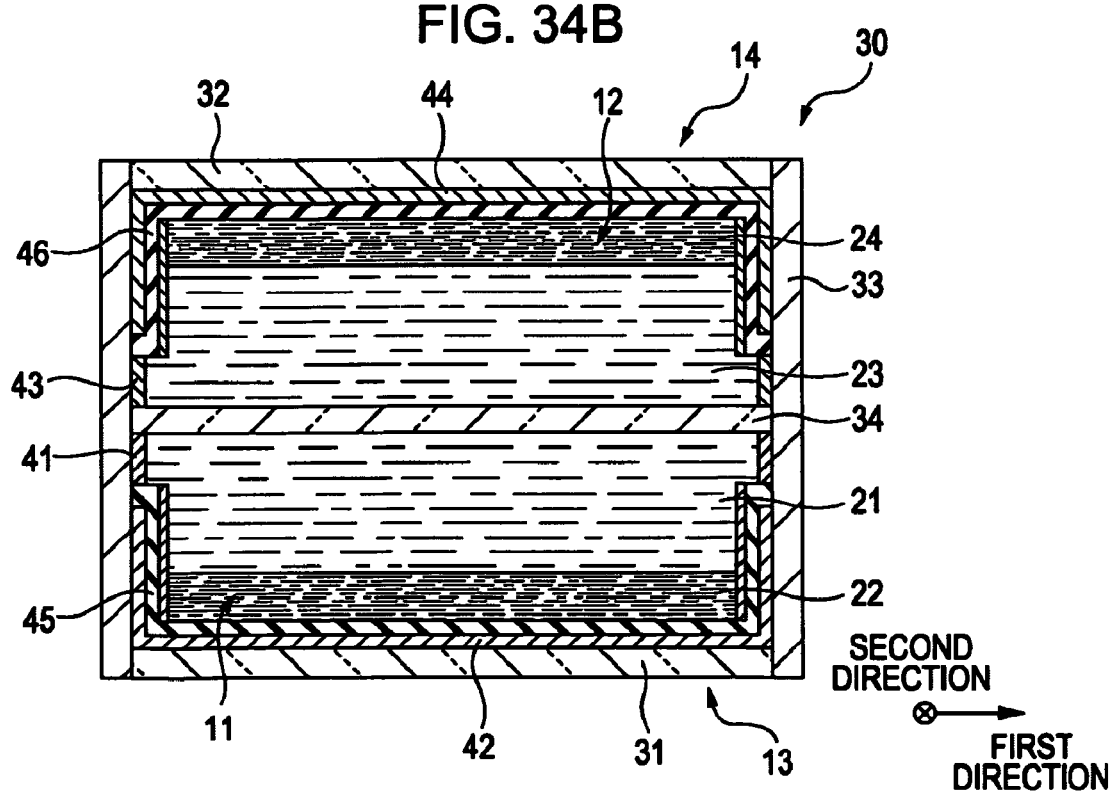

As shown in FIG. 34A of a schematic cross-sectional view of a cutaway of a modification of the optical device according to the twenty-first embodiment at a virtual vertical plane in a second direction (direction parallel to the Y axis), and as shown in FIG. 34B of a schematic cross-sectional view of a cutaway of the modification of the optical device according to the twenty-first embodiment at a virtual vertical plane in a first direction (direction parallel to the Z axis), in the same way described with the modification of the twentieth embodiment, an arrangement may be made wherein the first electrode 41 is provided only on the inner face of the side face 33 making up the first chamber 13, and the third electrode 43 is provided only on the inner face of the side face 33 making up the second chamber 14. Such an arrangement is employed; whereby the electrodes disposed on the optical path can be reduced, and also improvement in optical transmittance can be realized.

With the optical device according to the twenty-first embodiment or a modification thereof described above, the first electrode 41 and third electrode 43 may be made common, and the second electrode 42 and fourth electrode 44 may be made common, as appropriate. In other words, the first electrode 41 and third electrode 43 may be configured of a common electrode, and the second electrode 42 and fourth electrode 44 may be configured of a common electrode.

Twenty-Second Embodiment

The twenty-second embodiment is also a modification of the sixteenth embodiment, and specifically, relates to the optical device having the 2-1-D'th or 2-1-b'th configuration, and relates to a combination of the twentieth and nineteenth embodiments. FIG. 35A illustrates a schematic cross-sectional view of a cutaway of the optical device according to the twenty-second embodiment at a virtual vertical plane in a second direction (direction parallel to the Y axis), and FIG. 35B illustrates a schematic cross-sectional view of a cutaway of the optical device according to the twenty-second embodiment at a virtual vertical plane in a first direction (direction parallel to the Z axis).

With the optical device according to the twenty-second embodiment, there is a gap between the bottom face of the first partition plate 35 and the first face 31, and there is a gap between the bottom face of the second partition plate 37 and the second face 32, and there is a gap between the top face of the first partition plate 35 and the top face of the second partition plate 37. The arrangement and configuration of the optical device according to the twenty-second embodiment can be regarded as the same as those of the optical device according to the twentieth embodiment except for the above-mentioned point, so the detailed description thereof will be omitted.

Figure 36A:
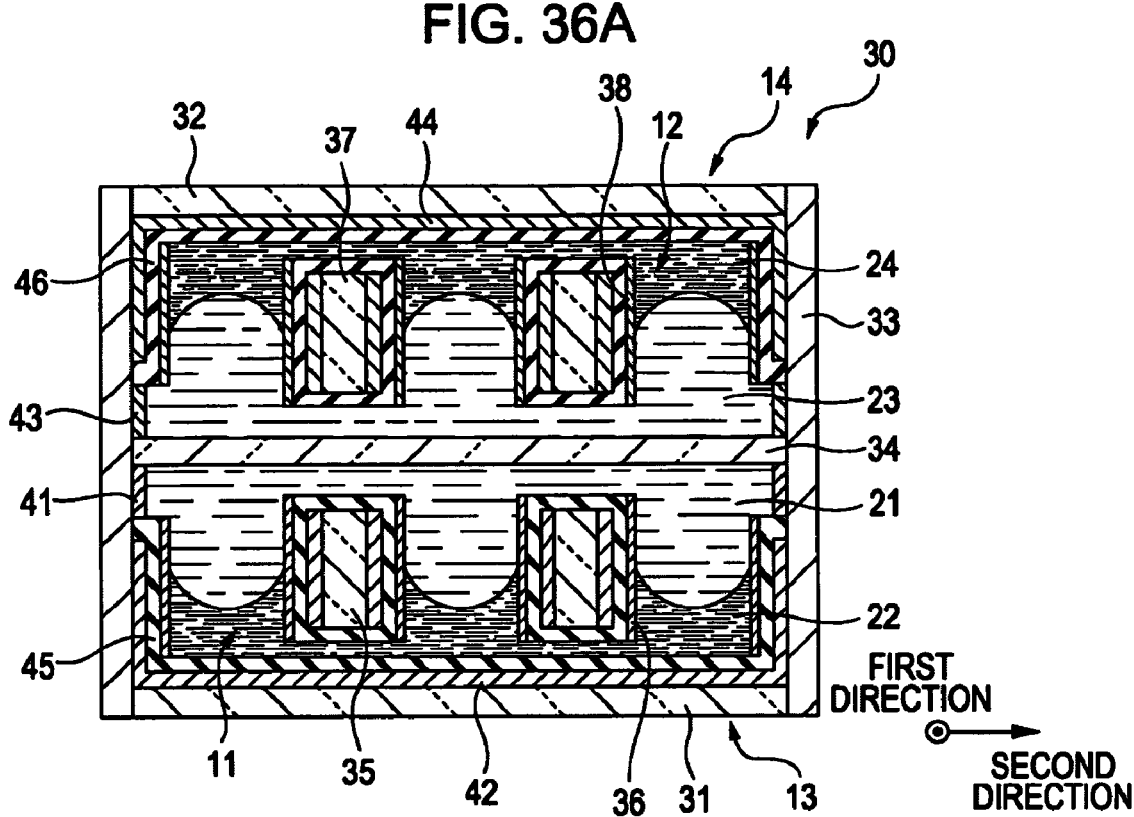
FIGS. 36A and 36B are schematic cross-sectional views illustrating a cutaway of a modification of the optical device according to the twenty-second embodiment at a virtual vertical plane in a second direction (direction parallel to the Y axis), and a cutaway of the modification of the optical device according to the twenty-second embodiment at a virtual vertical plane in a first direction (direction parallel to the Z axis)
Figure 36B:
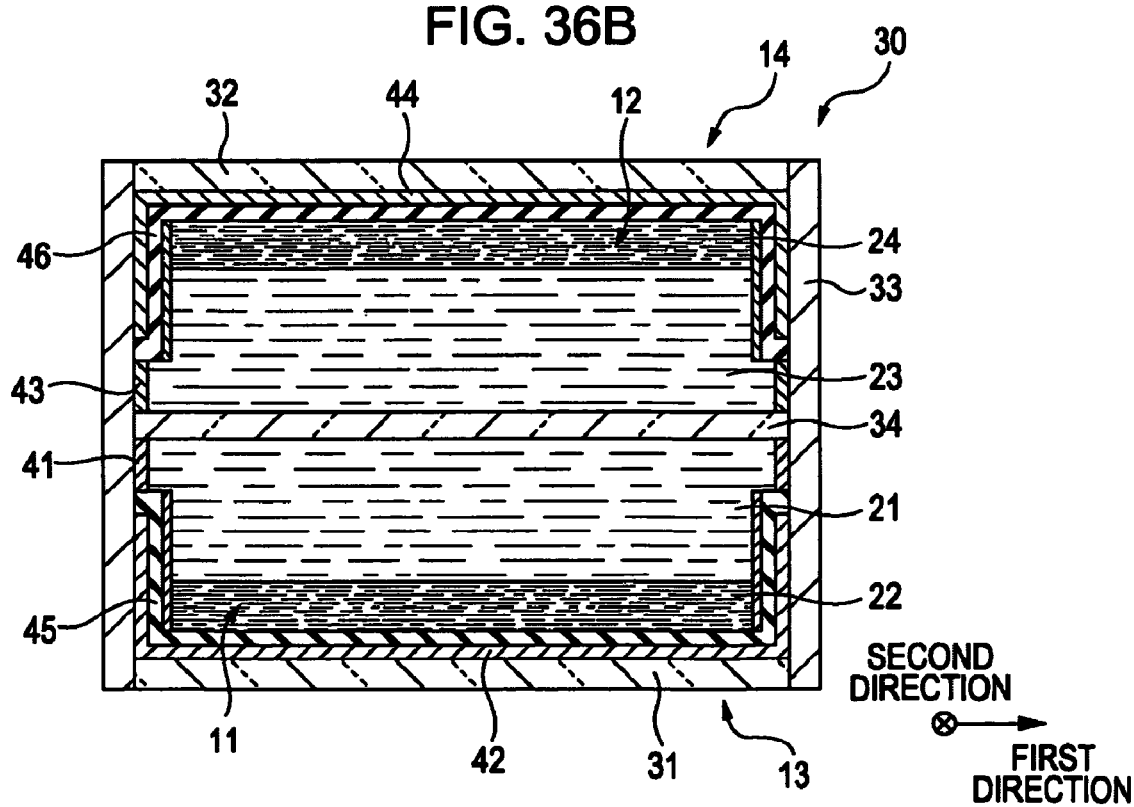

Note that, with the examples shown in FIGS. 35A and 35B, the first electrode 41 is provided on the inner face of the partition face 34 making up the first chamber 13, and the third electrode 43 is provided on the inner face of the partition face 34 making up the second chamber 14, but the optical device according to the twenty-second embodiment is not restricted to such an arrangement and configuration. As shown in FIG. 36A of a schematic cross-sectional view of a cutaway of a modification of the optical device according to the twenty-second embodiment at a virtual vertical plane in a second direction (direction parallel to the Y axis), and as shown in FIG. 36B of a schematic cross-sectional view of a cutaway of the modification of the optical device according to the twenty-second embodiment at a virtual vertical plane in a first direction (direction parallel to the Z axis), an arrangement may be made wherein the first electrode 41 is provided only on the inner face of the side face 33 making up the first chamber 13, and the third electrode 43 is provided only on the inner face of the side face 33 making up the second chamber 14. Such an arrangement is employed, whereby the electrodes disposed on the optical path can be reduced, and also improvement in optical transmittance can be realized.

With the optical device according to the twenty-second embodiment or the modification thereof described above, the first electrode 41 and third electrode 43 may be made common, and the second electrode 42 and fourth electrode 44 may be made common, as appropriate. In other words, the first electrode 41 and third electrode 43 may be configured of a common electrode, and the second electrode 42 and fourth electrode 44 may be configured of a common electrode.

Twenty-Third Embodiment

The twenty-third embodiment relates to the optical device having the 2-2'nd or 2-3'rd configuration, and specifically relates to the optical device having the 2-2-A'th or 2-2-a'th configuration. FIG. 37A illustrates a schematic cross-sectional view of a cutaway of the optical device according to the twenty-third embodiment at a virtual vertical plane in a second direction (direction parallel to the Y axis), and FIG. 37B illustrates a schematic cross-sectional view of a cutaway of the optical device according to the twenty-third embodiment at a virtual vertical plane in a first direction (direction parallel to the Z axis).

An optical device according to the twenty-third embodiment is an optical device including (A) a first cylindrical lens group where multiple first cylindrical lenses 11 are apposed, each of which is made up of a liquid lens of which the axis line extends in a first direction (the direction parallel to the Z axis);

(B) a second cylindrical lens group where multiple second cylindrical lenses 12 are apposed, each of which is made up of a liquid lens of which the axis line extends in the first direction (the direction parallel to the Z axis), and light passing through the first cylindrical lens group is input.

Also, with the optical device according to the twenty-third embodiment, the first partition plate 35 extends from the first face 31 toward the second face 32, and the second partition plate 37 extends from the second face 32 to the first face 31, and there is a gap between the top of the first partition plate 35 and the top of the second partition plate 37.

Subsequently, a first electrode 41 adjacent to the first liquid 121, and a second electrode 42 insulated from the first liquid 121 are disposed within the first chamber 13, and a third electrode 43 adjacent to the third liquid 123, and a fourth electrode 44 insulated from the third liquid 123 are disposed within the second chamber 14. Specifically, the second electrode 42 is adjacent to the interface between the first liquid 121 and second liquid 122 through the insulating film 145, and the fourth electrode 44 is adjacent to the interface between the third liquid 123 and second liquid 122 through the insulating film 145. Now, the first electrode 41 is made up of a transparent electrode provided on the inner face of the first face 31, and the third electrode 43 is made up of a transparent electrode provided on the inner face of the second face 32. Also, the second electrode 42 is provided on the inner face of the side face 33 and the side face of the first partition plate 35, which make the first chamber 13, in a state covered with the insulating film 145, and the fourth electrode 44 is provided on the inner face of the side face 33 and the side face of the second partition plate 37, which make the second chamber 14, in a state covered with the insulating film 145.

An arrangement and configuration are made wherein the first electrode 41, second electrode 42, third electrode 43, and fourth electrode 44 are connected to an external control circuit through an unshown connection unit, and desired voltage is applied thereto. Subsequently, upon voltage being applied between the first electrode 41 and second electrode 42, a lens face made up of the interface between the first liquid 121 and second liquid 122 is changed from the state protruding upward shown in FIG. 37A to a state protruding downward. On the other hand, upon voltage being applied between the third electrode 43 and fourth electrode 44, a lens face made up of the interface between the third liquid 123 and second liquid 122 is changed from the state protruding downward shown in FIG. 37A to a state protruding upward. The change states of the lens faces vary depending on voltage being applied to the electrodes (see Expression (A)). Thus, with the optical device according to the twenty-third embodiment, optical power at the first cylindrical lens group, and optical power at the second cylindrical lens group independently vary, whereby the focal distance of a lens formed by the first cylindrical lens group and second cylindrical lens group (specifically, lens made up of an area where the first cylindrical lens and second cylindrical lens are overlapped) can vary, and consequently, a strobe device of which the illuminating angle varies from the wide angle side to the telephoto side can be provided. This is true for later-described twenty-fourth embodiment. The components disposed on the optical path can be reduced, and also improvement in optical transmittance can be realized. This is true for later-described twenty-fourth through twenty-eighth embodiments.

Note that the second electrode and fourth electrode may be made common. In other words, the second electrode and fourth electrode may be configured of a common electrode. Specifically, the second electrode may be formed integral with the fourth electrode. FIG. 38A illustrates a schematic cross-sectional view of a cutaway of such an optical device according to the twenty-third embodiment at a virtual vertical plane in a second direction (direction parallel to the Y axis), and FIG. 37B illustrates a schematic cross-sectional view of a cutaway of the optical device according to the twenty-third embodiment at a virtual vertical plane in a first direction (direction parallel to the Z axis). In FIGS. 38A and 38B, an electrode obtained by making the second electrode and fourth electrode common is shown with the second electrode 42.

Twenty-Fourth Embodiment

The twenty-fourth embodiment is a modification of the twenty-third embodiment, and specifically, relates to the optical device having the 2-2-B'th or 2-2-a'th configuration. FIG. 39A illustrates a schematic cross-sectional view of a cutaway of the optical device according to the twenty-fourth embodiment at a virtual vertical plane in a second direction (direction parallel to the Y axis), and FIG. 39B illustrates a schematic cross-sectional view of a cutaway of the optical device according to the twenty-fourth embodiment at a virtual vertical plane in a first direction (direction parallel to the Z axis).

With the optical device according to the twenty-fourth embodiment, there is a gap between the bottom face of the first partition plate 35 and the first face 31, and there is a gap between the bottom face of the second partition plate 37 and the second face 32, and there is a gap between the top face of the first partition plate 35 and the top face of the second partition plate 37. The arrangement and configuration of the optical device according to the twenty-fourth embodiment can be regarded as the same as those of the optical device according to the twenty-third embodiment except for the above-mentioned point, so the detailed description thereof will be omitted.

Figure 40A:
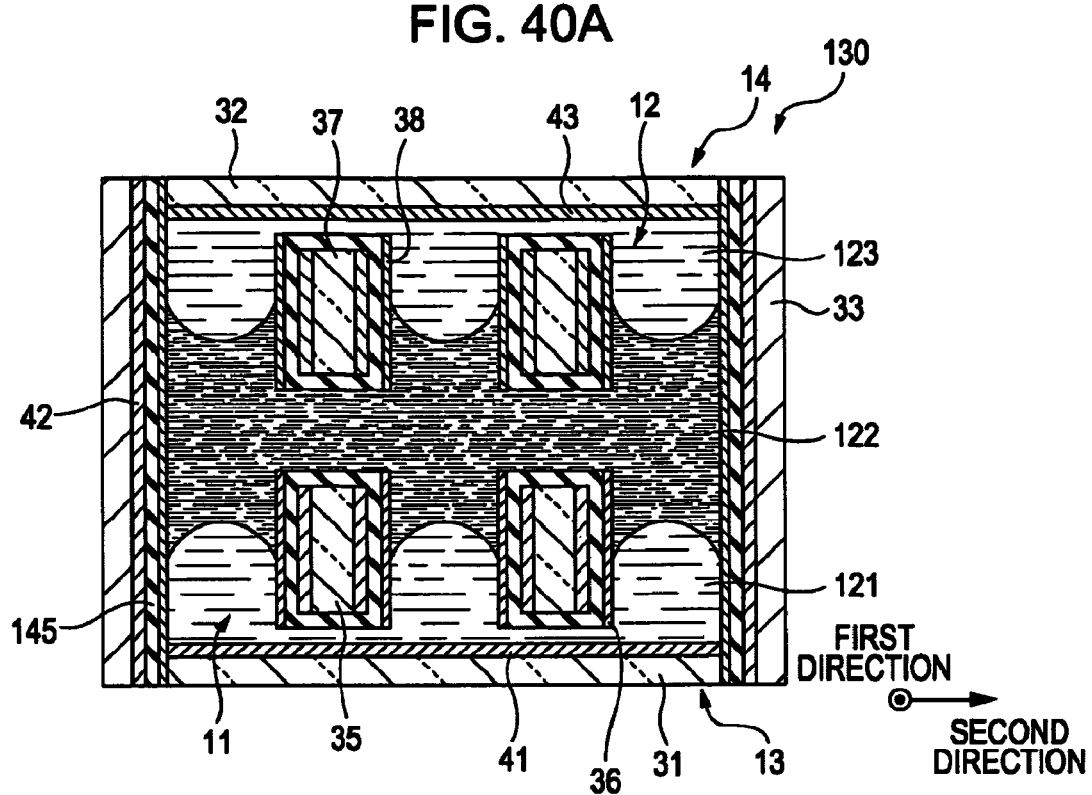
FIGS. 40A and 40B are schematic cross-sectional views illustrating a cutaway of a modification of the optical device according to the twenty-fourth embodiment at a virtual vertical plane in a second direction (direction parallel to the Y axis), and a cutaway of the modification of the optical device according to the twenty-fourth embodiment at a virtual vertical plane in a first direction (direction parallel to the Z axis)
Figure 40B:
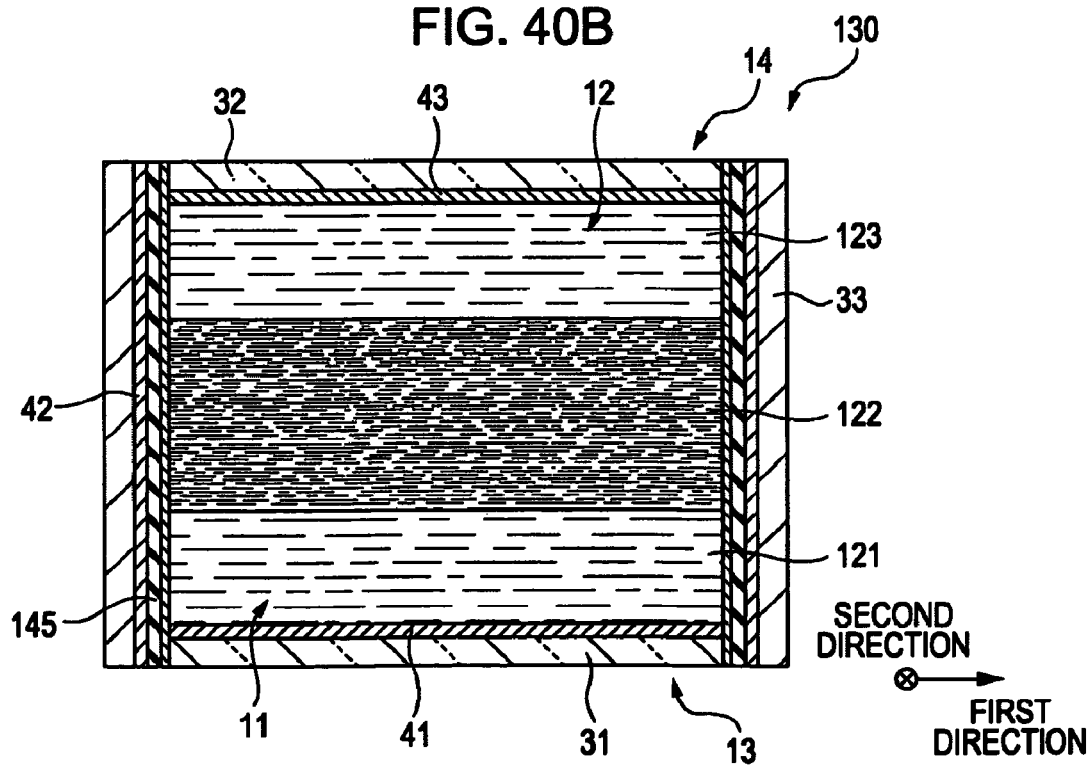

Note that the second electrode and fourth electrode may be made common. In other words, the second electrode and fourth electrode may be configured of a common electrode. Specifically, the second electrode may be formed integral with the fourth electrode. FIG. 40A illustrates a schematic cross-sectional view of a cutaway of such an optical device according to the twenty-fourth embodiment at a virtual vertical plane in a second direction (direction parallel to the Y axis), and FIG. 40B illustrates a schematic cross-sectional view of a cutaway of the optical device according to the twenty-fourth embodiment at a virtual vertical plane in a first direction (direction parallel to the Z axis). In FIGS. 40A and 40B, an electrode obtained by making the second electrode and fourth electrode common is shown with the second electrode 42.

Twenty-Fifth Embodiment

The twenty-fifth embodiment is also a modification of the twenty-third embodiment, and specifically, relates to the optical device having the 2-2-A'th or 2-2-b'th configuration. FIG. 41A illustrates a schematic cross-sectional view of a cutaway of the optical device according to the twenty-fifth embodiment at a virtual vertical plane in a second direction (direction parallel to the Y axis), and FIG. 41B illustrates a schematic cross-sectional view of a cutaway of the optical device according to the twenty-fifth embodiment at a virtual vertical plane in a first direction (direction parallel to the Z axis).

With the optical device according to the twenty-fifth embodiment, the first electrode 41 is provided on the inner face of the side face 33 making up the first chamber 13, and the third electrode 43 is provided on the inner face of the side face 33 making up the second chamber 14, the second electrode 42 is made up of a transparent electrode provided on the inner face of the first face 31, the side face of the first partition plate 35, and the side face 33 in a state covered with the insulating film 145, and the fourth electrode 44 is made up of a transparent electrode provided on the inner face of the second face 32, the side face of the second partition plate 37, and the side face 33 in a state covered with the insulating film 145. The arrangement and configuration of the optical device according to the twenty-fifth embodiment can be regarded as the same as those of the optical device according to the twenty-third embodiment except for the above-mentioned point, so the detailed description thereof will be omitted.

Twenty-Sixth Embodiment

Figure 42A:
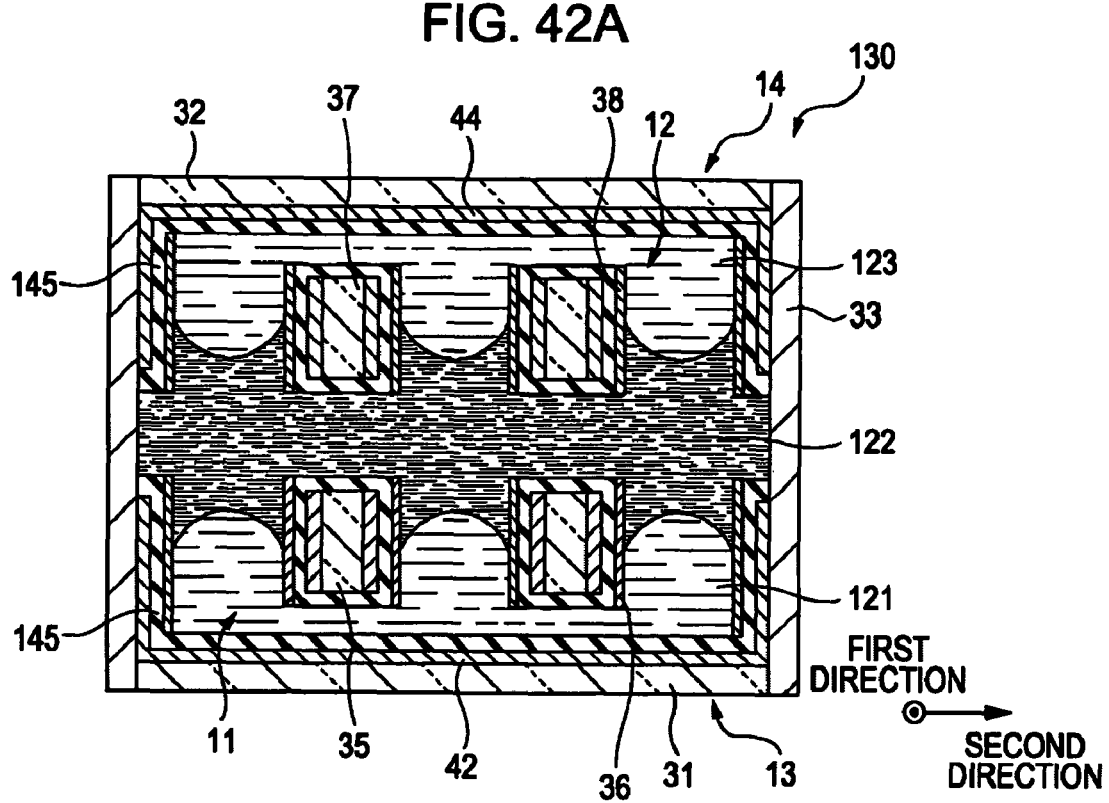
FIGS. 42A and 42B are schematic cross-sectional views illustrating a cutaway of an optical device according to a twenty-sixth embodiment at a virtual vertical plane in a second direction (direction parallel to the Y axis), and a cutaway of the optical device according to the twenty-sixth embodiment at a virtual vertical plane in a first direction (direction parallel to the Z axis)
Figure 42B:
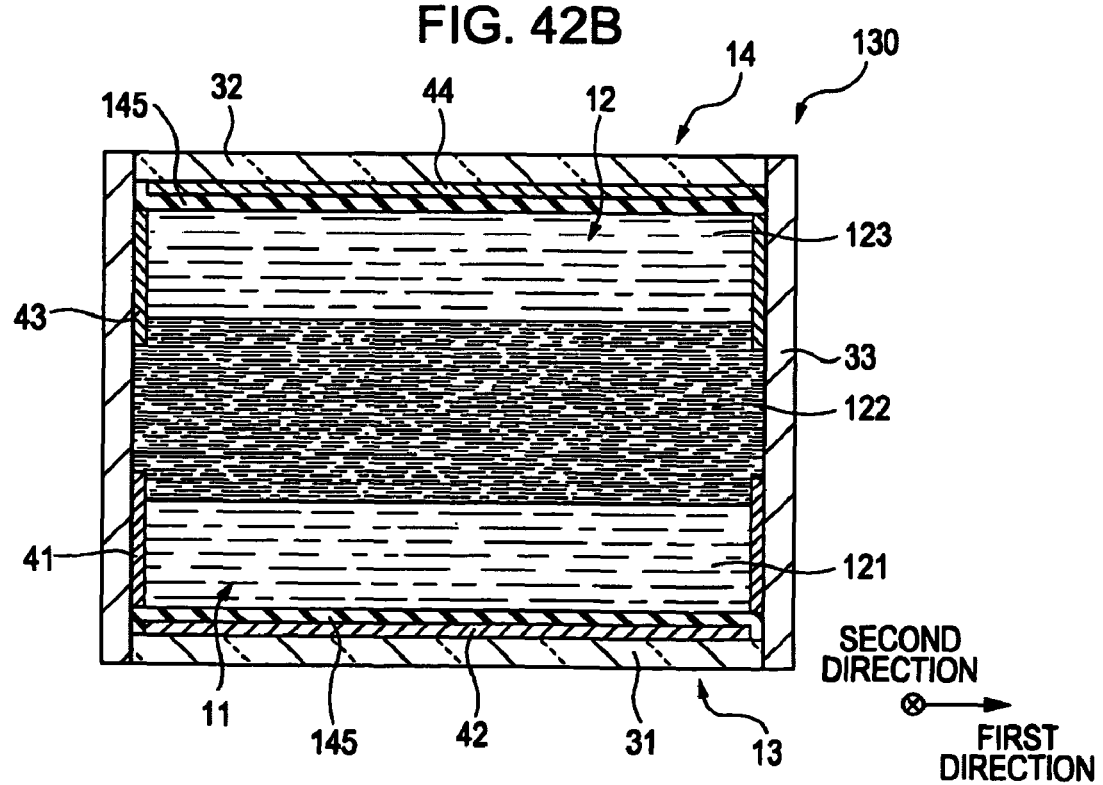

The twenty-sixth embodiment is a modification of the twenty-fourth embodiment, and specifically, relates to the optical device having the 2-2-B'th or 2-2-b'th configuration. FIG. 42A illustrates a schematic cross-sectional view of a cutaway of the optical device according to the twenty-sixth embodiment at a virtual vertical plane in a second direction (direction parallel to the Y axis), and FIG. 42B illustrates a schematic cross-sectional view of a cutaway of the optical device according to the twenty-sixth embodiment at a virtual vertical plane in a first direction (direction parallel to the Z axis).

With the optical device according to the twenty-sixth embodiment, similar to the optical device according to the thirteenth embodiment, similar to the twenty-fifth embodiment, the first electrode 41 is provided on the inner face of the side face 33 making up the first chamber 13, and the third electrode 43 is provided on the inner face of the side face 33 making up the second chamber 14, the second electrode 42 is made up of a transparent electrode provided on the inner face of the first face 31, the side face of the first partition plate 35, and the side face 33 in a state covered with the insulating film 145, and the fourth electrode 44 is made up of a transparent electrode provided on the inner face of the second face 32, the side face of the second partition plate 37, and the side face 33 in a state covered with the insulating film 145. The arrangement and configuration of the optical device according to the twenty-sixth embodiment can be regarded as the same as those of the optical device according to the twenty-fourth embodiment except for the above-mentioned point, so the detailed description thereof will be omitted.

Twenty-Seventh Embodiment

The twenty-seventh embodiment is also a modification of the twenty-third embodiment, and specifically, relates to the optical device having the 2-2-A'th or 2-2-c'th configuration. A point wherein the twenty-seventh embodiment or later-described twenty-eighth embodiment differs from the twenty-fourth embodiment or twenty-fifth embodiment is that the composition and layout of the first liquid, second liquid, and third liquid differ. FIG. 43A illustrates a schematic cross-sectional view of a cutaway of the optical device according to the twenty-seventh embodiment at a virtual vertical plane in a second direction (direction parallel to the Y axis), and FIG. 43B illustrates a schematic cross-sectional view of a cutaway of the optical device according to the twenty-seventh embodiment at a virtual vertical plane in a first direction (direction parallel to the Z axis).

With the optical device according to the twenty-seventh embodiment, the first partition plate 35 extends from the first face 31 toward the second face 32, and the second partition plate 37 extends from the second face 32 toward the first face 31, and there is a gap between the top face of the first partition plate 35 and the top face of the second partition plate 37.

With the twenty-seventh embodiment as well, an arrangement and configuration are made wherein the first electrode 41, second electrode 42, and third electrode 43 are connected to an external control circuit through an unshown connection unit, and desired voltage is applied thereto. Subsequently, upon voltage being applied between the second electrode 42 and first electrode 41, a lens face made up of the interface between the second liquid 222 and first liquid 221 is changed from the state protruding downward shown in FIG. 43A to a state protruding upward. On the other hand, upon voltage being applied between the second electrode 42 and third electrode 43, a lens face made up of the interface between the second liquid 222 and third liquid 223 is changed from the state protruding upward shown in FIG. 43A to a state protruding downward. The change states of the lens faces vary depending on voltage being applied to the electrodes (see Expression (A)). Thus, with the optical device according to the twenty-seventh embodiment, optical power at the first cylindrical lens group, and optical power at the second cylindrical lens group independently vary, whereby the focal distance of a lens formed by the first cylindrical lens group and second cylindrical lens group (specifically, lens made up of an area where the first cylindrical lens and second cylindrical lens are overlapped) can vary, and consequently, a strobe device of which the illuminating angle varies from the wide angle side to the telephoto side can be provided. This is true for later-described twenty-eighth embodiment.

Twenty-Eighth Embodiment

The twenty-eighth embodiment is a modification of the twenty-seventh embodiment, and specifically, relates to the optical device having the 2-2-B'th or 2-2-c'th configuration. FIG. 44A illustrates a schematic cross-sectional view of a cutaway of the optical device according to the twenty-eighth embodiment at a virtual vertical plane in a second direction (direction parallel to the Y axis), and FIG. 44B illustrates a schematic cross-sectional view of a cutaway of the optical device according to the twenty-eighth embodiment at a virtual vertical plane in a first direction (direction parallel to the Z axis).

With the optical device according to the twenty-eighth embodiment, there is a gap between the bottom face of the first partition plate 35 and the first face 31, and there is a gap between the bottom face of the second partition plate 37 and the second face 32, and there is a gap between the top face of the first partition plate 35 and the top face of the second partition plate 37. The arrangement and configuration of the optical device according to the twenty-eighth embodiment can be regarded as the same as those of the optical device according to the twenty-seventh embodiment except for the above-mentioned point, so the detailed description thereof will be omitted. The portion of the first electrode 41 provided on the inner face of the first face 31, and the portion of the first electrode 41 provided on the side face of the first partition plate 35 are united with an unshown area, and the portion of the third electrode 43 provided on the inner face of the second face 32, and the portion of the third electrode 43 provided on the side face of the second partition plate 37 are united with an unshown area.

Twenty-Ninth Embodiment

Figure 45A:
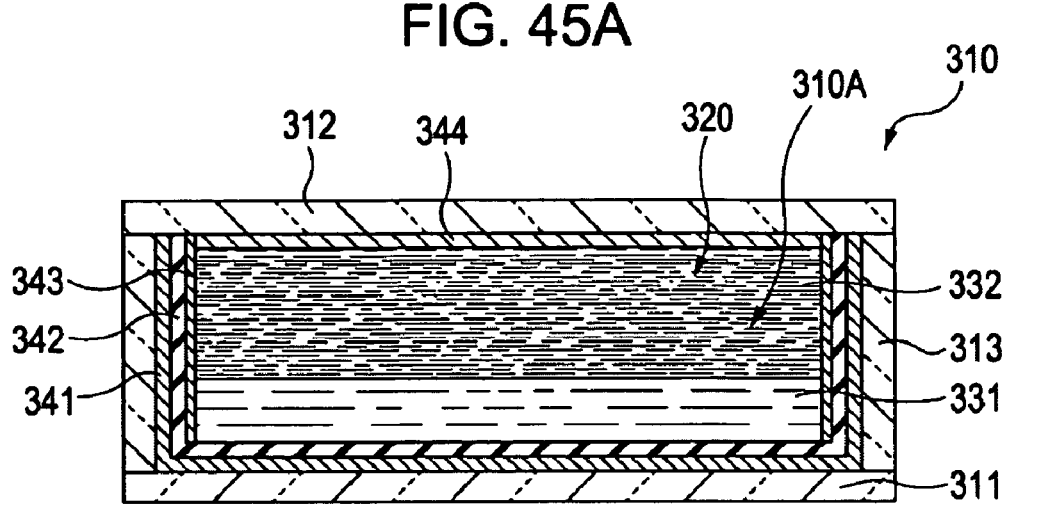
FIGS. 45A and 45B are schematic cross-sectional views illustrating a cutaway of an optical device according to a twenty-ninth embodiment at an X-Z plane, and a cutaway of the optical device according to the twenty-ninth embodiment at an X-Y plane.
Figure 45B:
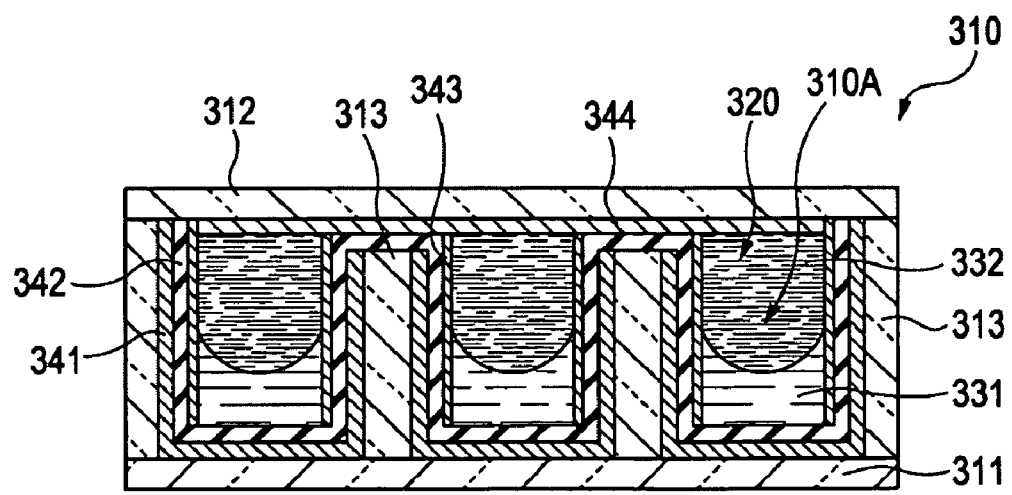

The twenty-ninth embodiment relates to the optical device having the third configuration, and specifically, relates to the optical device having the 3-1'st configuration. FIG. 45A illustrates a schematic cross-sectional view of a cutaway of the optical device according to the twenty-ninth embodiment at an X-Z plane, and FIG. 45B illustrates a schematic cross-sectional view of a cutaway of the optical device according to the twenty-ninth embodiment at an X-Y plane. Also, FIG. 46 schematically illustrates an array state of a cylindrical lens chamber. Note that, in the drawing, three cylindrical lenses are illustrated for the sake of simplification of the drawing, but the number of cylindrical lenses is not restricted to this.

The optical device according to the twenty-ninth embodiment is an optical device where multiple cylindrical lenses 320 each made up of a liquid lens are arrayed, including a housing 310 including (a) a first supporting member 311 transmissive to incident light (from the emission unit), (b) a second supporting member 312 transmissive to incident light (from the emission unit), facing the first supporting member 311, and (c) Multiple partition walls 313 disposed between the first supporting member 311 and the second supporting member 312.

Cylindrical lens chambers 310A are configured of the first supporting member 311, the second supporting member 312, and the partition walls 313, each of the cylindrical lens chambers 310A is occupied with a layered structure of first liquid 331 and second liquid 332 making up a liquid crystal lens, and the plane shape of each of the cylindrical lens chambers 310A is a rectangle with four rounded corners.

The above-mentioned configuration of the optical device is also true for later-described thirtieth through thirty-sixth embodiments.

With the optical device according to the twenty-ninth embodiment, a first electrode 341 adjacent to the first liquid 331 having insulation properties through an insulating film 342, and a second electrode 344 adjacent to the second liquid 332 having electroconductivity are disposed within each of the cylindrical lens chambers 310A. The first liquid 331 and second liquid 332 are insoluble and unmixed, and separated at the interface, and this interface makes up a lens face. The interface between the first liquid 331 and second liquid 332 is positioned on the side face of the partition walls 313. The above-mentioned configuration is also true for later-described thirtieth through thirty-sixth embodiments.

Further, with the optical device according to the twenty-ninth embodiment, the first electrode 341 is provided on the side face of the partition walls 313, and the second electrode 344 is disposed on the second supporting member 312. Note that the first electrode 341 extends onto the opposed face of the first supporting member 311 from on the side face of the partition walls 313. The above-mentioned configuration is also true for later-described thirtieth through thirty-second embodiments. Subsequently, the surface of the insulating film 342 has been subjected to water-repellent processing. Specifically, a water-repellent processing layer 343 is formed on the surface of the insulating film 342. Such a configuration is also true for later-described thirtieth through thirty-sixth embodiments. Note that a water-repellent processing layer may be formed on the entire area of the insulating film 342. This is also true for later-described thirtieth through thirty-sixth embodiments.

With the optical device according to the twenty-ninth embodiment, specifically, the first supporting member 311, second supporting member 312, and partition walls 313 are fabricated of glass or a resin such as an acrylic resin or the like. Also, the first liquid 331 and second liquid 332 are made of silicone oil and lithium-chloride solution. The water-repellent processing layer 343 is made up of polyparaxylylene or fluorine polymer, the insulating film 342 is made of metal oxides, such as polyparaxylylene, tantalum oxide, titanium oxide, or the like. Also, the first electrode 341 and second electrode 344 are made up of a transparent electrode made of ITO. Note that in a case wherein transparency is not indispensable for the electrodes, the electrodes may be made of a metal electrode such as gold, aluminum, copper, silver, or the like. The plane shape of the housing 310 is a square. The above-mentioned matters are true for later-described thirtieth through thirty-sixth embodiments as long as there is no notice otherwise in particular.

With the twenty-ninth embodiment, length $2a$ along an X-Z plane of the cylindrical lens 320, and length $2b$ along an X-Y plane have been set as follows.

$$2a = 4 \text{ mm}$$

$$2b = 1 \text{ mm}$$

Also, the number of cylindrical lenses 320 has been set as follows.

$$6 \times 6 = 36$$

Here, the "rounded" shape is an arc, and the radius $r_0$ of the "rounded" arc satisfies $r_0 = b$.

Figure 59A:
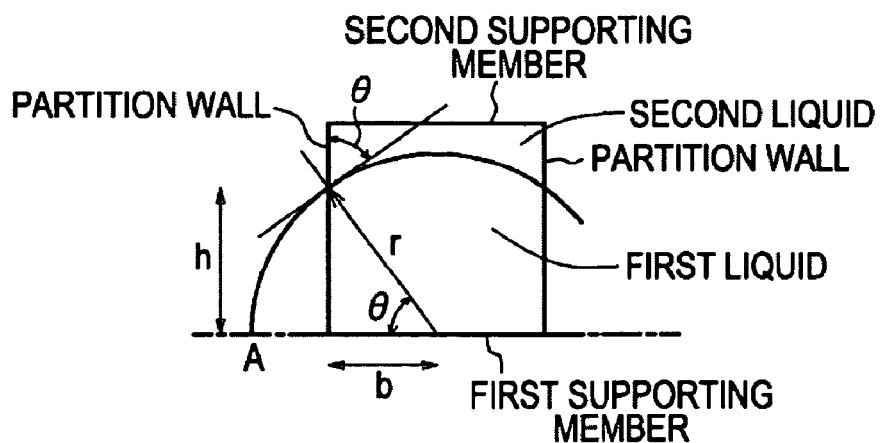
FIGS. 59A and 59B are a schematic cross-sectional view and plane view of a cylindrical chamber.
Figure 59B:
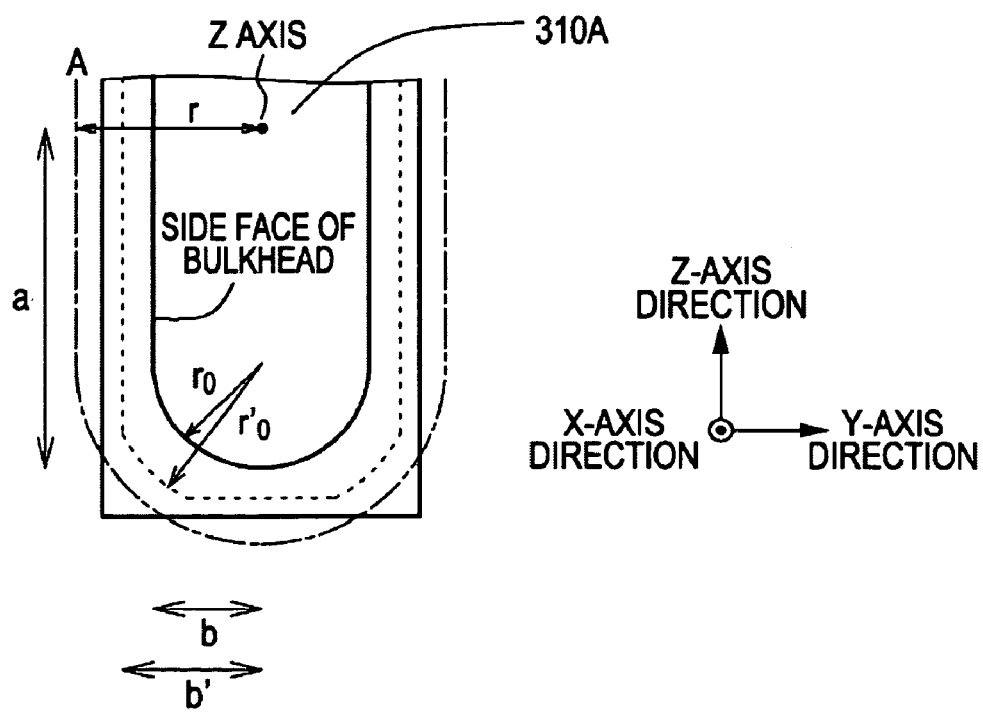
Figure 60A:
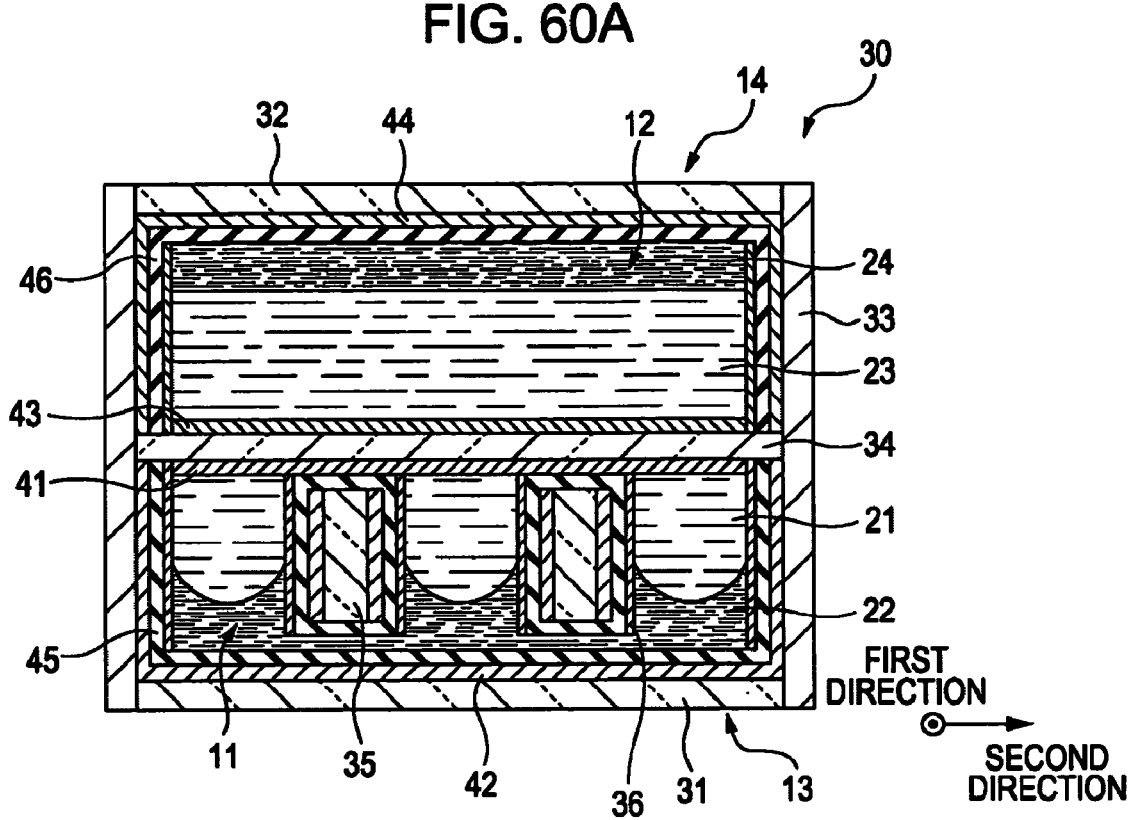
FIGS. 60A and 60B are schematic cross-sectional views illustrating a cutaway of a modification of the optical device according to the third embodiment at a virtual vertical plane in a second direction (direction parallel to the Y axis), and a cutaway of the modification of the optical device according to the third embodiment at a virtual vertical plane in a first direction (direction parallel to the Z axis)
Figure 60B:
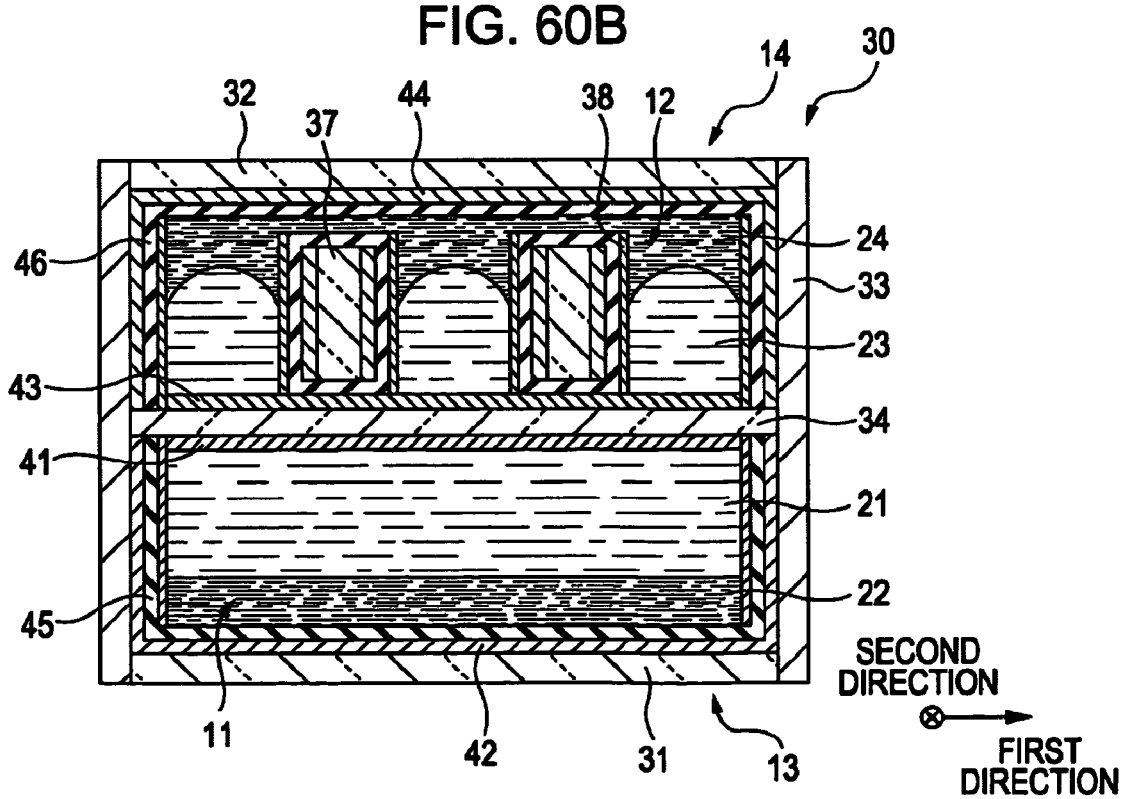
Figure 63A:
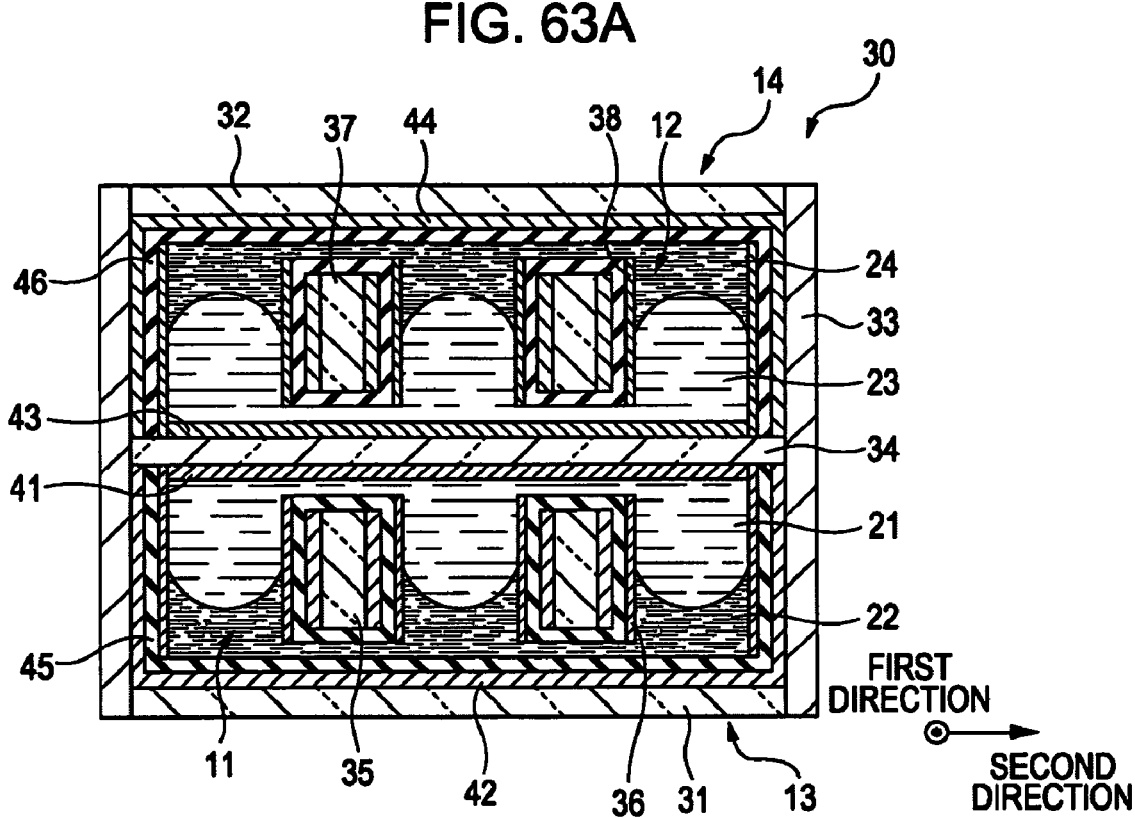
FIGS. 63A and 63B are schematic cross-sectional views illustrating a cutaway of another modification of the optical device according to the sixteenth embodiment at a virtual vertical plane in a second direction (direction parallel to the Y axis), and a cutaway of the other modification of the optical device according to the sixteenth embodiment at a virtual vertical plane in a first direction (direction parallel to the Z axis)
Figure 63B:
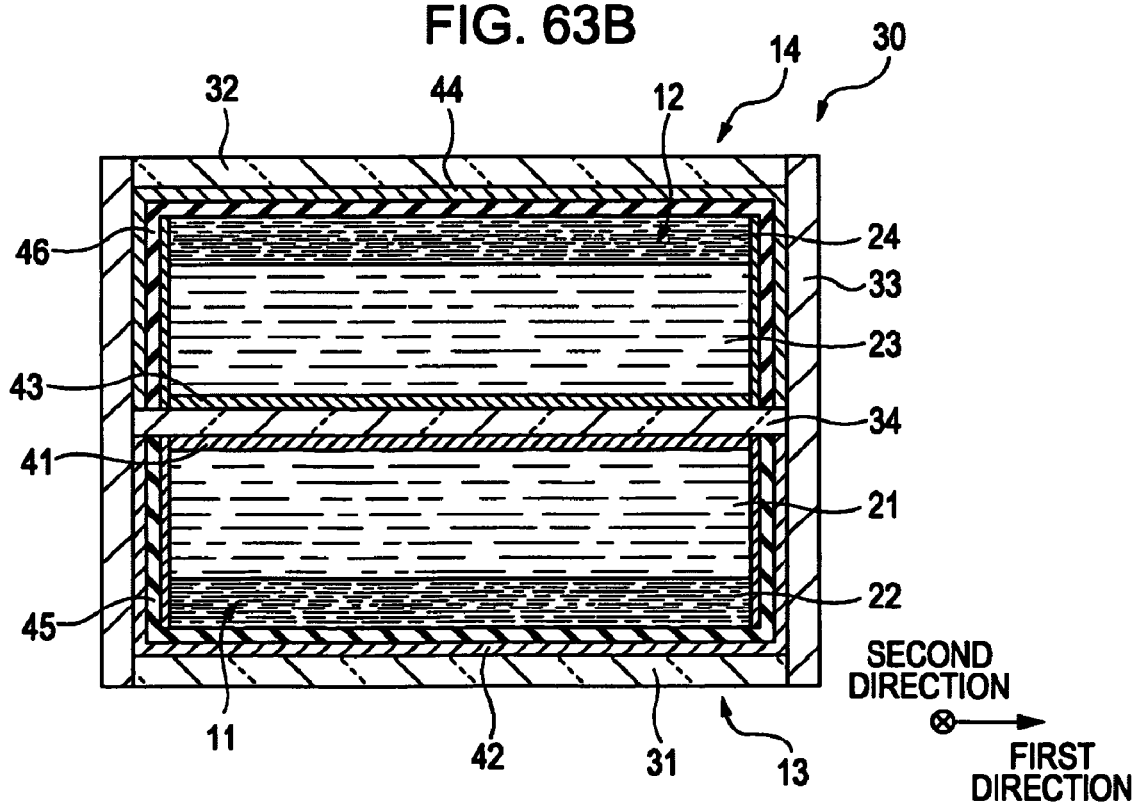
Figure 64A:
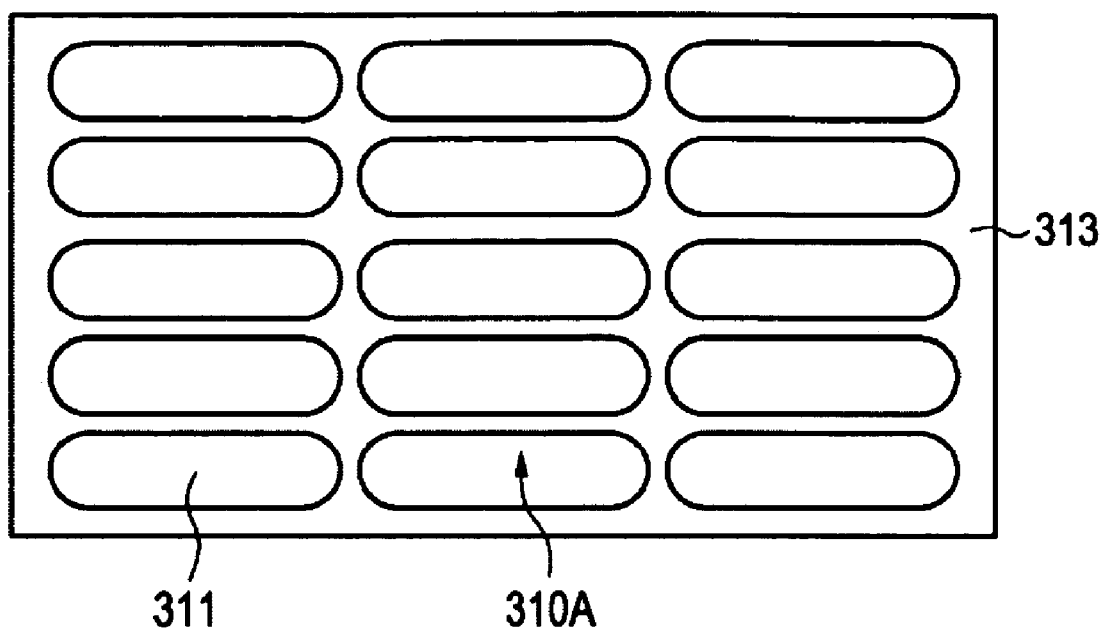
FIGS. 64A and 64B are schematic diagrams illustrating a modification of an array of cylindrical lenses.
Figure 64B:
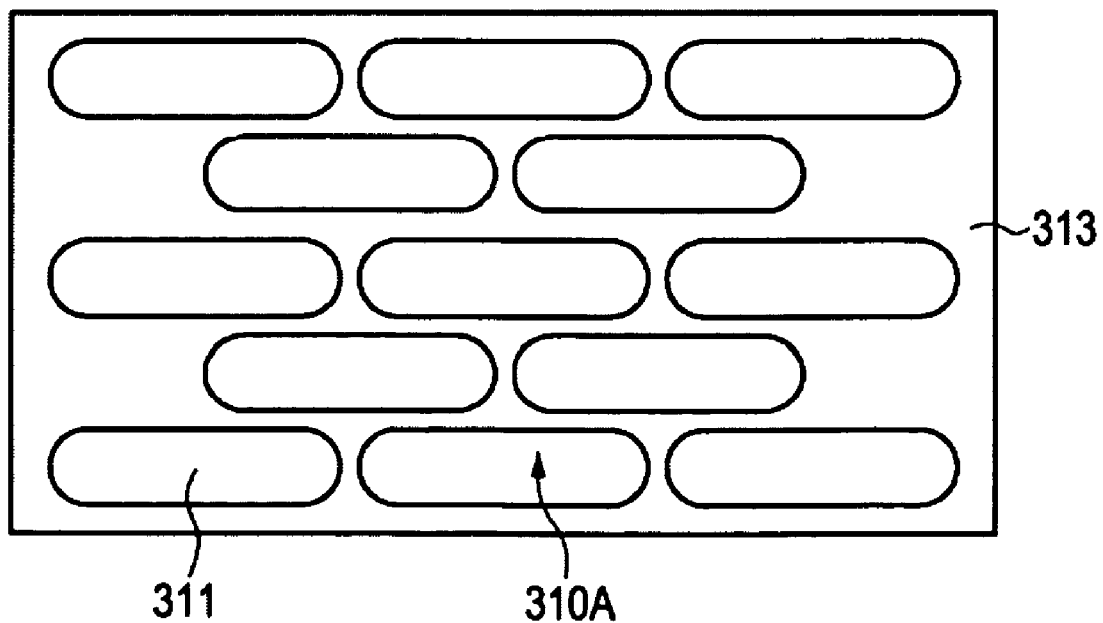
Figure 65A:
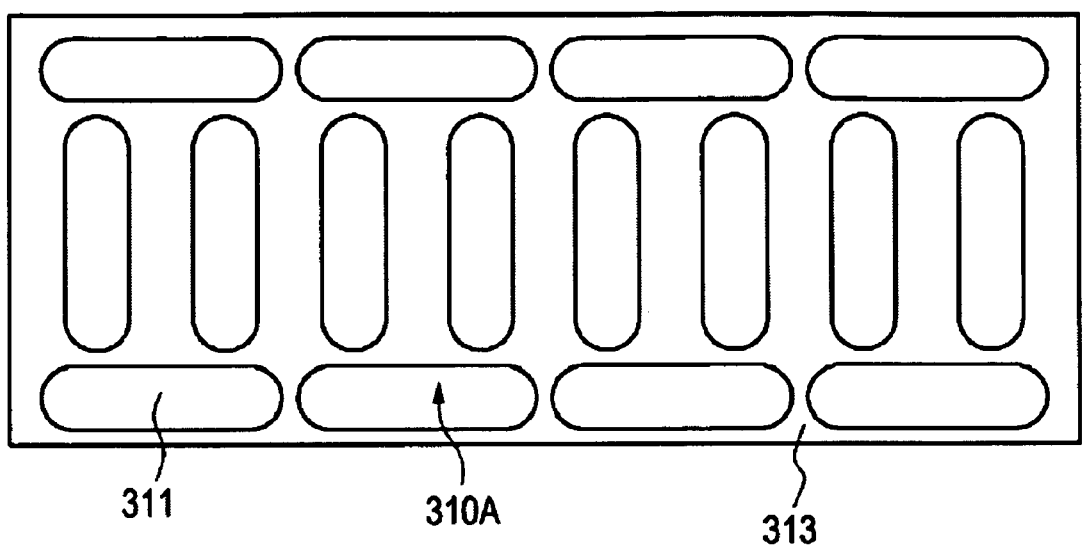
FIGS. 65A and 65B are schematic diagrams illustrating a modification of an array of cylindrical lenses.
Figure 65B:
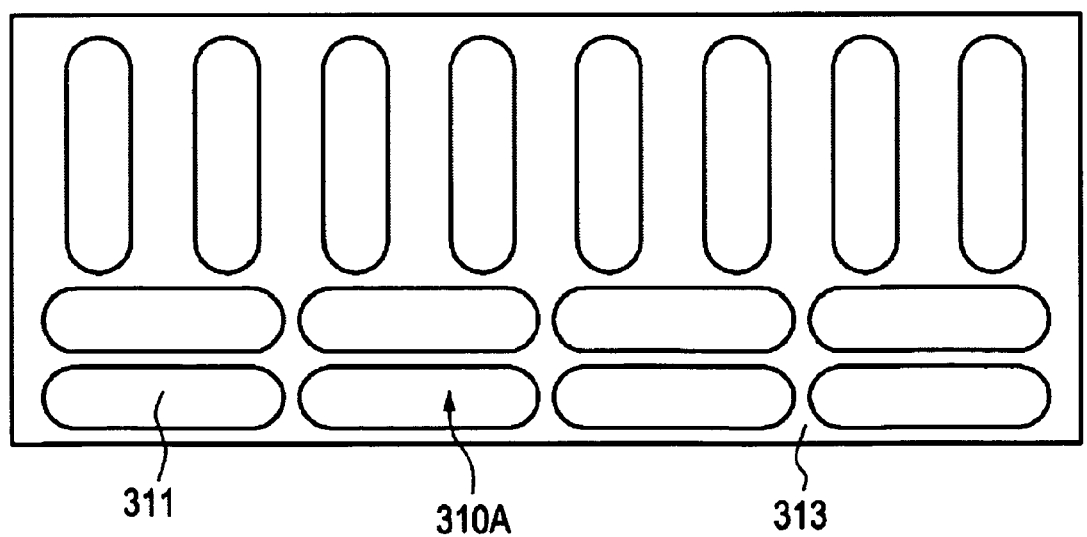
Figure 66A:
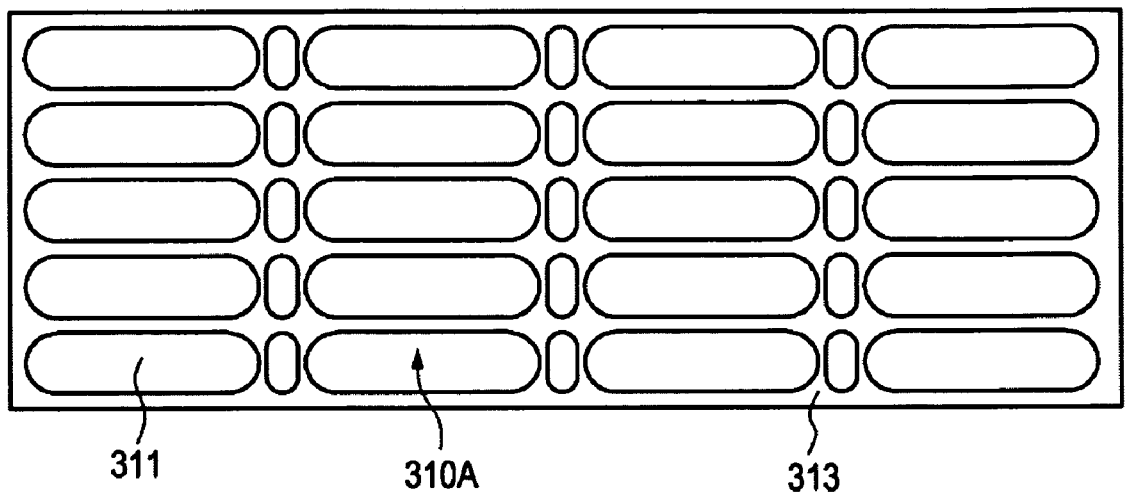
FIGS. 66A and 66B are schematic diagrams illustrating a modification of an array of cylindrical lenses.
Figure 66B:
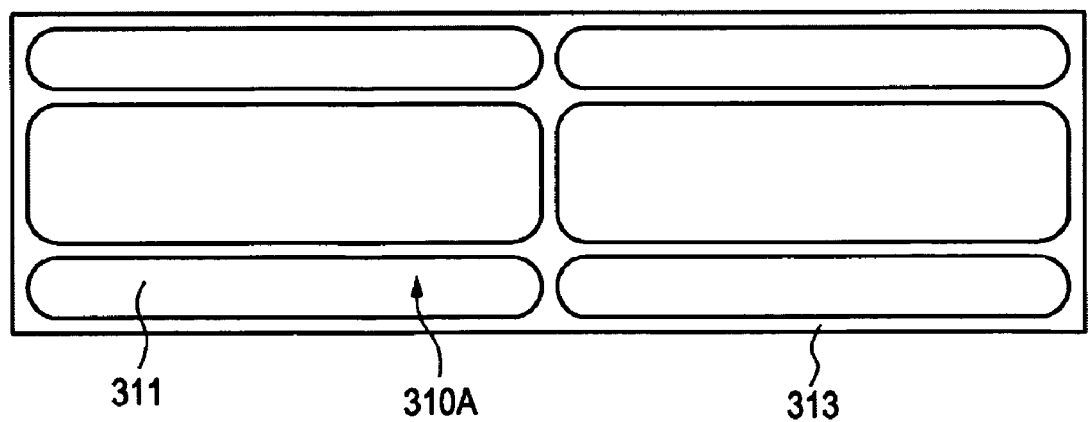
Figure 67A:
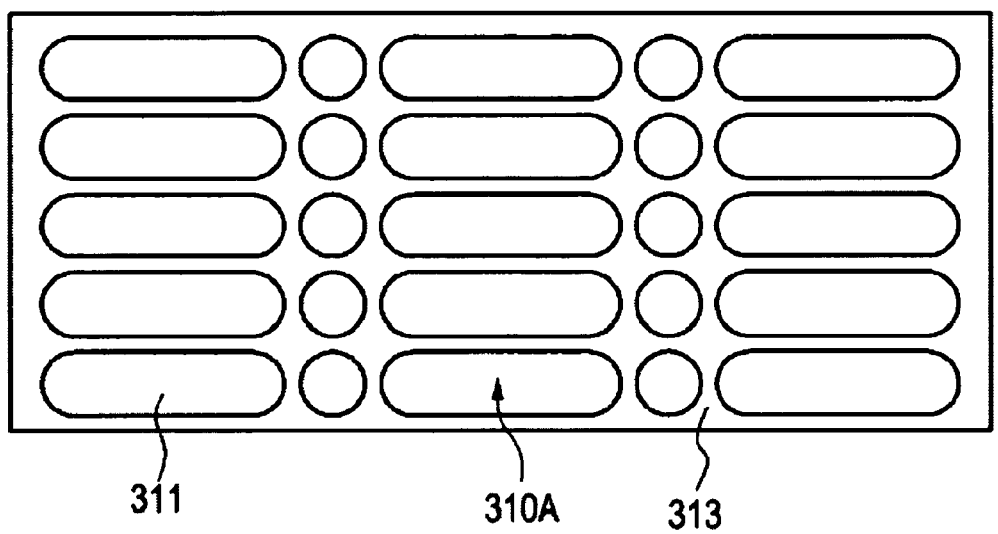
FIGS. 67A and 67B are schematic diagrams illustrating a modification of an array of cylindrical lenses.
Figure 67B:
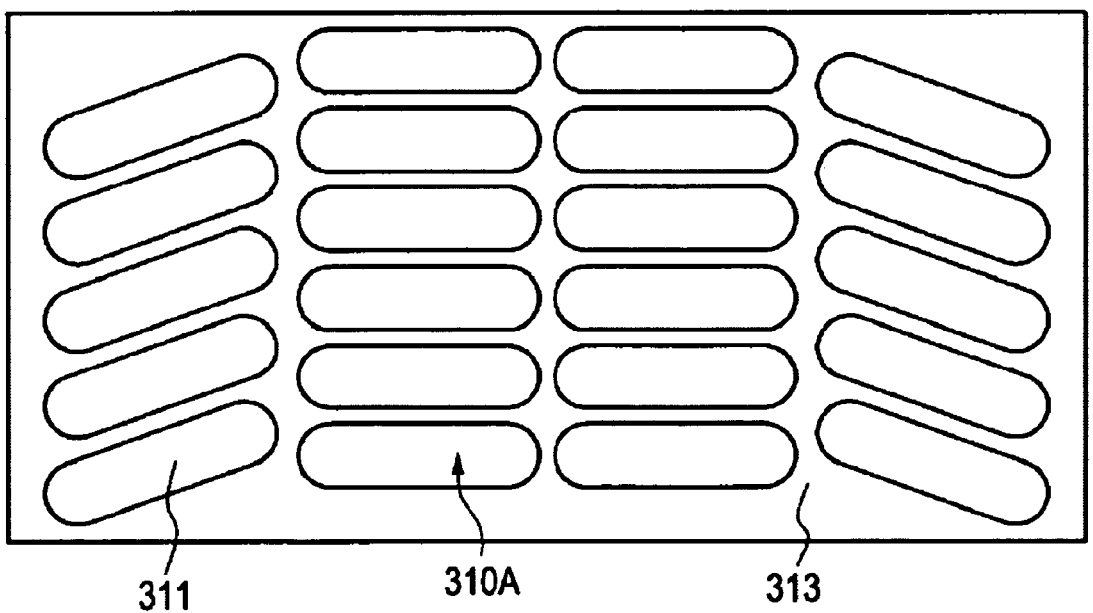
Figure 68A:
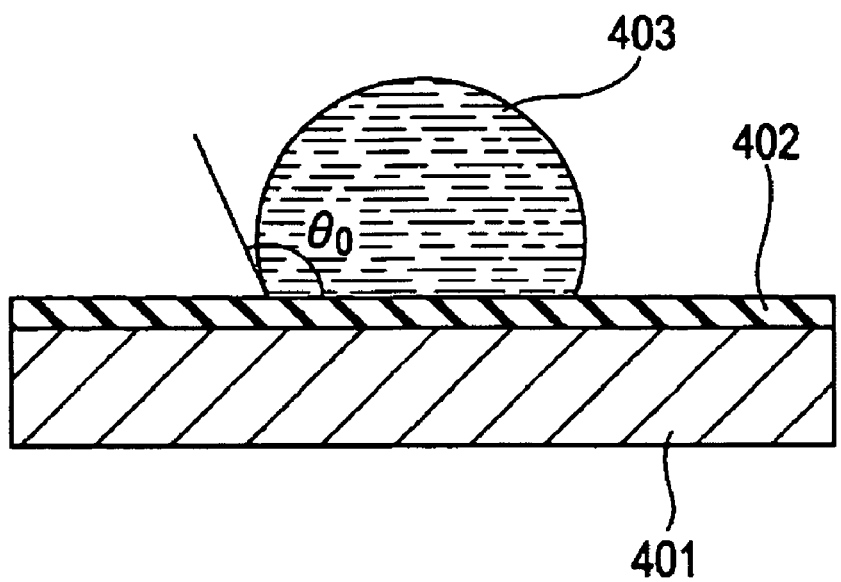
FIGS. 68A and 68B are principle diagrams for describing electrocapillarity.
Figure 68B:
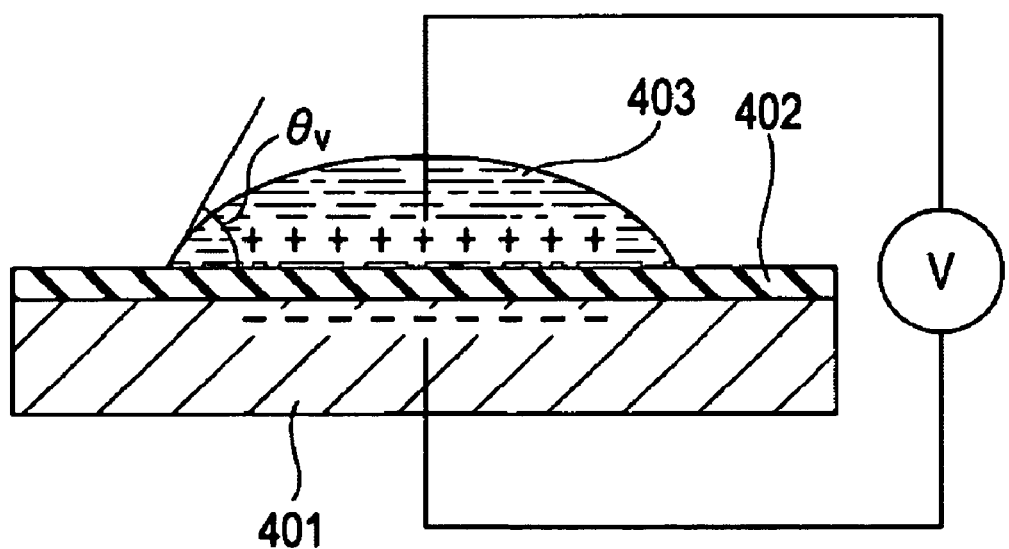

As shown in FIGS. 59A and 59B, let us say that the normal line of the first supporting member which passes through the center of the cylindrical lens chamber 310A is taken as the X axis, and the axis line of the cylindrical lens chamber which passes through the center of the cylindrical lens chamber 310A is taken as the Z axis. Now, when voltage is applied to the first electrode 341 and second electrode 344, and the cylindrical lens 320 exhibits the maximum optical power, the optical power of the cylindrical lens 320 on the X-Z plane (or plane parallel to the X-Z plane) is substantially zero, and the optical power of the cylindrical lens 320 on the X-Y plane exhibits a limited value. That is to say, as shown in FIG. 59A, let us say that when voltage is applied to the first electrode 341 and second electrode 344, and the cylindrical lens 320 exhibits the maximum optical power, an angle (contact angle) made up of the interface between the first liquid and second liquid on the side face of the partition walls on the X-Y plane, and the side face of the partition walls is $(180-\theta)$ degrees, and the height of the interface on the side face of the partition walls is h. Here, "r" is as defined with Expression (2), and the relation between the height h, length b, and r can be represented with Expression (3).

A dashed dotted line in FIG. 59B illustrates the trajectory a point "A" located in distance r from a center point when the center point is moved to (a-b) from the origin along the Z axis. Also, a solid line in FIG. 59B illustrates the trajectory a point located in distance b from the center point when the center point is moved to (a-b) from the origin along the Z axis, but this trajectory is identical to the side face of the partition walls 313. The value of $r_0$ may be set so as to satisfy the following relational expression in some cases.

$$b \leq r_0 \leq (b^2 + h^2)^{1/2}$$

In FIG. 59B, a dotted line illustrates $r_0$ according to the rounded portion as the trajectory of $r'_0$, but the length along an X-Y plane of the cylindrical lens 320 is $2b'$, and $b' < r'_0$ holds.

An arrangement and configuration are made wherein the first electrode 341 and second electrode 344 are connected to an external control circuit through an unshown connection unit, and desired voltage is applied thereto. Subsequently, upon voltage being applied between the first electrode 341 and the second electrode 344, a lens face made up of the interface between the first liquid 331 and the second liquid 332 is changed from the state protruding downward shown in FIGS. 45A and 45B to a state protruding upward. The change state of the lens face varies depending on voltage being applied to the electrodes (see Expression (A)). Thus, with the optical device according to the twenty-ninth embodiment, optical power at the cylindrical lens 320 independently varies, whereby the focal distance of the cylindrical lens 320 can vary, and consequently, a strobe device of which the illuminating angle varies from the wide angle side to the telephoto side can be provided. This is true for later-described thirtieth through thirty-second embodiments.

Thirtieth Embodiment

Figure 47A:
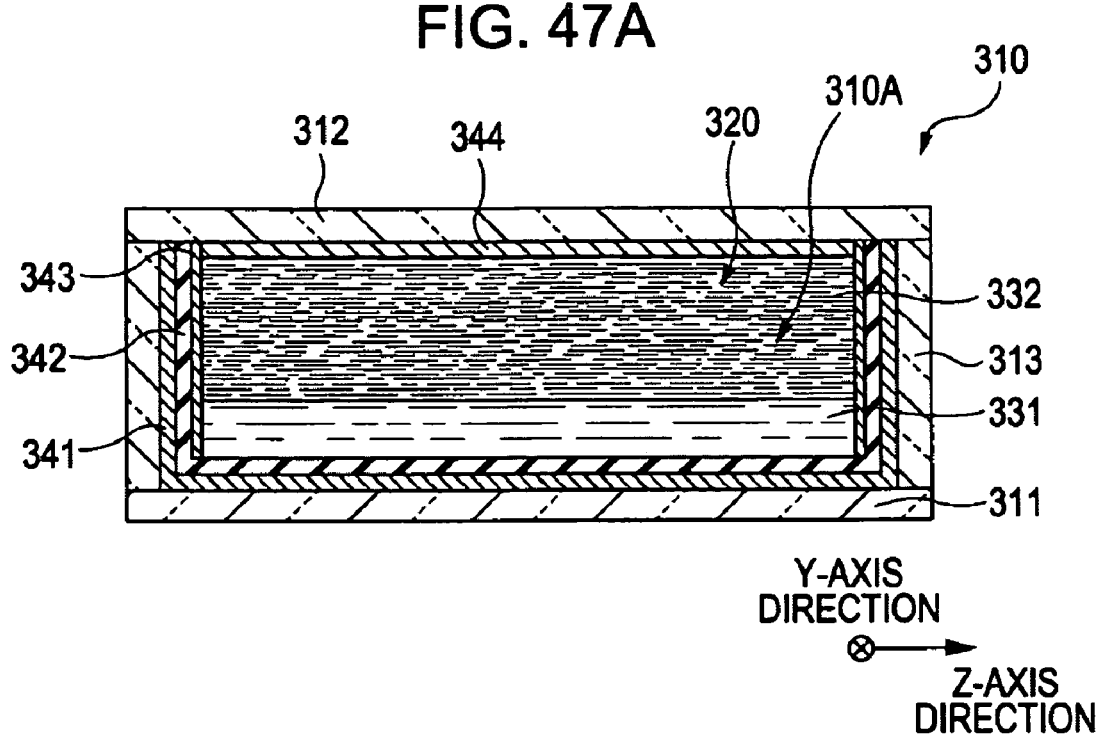
FIGS. 47A and 47B are schematic cross-sectional views illustrating a cutaway of an optical device according to a thirtieth embodiment at an X-Z plane, and a cutaway of the optical device according to the thirtieth embodiment at an X-Y plane.
Figure 47B:
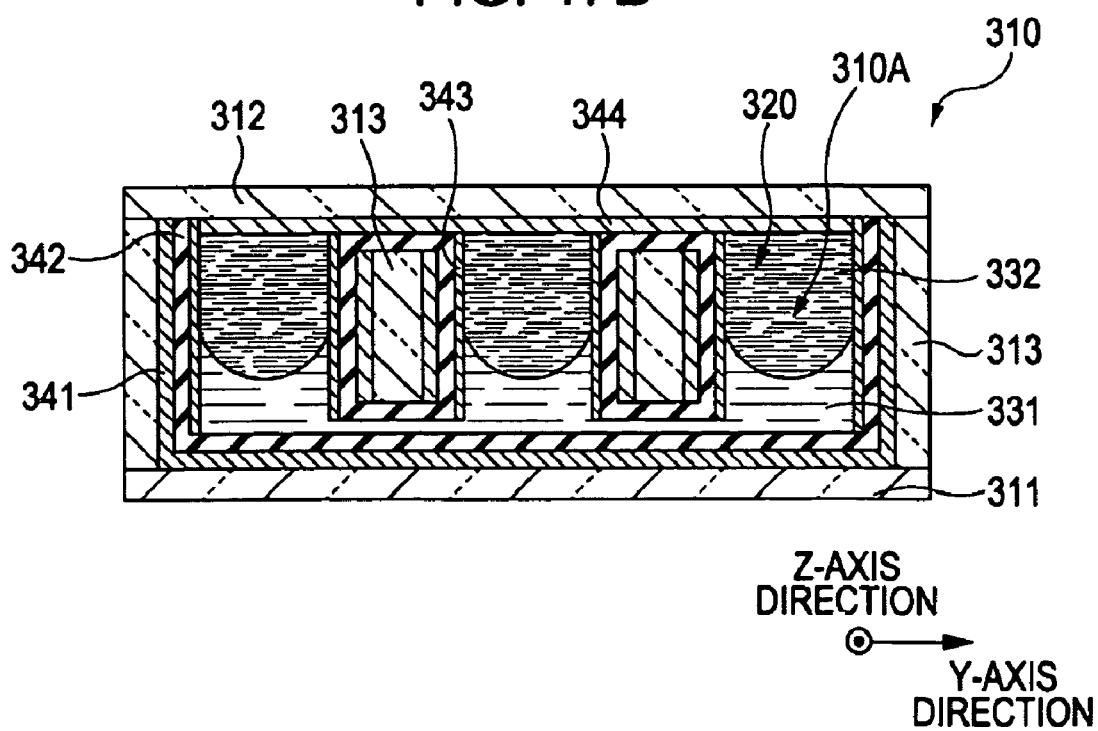

The thirtieth embodiment is a modification of the twenty-ninth embodiment. FIG. 47A illustrates a schematic cross-sectional view of a cutaway of the optical device according to the thirtieth embodiment at an X-Z plane, and FIG. 47B illustrates a schematic cross-sectional view of a cutaway of the optical device according to the thirtieth embodiment at an X-Y plane.

With the optical device according to the twenty-ninth embodiment, the partition walls 313 partitioning the cylindrical lens chambers 310A extends from the first supporting member 311 to the second supporting member 312.

On the other hand, with the optical device according to the thirtieth embodiment, the partition walls 313 partitioning the cylindrical lens chambers 310A extends from the second supporting member 312 to the first supporting member 311, but there is a gap between the top of the partition walls 313 and the first supporting member 311. The arrangement and configuration of the optical device according to the thirtieth embodiment can be regarded as the same as those of the optical device according to the twenty-ninth embodiment except for the above-mentioned point, so the detailed description thereof will be omitted.

Thirty-First Embodiment

Figure 48A:
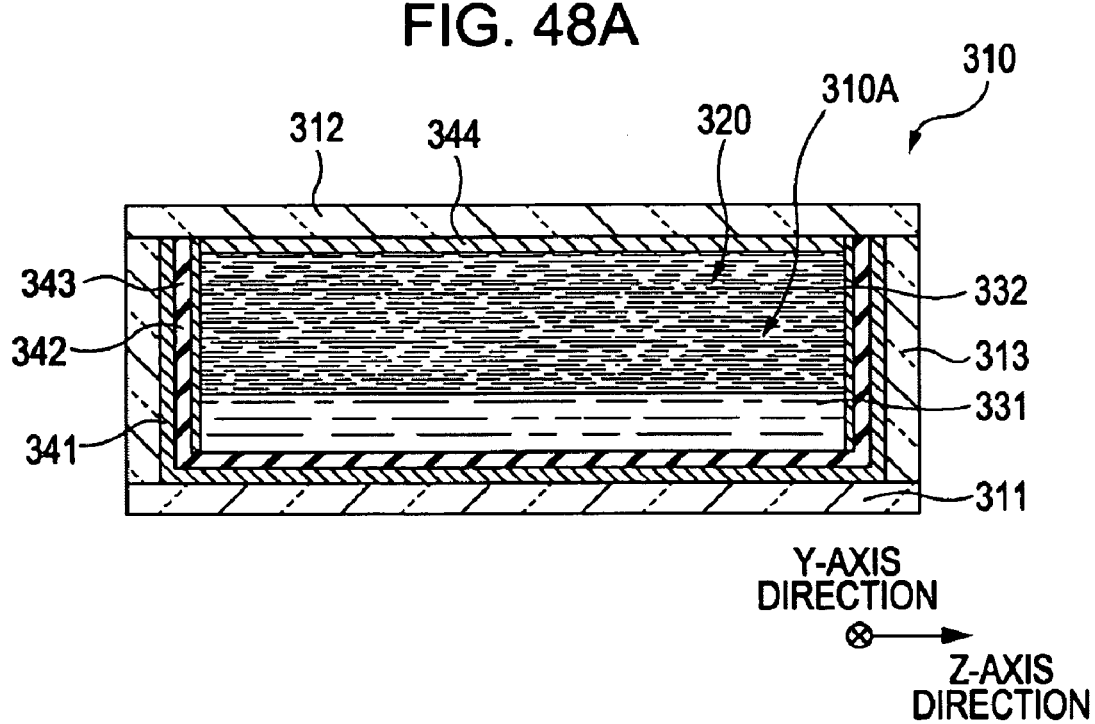
FIGS. 48A and 48B are schematic cross-sectional views illustrating a cutaway of an optical device according to a thirty-first embodiment at an X-Z plane, and a cutaway of the optical device according to the thirty-first embodiment at an X-Y plane.
Figure 48B:
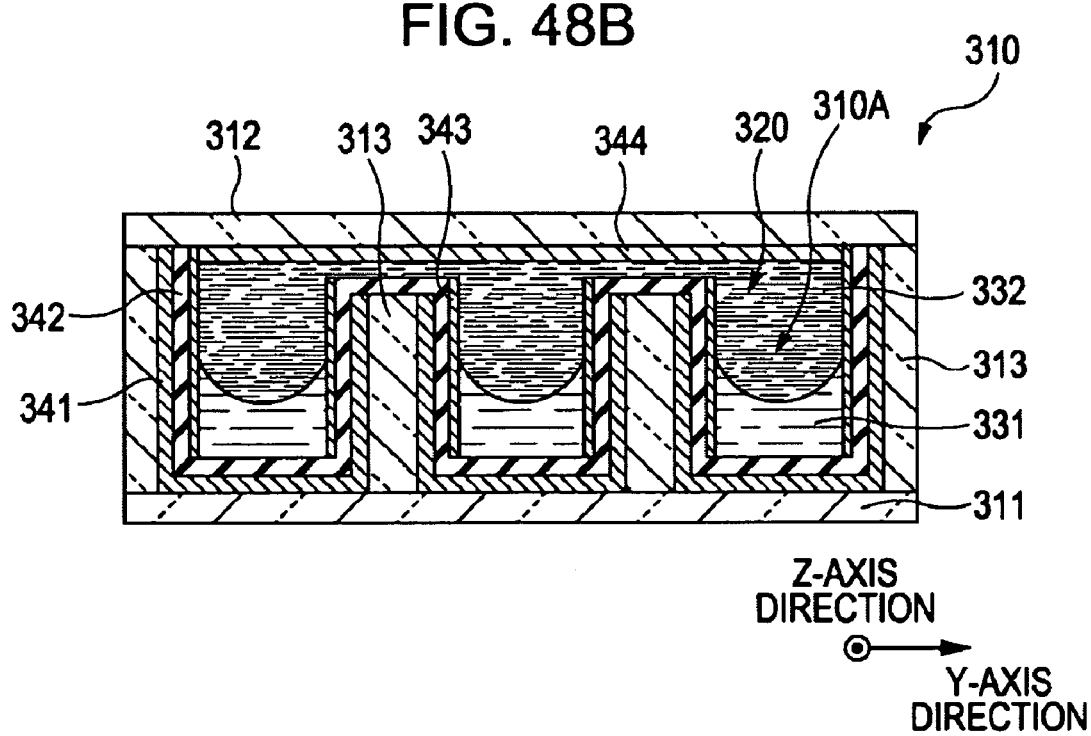

The thirty-first embodiment is also a modification of the twenty-ninth embodiment. FIG. 48A illustrates a schematic cross-sectional view of a cutaway of the optical device according to the thirty-first embodiment at an X-Z plane, and FIG. 48B illustrates a schematic cross-sectional view of a cutaway of the optical device according to the thirty-first embodiment at an X-Y plane.

With the optical device according to the thirty-first embodiment, the partition walls 313 partitioning the cylindrical lens chambers 310A extends from the first supporting member 311 to the second supporting member 312, and there is a gap between the top of the partition walls 313 and the second supporting member 312. The arrangement and configuration of the optical device according to the thirty-first embodiment can be regarded as the same as those of the optical device according to the twenty-ninth embodiment except for the above-mentioned point, so the detailed description thereof will be omitted.

Thirty-Second Embodiment

Figure 49A:
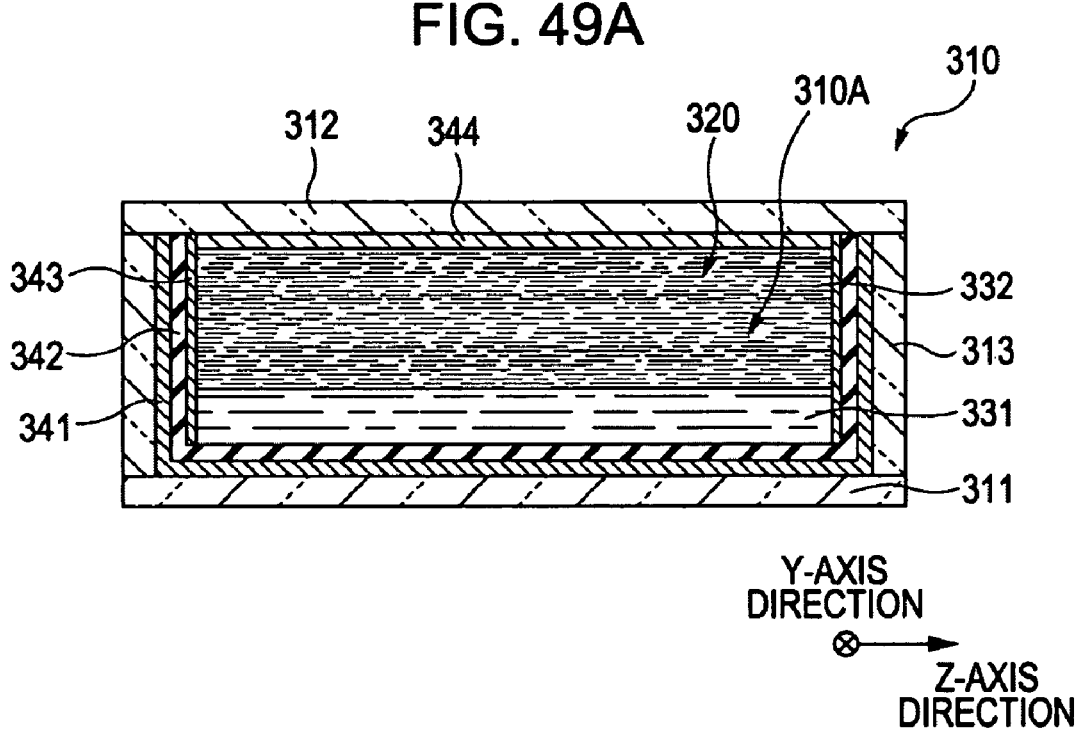
FIGS. 49A and 49B are schematic cross-sectional views illustrating a cutaway of an optical device according to a thirty-second embodiment at an X-Z plane, and a cutaway of the optical device according to the thirty-second embodiment at an X-Y plane.
Figure 49B:
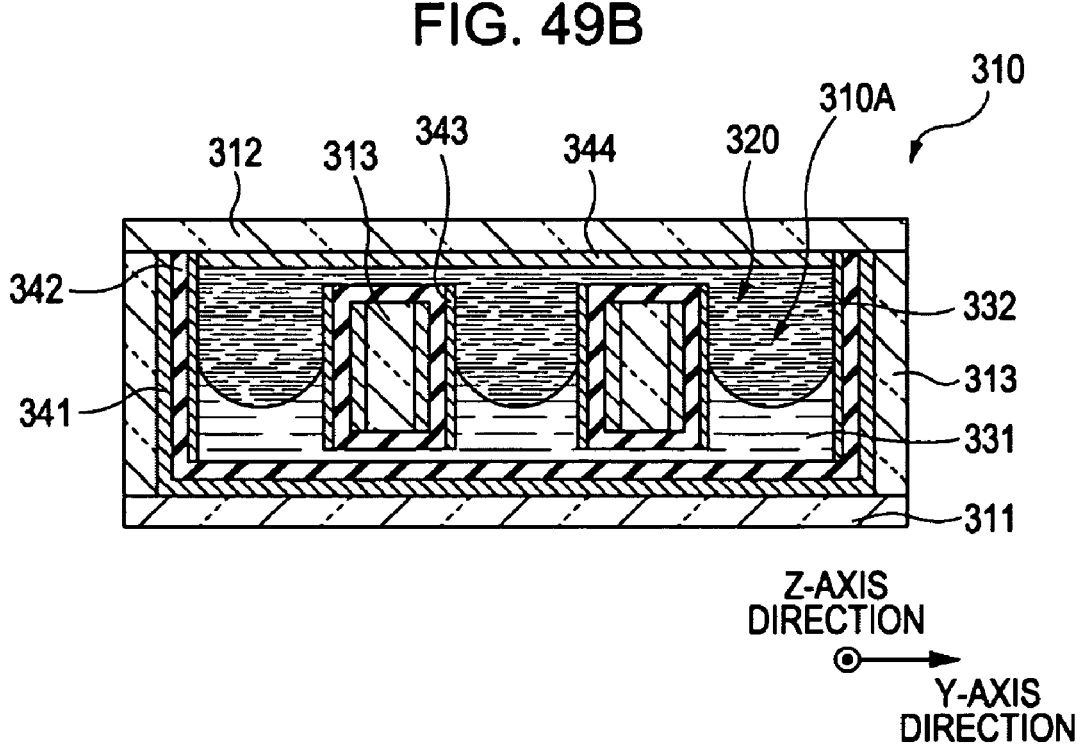

The thirty-second embodiment is also a modification of the twenty-ninth embodiment. FIG. 49A illustrates a schematic cross-sectional view of a cutaway of the optical device according to the thirty-second embodiment at an X-Z plane, and FIG. 49B illustrates a schematic cross-sectional view of a cutaway of the optical device according to the thirty-second embodiment at an X-Y plane.

With the optical device according to the thirty-second embodiment, there is a gap between the bottom face of the partition walls 313 partitioning the cylindrical lens chambers 310A and the first supporting member 311, and there is a gap between the top of the partition walls 313 and the second supporting member 312. The arrangement and configuration of the optical device according to the thirty-second embodiment can be regarded as the same as those of the optical device according to the twenty-ninth embodiment except for the above-mentioned point, so the detailed description thereof will be omitted.

Thirty-Third Embodiment

Figure 50A:
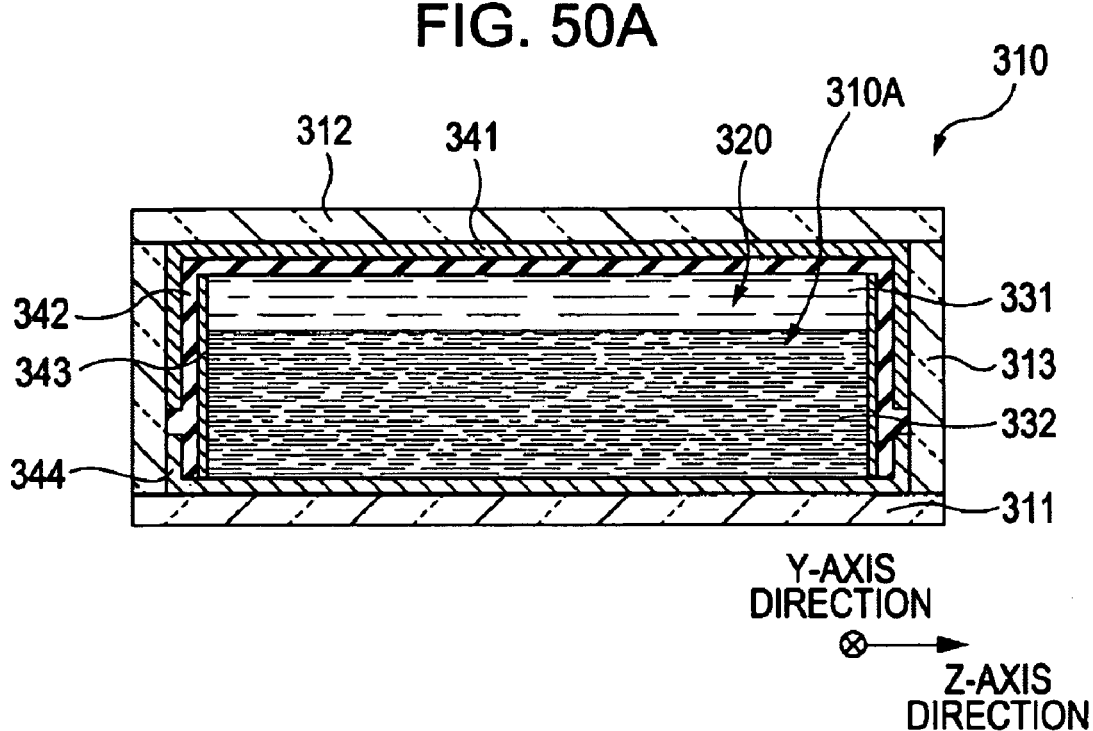
FIGS. 50A and 50B are schematic cross-sectional views illustrating a cutaway of an optical device according to a thirty-third embodiment at an X-Z plane, and a cutaway of the optical device according to the thirty-third embodiment at an X-Y plane.
Figure 50B:
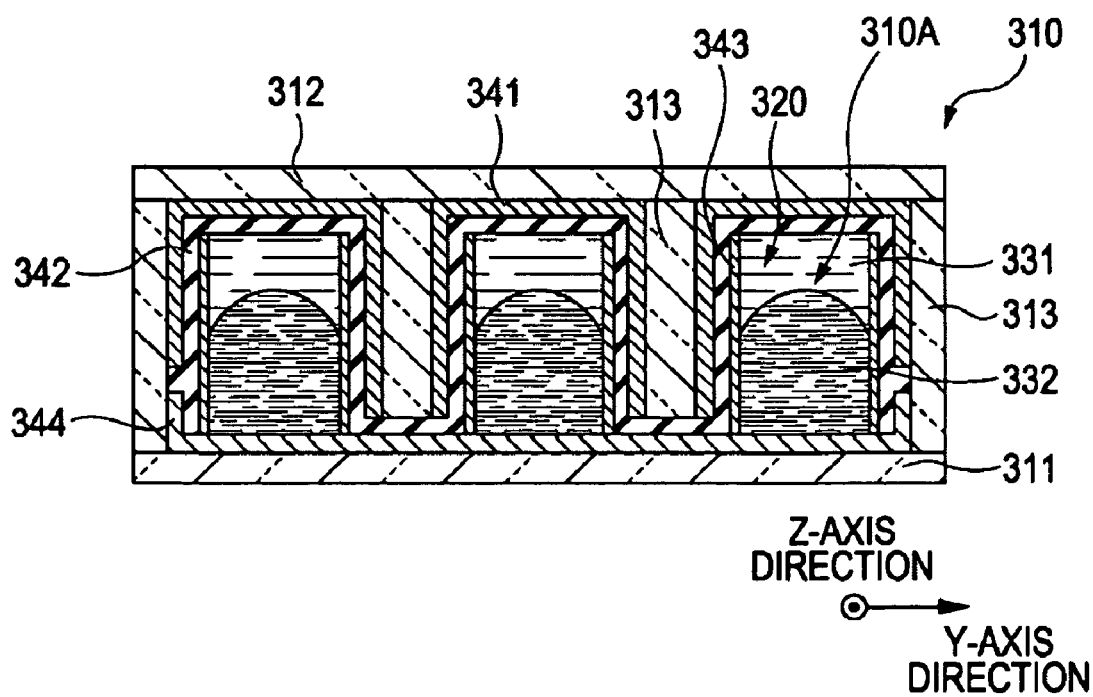

The thirty-third embodiment is also a modification of the twenty-ninth embodiment, and specifically, relates to the optical device having the 3-2'nd configuration. A point wherein the optical device according to the thirty-third embodiment differs from the optical device according to the twenty-ninth embodiment is that the layout of the first liquid 331 and second liquid 332 and the layout of the first electrode 341 and second electrode 344 are inverted vertically. FIG. 50A illustrates a schematic cross-sectional view of a cutaway of the optical device according to the thirty-third embodiment at an X-Z plane, and FIG. 50B illustrates a schematic cross-sectional view of a cutaway of the optical device according to the thirty-third embodiment at an X-Y plane. The first electrode 341 is disposed extending onto the second supporting member 312 from on the side face of the partition walls 313, and the second electrode 344 is disposed extending onto the first supporting member 311. Note that, with the example shown in FIGS. 50A and 50B, the second electrode 344 extends to the side face of a part of the partition walls 313, but the second electrode 344 may be disposed only on the opposed face of the first supporting member 311. The arrangement and configuration of the optical device according to the thirty-third embodiment can be regarded as the same as those of the optical device according to the twenty-ninth embodiment except for the above-mentioned point, so the detailed description thereof will be omitted.

With the thirty-third embodiment as well, an arrangement and configuration are made wherein the first electrode 341 and second electrode 344 are connected to an external control circuit through an unshown connection unit, and desired voltage is applied thereto. Subsequently, upon voltage being applied between the first electrode 341 and the second electrode 344, a lens face made up of the interface between the first liquid 331 and the second liquid 332 is changed from the state protruding upward shown in FIGS. 50A and 50B to a state protruding downward. The change state of the lens face varies depending on voltage being applied to the electrodes (see Expression (A)). Thus, with the optical device according to the thirty-third embodiment, optical power at the cylindrical lens 320 independently varies, whereby the focal distance of the cylindrical lens 320 can vary, and consequently, a strobe device of which the illuminating angle varies from the wide angle side to the telephoto side can be provided. This is true for later-described thirty-fourth through thirty-sixth embodiments.

Thirty-Fourth Embodiment

Figure 51A:
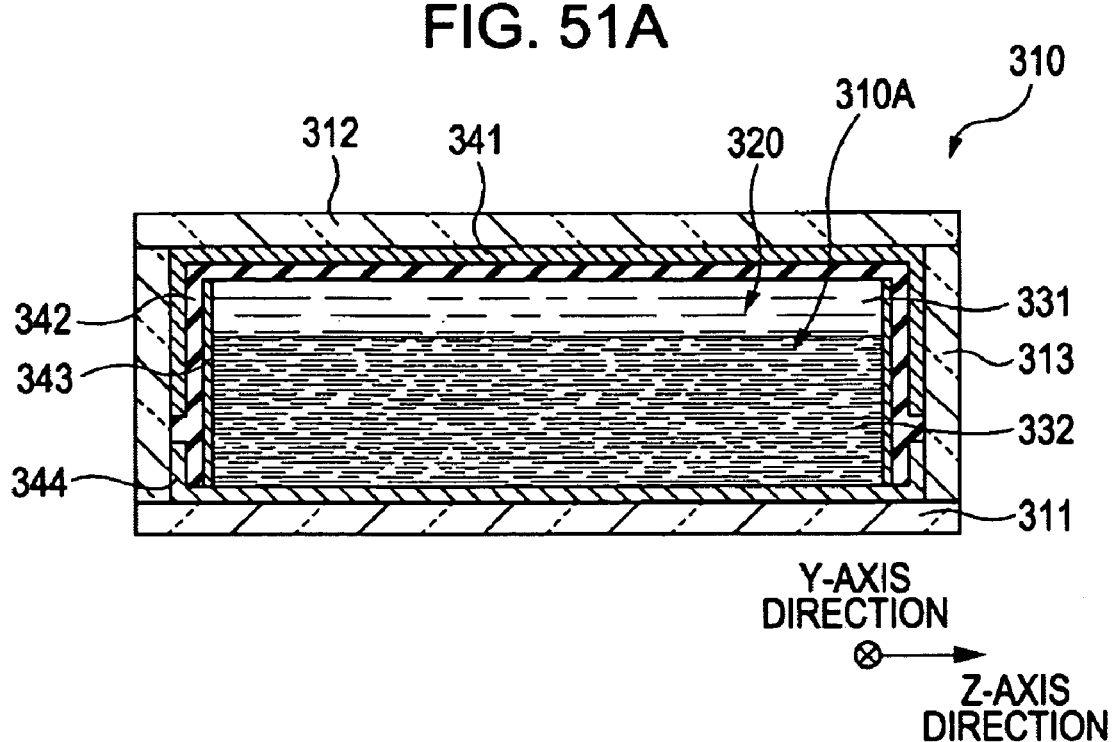
FIGS. 51A and 51B are schematic cross-sectional views illustrating a cutaway of an optical device according to a thirty-fourth embodiment at an X-Z plane, and a cutaway of the optical device according to the thirty-fourth embodiment at an X-Y plane.
Figure 51B:
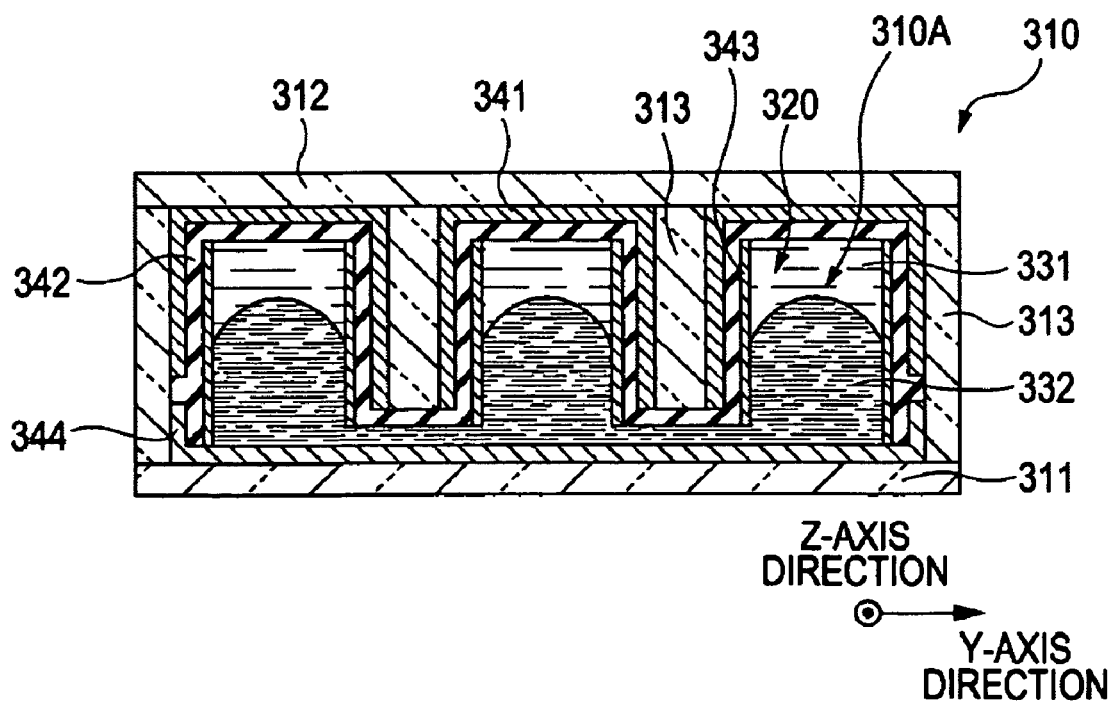

The thirty-fourth embodiment is a modification of the thirtieth embodiment, and specifically, relates to the optical device having the 3-2'nd configuration. A point wherein the optical device according to the thirty-fourth embodiment differs from the optical device according to the thirtieth embodiment is that the layout of the first liquid 331 and second liquid 332 and the layout of the first electrode 341 and second electrode 344 are inverted vertically. FIG. 51A illustrates a schematic cross-sectional view of a cutaway of the optical device according to the thirty-fourth embodiment at an X-Z plane, and FIG. 51B illustrates a schematic cross-sectional view of a cutaway of the optical device according to the thirty-fourth embodiment at an X-Y plane. The first electrode 341 is disposed extending onto the second supporting member 312 from on the side face of the partition walls 313, and the second electrode 344 is disposed extending onto the first supporting member 311. Note that, with the example shown in FIGS. 51A and 51B, the second electrode 344 extends to the side face of a part of the partition walls 313, but the second electrode 344 may be disposed only on the opposed face of the first supporting member 311.

Figure 52A:
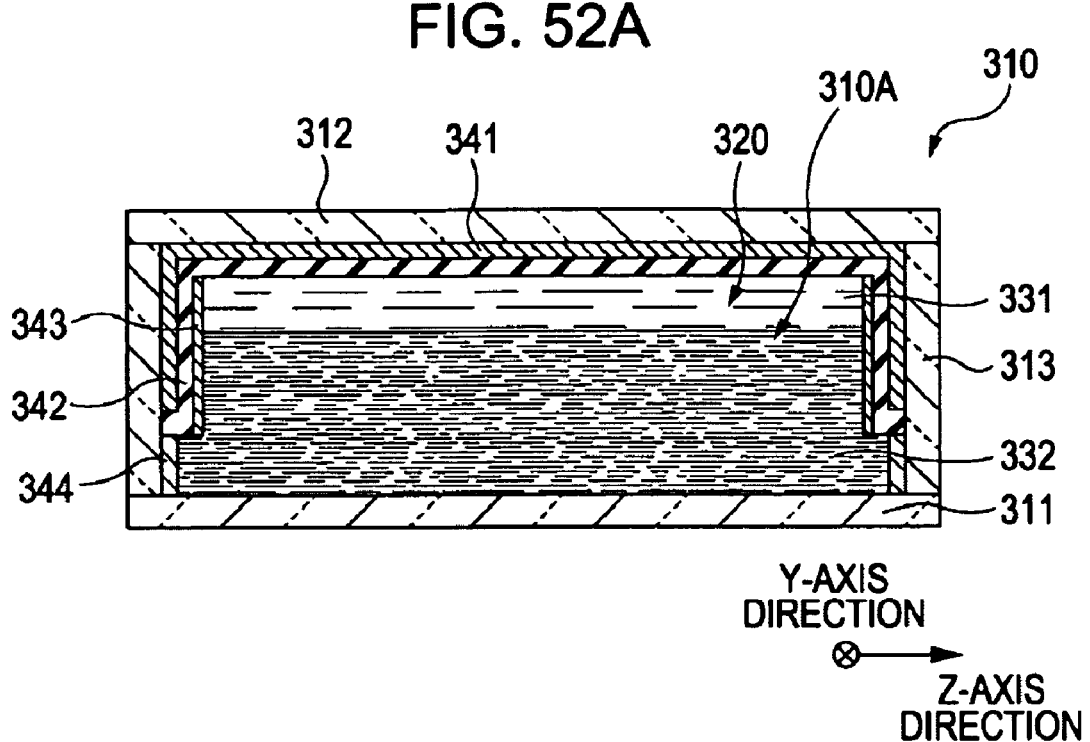
FIGS. 52A and 52B are schematic cross-sectional views illustrating a cutaway of a modification of the optical device according to the thirty-fourth embodiment at an X-Z plane, and a cutaway of the modification of the optical device according to the thirty-fourth embodiment at an X-Y plane.
Figure 52B:
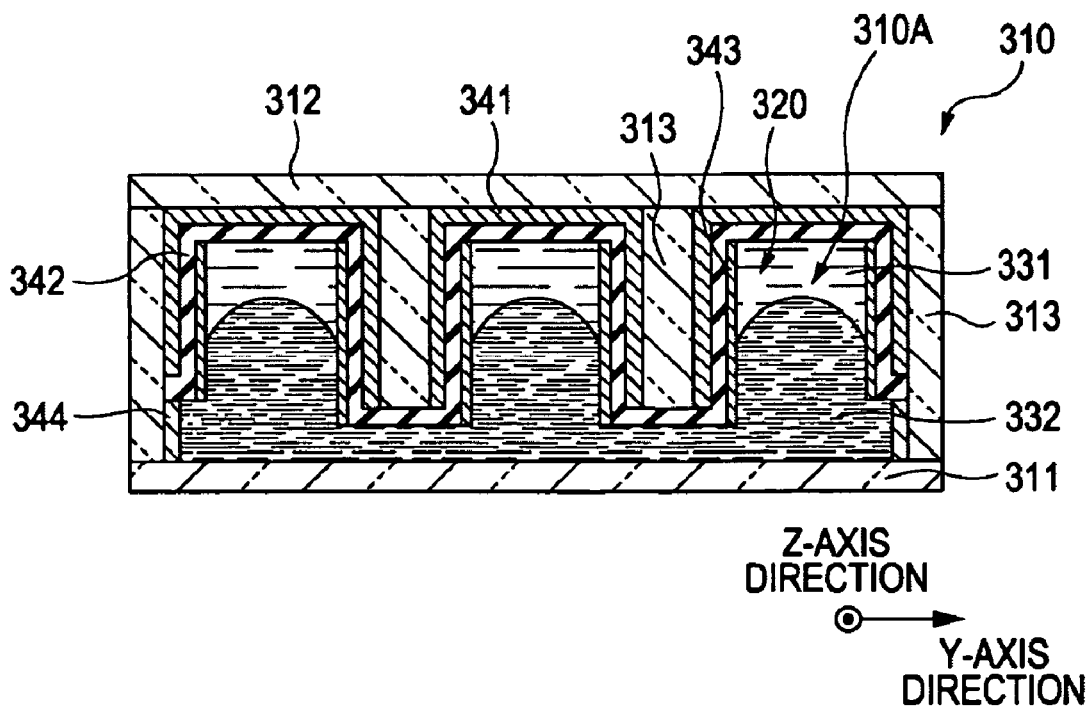

Also, with the modification of the optical device according to the thirty-fourth embodiment of which the schematic cross-sectional view when being cut away at an X-Z plane is shown in FIG. 52A, and of which the schematic cross-sectional view when being cut away at an X-Y plane is shown in FIG. 52B, the second electrode 344 is formed only on the side face of a part of the partition walls 313. Such an arrangement is employed, whereby the electrodes disposed on the optical path can be reduced, and also improvement in optical transmittance can be realized.

The arrangement and configuration of the optical device according to the thirty-fourth embodiment can be regarded as the same as those of the optical device according to the thirtieth embodiment except for the above-mentioned point, so the detailed description thereof will be omitted.

Thirty-Fifth Embodiment

Figure 53A:
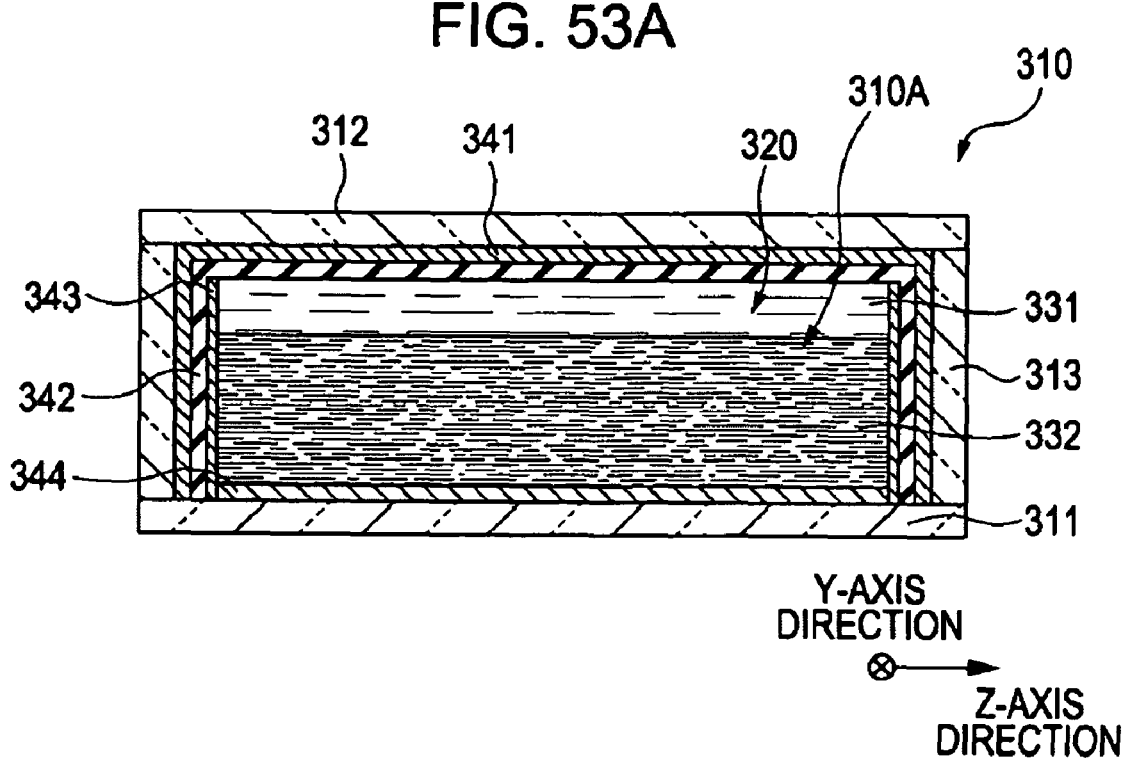
FIGS. 53A and 53B are schematic cross-sectional views illustrating a cutaway of an optical device according to a thirty-fifth embodiment at an X-Z plane, and a cutaway of the optical device according to the thirty-fifth embodiment at an X-Y plane.
Figure 53B:
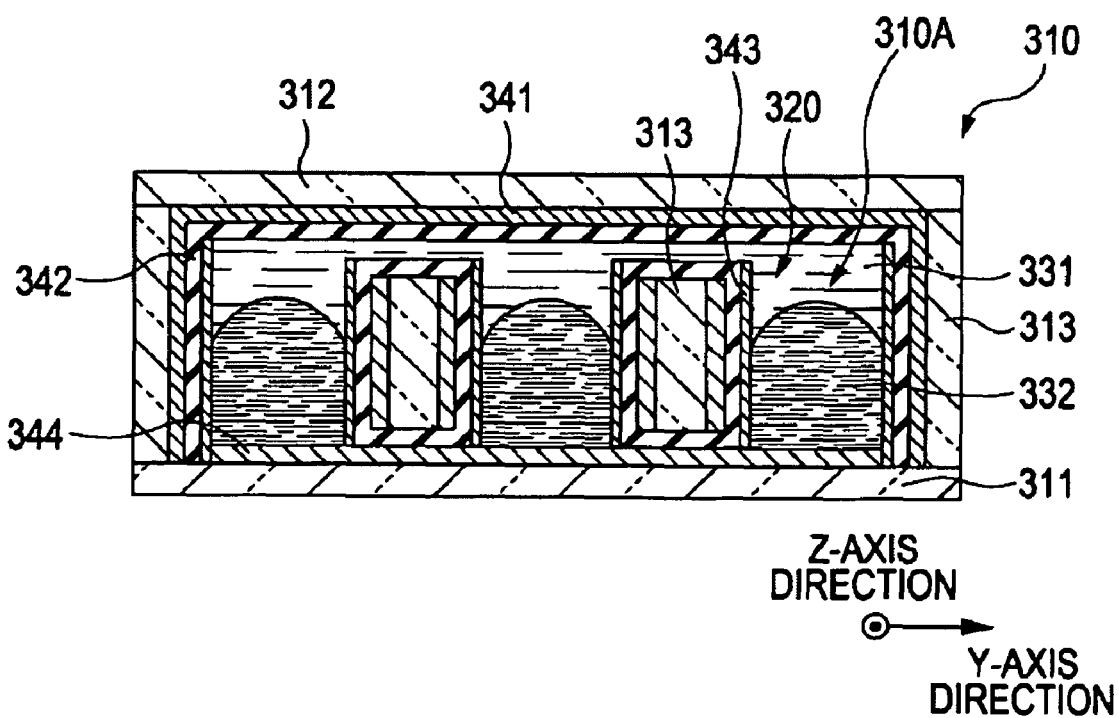
Figure 54A:
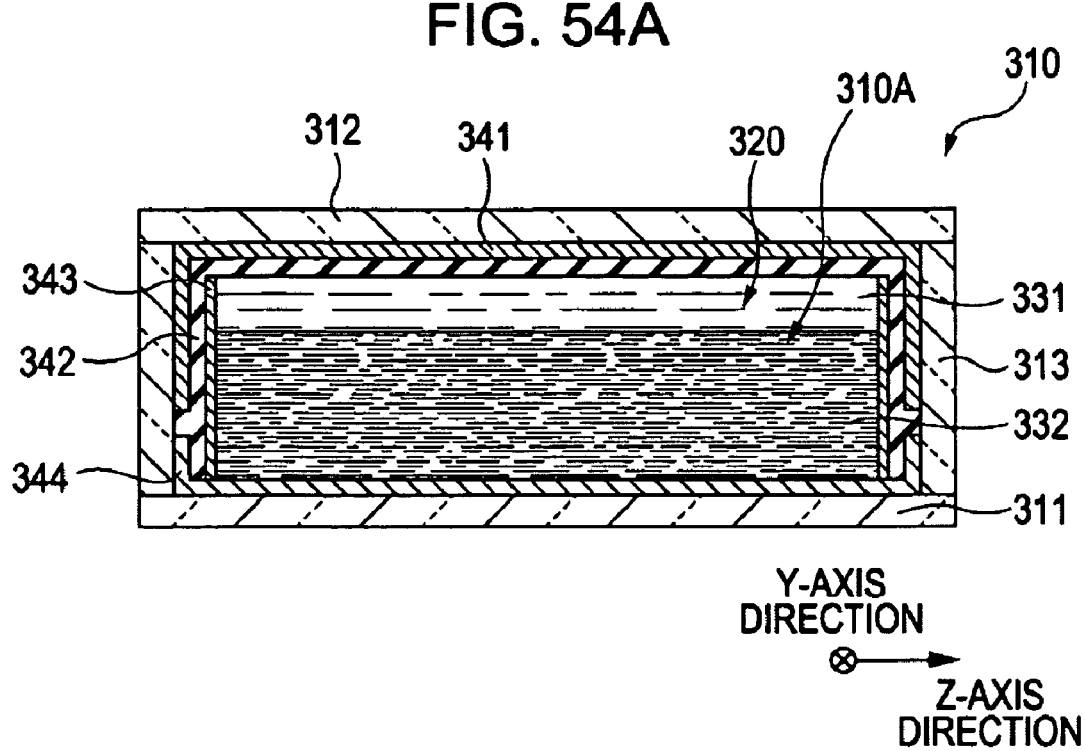
FIGS. 54A and 54B are schematic cross-sectional views illustrating a cutaway of a modification of the optical device according to the thirty-fifth embodiment at an X-Z plane, and a cutaway of the modification of the optical device according to the thirty-fifth embodiment at an X-Y plane.
Figure 54B:
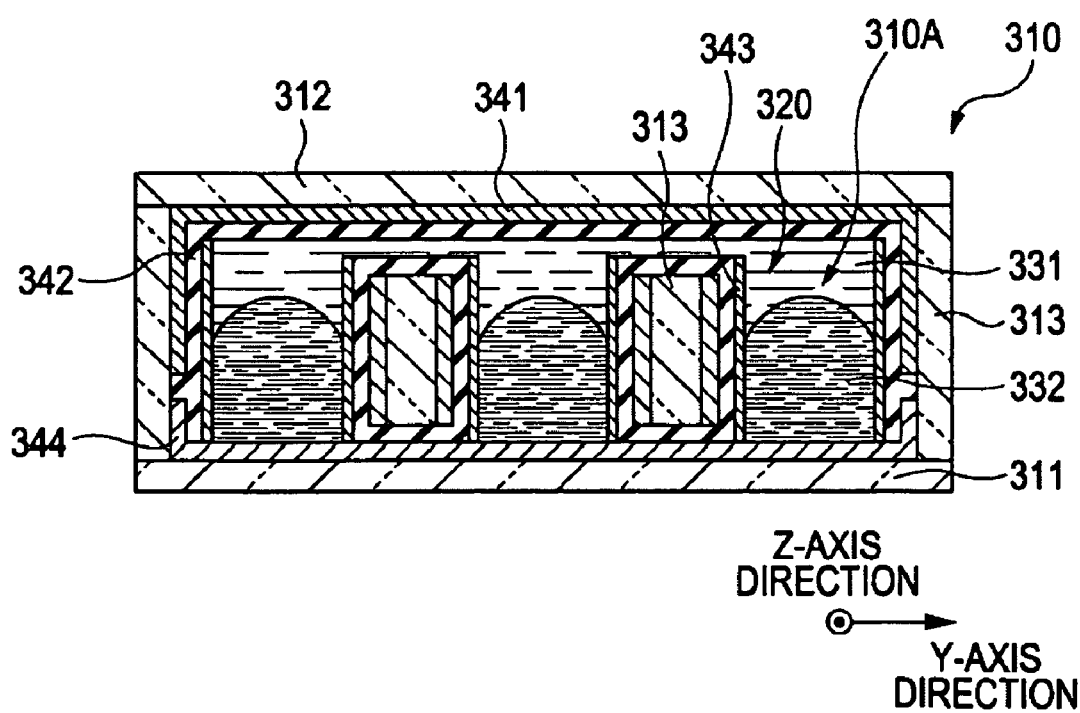

The thirty-fifth embodiment is a modification of the thirty-first embodiment, and specifically, relates to the optical device having the 3-2'nd configuration. A point wherein the optical device according to the thirty-fifth embodiment differs from the optical device according to the thirty-first embodiment is that the layout of the first liquid 331 and second liquid 332 and the layout of the first electrode 341 and second electrode 344 are inverted vertically. FIG. 53A illustrates a schematic cross-sectional view of a cutaway of the optical device according to the thirty-fifth embodiment at an X-Z plane, and FIG. 53B illustrates a schematic cross-sectional view of a cutaway of the optical device according to the thirty-fifth embodiment at an X-Y plane. The first electrode 341 is disposed extending onto the second supporting member 312 from on the side face of the partition walls 313, and the second electrode 344 is disposed extending onto the first supporting member 311. Note that, as shown in FIG. 54A of a schematic cross-sectional view of a cutaway of a modification of the optical device according to the thirty-fifth embodiment at an X-Z plane, and as shown in FIG. 54B of a schematic cross-sectional view of a cutaway of the modification of the optical device according to the thirty-fifth embodiment at an X-Y plane, an arrangement may be made wherein the second electrode 344 extends to the side face of a part of the partition walls 313.

Figure 55A:
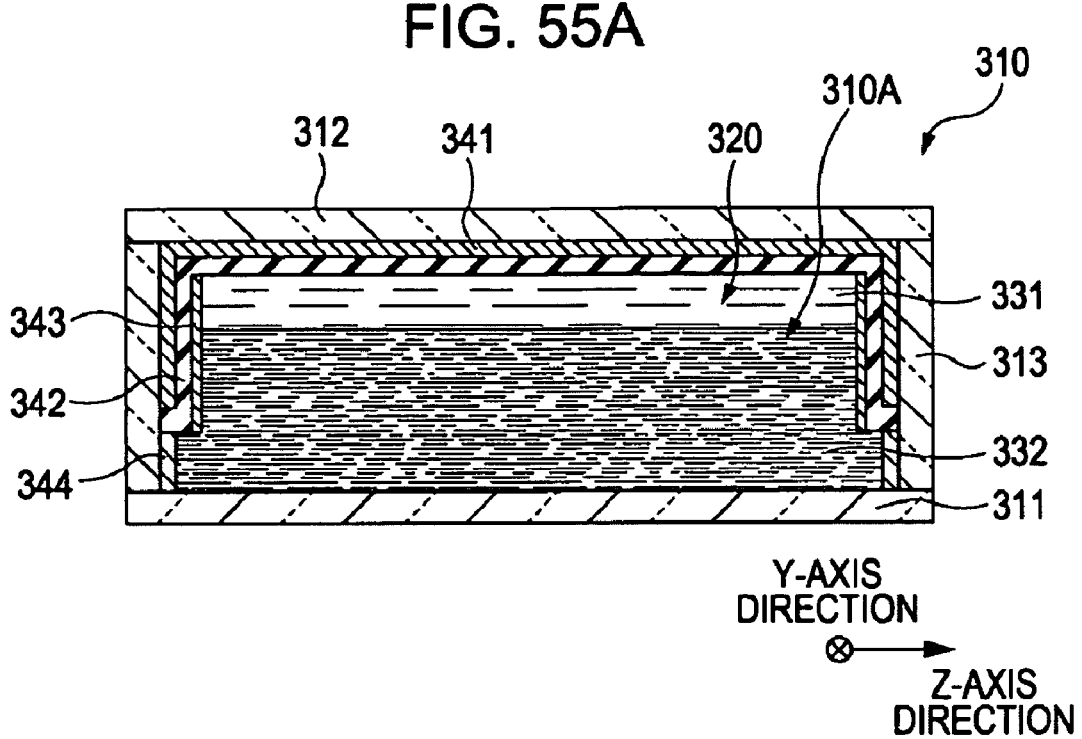
FIGS. 55A and 55B are schematic cross-sectional views illustrating a cutaway of another modification of the optical device according to the thirty-fifth embodiment at an X-Z plane, and a cutaway of the other modification of the optical device according to the thirty-fifth embodiment at an X-Y plane.
Figure 55B:
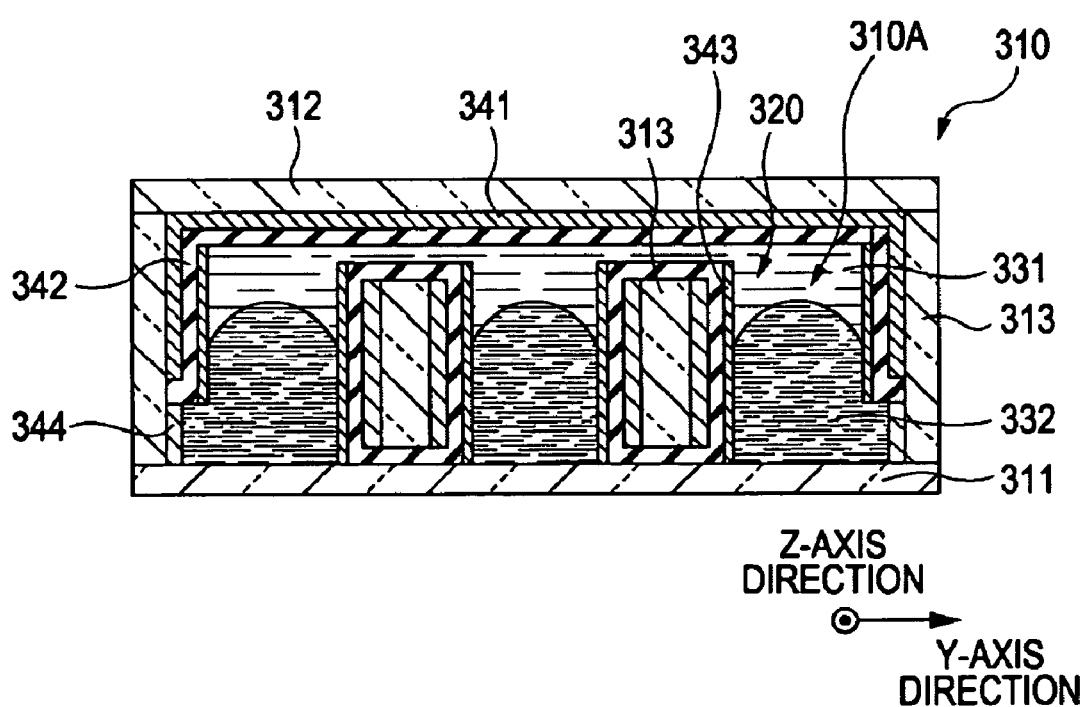

Also, with the modification of the optical device according to the thirty-fifth embodiment of which the schematic cross-sectional view when being cut away at an X-Z plane is shown in FIG. 55A, and of which the schematic cross-sectional view when being cut away at an X-Y plane is shown in FIG. 55B, the second electrode 344 is formed only on the side face of a part of the partition walls 313. Such an arrangement is employed, whereby the electrodes disposed on the optical path can be reduced, and also improvement in optical transmittance can be realized.

The arrangement and configuration of the optical device according to the thirty-fifth embodiment can be regarded as the same as those of the optical device according to the thirty-first embodiment except for the above-mentioned point, so the detailed description thereof will be omitted.

Thirty-Sixth Embodiment

Figure 56A:
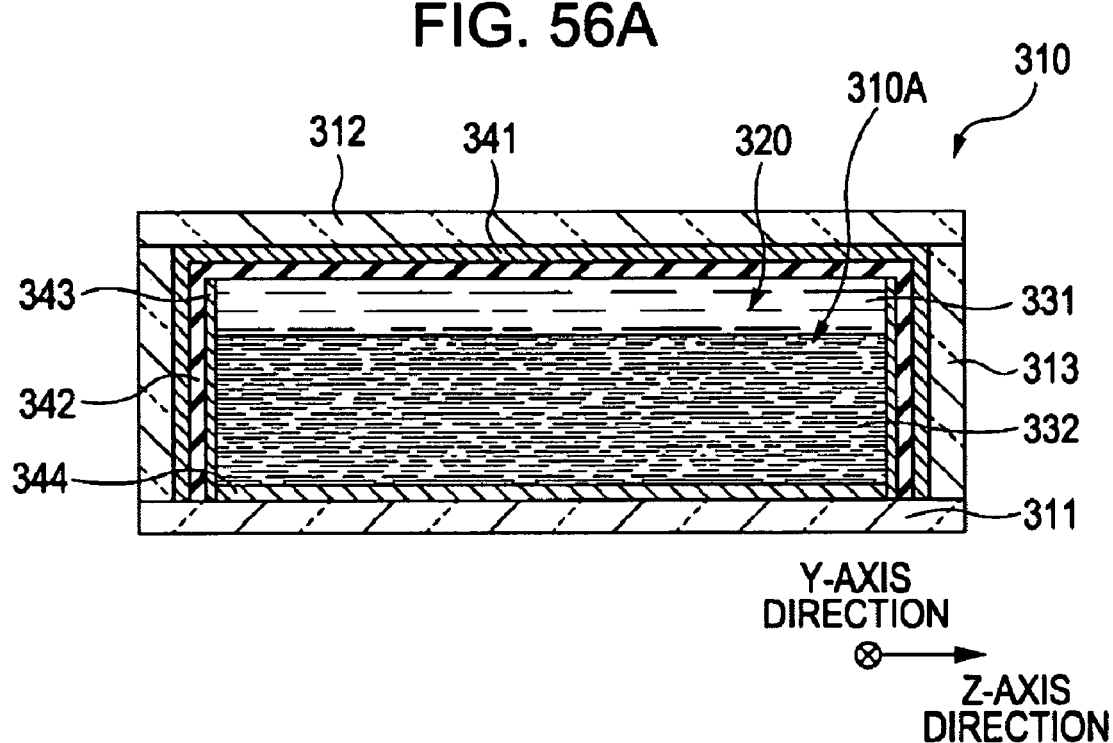
FIGS. 56A and 56B are schematic cross-sectional views illustrating a cutaway of an optical device according to a thirty-sixth embodiment at an X-Z plane, and a cutaway of the optical device according to the thirty-sixth embodiment at an X-Y plane.
Figure 56B:
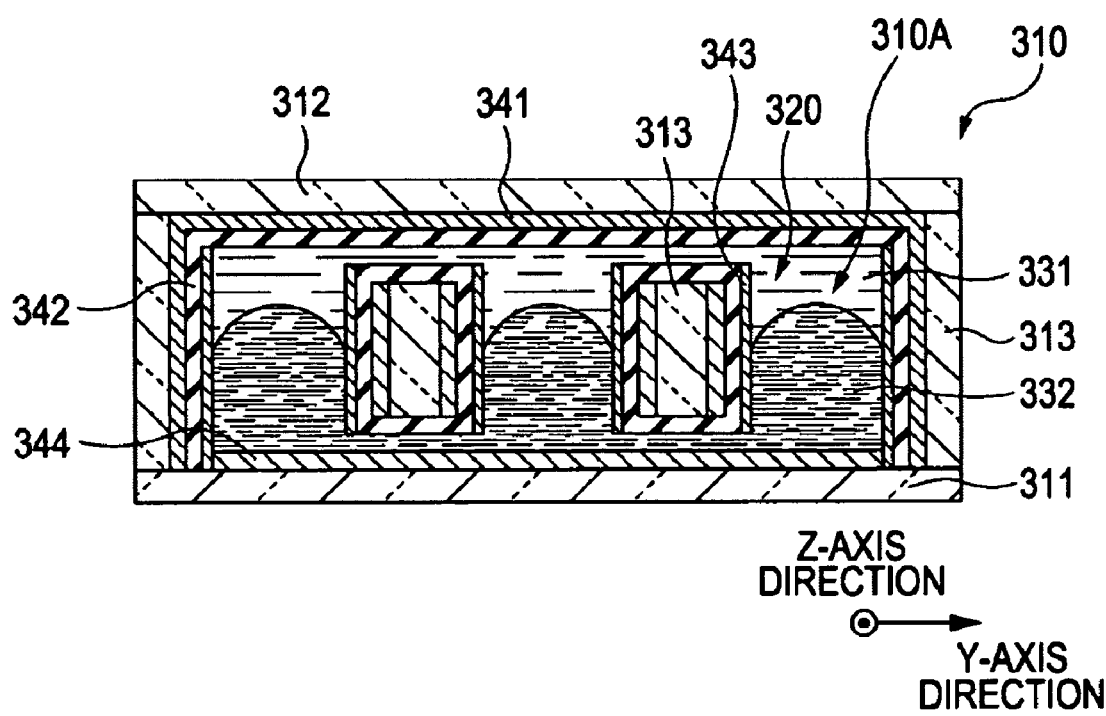
Figure 57A:
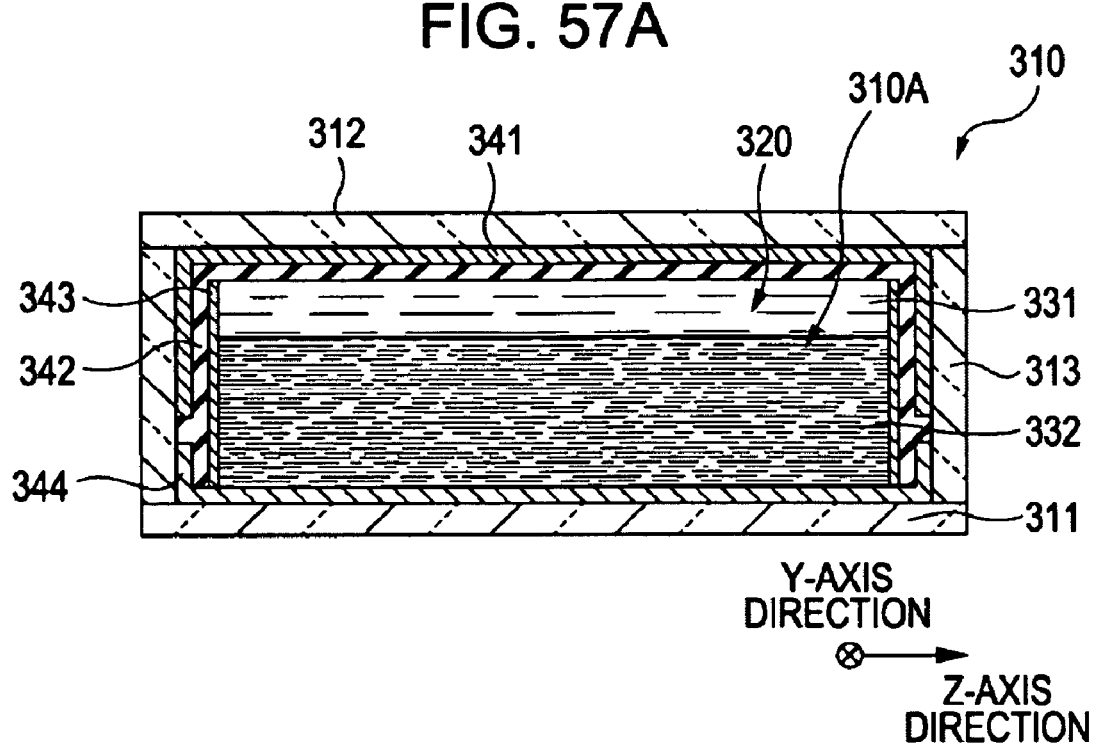
FIGS. 57A and 57B are schematic cross-sectional views illustrating a cutaway of a modification of the optical device according to the thirty-sixth embodiment at an X-Z plane, and a cutaway of the modification of the optical device according to the thirty-sixth embodiment at an X-Y plane.
Figure 57B:
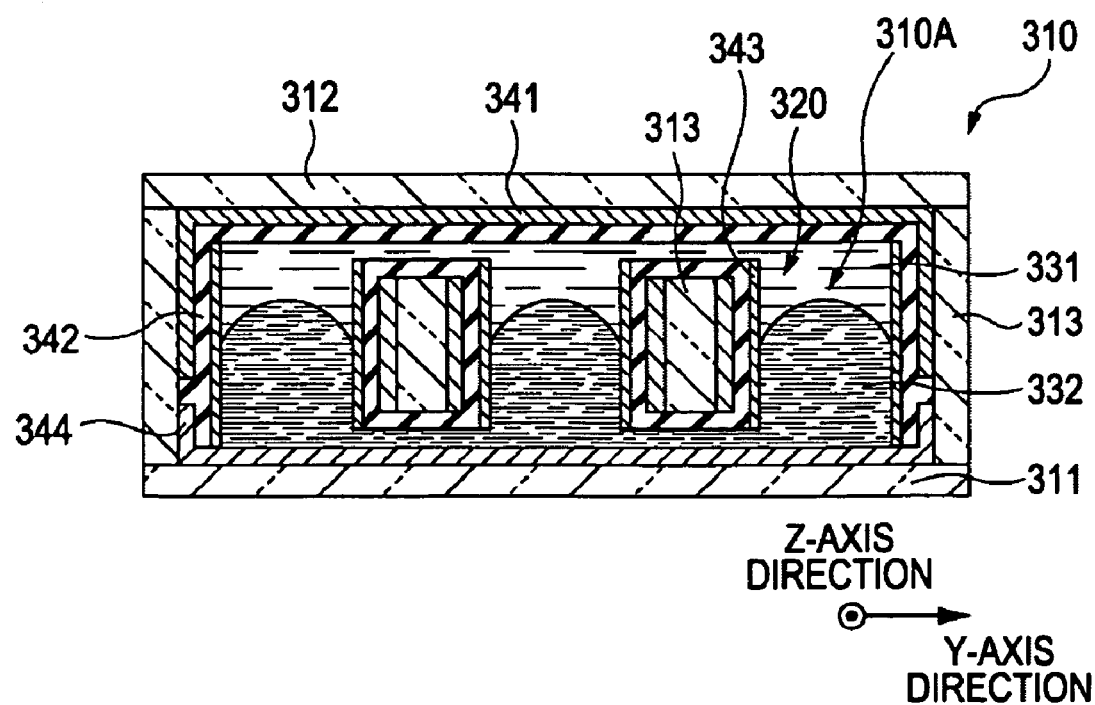

The thirty-sixth embodiment is a modification of the thirty-second embodiment, and specifically, relates to the optical device having the 3-2'nd configuration. A point wherein the optical device according to the thirty-sixth embodiment differs from the optical device according to the thirty-second embodiment is that the layout of the first liquid 331 and second liquid 332 and the layout of the first electrode 341 and second electrode 344 are inverted vertically. FIG. 56A illustrates a schematic cross-sectional view of a cutaway of the optical device according to the thirty-sixth embodiment at an X-Z plane, and FIG. 56B illustrates a schematic cross-sectional view of a cutaway of the optical device according to the thirty-sixth embodiment at an X-Y plane. The first electrode 341 is disposed extending onto the second supporting member 312 from on the side face of the partition walls 313, and the second electrode 344 is disposed extending onto the first supporting member 311. Note that, as shown in FIG. 57A of a schematic cross-sectional view of a cutaway of a modification of the optical device according to the thirty-sixth embodiment at an X-Z plane, and as shown in FIG. 57B of a schematic cross-sectional view of a cutaway of the modification of the optical device according to the thirty-sixth embodiment at an X-Y plane, an arrangement may be made wherein the second electrode 344 extends to the side face of a part of the partition walls 313.

Also, with a modification of the optical device according to the thirty-sixth embodiment of which the schematic cross-sectional view when being cut away at an X-Z plane is shown in FIG. 58A, and of which the schematic cross-sectional view when being cut away at an X-Y plane is shown in FIG. 58B, the second electrode 344 is formed only on the side face of a part of the partition walls 313. Such an arrangement is employed, whereby the electrodes disposed on the optical path can be reduced, and also improvement in optical transmittance can be realized.

The arrangement and configuration of the optical device according to the thirty-sixth embodiment can be regarded as the same as those of the optical device according to the thirty-second embodiment except for the above-mentioned point, so the detailed description thereof will be omitted.

For example, the optical device described with the fifth embodiment (see FIG. 6) can be fabricated with the following method.

First, the side face 33, partition face 34, first partition plate 35, and second partition plate 37 are fabricated. Note that a pouring port for pouring liquid, and a drainage port for draining liquid are provided on the side face 33 as appropriate. Subsequently, the side face 33, partition face 34, first partition plate 35, and second partition plate 37 are assembled using an adhesive agent. Subsequently, the second electrode 42 and fourth electrode 44 are formed on the side face 33, partition face 34, first partition plate 35, and second partition plate 37, for example, based on the sputtering method, the first insulating film 45 is formed on the second electrode 42, and the second insulating film 46 is formed on the fourth electrode 44, for example, based on the sputtering method, and further, the water-repellent processing layers 36 and 38 are formed on the first insulating film 45 and second insulating film 46. Subsequently, the first face 31 and second face 32 where the first electrode 41 and third electrode 43 are formed respectively are fixed to the side face 33.

Subsequently, the second liquid 22 and fourth liquid 24 are poured into the first chamber 13 and second chamber 14 from the pouring port (not shown) provided on the side face 33 while depressurizing the first chamber 13 and second chamber 14. Subsequently, the first liquid 21 and third liquid 23 are poured into the first chamber 13 and second chamber 14 from the pouring port provided on the side face 33 while pressurizing the first chamber 13 and second chamber 14. At this time, the first liquid 21 and third liquid 23 are poured while forming an interface between the second liquid 22 and fourth liquid 24, and a part of the second liquid 22 and fourth liquid 24 is drained from the drainage port (not shown). Finally, the pouring port and drainage port are sealed, the electrodes are connected to an external control circuit, whereby the optical device can be completed.

Note that the optical devices described with the other embodiments can also be fabricated substantially with the same method.

The present application has been described so far based on the preferred embodiments, but the present application is not restricted to those embodiments. The arrangements and configurations of the optical devices and lighting system (strobe device) described with the embodiments are examples, and materials and so forth making up the optical devices are also examples, which may be changed as appropriate. The plane shapes of the optical devices are not restricted to a square, and substantially arbitrary shapes (e.g., rectangle, circle, ellipse, oval, etc.) may be employed. Also, with the third through ninth embodiments, the arrangement of the first chamber and the arrangement of the second chamber may arbitrarily be combined. That is to say, the arrangement of the first chamber according to the third embodiment, and the arrangement of the second chamber according to the fourth through ninth embodiments may be combined, the arrangement of the first chamber according to the fourth embodiment, and the arrangement of the second chamber according to the third and fifth through ninth embodiments may be combined, the arrangement of the first chamber according to the fifth embodiment, and the arrangement of the second chamber according to the third, fourth, sixth through ninth embodiments may be combined, the arrangement of the first chamber according to the sixth embodiment, and the arrangement of the second chamber according to the third through fifth, and seventh through ninth embodiments may be combined, the arrangement of the first chamber according to the seventh embodiment, and the arrangement of the second chamber according to the third through sixth, eighth, and ninth embodiments may be combined, the arrangement of the first chamber according to the eighth embodiment, and the arrangement of the second chamber according to the third through seventh, and ninth embodiments may be combined, and the arrangement of the first chamber according to the ninth embodiment, and the arrangement of the second chamber according to the third through eighth embodiments may be combined. Also, the arrangements of the first cylindrical lens, and first cylindrical lens group, and the arrangements of the second cylindrical lens and second cylindrical lens group may be changed. The arrangements, configurations, and layout status of the first electrode, second electrode, third electrode, and fourth electrode may be changed as appropriate depending on the characteristics (electroconductivity, insulation properties) of liquid adjacent to these electrodes directly or through an insulating film. An arrangement may be made wherein light is input to the first cylindrical lens group or first supporting member of an optical device, and light is output from the second cylindrical lens group or second supporting member, or an arrangement may be made wherein light is input to the second cylindrical lens group or second supporting member of an optical device, and light is output from the first cylindrical lens group or first supporting member. Also, with the third through fifteenth embodiments, the first cylindrical lens group and second cylindrical lens group have been combined, but further, a third cylindrical lens group and fourth cylindrical lens group of which the directions where the axis lines extend differ may be combined.

Further, with the sixteenth through twenty-second embodiments, the arrangement of the first chamber and the arrangement of the second chamber may arbitrarily be combined. That is to say, the arrangement of the first chamber according to the sixteenth embodiment, and the arrangement of the second chamber according to the seventeenth through twenty-second embodiments may be combined, the arrangement of the first chamber according to the seventeenth embodiment, and the arrangement of the second chamber according to the sixteenth, eighteenth through twenty-second embodiments may be combined, the arrangement of the first chamber according to the eighteenth embodiment, and the arrangement of the second chamber according to the sixteenth, seventeenth, nineteenth through twenty-second embodiments may be combined, the arrangement of the first chamber according to the nineteenth embodiment, and the arrangement of the second chamber according to the sixteenth through eighteenth, and twentieth through twenty-second embodiments may be combined, the arrangement of the first chamber according to the twentieth embodiment, and the arrangement of the second chamber according to the sixteenth through nineteenth, twenty-first, and twenty-second embodiments may be combined, the arrangement of the first chamber according to the twenty-first embodiment, and the arrangement of the second chamber according to the sixteenth through twentieth, and twenty-second embodiments may be combined, and the arrangement of the first chamber according to the twenty-second embodiment, and the arrangement of the second chamber according to the sixteenth through twenty-first embodiments may be combined. Also, the arrangements of the first cylindrical lens, and first cylindrical lens group, and the arrangements of the second cylindrical lens and second cylindrical lens group may be changed. The arrangements, configurations, and layout status of the first electrode, second electrode, third electrode, and fourth electrode may be changed as appropriate depending on the characteristics (electroconductivity, insulation properties) of liquid adjacent to these electrodes directly or through an insulating film. An arrangement may be made wherein light is input to the first cylindrical lens group of an optical device, and light is output from the second cylindrical lens group, or an arrangement may be made wherein light is input to the second cylindrical lens group of an optical device, and light is output from the first cylindrical lens group. Also, with the sixteenth through twenty-eighth embodiments, the first cylindrical lens group and second cylindrical lens group have been combined, but further, a third cylindrical lens group and fourth cylindrical lens group of which the directions where the axis lines extend differ may be combined.

With the third through thirteenth, and sixteenth through twenty-sixth embodiments, an arrangement may be made wherein the second electrode making up the first cylindrical lens is divided for each first cylindrical lens, and voltage to be applied is controlled for each of the divided second electrodes, or an arrangement may be made wherein the fourth electrode making up the second cylindrical lens is divided for each second cylindrical lens, and voltage to be applied is controlled for each of the divided fourth electrodes. Also, With the fourteenth, fifteenth, twenty-seventh, and twenty-eighth embodiments, an arrangement may be made wherein the first electrode making up the first cylindrical lens is divided for each first cylindrical lens, and voltage to be applied is controlled for each of the divided first electrodes, or an arrangement may be made wherein the third electrode making up the second cylindrical lens is divided for each second cylindrical lens, and voltage to be applied is controlled for each of the divided third electrodes. With the twenty-ninth through thirty-sixth embodiments, an arrangement may be made wherein the first electrode making up a cylindrical lens is divided for each cylindrical lens, and voltage to be applied is controlled for each of the divided first electrodes.

Also, with the optical device having the 1-1'st or 2-1'st configuration, an arrangement may be made wherein the first electrode is made up of a transparent electrode provided on the inner face of the partition face making up the first chamber, the third electrode is made up of a transparent electrode provided on the inner face of the partition face making up the second chamber, the second electrode is made up of a transparent electrode provided on the inner face of the first face, and the fourth electrode is made up of a transparent electrode provided on the inner face of the second face. With the optical device having such a configuration, further, an arrangement may be made wherein the first electrode is provided extending to the inner face of the side face making up the first chamber, and the third electrode is provided extending to the inner face of the side face making up the second chamber. Also, with the optical device having such a configuration, further, as shown in FIGS. 60A and 60B or FIGS. 61A and 61B, also, as shown in FIGS. 62A and 62B or FIGS. 63A and 63B, an arrangement may be made wherein the second electrode is provided extending to the inner face of the side face making up the first chamber, and the fourth electrode is provided extending to the inner face of the side face making up the second chamber. Note that, with these modifications or later-described modifications, an arrangement may be made wherein the second electrode is also provided on the side face of the first partition plate, and the fourth electrode is also provided on the side face of the second partition plate.

Also, with the optical device having the 1-1'st or 2-1'st configuration, an arrangement may be made wherein the first electrode is made up of a transparent electrode provided on the inner face of the first face, the third electrode is made up of a transparent electrode provided on the inner face of the second face, the second electrode is made up of a transparent electrode provided on the inner face of the partition face making up the first chamber, and the fourth electrode is made up of a transparent electrode provided on the inner face of the partition face making up the second chamber. With the optical device having such a configuration, further, an arrangement may be made wherein the first electrode is provided extending to the inner face of the side face making up the first chamber, and the third electrode is provided extending to the inner face of the side face making up the second chamber. Also, with the optical device having such a configuration, further, an arrangement may be made wherein the second electrode is provided extending to the inner face of the side face making up the first chamber, and the fourth electrode is provided extending to the inner face of the side face making up the second chamber.

Also, with the optical device having the 1-1'st or 2-1'st configuration, an arrangement may be made wherein the first electrode is provided on the inner face of the side face making up the first chamber, the third electrode is provided on the inner face of the side face making up the second chamber, the second electrode is made up of a transparent electrode provided on the inner face of the partition face making up the first chamber, and the fourth electrode is made up of a transparent electrode provided on the inner face of the partition face making up the second chamber. With the optical device having such a configuration, further, an arrangement may be made wherein the second electrode is provided extending to the inner face of the side face making up the first chamber, and the fourth electrode is provided extending to the inner face of the side face making up the second chamber. Also, with the optical device having such a configuration, further, an arrangement may be made wherein the first electrode is provided extending to the inner face of the side face making up the first chamber, and the third electrode is provided extending to the inner face of the side face making up the second chamber.

Also, with the optical device having the 1-1'st or 2-1'st configuration, an arrangement may be made wherein the first electrode is made up of a transparent electrode provided on the inner face of the partition face making up the first chamber, the third electrode is made up of a transparent electrode provided on the inner face of the partition face making up the second chamber, the second electrode is provided on the inner face of the side face making up the first chamber, and the fourth electrode is provided on the inner face of the side face making up the second chamber. With the optical device having such a configuration, further, an arrangement may be made wherein the second electrode is provided extending to the inner face of the side face making up the first chamber, and the fourth electrode is provided extending to the inner face of the side face making up the second chamber.

Also, with the optical device having the 1-1'st or 2-1'st configuration, an arrangement may be made wherein the first electrode is provided on the inner face of the side face making up the first chamber, the third electrode is provided on the inner face of the side face making up the second chamber, the second electrode is provided on the inner face of the side face making up the first chamber, and the fourth electrode is provided on the inner face of the side face making up the second chamber.

Modifications of the array of cylindrical lenses according to the twenty-ninth through thirty-sixth embodiments are exemplified in FIGS. 64A, 64B, 65A, 65B, 66A, 66B, 67A, and 67B, respectively. With the example shown in FIG. 64A, for example, cylindrical lenses of 5×3=15 are arrayed in a two-dimensional matrix manner. Also, with the example shown in FIG. 64B, cylindrical lenses are arrayed in a two-dimensional matrix manner (albeit in a zigzag manner). With the examples shown in FIGS. 65A, 65B, 66A, and 67B, cylindrical lenses of which the directions of the X axis differ are arrayed. With the example shown in FIG. 67A, cylindrical lenses and ordinary lenses (plane shapes are circles) are arrayed in a mixed manner.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed as follows:

1. The lighting system comprising:
   an optical device including a cylindrical lens made up of a liquid lens;
   emission means including an axis line in the Z-axis direction; and
   a reflecting mirror configured to reflect light emitted from said emission means;
   wherein the cross-sectional shape of a light reflecting portion when cutting away said reflecting mirror at a virtual plane perpendicular to the Z axis is a part of a parabola,
   wherein the axis line of said emission means is positioned between the vertex of said parabola and a focal point; and wherein a distance between the focal point of said parabola and the axis line of said emission means is 0.1 mm through 1 mm.

2. The lighting system comprising:

an optical device including a cylindrical lens made up of a liquid lens;

emission means including an axis line in the Z-axis direction; and a reflecting mirror configured to reflect light emitted from said emission means;

wherein the cross-sectional shape of a light reflecting portion when cutting away said reflecting mirror at a virtual plane perpendicular to the Z axis is a part of a parabola, wherein the axis line of said emission means is positioned between the vertex of said parabola and a focal point; and wherein assuming that a straight line connecting the vertex of said parabola and said focal point is the X axis, the optical device includes:

a first cylindrical lens group where a plurality of first cylindrical lenses are apposed, each of which is made up of a liquid lens of which the axis line extends in the direction parallel to the Z axis;

a second cylindrical lens group where a plurality of second cylindrical lenses are apposed, each of which is made up of a liquid lens of which the axis line extends in the direction parallel to the Y axis, and light passing through said first cylindrical lens group is input; and a housing including a first face transmissive to incident light, a second face transmissive to incident light, facing said first face, a side face linking said first face and said second face, and a partition face transmissive to incident light;

wherein a first chamber is configured of said first face, said partition face, and a portion of said side face;

and wherein a second chamber is configured of said second face, said partition face, and the remaining portion of said side face;

and wherein a first partition plate is disposed within said first chamber, which extends in the direction parallel to the Z axis, and partitions between said first cylindrical lenses;

and wherein a second partition plate is disposed within said second chamber, which extends in the direction parallel to the Y axis, and partitions between said second cylindrical lenses;

and wherein said first chamber is occupied with first liquid and second liquid which make up a liquid lens serving as said first cylindrical lens;

and wherein said second chamber is occupied with third liquid and fourth liquid which make up a liquid lens serving as said second cylindrical lens.

3. The lighting system comprising:

an optical device including a cylindrical lens made up of a liquid lens;

emission means including an axis line in the Z-axis direction; and a reflecting mirror configured to reflect light emitted from said emission means;

wherein the cross-sectional shape of a light reflecting portion when cutting away said reflecting mirror at a virtual plane perpendicular to the Z axis is a part of a parabola, wherein the axis line of said emission means is positioned between the vertex of said parabola and a focal point; and wherein assuming that a straight line connecting the vertex of said parabola and said focal point is the X axis, the optical device includes:

a first cylindrical lens group where a plurality of first cylindrical lenses are apposed, each of which is made up of a liquid lens of which the axis line extends in the direction parallel to the Z axis;

a second cylindrical lens group where a plurality of second cylindrical lenses are apposed, each of which is made up of a liquid lens of which the axis line extends in the direction parallel to the Y axis, and light passing through said first cylindrical lens group is input; and a housing including a first face transmissive to incident light, a second face transmissive to incident light, facing said first face, and a side face linking said first face and said second face;

wherein a first chamber is configured of said first face, and a portion of said side face;

and wherein a second chamber is configured of said second face, and the remaining portion of said side face;

and wherein said first chamber and said second chamber are communicated;

and wherein a first partition plate is disposed within said first chamber, which extends in the direction parallel to the Z axis, and partitions between said first cylindrical lenses;

and wherein a second partition plate is disposed within said second chamber, which extends in the direction parallel to the Y axis, and partitions between said second cylindrical lenses;

and wherein said first chamber is occupied with first liquid and second liquid which make up a liquid lens serving as said first cylindrical lens;

and wherein said second chamber is occupied with third liquid and second liquid which make up a liquid lens serving as said second cylindrical lens.

4. The lighting system comprising: according to claim 1, an optical device including a cylindrical lens made up of a liquid lens;

emission means including an axis line in the Z-axis direction; and a reflecting mirror configured to reflect light emitted from said emission means;

wherein the cross-sectional shape of a light reflecting portion when cutting away said reflecting mirror at a virtual plane perpendicular to the Z axis is a part of a parabola, wherein the axis line of said emission means is positioned between the vertex of said parabola and a focal point; and wherein assuming that a straight line connecting the vertex of said parabola and said focal point is the X axis, the optical device includes:

a first cylindrical lens group where a plurality of first cylindrical lenses are apposed, each of which is made up of a liquid lens of which the axis line extends in the direction parallel to the Z axis;

a second cylindrical lens group where a plurality of second cylindrical lenses are apposed, each of which is made up of a liquid lens of which the axis line extends in the direction parallel to the Z axis, and light passing through said first cylindrical lens group is input; and a housing including
a first face transmissive to incident light,
a second face transmissive to incident light, facing said first face,
a side face linking said first face and said second face, and
a partition face transmissive to incident light;
wherein a first chamber is configured of said first face, said partition face, and a portion of said side face;
and wherein a second chamber is configured of said second face, said partition face, and the remaining portion of said side face;
and wherein a first partition plate is disposed within said first chamber, which extends in the direction parallel to the Z axis, and partitions between said first cylindrical lenses;
and wherein a second partition plate is disposed within said second chamber, which extends in the direction parallel to the Z axis, and partitions between said second cylindrical lenses;
and wherein said first chamber is occupied with first liquid and second liquid which make up a liquid lens serving as said first cylindrical lens;
and wherein said second chamber is occupied with third liquid and fourth liquid which make up a liquid lens serving as said second cylindrical lens.

5. The lighting system comprising:
an optical device including a cylindrical lens made up of a liquid lens;
emission means including an axis line in the Z-axis direction; and
a reflecting mirror configured to reflect light emitted from said emission means;
wherein the cross-sectional shape of a light reflecting portion when cutting away said reflecting mirror at a virtual plane perpendicular to the Z axis is a part of a parabola,
wherein the axis line of said emission means is positioned between the vertex of said parabola and a focal point; and
wherein assuming that a straight line connecting the vertex of said parabola and said focal point is the X axis, the optical device includes:
a first cylindrical lens group where a plurality of first cylindrical lenses are apposed, each of which is made up of a liquid lens of which the axis line extends in the direction parallel to the Z axis;
a second cylindrical lens group where a plurality of second cylindrical lenses are apposed, each of which is made up of a liquid lens of which the axis line extends in the direction parallel to the Z axis, and light passing through said first cylindrical lens group is input; and
a housing including
a first face transmissive to incident light,
a second face transmissive to incident light, facing said first face, and
a side face linking said first face and said second face;
wherein a first chamber is configured of said first face, and a portion of said side face;
and wherein a second chamber is configured of said second face, and the remaining portion of said side face;
and wherein said first chamber and said second chamber are communicated;
and wherein a first partition plate is disposed within said first chamber, which extends in the direction parallel to the Z axis, and partitions between said first cylindrical lenses;
and wherein a second partition plate is disposed within said second chamber, which extends in the direction parallel to the Z axis, and partitions between said second cylindrical lenses;
and wherein said first chamber is occupied with first liquid and second liquid which make up a liquid lens serving as said first cylindrical lens;
and wherein said second chamber is occupied with third liquid and second liquid which make up a liquid lens serving as said second cylindrical lens.

6. The lighting system comprising:
an optical device including a cylindrical lens made up of a liquid lens;
emission means including an axis line in the Z-axis direction; and
a reflecting mirror configured to reflect light emitted from said emission means;
wherein the cross-sectional shape of a light reflecting portion when cutting away said reflecting mirror at a virtual plane perpendicular to the Z axis is a part of a parabola,
wherein the axis line of said emission means is positioned between the vertex of said parabola and a focal point; and
the optical device including:
a housing including
a first supporting member transmissive to incident light,
a second supporting member transmissive to incident light, facing said first supporting member, and
a plurality of partition walls disposed between said first supporting member and said second supporting member;
wherein cylindrical lens chambers are configured of said first supporting member, said second supporting member, and said partition walls;
and wherein each of said cylindrical lens chambers is occupied with a layered structure of said first liquid and said second liquid making up a liquid crystal lens;
and wherein the plane shape of each of said cylindrical lens chambers is a rectangle with four rounded corners.

7. A lighting system comprising:
an optical device including a cylindrical lens made up of a liquid lens;
emission means including an axis line in the Z-axis direction; and
a reflecting mirror configured to reflect light emitted from said emission means;
wherein the cross-sectional shape of a light reflecting portion when cutting away said reflecting mirror at a virtual plane perpendicular to the Z axis is a part of an ellipse,
and wherein the axis line of said emission means is positioned between the intersection point with the long axis of said ellipse and a focal point adjacent to the intersection point.

8. The lighting system according to claim 7, wherein a distance between the focal point of said ellipse and the axis line of said emission means is 0.1 mm through 1 mm.

9. The lighting system according to claim 7, wherein assuming that a straight line connecting the intersection point of the long axis of said ellipse and said focal point is the X axis, the optical device includes:
a first cylindrical lens group where a plurality of first cylindrical lenses are apposed, each of which is made up of a liquid lens of which the axis line extends in the direction parallel to the Z axis;
a second cylindrical lens group where a plurality of second cylindrical lenses are apposed, each of which is made up of a liquid lens of which the axis line extends in the direction parallel to the Y axis, and light passing through said first cylindrical lens group is input; and a housing including a first face transmissive to incident light, a second face transmissive to incident light, facing said first face, a side face linking said first face and said second face, and a partition face transmissive to incident light;

wherein a first chamber is configured of said first face, said partition face, and a portion of said side face;

and wherein a second chamber is configured of said second face, said partition face, and the remaining portion of said side face;

and wherein a first partition plate is disposed within said first chamber, which extends in the direction parallel to the Z axis, and partitions between said first cylindrical lenses;

and wherein a second partition plate is disposed within said second chamber, which extends in the direction parallel to the Y axis, and partitions between said second cylindrical lenses;

and wherein said first chamber is occupied with first liquid and second liquid which make up a liquid lens serving as said first cylindrical lens;

and wherein said second chamber is occupied with third liquid and fourth liquid which make up a liquid lens serving as said second cylindrical lens.

10. The lighting system according to claim 7, wherein assuming that a straight line connecting the intersection point of the long axis of said ellipse and said focal point is the X axis, the optical device includes:

a first cylindrical lens group where a plurality of first cylindrical lenses are apposed, each of which is made up of a liquid lens of which the axis line extends in the direction parallel to the Z axis;

a second cylindrical lens group where a plurality of second cylindrical lenses are apposed, each of which is made up of a liquid lens of which the axis line extends in the direction parallel to the Y axis, and light passing through said first cylindrical lens group is input; and a housing including a first face transmissive to incident light, a second face transmissive to incident light, facing said first face, and a side face linking said first face and said second face;

wherein a first chamber is configured of said first face, and a portion of said side face;

and wherein a second chamber is configured of said second face, and the remaining portion of said side face;

and wherein said first chamber and said second chamber are communicated;

and wherein a first partition plate is disposed within said first chamber, which extends in the direction parallel to the Z axis, and partitions between said first cylindrical lenses;

and wherein a second partition plate is disposed within said second chamber, which extends in the direction parallel to the Y axis, and partitions between said second cylindrical lenses;

and wherein said first chamber is occupied with first liquid and second liquid which make up a liquid lens serving as said first cylindrical lens;

and wherein said second chamber is occupied with third liquid and second liquid which make up a liquid lens serving as said second cylindrical lens.

11. The lighting system according to claim 7, wherein assuming that a straight line connecting the intersection point of the long axis of said ellipse and said focal point is the X axis, the optical device includes:

a first cylindrical lens group where a plurality of first cylindrical lenses are apposed, each of which is made up of a liquid lens of which the axis line extends in the direction parallel to the Z axis;

a second cylindrical lens group where a plurality of second cylindrical lenses are apposed, each of which is made up of a liquid lens of which the axis line extends in the direction parallel to the Z axis, and light passing through said first cylindrical lens group is input; and a housing including a first face transmissive to incident light, a second face transmissive to incident light, facing said first face, a side face linking said first face and said second face, and a partition face transmissive to incident light;

wherein a first chamber is configured of said first face, said partition face, and a portion of said side face;

and wherein a second chamber is configured of said second face, said partition face, and the remaining portion of said side face;

and wherein a first partition plate is disposed within said first chamber, which extends in the direction parallel to the Z axis, and partitions between said first cylindrical lenses;

and wherein a second partition plate is disposed within said second chamber, which extends in the direction parallel to the Z axis, and partitions between said second cylindrical lenses;

and wherein said first chamber is occupied with first liquid and second liquid which make up a liquid lens serving as said first cylindrical lens;

and wherein said second chamber is occupied with third liquid and fourth liquid which make up a liquid lens serving as said second cylindrical lens.

12. The lighting system according to claim 7, wherein assuming that a straight line connecting the intersection point of the long axis of said ellipse and said focal point is the X axis, the optical device includes:

a first cylindrical lens group where a plurality of first cylindrical lenses are apposed, each of which is made up of a liquid lens of which the axis line extends in the direction parallel to the Z axis;

a second cylindrical lens group where a plurality of second cylindrical lenses are apposed, each of which is made up of a liquid lens of which the axis line extends in the direction parallel to the Z axis, and light passing through said first cylindrical lens group is input; and a housing including a first face transmissive to incident light, a second face transmissive to incident light, facing said first face, and a side face linking said first face and said second face;

wherein a first chamber is configured of said first face, and a portion of said side face;

and wherein a second chamber is configured of said second face, and the remaining portion of said side face;

and wherein said first chamber and said second chamber are communicated;

and wherein a first partition plate is disposed within said first chamber, which extends in the direction parallel to the Z axis, and partitions between said first cylindrical lenses;

and wherein a second partition plate is disposed within said second chamber, which extends in the direction parallel to the Z axis, and partitions between said second cylindrical lenses;

and wherein said first chamber is occupied with first liquid and second liquid which make up a liquid lens serving as said first cylindrical lens;

and wherein said second chamber is occupied with third liquid and second liquid which make up a liquid lens serving as said second cylindrical lens.

13. The lighting system according to claim 8, said optical device comprising:
    a housing including
    a first supporting member transmissive to incident light,
    a second supporting member transmissive to incident light, facing said first supporting member, and
    a plurality of partition walls disposed between said first supporting member and said second supporting member;
    wherein cylindrical lens chambers are configured of said first supporting member, said second supporting member, and said partition walls;
    and wherein each of said cylindrical lens chamber is occupied with a layered structure of said first liquid and said second liquid making up a liquid crystal lens;
    and wherein the plane shape of each of said cylindrical lens chambers is a rectangle with four rounded corners.

14. A lighting system comprising:
    an optical device including a cylindrical lens made up of a liquid lens;
    an emission unit including an axis line in the Z-axis direction; and
    a reflecting minor configured to reflect light emitted from said emission unit;
    wherein the cross-sectional shape of a light reflecting portion when cutting away said reflecting mirror at a virtual plane perpendicular to the Z axis is a part of a parabola;
    and wherein the axis line of said emission unit is positioned between the vertex of said parabola and a focal point.

15. A lighting system comprising:
    an optical device including a cylindrical lens made up of a liquid lens;
    an emission unit including an axis line in the Z-axis direction; and
    a reflecting mirror configured to reflect light emitted from said emission unit;
    wherein the cross-sectional shape of a light reflecting portion when cutting away said reflecting mirror at a virtual plane perpendicular to the Z axis is a part of an ellipse;
    and wherein the axis line of said emission unit is positioned between the intersection point with the long axis of said ellipse and a focal point adjacent to the intersection point.

\* \* \* \* \*